(12) United States Patent
Kondo

(10) Patent No.: US 7,630,576 B2
(45) Date of Patent: Dec. 8, 2009

(54) SIGNAL PROCESSING APPARATUS AND METHOD, AND COMMAND-SEQUENCE DATA STRUCTURE

(75) Inventor: Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 851 days.

(21) Appl. No.: 11/050,275

(22) Filed: Feb. 4, 2005

(65) Prior Publication Data

US 2005/0226529 A1   Oct. 13, 2005

(30) Foreign Application Priority Data

Feb. 19, 2004   (JP) ............................. 2004-042904

(51) Int. Cl.
G06K 9/36   (2006.01)
(52) U.S. Cl. ..................................... 382/276
(58) Field of Classification Search ................. 382/276
See application file for complete search history.

(56) References Cited

U.S. PATENT DOCUMENTS

| | | | | |
|---|---|---|---|---|
| 6,119,048 A * | 9/2000 | Kondo et al. ................... 700/94 |
| 6,563,430 B1 * | 5/2003 | Kemink et al. ......... 340/825.49 |
| 6,640,144 B1 * | 10/2003 | Huang et al. ................... 700/65 |
| 6,747,590 B1 * | 6/2004 | Weber ........................ 341/176 |
| 6,987,539 B2 * | 1/2006 | Kondo et al. ................. 348/441 |
| 7,047,325 B2 * | 5/2006 | Kondo et al. ................. 710/16 |
| 7,170,422 B2 * | 1/2007 | Nelson et al. .......... 340/825.72 |
| 2002/0019892 A1 | 2/2002 | Kondo et al. |
| 2004/0031060 A1 | 2/2004 | Kondo |

FOREIGN PATENT DOCUMENTS

| | | |
|---|---|---|
| JP | 04-241584 | 8/1992 |
| JP | 05-020447 | 1/1993 |
| JP | 11-355683 | 12/1999 |
| JP | 2000-013713 | 1/2000 |
| JP | 2000-125268 | 4/2000 |
| JP | 2000-235644 | 8/2000 |
| JP | 2000-307594 | 11/2000 |
| JP | 2001-014119 | 1/2001 |
| JP | 2002-209228 | 7/2002 |
| JP | 2002/223374 | 8/2002 |
| JP | 2002-374461 | 12/2002 |
| JP | 2003-150949 | 5/2003 |
| JP | 2003-179821 | 6/2003 |
| JP | 2003-198967 | 7/2003 |

(Continued)

*Primary Examiner*—Bhavesh M Mehta
*Assistant Examiner*—Soo Jin Park
(74) *Attorney, Agent, or Firm*—Oblon, Spivak, McClelland, Maier & Neustadt, L.L.P.

(57) ABSTRACT

Many functions are implemented by using a single unit of hardware. A first receiver and a second receiver receive a command sequence consisting of a plurality of commands sent from a controller, and supply the command sequence to a first R-IC and a second R-IC, respectively. The first R-IC switches the internal configuration according to at least one command of the command sequence, performs signal processing on a received first signal, and outputs a second signal. The second R-IC switches the internal configuration according to at least one command of the command sequence, performs signal processing on the second signal output from the first R-IC, and outputs a third signal. The present invention can be used for an integrated circuit (IC).

24 Claims, 71 Drawing Sheets

FOREIGN PATENT DOCUMENTS

| | | |
|---|---|---|
| JP | 2003-333502 | 11/2003 |
| JP | 2003-333541 | 11/2003 |
| WO | WO96/07987 | 3/1996 |
| WO | WO 0163921 A1 * | 8/2001 |
| WO | WO 04/001696 A1 | 12/2003 |

* cited by examiner

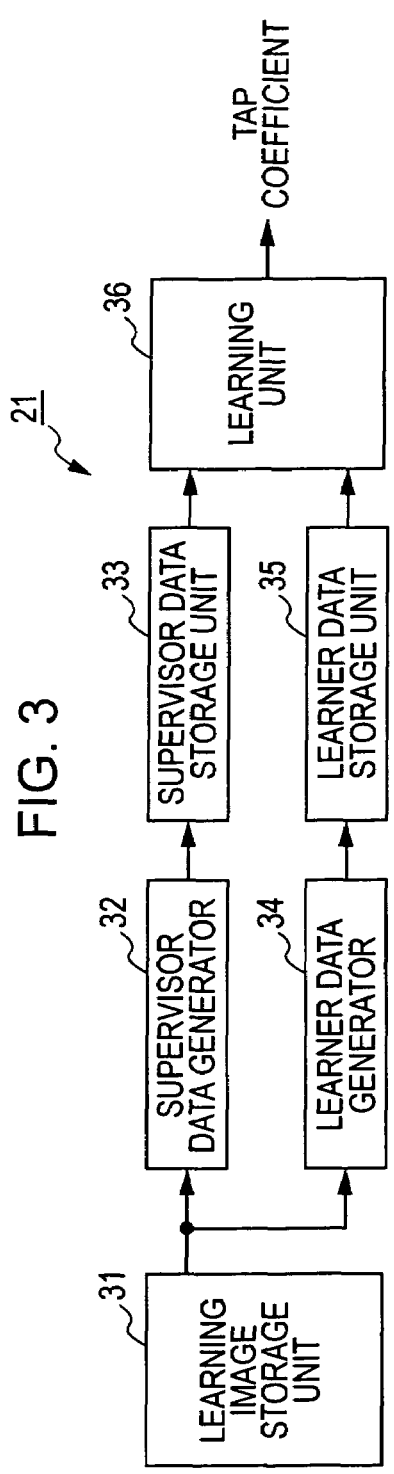
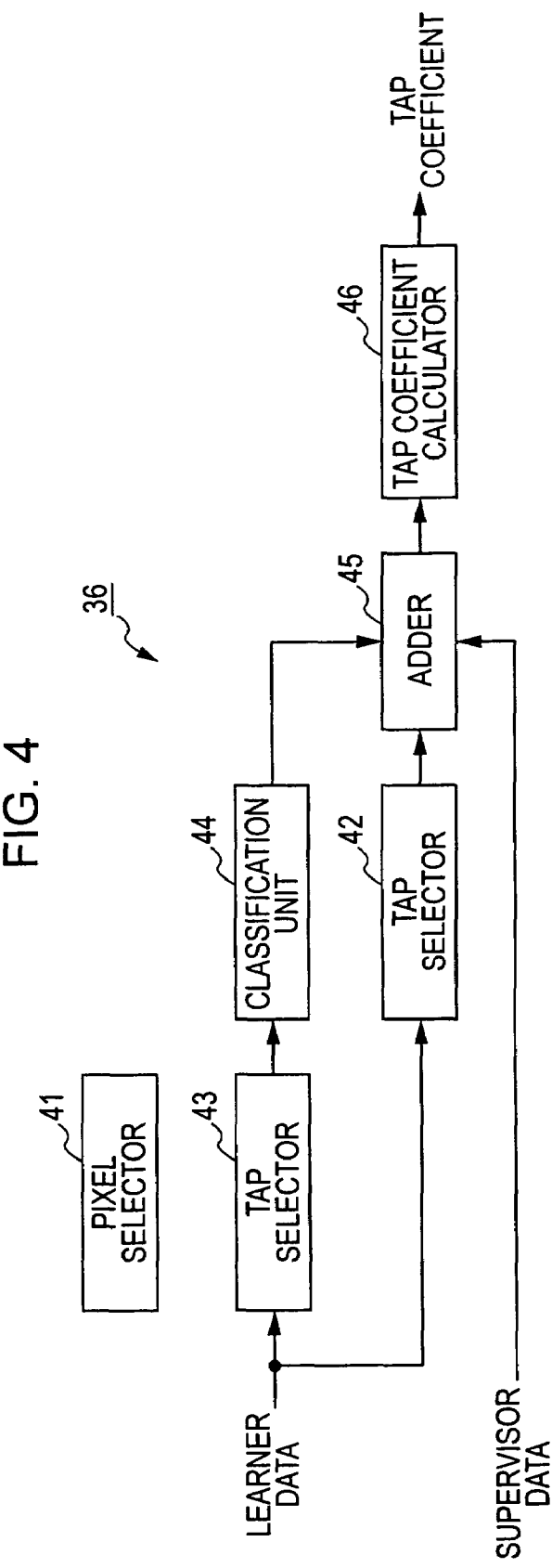

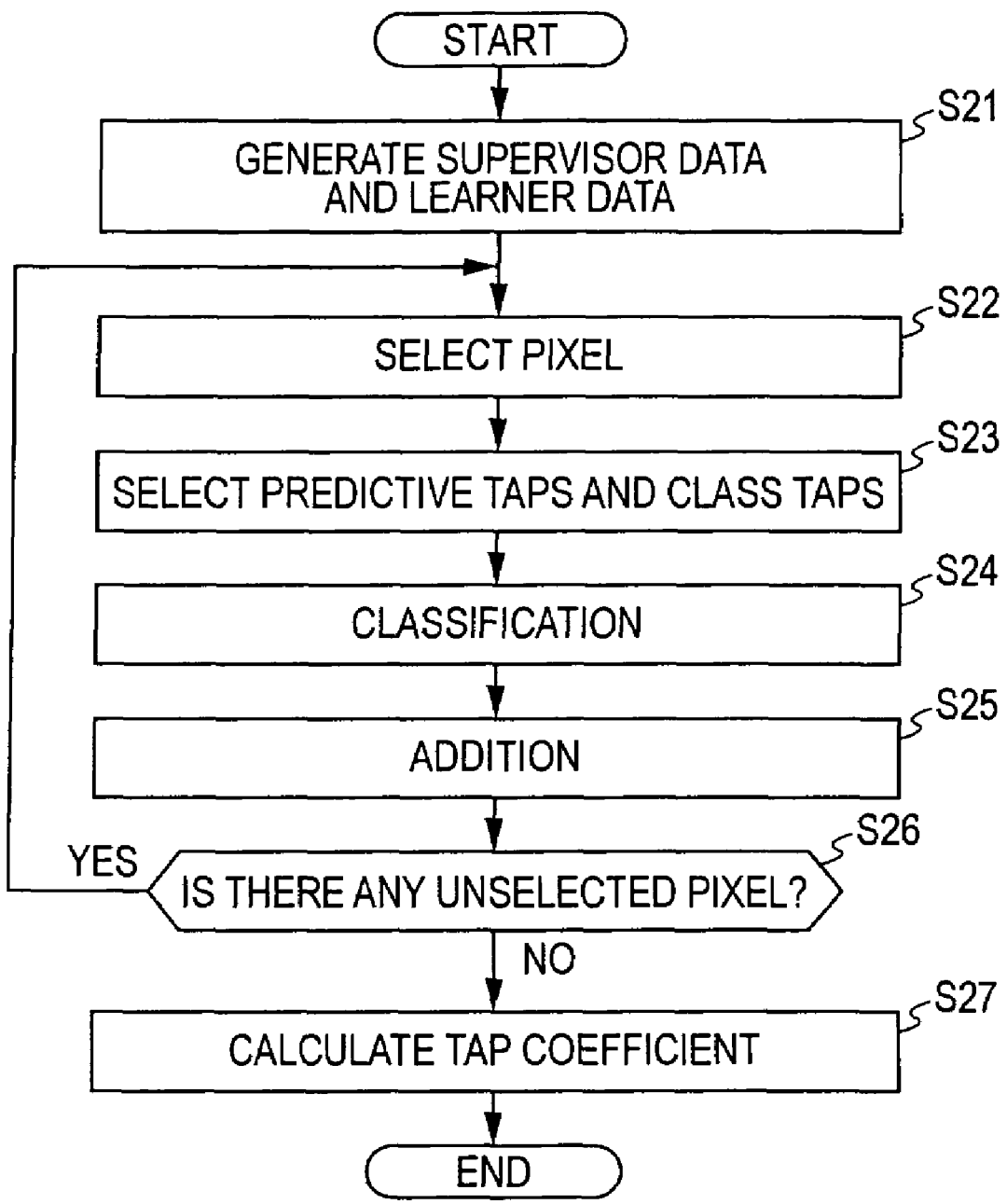

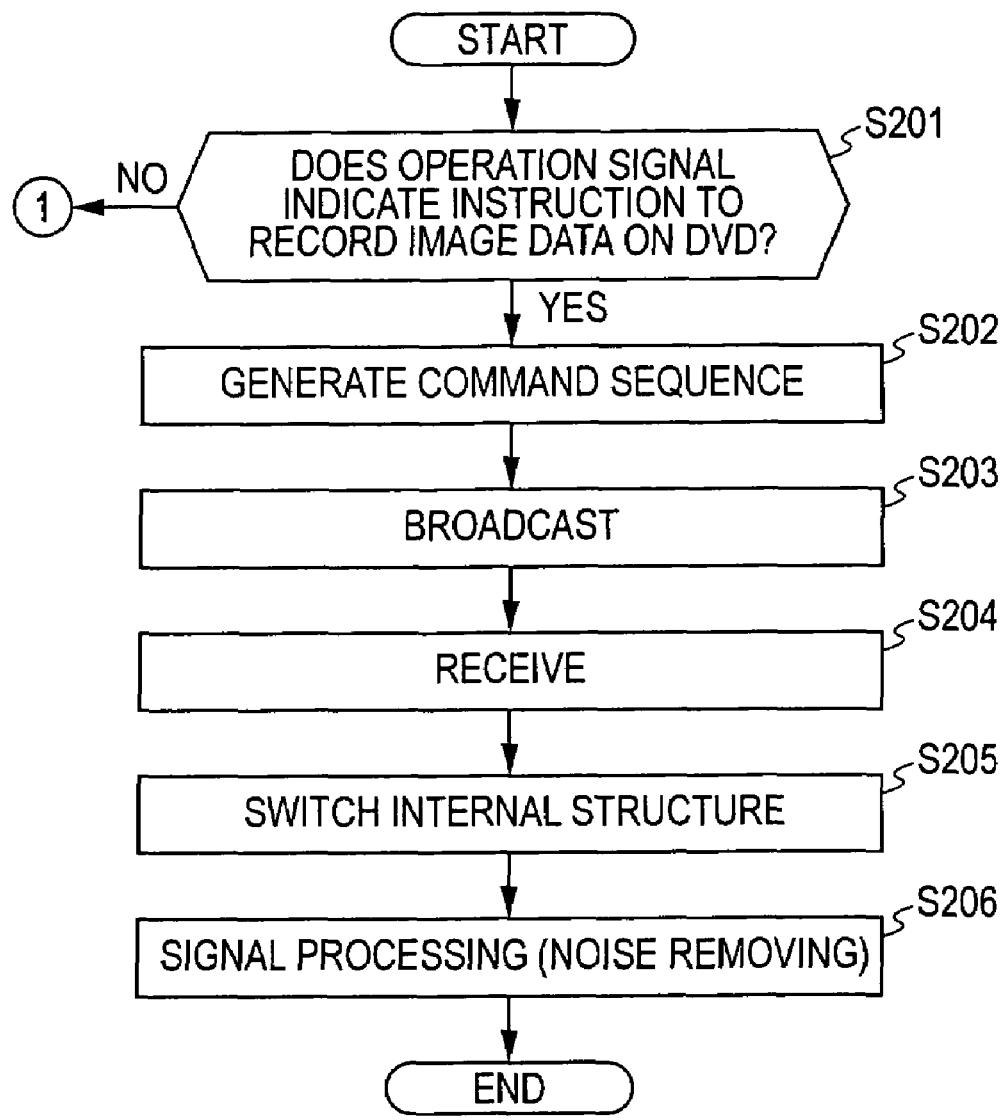

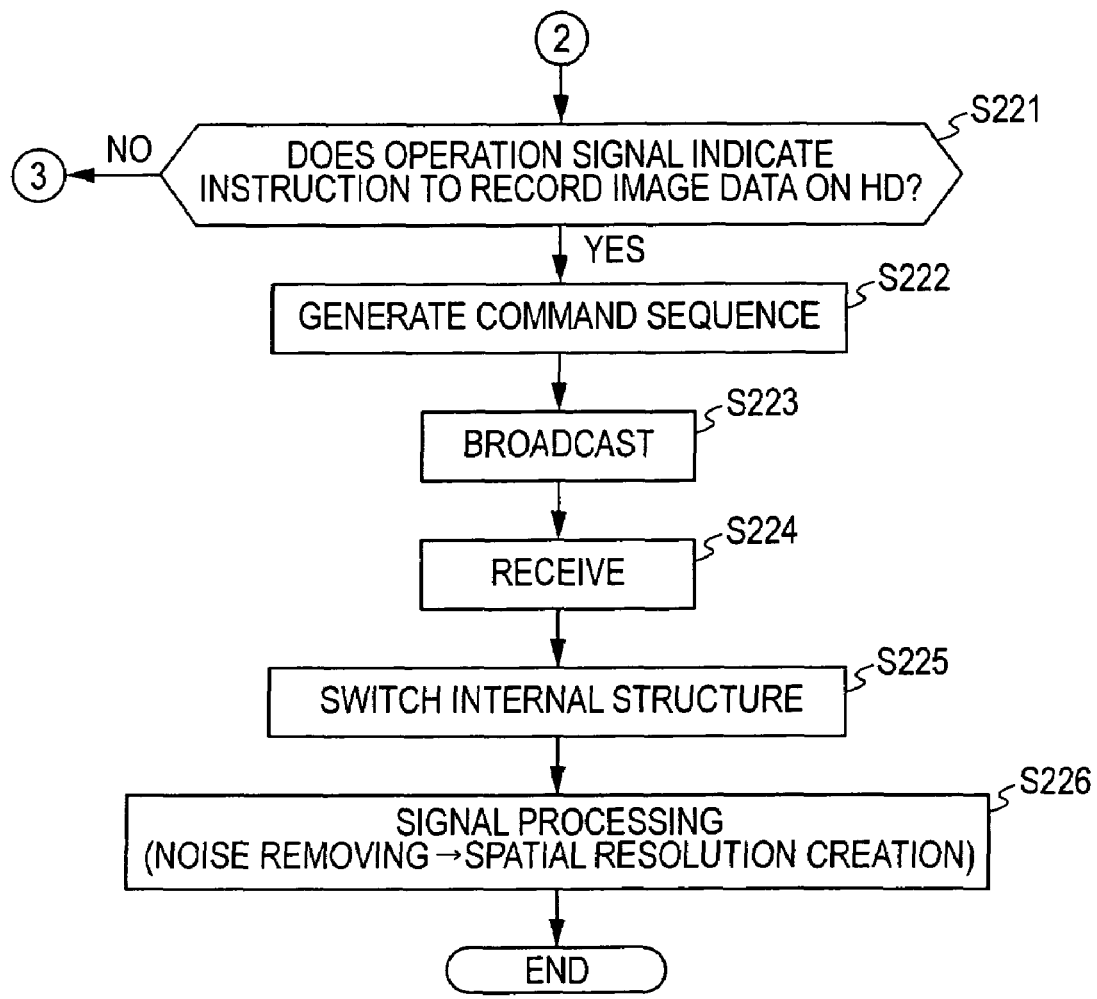

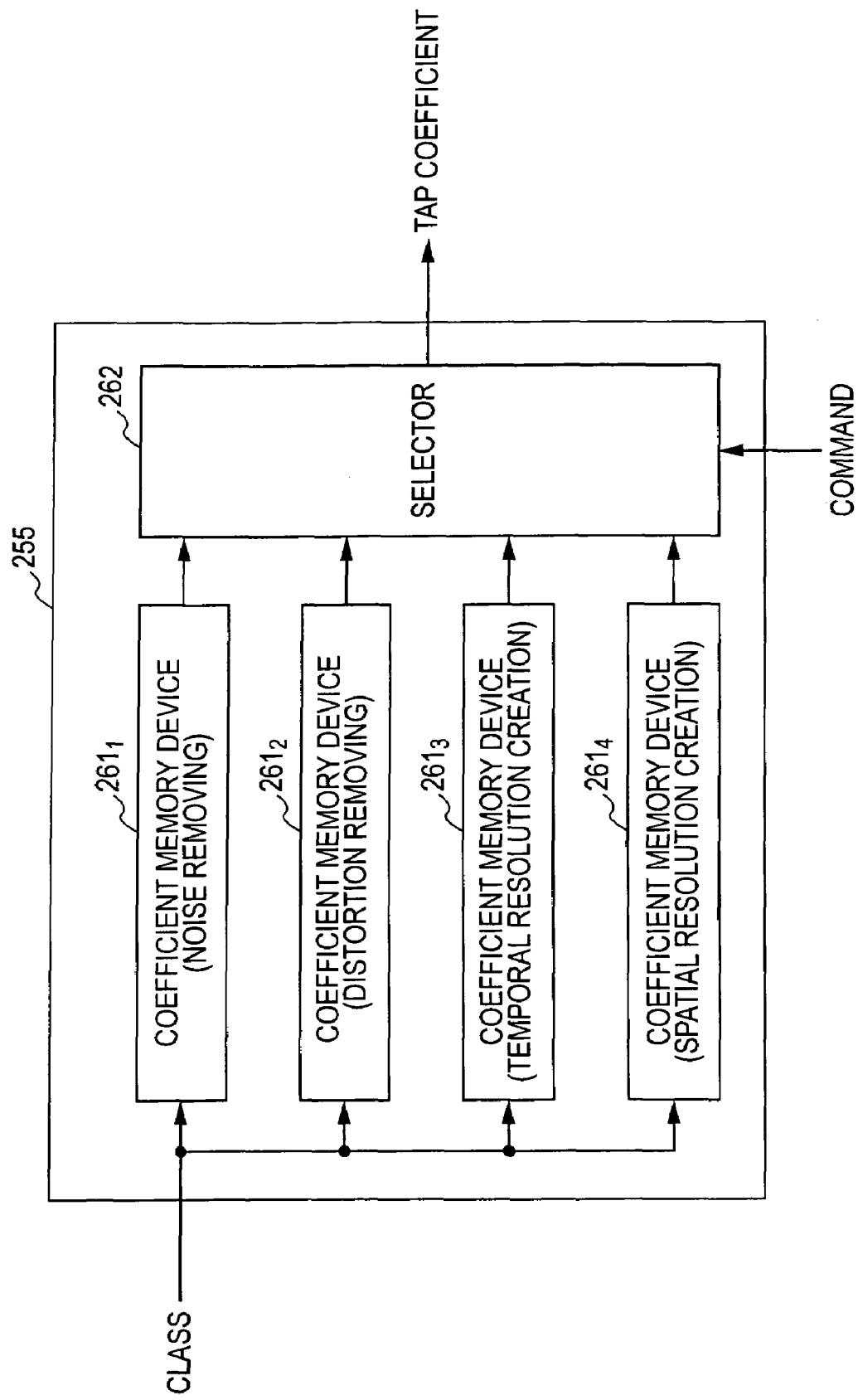

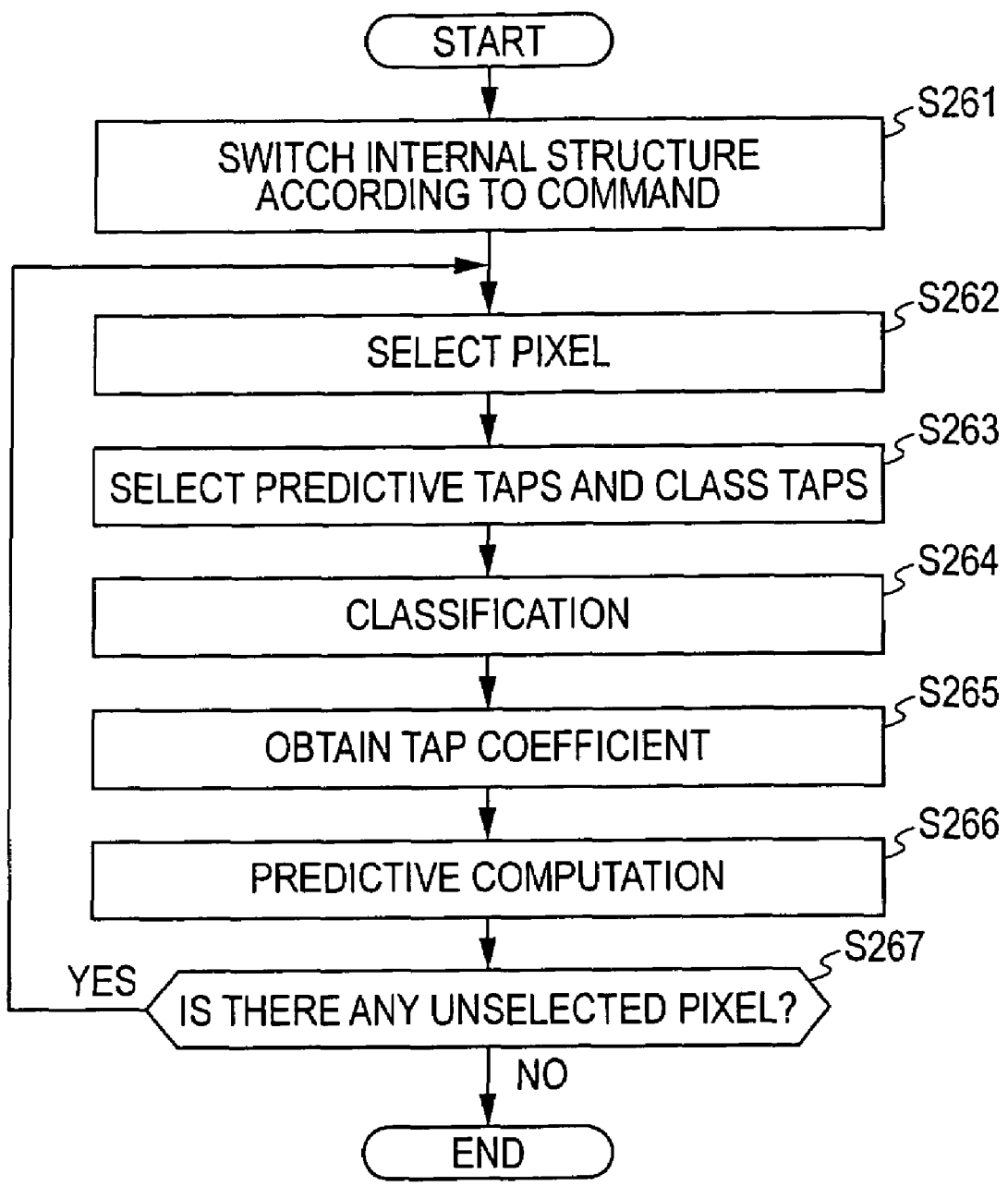

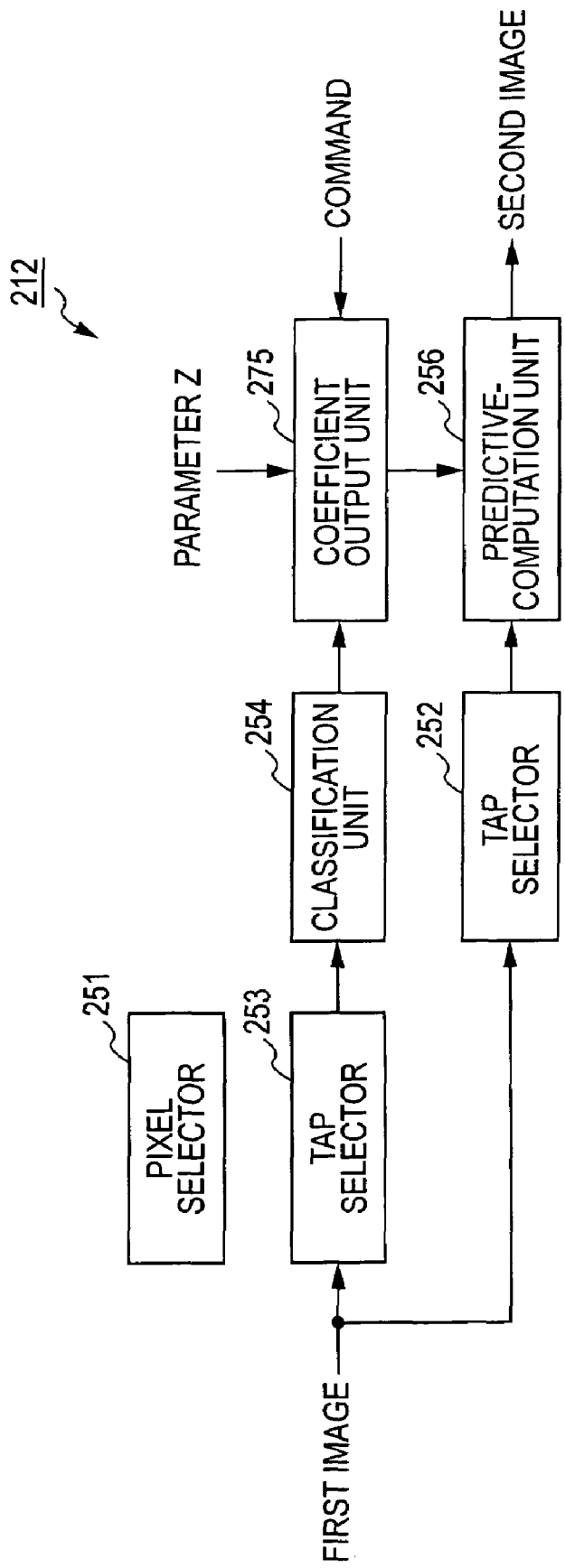

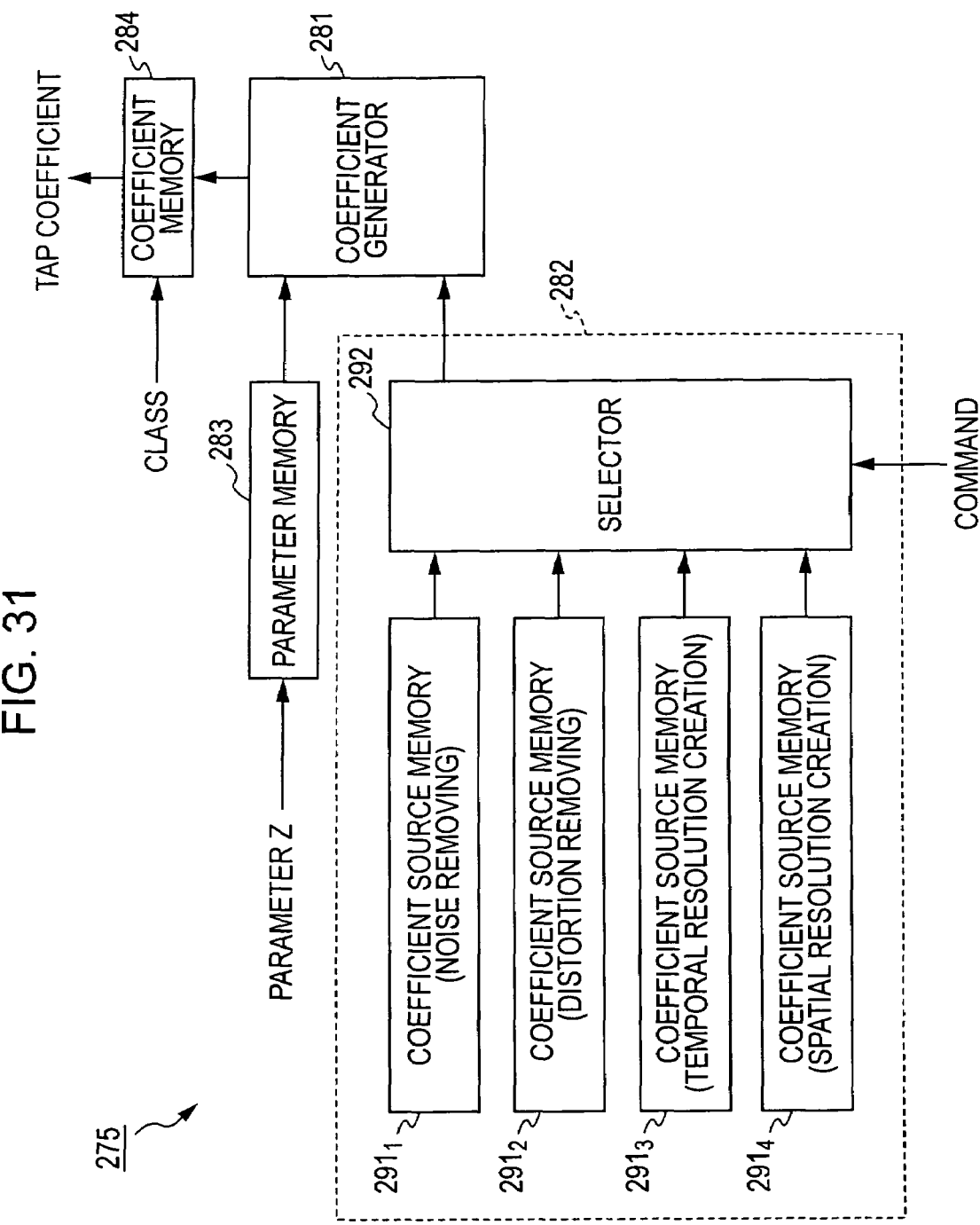

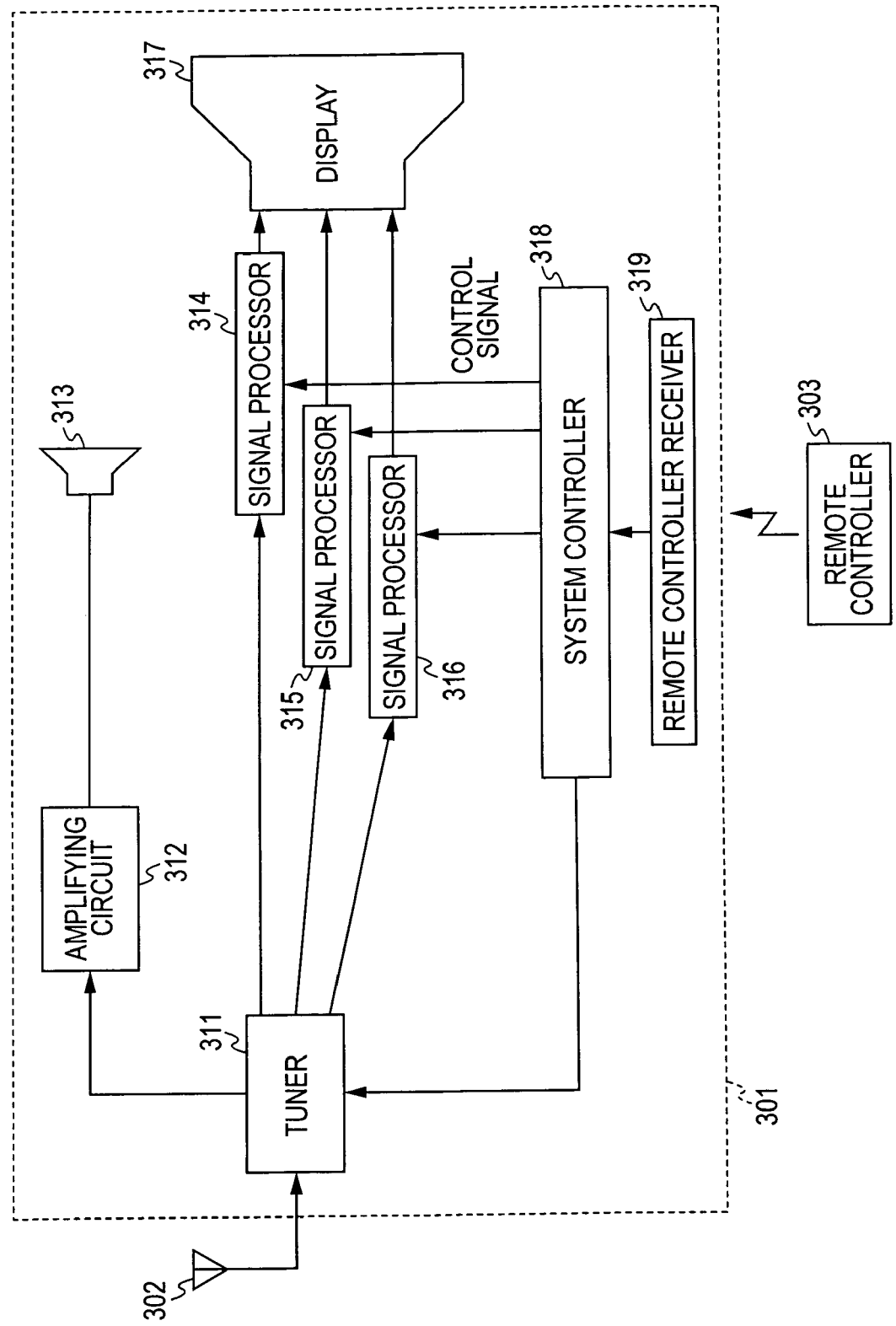

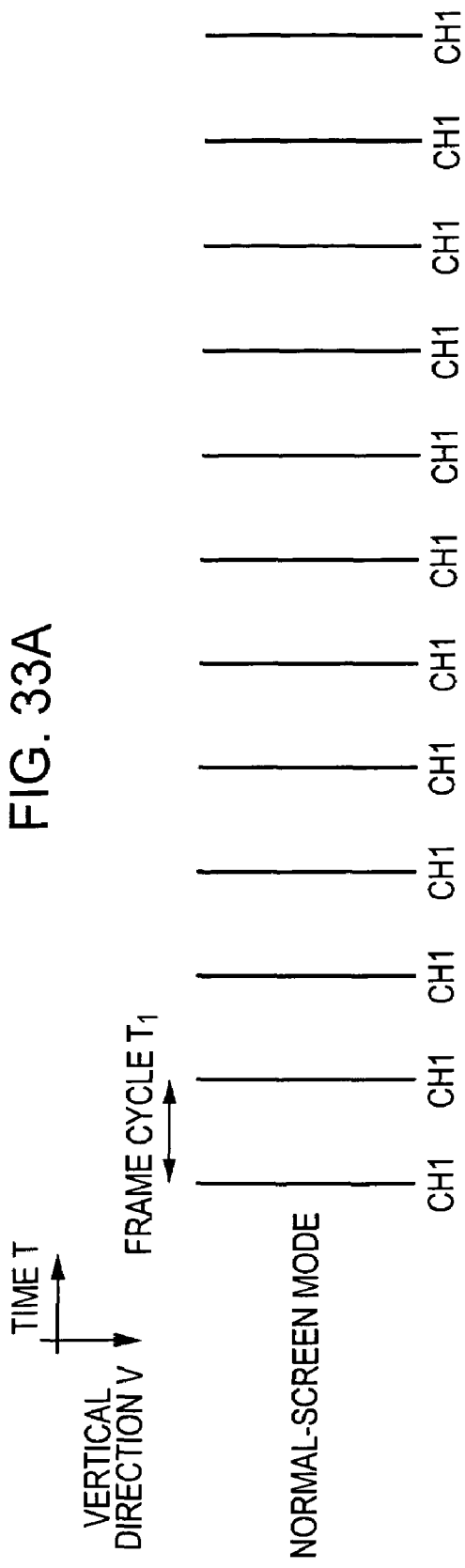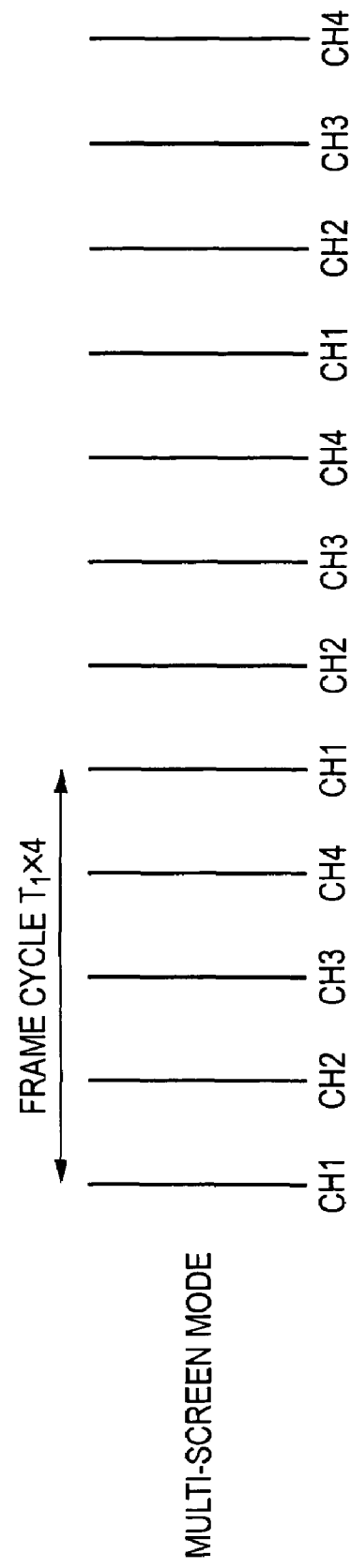

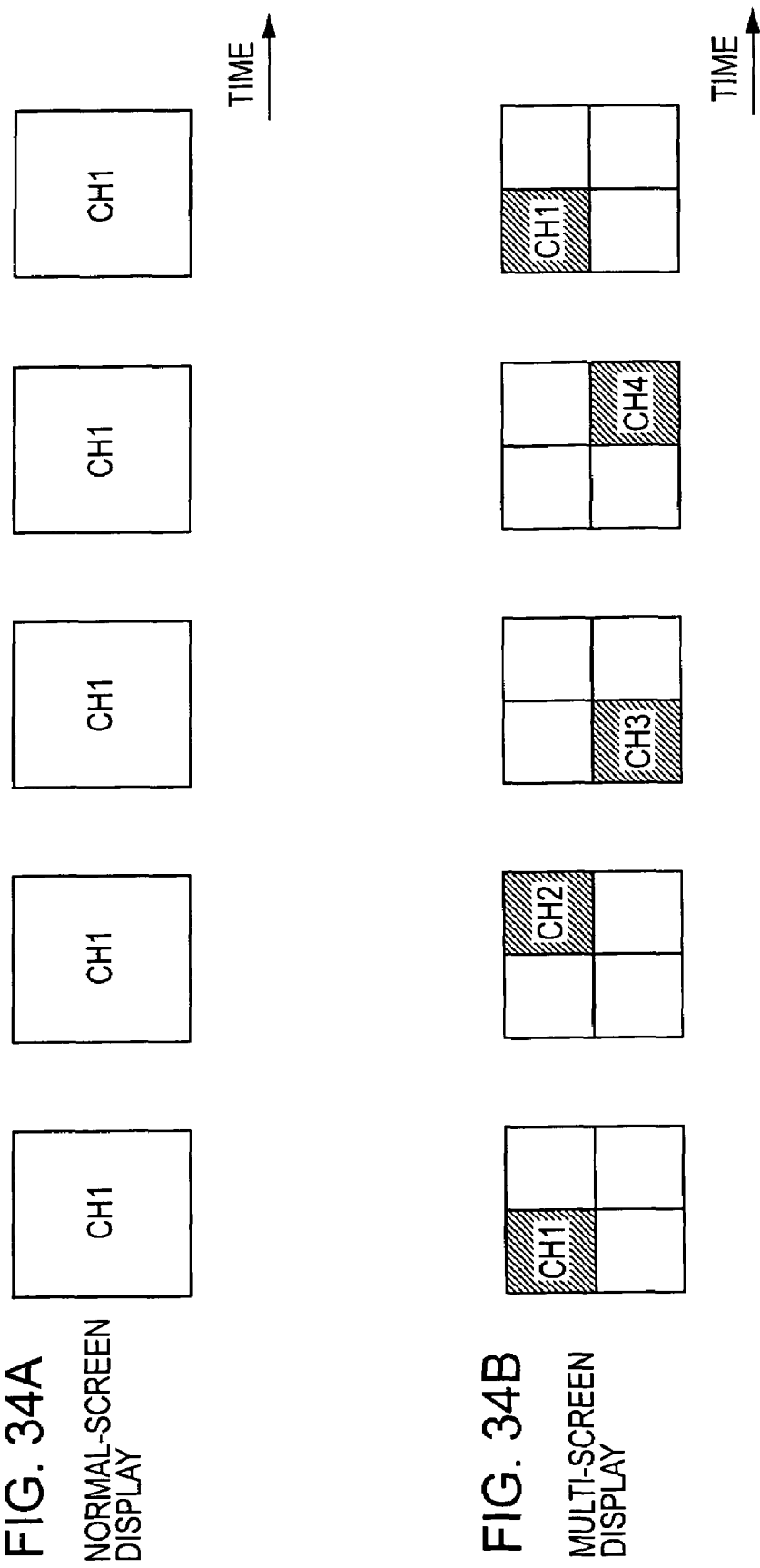

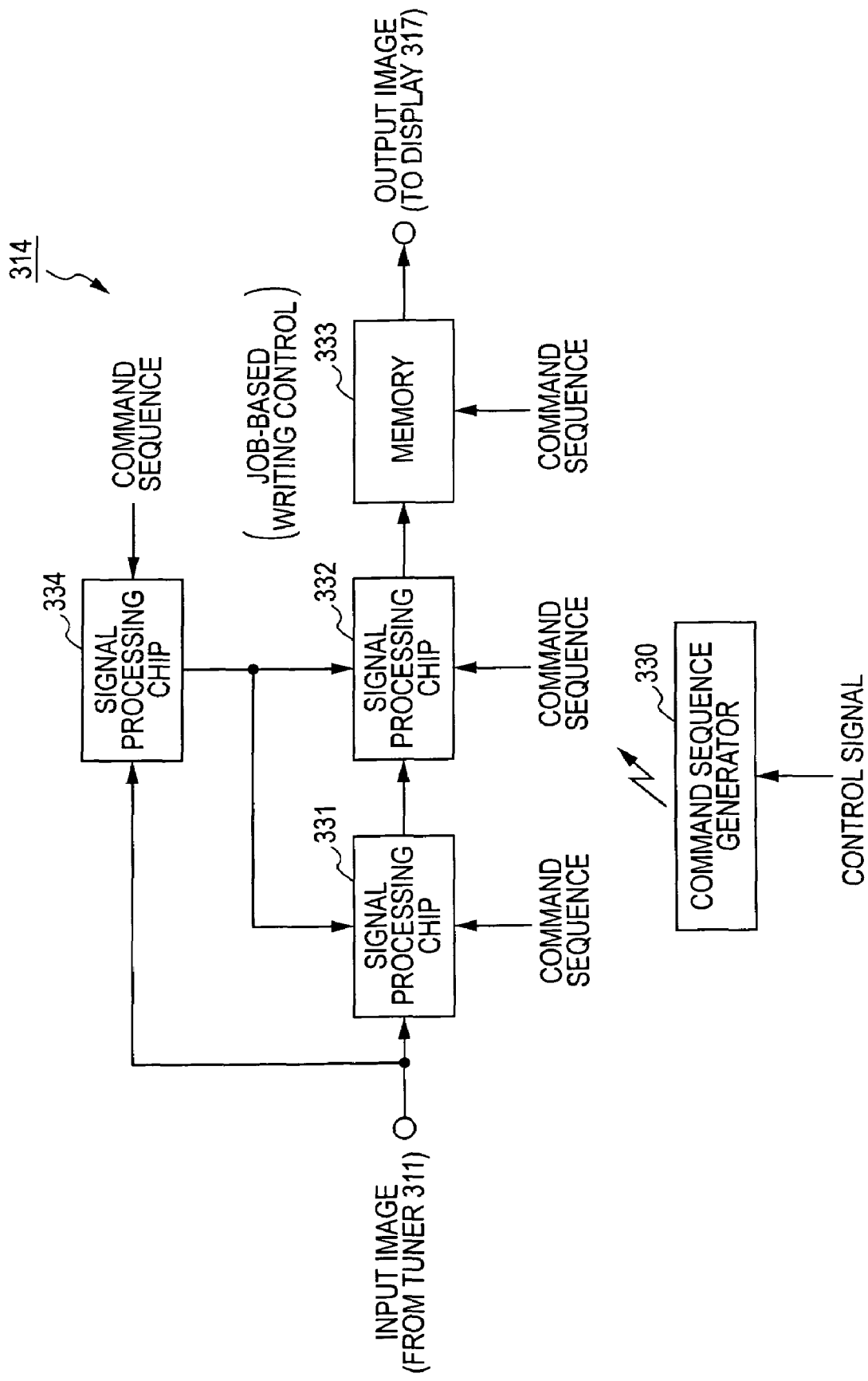

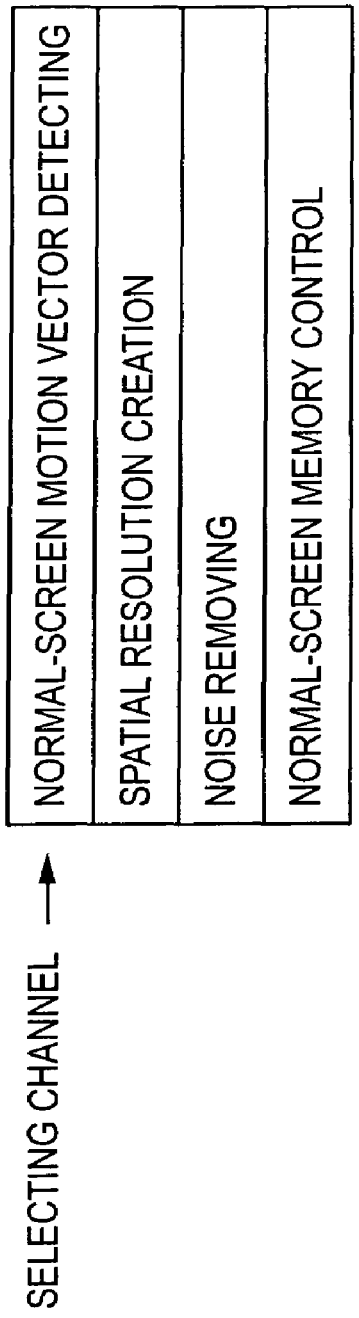
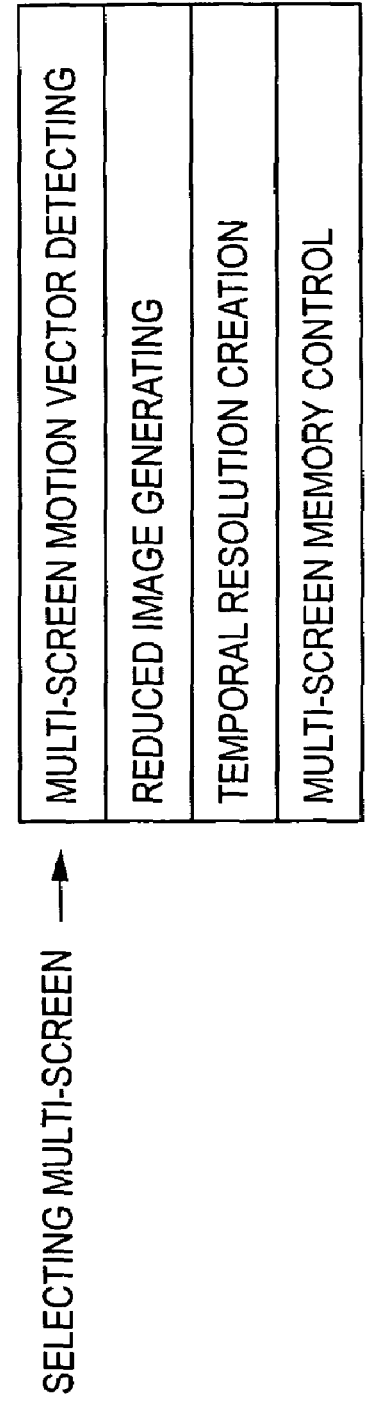

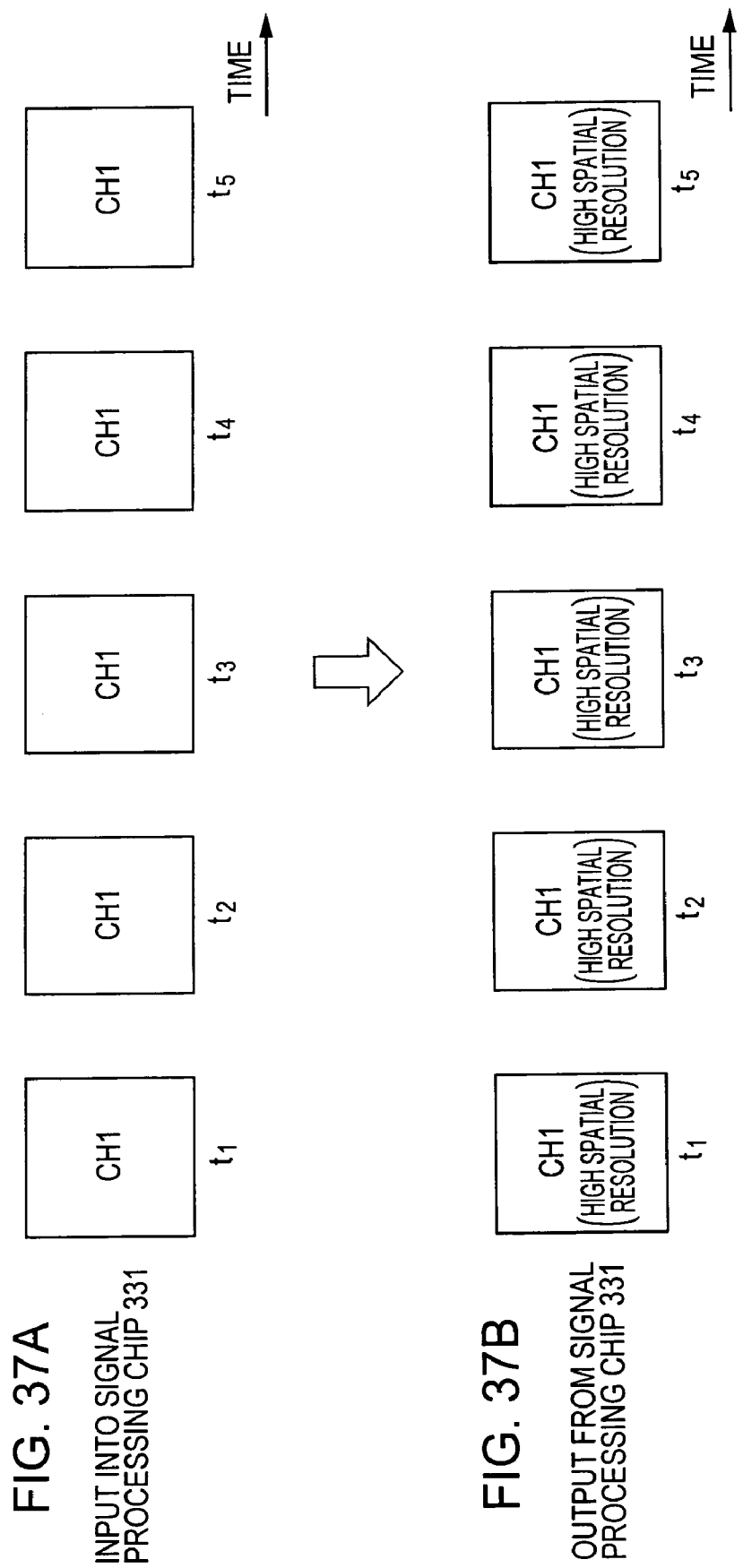

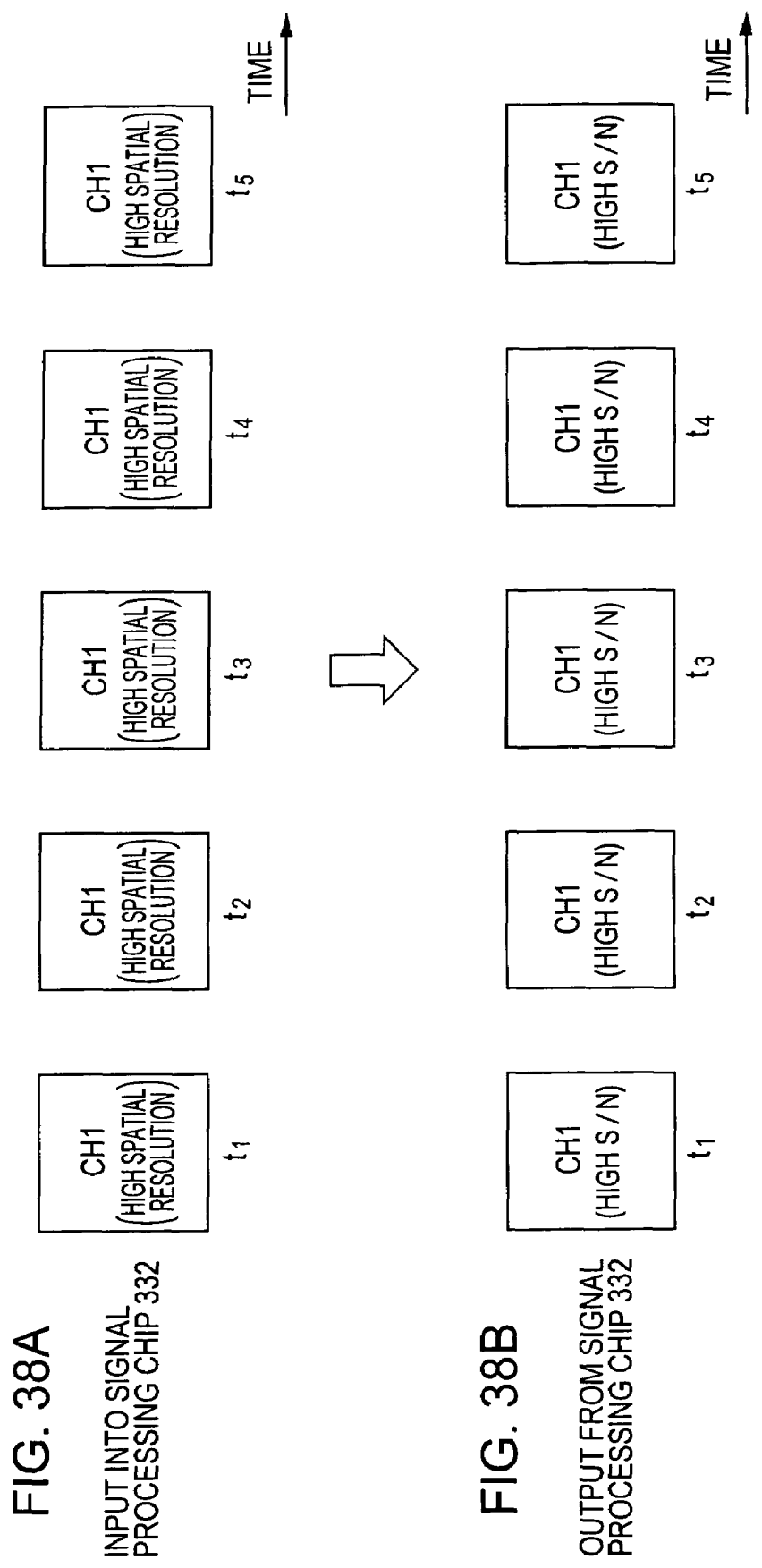

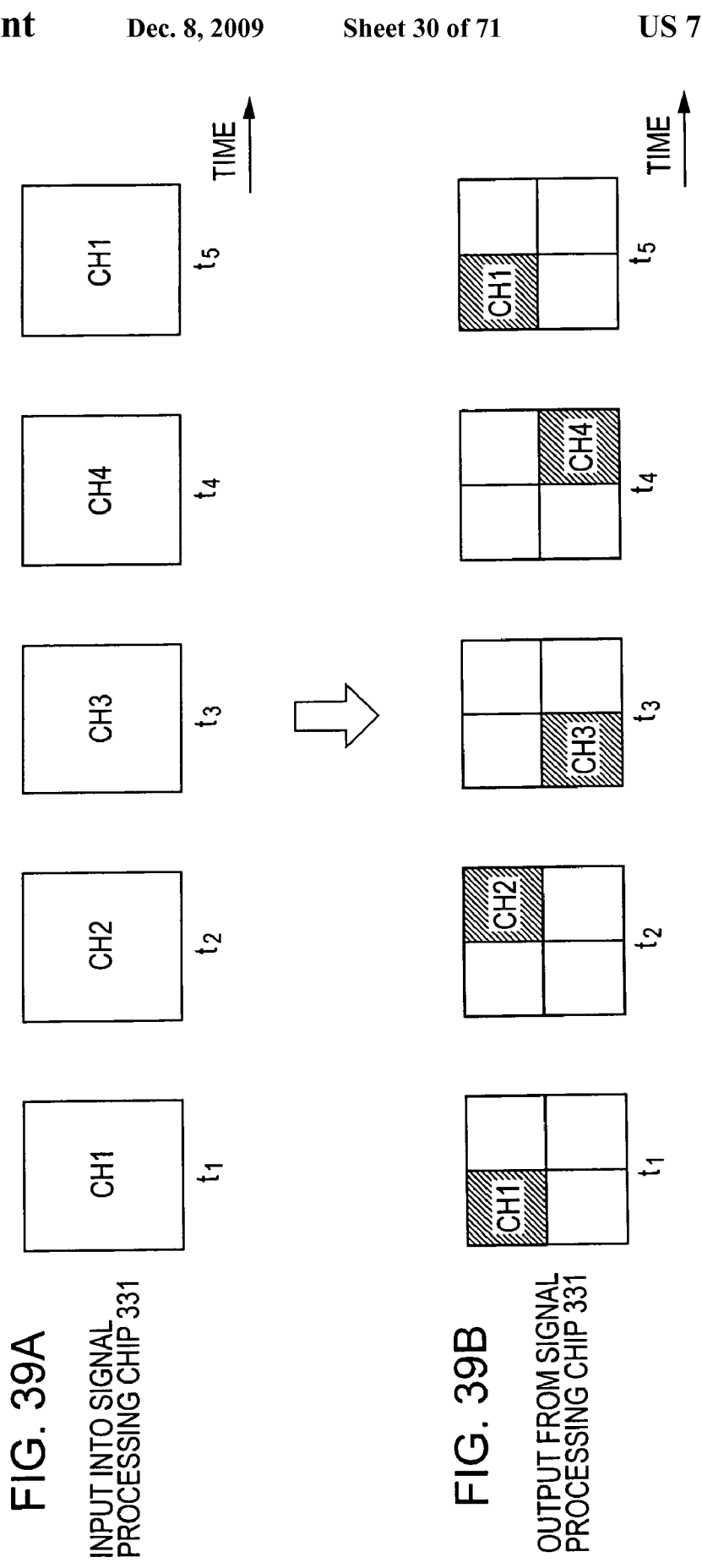

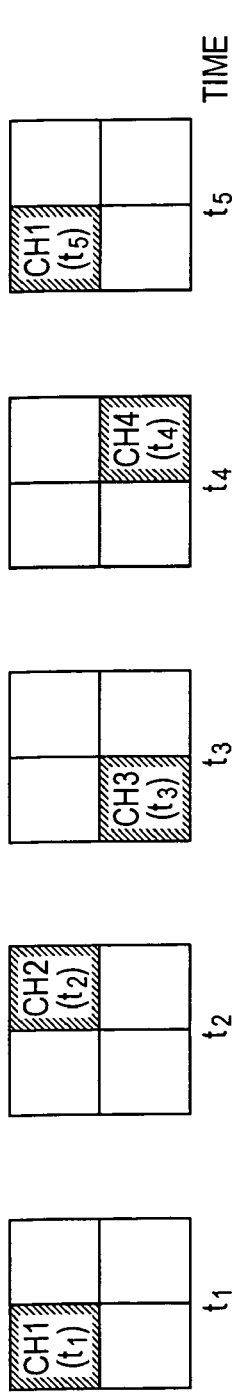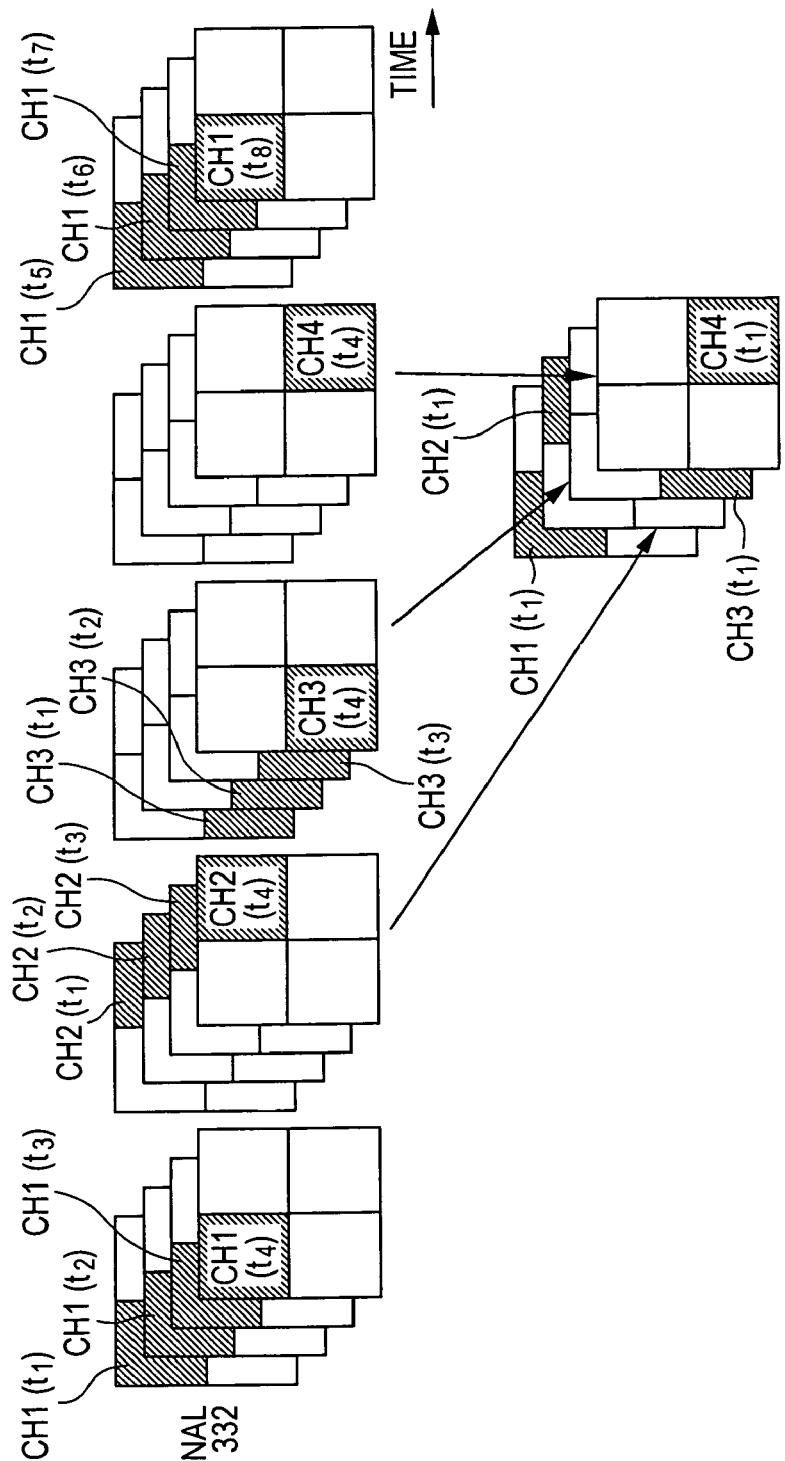
FIG. 40A INPUT INTO SIGNAL PROCESSING CHIP 332
FIG. 40B OUTPUT FROM SIGNAL PROCESSING CHIP 332

FIG. 65A

| Commands |
|---|
| Kaizodo 1dimensional |
| Kaizodo 2dimensional |
| Kaizodo 3dimensional |
| Zoom ver1 |
| Zoom ver2 |
| ⋮  ⋮  ⋮ |

FIG. 65B

| Kaizodo 2dimensional |
|---|

FIG. 65C

| Kaizodo 2dimensional | Zoom ver1 |
|---|---|

.# SIGNAL PROCESSING APPARATUS AND METHOD, AND COMMAND-SEQUENCE DATA STRUCTURE

BACKGROUND OF THE INVENTION

1. Field of the Invention

The present invention relates to signal processing apparatuses and methods, and to command-sequence data structures. More particularly, the invention relates to a signal processing apparatus and method, and to a command-sequence data structure in which many functions can be easily implemented by the use of a single unit of hardware by switching the hardware internal structure according to a plurality of commands.

2. Description of the Related Art

As computers become faster and less expensive, various functions are implemented by software. More specifically, not only in general-purpose computers, but also in cellular telephones and other types of personal digital assistants (PDAs), audio visual machines, such as television receivers, and electrical household appliances, such as electronic rice cookers, processors, such as central processing units (CPUs) and digital signal processors (DSPs), perform various types of processing by executing software (programs).

Because of the increasing use of software for implementing functions, software becomes more complicated and large, and the load on computers (CPUs or DSPs) is accordingly increasing. Thus, a device having a novel processor for reducing the load on a computer system has been proposed in, for example, Japanese Unexamined Patent Application Publication No. 2002-358294.

As long as software is executed on computers, the development of complicated and large software becomes necessary, which is very time-consuming and requires much labor.

Particularly when fast processing is demanded, parallel processing using a plurality of processors, for example, is necessary. For producing software for parallel processing, an enormous number of steps must be programmed while considering the operation timings of a plurality of processors, which imposes a heavy load on software developers (engineers).

If a certain type of processing only is required, dedicated hardware for performing such processing can be developed, for example, integrated circuits (ICs) or large scale integration (LSI).

However, dedicated hardware can perform only a specific type of processing, and lacks versatility.

SUMMARY OF THE INVENTION

Accordingly, in view of the above background, it is an object of the present invention to easily implement many functions by the use of a single unit of hardware without the need to program an enormous number of steps.

According to one aspect of the present invention, there is provided a signal processing apparatus including: a first signal processor for performing signal processing on a first signal after switching the internal structure of the first signal processor according to at least one of a plurality of commands forming a command sequence and for outputting a second signal; and a second signal processor for performing signal processing on the second signal after switching the internal structure of the second signal processor according to at least one of the plurality of commands forming the command sequence and for outputting a third signal.

According to another aspect of the present invention, there is provided a signal processing method for a signal processing apparatus including a first signal processor and a second signal processor. The signal processing method includes: a first signal processing step of performing by the first signal processor signal processing on a first signal after switching the internal structure of the first signal processor according to at least one of a plurality of commands forming a command sequence so as to output a second signal; and a second signal processing step of performing by the second signal processor signal processing on the second signal after switching the internal structure of the second signal processor according to at least one of the plurality of commands forming the command sequence so as to output a third signal.

According to still another aspect of the present invention, there is provided a signal processing apparatus including a first signal processor for performing signal processing on a first signal after switching the internal structure according to at least one of a plurality of commands forming a command sequence and for outputting a second signal. The second signal is subjected to signal processing by a second signal processor that switches the internal structure of the second signal processor according to at least one of the plurality of commands forming the command sequence.

According to a further aspect of the present invention, there is provided a signal processing apparatus including a second signal processor for performing signal processing on a second signal, the second signal being output as a result of performing signal processing on a first signal by a first signal processor that switches the internal structure of the first signal processor according to at least one of a plurality of commands forming a command sequence. The second signal processor performs signal processing on the second signal after switching the internal structure of the second signal processor according to at least one of the plurality of commands forming the command sequence so as to output a third signal.

According to a yet further aspect of the present invention, there is provided a signal processing apparatus including: command sequence receiving means for receiving a command sequence including a plurality of commands; and signal processing means for switching the internal structure of the signal processing means to a first state according to the command sequence to perform first signal processing, and then for switching the internal structure to a second state according to the command sequence to perform second signal processing.

According to a further aspect of the present invention, there is provided a signal processing apparatus including: a command sequence receiving unit configured to receive a command sequence including a plurality of commands; and a signal processing unit configured to switch an internal structure of the signal processing unit to a first state according to the command sequence to perform first signal processing, and then to switch the internal structure to a second state according to the command sequence to perform second signal processing.

According to a further aspect of the present invention, there is provided a signal processing method including: a command sequence receiving step of receiving a command sequence including a plurality of commands; and a signal processing step of switching the internal structure to a first state according to the command sequence so as to perform first signal processing, and of switching the internal structure to a second state according to the command sequence so as to perform second signal processing.

According to a further aspect of the present invention, there is provided a command-sequence data structure including a plurality of commands for causing a signal processor for performing signal processing to switch the internal structure of the signal processor. One of the plurality of commands corresponds to first signal processing performed by the signal processor, and another command of the plurality of commands corresponds to second signal processing performed by the signal processor after the signal processor performs the first signal processing.

BRIEF DESCRIPTION OF THE DRAWINGS

FIG. 3 is a block diagram illustrating an example of the configuration of a learning device for learning tap coefficients;

FIG. 4 is a block diagram illustrating an example of the configuration of a learning unit of the learning device shown in FIG. 3;

FIG. 6 is a flowchart illustrating learning processing performed by the learning device shown in FIG. 3;

FIG. 15 is a flowchart illustrating the operation of a main body of the AV system shown in FIG. 14;

FIG. 16 illustrates an example of commands;

FIG. 19 is a flowchart illustrating the operation of a main body of the AV system shown in FIG. 14;

FIG. 20 illustrates an example of commands;

FIG. 28 is a block diagram illustrating an example of the configuration of a coefficient output unit of the R-IC shown in FIG. 27;

FIG. 29 is a flowchart illustrating processing performed by the R-IC shown in FIG. 27;

FIG. 30 is a block diagram illustrating another example of the configuration of the R-IC;

FIG. 31 is a block diagram illustrating an example of the configuration of a coefficient output unit of the R-IC shown in FIG. 30;

FIG. 32 is a block diagram illustrating an example of the configuration of a television receiver according to a second embodiment of the present invention;

FIGS. 33A and 33B illustrate a control operation by a system controller on a tuner;

FIGS. 34A and 34B illustrate a normal-screen mode display and a multi-screen mode display, respectively;

FIG. 35 is a block diagram illustrating an example of the configuration of a signal processor of the television receiver shown in FIG. 32;

FIGS. 36A and 36B illustrate examples of command sequences generated by a command sequenced generator;

FIGS. 37A and 37B illustrate image data input into and output from a signal processing chip of the signal processor shown in FIG. 35;

FIGS. 38A and 38B illustrate image data input into and output from a signal processing chip of the signal processor shown in FIG. 35;

FIGS. 39A and 39B illustrate image data input into and output from the same signal processing chip as the signal processing chip shown in FIG. 37;

FIGS. 40A and 40B illustrate image data input into and output from the same signal processing chip as the signal processing chip shown in FIG. 38;

FIGS. 65A, 65B, and 65C illustrate command sequences received by a receiver of the IC shown in FIG. 64 from an external source;

DESCRIPTION OF THE PREFERRED EMBODIMENTS

Figure 1:
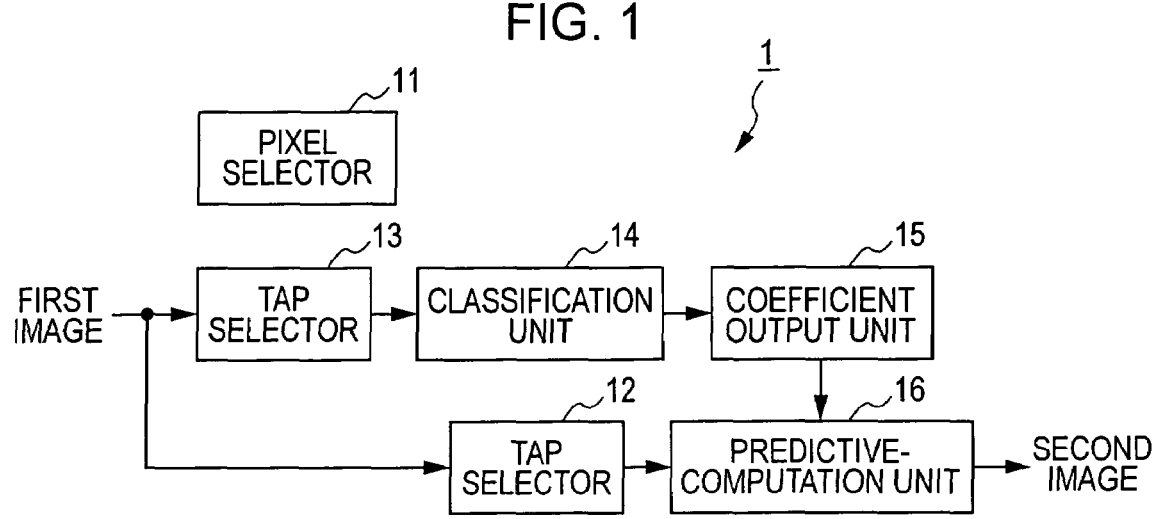
FIG. 1 is a block diagram illustrating an example of the configuration of an image converter for performing image conversion processing by utilizing classification adaptive processing.

Before describing details of various devices (systems) to which the present invention is applied, classification adaptive processing used in signal processing performed by the various devices is discussed below. Classification adaptive processing is merely an example of signal processing performed by the various devices, and it is not essential that classification adaptive processing be used for the signal processing.

The classification adaptive processing is discussed below in the context of image conversion processing for converting first image data (image signal) into second image data (image signal).

The type of image conversion processing for converting the first image data into the second image data varies depending on the definitions of the first image data and the second image data.

More specifically, for example, if the first image data is low-spatial-resolution image data and if the second image data is high-spatial-resolution image data, the image conversion processing can be spatial-resolution creation (improving) processing for improving the spatial resolution.

If the first image data is low signal-to-noise (S/N) ratio image data and if the second image data is high-S/N-ratio image data, the image conversion processing can be noise removing processing.

If the first image data is image data having a predetermined number of pixels (size) and if the second image data is image data generated by increasing or decreasing the number of pixels of the first image data, the image conversion processing can be resealing processing for resealing (enlarging or reducing the size) images.

If the first image data is low-temporal-resolution image data and if the second image data is high-temporal-resolution image data, the image conversion processing can be temporal-resolution creation (improving) processing for improving the temporal resolution.

If the first image data is image data obtained by decoding image data coded in units of blocks by, for example, the moving picture experts group (MPEG) method, and if the second image data is original image data before being coded, the image conversion processing can be distortion removing processing for removing various distortions, such as block distortions, caused by MPEG-coding and decoding.

In the spatial-resolution creation processing, when converting the first image data, which is low-spatial-resolution image data, into the second image data, which is high-spatial-resolution image data, the number of pixels of the second image data may be larger than or equal to that of the first image data. If the second image data has a larger number of pixels than the first image data, the spatial-resolution creation processing can be spatial-resolution improving processing and also resealing processing for enlarging the image (increasing the number of pixels of the image).

As discussed above, various types of signal processing can be implemented according to the definitions of the first and second image data.

In the classification adaptive processing as the image conversion processing, one of a plurality of pixels forming the second image data is selected and is classified into one of a plurality of classes, and computation is performed by using a tap coefficient of the specified class and several pixels of the first image data selected for the selected pixel of the second image data, thereby determining the value of the selected pixel.

FIG. 1 illustrates an example of the configuration of an image converter 1 for performing image conversion by using classification adaptive processing.

In the image converter 1, input image data is supplied to tap selectors 12 and 13 as the first image data.

A pixel selector 11 sequentially selects pixels forming the second image data and supplies information concerning the selected pixels to the corresponding blocks.

The tap selector 12 selects, as predictive taps, several pixels forming the first image data used for predicting a selected pixel. More specifically, the tap selector 12 selects, as predictive taps, a plurality of pixels located spatially or temporally close to the spatial or temporal position of the selected pixel.

The tap selector 13 selects, as class taps, several pixels forming the first image data for classifying the selected pixel into one of a plurality of classes. That is, the tap selector 13 selects class taps in a manner similar to the tap selector 12 for selecting the predictive taps.

The predictive taps and the class taps may have the same tap structure or different tap structures.

The predictive taps obtained in the tap selector 12 are supplied to a predictive-computation unit 16, and the class taps obtained in the tap selector 13 are supplied to a classification unit 14.

The classification unit 14 classifies the selected pixel based on the class taps supplied from the tap selector 13, and supplies a class code corresponding to the resulting class to a coefficient output unit 15.

As the method for classifying the selected pixel, for example, adaptive dynamic range coding (ADRC) may be used.

In this method, the pixel values forming the class taps are subjected to ADRC processing, and the class of the selected pixel is determined based on the resulting ADRC code.

In K-bit ADRC, for example, the maximum value MAX and the minimum value MIN of the pixel values forming the class taps are detected, and DR=MAX−MIN is set to be a local dynamic range of a set, and based on this dynamic range DR, each of the pixel values forming the class taps is re-quantized into K bits. More specifically, the minimum value MIN is subtracted from each of the pixel values forming the class taps, and the resulting value is divided (re-quantized) with $DR/2^K$. Then, the K-bit pixel values forming the class taps are arranged as a bit string in a predetermined order, and the bit string is then output as an ADRC code. Accordingly, when the class taps are subjected to one-bit ADRC processing, each of the pixel values forming the class taps is divided by the average of the maximum value MAX and the minimum value MIN (truncating decimal places) so that each pixel value is formed into one bit (binarized). Then, the one-bit pixel values are arranged in a predetermined bit string, and the bit string is output as an ADRC code.

The classification unit 14 may output the level distribution pattern of the pixel values forming the class taps as a class code. In this case, however, if the class taps are formed of N pixels and K bits are assigned to each pixel, the number of possible class codes output from the classification unit 14 becomes $(2^N)^K$, which is an enormous number, exponentially proportional to the number K of bits of the pixel values.

Accordingly, it is preferable that, in the classification unit 14, the amount of class tap information be compressed by the above-described ADRC processing or vector quantization before being classified.

The coefficient output unit 15 stores a tap coefficient corresponding to each class, which is determined by learning described below, and outputs the tap coefficient stored at the address corresponding to the class code supplied from the classification unit 14 (tap coefficient of the class represented by the class code supplied from the classification unit 14). This tap coefficient is supplied to the predictive-computation unit 16.

The tap coefficient is a coefficient to be multiplied with input data at a so-called "tap" of a digital filter.

The predictive-computation unit 16 obtains the predictive taps output from the tap selector 12 and the tap coefficient output from the coefficient output unit 15, and performs predetermined predictive computation for determining the predictive value of the true value of the selected pixel by using the predictive taps and the tap coefficient. Then, the predictive-computation unit 16 determines and outputs the predictive value of the selected pixel, i.e., the value of the pixel forming the second image data.

The image conversion processing performed by the image converter 1 shown in FIG. 1 is discussed below with reference to the flowchart of FIG. 2.

In step S11, the pixel selector 11 selects one of the unselected pixels forming the second image data corresponding to the first image data input into the image converter 1. That is, the pixel selector 11 sequentially selects unselected pixels forming the second image data in the raster scanning order.

In step S12, the tap selectors 12 and 13 select predictive taps and class taps, respectively, for the selected pixel from the first image data. The tap selector 12 then supplies the predictive taps to the predictive-computation unit 16, while the tap selector 13 supplies the class taps to the classification unit 14.

Upon receiving the class taps from the tap selector 13, in step S13, the classification unit 14 classifies the selected pixel based on the class taps. The classification unit 14 also outputs the class code representing the resulting class to the coefficient output unit 15.

Then, in step S14, the coefficient output unit 15 obtains and outputs the tap coefficient stored at the address corresponding to the class code supplied from the classification unit 14. Also in step S14, the predictive-computation unit 16 obtains the tap coefficient output from the coefficient output unit 15.

In step S15, the predictive-computation unit 16 performs predetermined predictive computation by using the predictive taps output from the tap selector 12 and the tap coefficient obtained from the coefficient output unit 15. The predictive-computation unit 16 then determines and outputs the value of the selected pixel.

In step S16, the pixel selector 11 determines whether there are pixels that have not been selected among the pixels forming the second image data. If it is determined in step S16 that there is an unselected pixel, the process returns to step S11, and step S11 and the subsequent steps are repeated.

If it is determined in step S16 that there are no unselected pixels, the process is completed.

The predictive computation performed by the predictive-computation unit 16 and the learning of the tap coefficients stored in the coefficient output unit 15 are as follows.

It is now considered that, for example, high-quality image data is set to be the second image data, and low-quality image data generated by reducing the image quality (resolution) of the high-quality image data by filtering the high-quality data with a low-pass filter (LPF) is set to be the first image data, and that predictive taps are selected from the low-quality image data and by using those predictive taps and the tap coefficient, the pixel values (high-quality pixels) of the high-quality image data are determined (predicted) by performing predetermined predictive computation.

As the predetermined predictive computation, linear predictive computation, for example, is used, and then, the pixel value y of the high-quality pixel can be determined by the following linear expression:

$$y = \sum_{n=1}^{N} w_n x_n \quad (1)$$

where $x_n$ represents n-th pixel of the low-quality image data forming the predictive taps for the high-quality pixel y, $w_n$ designates the n-th tap coefficient to be multiplied with the pixel value of the n-th low-quality image pixel. In equation (1), the predictive taps are formed of N low-quality pixels $x_1, x_2, \ldots, x_N$.

The pixel value y may be determined by a higher-order expression rather than the linear expression represented by equation (1).

When the true value of the pixel value of the high-quality pixel of the k-th sample is represented by $y_k$, and when the predictive value of the true value $y_k$ obtained by equation (1) is designated by $y_k'$, the predictive error between the two values is expressed by the following equation.

$$e_k = y_k - y_k' \quad (2)$$

Since the predictive value $y_k'$ in equation (2) can be determined by equation (1), the following equation can be obtained by modifying $y_k'$ in equation (2) into equation (1):

$$e_k = y_k - \left( \sum_{n=1}^{N} w_n x_{n,k} \right) \quad (3)$$

where $x_{n,k}$ represents the n-th low-quality pixel forming the predictive taps for the k-th sample high-quality pixel.

The tap coefficient $w_n$ that allows the predictive error $e_k$ in equation (3) (or equation (2)) to be 0 is the optimal value for predicting the high-quality pixel. Generally, however, it is difficult to determine such tap coefficients $w_n$ for all the high-quality pixels.

As the standard for the optimal tap coefficient $w_n$, the method of least squares can be employed, and the optimal tap coefficient $w_n$ can be determined by minimizing the total sum E of the square errors expressed by the following equation:

$$E = \sum_{k=1}^{K} e_k^2 \quad (4)$$

where K represents the number of learning samples of sets of the high-quality pixels $y_k$ and the low-quality pixels $x_{1,k}, x_{2,k}, \ldots, x_{N,k}$ forming the predictive taps for the high-quality pixel $y_k$.

The minimum (minimal) value of the total sum E of the square errors in equation (4) can be determined by the tap coefficient $w_n$ that allows the value obtained by partial-differentiating the total sum E with the tap coefficient $w_n$ to be 0, as expressed by equation (5).

$$\frac{\partial E}{\partial w_n} = e_1 \frac{\partial e_1}{\partial w_n} + e_2 \frac{\partial e_2}{\partial w_n} + \cdots + e_k \frac{\partial e_k}{\partial w_n} = 0 \quad (n = 1, 2, \ldots, N) \quad (5)$$

The following equation can be obtained by partial-differentiating equation (3) by the tap coefficient $w_n$.

$$\frac{\partial e_k}{\partial w_1} = -x_{1,k}, \frac{\partial e_k}{\partial w_2} = -x_{2,k}, \ldots, \frac{\partial e_k}{\partial w_n} = -x_{N,k}, \quad (6)$$
$$(k = 1, 2, \ldots, K)$$

Then, the following equations can be obtained by equations (5) and (6).

$$\sum_{k=1}^{K} e_k x_{1,k} = 0, \sum_{k=1}^{K} e_k x_{2,k} = 0, \ldots \sum_{k=1}^{K} e_k x_{N,k} = 0 \quad (7)$$

By substituting equation (3) into $e_k$ in equation (7), equation (7) can be expressed by normal equations represented by equation (8).

$$\begin{bmatrix} \left(\sum_{k=1}^{K} x_{1,k}x_{1,k}\right) & \left(\sum_{k=1}^{K} x_{1,k}x_{2,k}\right) & \cdots & \left(\sum_{k=1}^{K} x_{1,k}x_{N,k}\right) \\ \left(\sum_{k=1}^{K} x_{2,k}x_{1,k}\right) & \left(\sum_{k=1}^{K} x_{2,k}x_{2,k}\right) & \cdots & \left(\sum_{k=1}^{K} x_{2,k}x_{N,k}\right) \\ \vdots & \vdots & \ddots & \vdots \\ \left(\sum_{k=1}^{K} x_{N,k}x_{1,k}\right) & \left(\sum_{k=1}^{K} x_{N,k}x_{2,k}\right) & \cdots & \left(\sum_{k=1}^{K} x_{N,k}x_{N,k}\right) \end{bmatrix} \begin{bmatrix} w_1 \\ w_2 \\ \vdots \\ w_N \end{bmatrix} = \begin{bmatrix} \left(\sum_{k=1}^{K} x_{1,k}y_k\right) \\ \left(\sum_{k=1}^{K} x_{2,k}y_k\right) \\ \vdots \\ \left(\sum_{k=1}^{K} x_{N,k}y_k\right) \end{bmatrix} \quad (8)$$

The normal equations in equation (8) can be solved for the tap coefficient $w_n$ by using, for example, a sweeping-out method (Gauss-Jordan elimination).

The normal equations in equation (8) can be solved for each class so that the optimal tap coefficient $w_n$ (i.e., the tap coefficient that allows the total sum E of the square errors to be 0) can be determined for each class.

FIG. 3 illustrates an example of the configuration of a learning device 21 for conducting learning for determining the tap coefficient $w_n$ by solving the normal equations in equation (8).

A learning image storage unit 31 stores learning image data used for learning the tap coefficient $w_n$. As the learning image data, for example, high-quality image data with high resolution, can be used.

A supervisor data generator 32 reads the learning image data from the learning image storage unit 31. The supervisor data generator 32 then generates a supervisor (true value) for learning the tap coefficient, i.e., supervisor data, which is the pixel value of a converted object expressed by the predictive computation in equation (1), from the learning image data, and supplies the supervisor data to a supervisor data storage unit 33. In this example, the supervisor data generator 32 directly supplies the high-quality image data as the learning image data to the supervisor data storage unit 33 as the supervisor data.

The supervisor data storage unit 33 stores the high-quality image data supplied from the supervisor data generator 32 as the supervisor data.

A learner data generator 34 reads the learning image data from the learning image storage unit 31. The learner data generator 34 then generates a learner for the tap coefficient, i.e., learner data, which is the pixel value of a subject to be converted expressed by the predictive computation in equation (1), from the learning image data, and supplies the learner data to a learner data storage unit 35. In this example, the learner data generator 34 generates low-quality image data by reducing the resolution of the high-quality image data, which is the learning image data, by filtering the high-quality image data, and supplies the generated low-quality image data to the learner data storage unit 35 as the learner data.

The learner data storage unit 35 stores the learner data supplied from the learner data generator 34.

A learning unit 36 sequentially selects the pixels forming the high-quality image data stored in the supervisor data storage unit 33 as the supervisor data, and selects, for each selected pixel, as predictive taps, the low-quality pixels having the same tap structure of the pixels selected by the tap selector 12 shown in FIG. 1 from the low-quality pixels as the learner data stored in the learner data storage unit 35. The learning unit 36 also solves the normal equations in equation (8) for each class by using each selected pixel forming the supervisor data and the predictive taps for the selected pixel, thereby determining the tap coefficient for each class.

FIG. 4 illustrates an example of the configuration of the learning unit 36 shown in FIG. 3.

A pixel selector 41 sequentially selects the pixels forming the supervisor data stored in the supervisor data storage unit 33, and supplies information indicating the selected pixels to the corresponding blocks.

A tap selector 42 selects, for the selected pixel, the same pixels as those selected by the tap selector 12 shown in FIG. 1 from the low-quality pixels forming the low-quality image data as the learner data stored in the learner data storage unit 35. Accordingly, the tap selector 42 obtains the predictive taps having the same tap structure as those obtained by the tap selector 12, and supplies the predictive taps to an adder 45.

A tap selector 43 selects, for the selected pixel, the same pixels as those selected by the tap selector 13 shown in FIG. 1 from the low-quality pixels forming the low-quality image data as the learner data stored in the learner data storage unit 35. Accordingly, the tap selector 43 obtains the class taps having the same tap structure as those obtained by the tap selector 13, and supplies the class taps to a classification unit 44.

The classification unit 44 classifies the selected pixel into the same class as that selected by the classification unit 14 shown in FIG. 1 based on the class taps output from the tap selector 43, and outputs the class code corresponding to the resulting class to the adder 45.

The adder 45 reads the supervisor data, which is the selected pixel, from the supervisor data storage unit 33, and performs addition for the selected pixel and the learner data (pixels) forming the predictive taps for the selected pixel supplied from the tap selector 42 for each class code supplied from the classification unit 44.

That is, the supervisor data $y_k$ stored in the supervisor data storage unit 33, the predictive taps $x_{n,k}$ output from the tap selector 42, and the class code output form the classification unit 44 are supplied to the adder 45.

Then, the adder 45 performs computation for the multiplication ($x_{n,k}x_{n',k}$) of learner data items and the summation ($\Sigma$) in the left side matrix in equation (8) by using the predictive taps (learner data) $x_{n,k}$ for each class corresponding to the class code supplied from the classification unit 44.

The adder 45 also performs computation for the multiplication ($x_{n,k}y_k$) of the predictive taps (learner data) $x_{n,k}$ and the supervisor data $y_k$ and the summation ($\Sigma$) in the right side vector in equation (8) by using the predictive taps (learner data) $x_{n,k}$ and the supervisor data $y_k$ for each class corresponding to the class code supplied from the classification unit 44.

That is, the adder 45 stores in a built-in memory (not shown) the component in the left side matrix ($\Sigma x_{n,k}x_{n',k}$) and the component in the right side vector ($\Sigma x_{n,k}y_k$) in the normal equations in equation (8) determined for the supervisor data, which is the previous selected pixel. The adder 45 then adds the corresponding component $x_{n,k+1}x_{n',k+1}$ or $x_{n,k+1}y_{k+1}$ calculated by using the supervisor data $y_{k+1}$ and the learner data $x_{n,k+1}$ for the supervisor data, which is the newly selected pixel, to the matrix component ($\Sigma x_{n,k}x_{n',k}$) or the vector component ($\Sigma x_{n,k} y_k$) In short, the adder 45 performs addition represented by summation in the normal equations in equation (8).

Then, the adder 45 computes the above-described addition for all the pixels forming the supervisor data stored in the supervisor data storage unit 33 shown in FIG. 3 so that the normal equations in equation (8) can be established for each class. The adder 45 then supplies the normal equations to a tap coefficient calculator 46.

The tap coefficient calculator 46 solves the normal equations for each class supplied from the adder 45, thereby determining the optimal tap coefficient $w_n$ for each class.

The tap coefficient $w_n$ for each class determined as described above is stored in the coefficient output unit 15 in the image converter 1 shown in FIG. 1.

According to the selected type of learner data corresponding to the first image data and the selected type of supervisor data corresponding to the second image data, image conversion processing to be performed by using the resulting tap coefficient becomes different, as stated above.

Figure 5A:
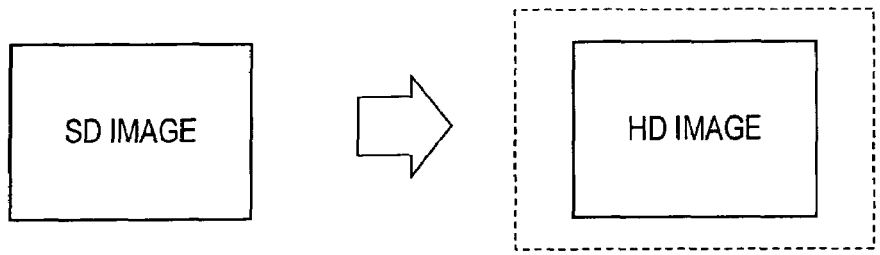
FIGS. 5A through 5D illustrate various types of image conversion processing.

For example, tap coefficients can be learned by using high-quality image data as the supervisor data corresponding to the second image data and by using low-quality image data generated by reducing the spatial resolution of the high-quality image data as the learner data corresponding to the first image data. In this case, it is possible to obtain a tap coefficient that can perform spatial-resolution creation processing, as shown in FIG. 5A, for converting the first image data, which is the low-quality image data (standard definition (SD) image), into the second image data, which is the high-quality image data with improved spatial resolution (high definition (HD) image).

In this case, the number of pixels of the first image data (learner data) may be smaller than or equal to that of the second image data (supervisor data).

Figure 5B:
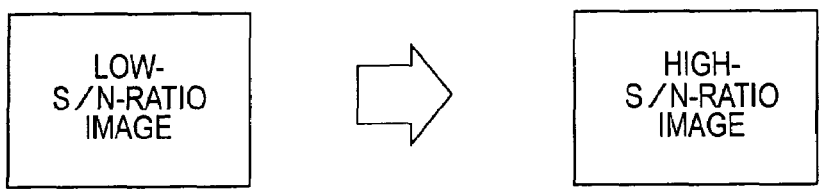

Tap coefficients can be learned by using high-quality image data as the supervisor data and by using image data generated by superimposing noise on the high-quality image data as the learner data. In this case, it is possible to obtain a tap coefficient that can perform noise removing (reducing) processing, as shown in FIG. 5B, for converting the first image data, which is low-S/N-ratio image data, to the second image data, which is high-S/N-ratio image data without noise.

Figure 5C:
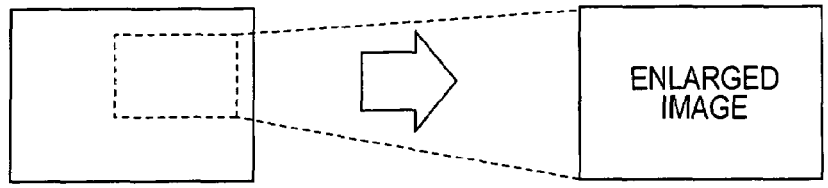

Tap coefficients can be learned by using certain image data as the supervisor data and by using image data generated by reducing the number of pixels of the supervisor image data. In this case, it is possible to obtain a tap coefficient that can perform enlarging processing (resealing processing), as shown in FIG. 5C, for enlarging the first image data, which is part of the image data, into the second image data, which is image data enlarged from the first image data.

The tap coefficient for performing enlarging processing may be obtained by learning tap coefficients by using high-quality image data as the supervisor data and by using, as the learner data, low-quality image data generated by decreasing the spatial resolution of the high-quality image data by reducing the number of pixels of the high-quality image data.

Figure 5D:
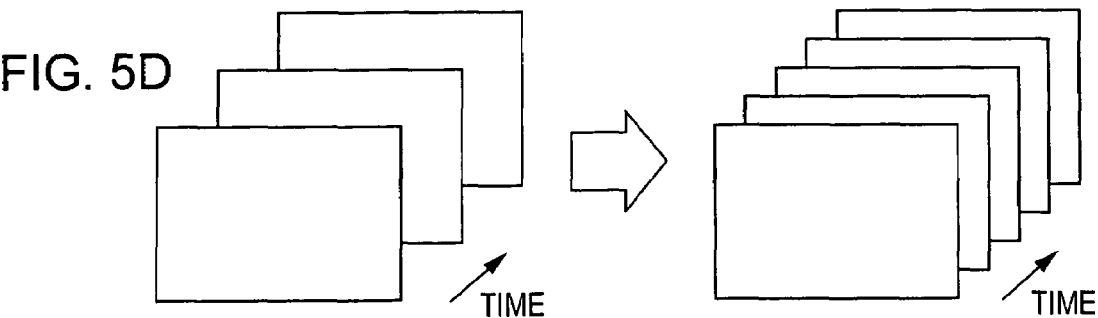

Tap coefficients can be learned by using high-frame-rate image data as the supervisor data and by using image data generated by reducing the number of frames of the high-frame-rate image data as the learner data. In this case, it is possible to obtain a tap coefficient that can perform temporal-resolution creation processing, as shown in FIG. 5D, for converting the first image data with a predetermined frame rate into the second image data with a higher frame rate.

The learning processing performed by the learning device 21 shown in FIG. 3 is described below with reference to the flowchart of FIG. 6.

In step S21, the supervisor data generator 32 and the learner data generator 34 first generate supervisor data and learner data, respectively, from the learning image data stored in the learning image storage unit 31, and supplies the supervisor data and the learner data to the supervisor data storage unit 33 and the learner data storage unit 35, respectively.

The type of supervisor data and the type of learner data to be generated in the supervisor data generator 32 and the learner data generator 34, respectively, vary depending on the type of image conversion processing to be performed by using the resulting tap coefficient.

Then, in step S22, in the learning unit 36 shown in FIG. 4, the pixel selector 41 selects an unselected pixel from the supervisor data stored in the supervisor data storage unit 33. Then, in step S23, the tap selector 42 selects, for the selected pixel, pixels, which are predictive taps, from the learner data stored in the learner data storage unit 35, and supplies the predictive taps to the adder 45. The tap selector 43 also selects, for the selected pixel, pixels, which are class taps, from the learner data stored in the learner data storage unit 35, and supplies the class taps to the classification unit 44.

In step S24, the classification unit 44 classifies the selected pixel based on the class taps, and outputs the class code corresponding to the resulting class to the adder 45.

In step S25, the adder 45 reads the selected pixel from the supervisor data storage unit 33, and performs addition in the normal equations in equation (8) for the selected pixel and the learner data forming the predictive taps supplied from the tap selector 42 for each class code supplied from the classification unit 44.

Subsequently, in step S26, the pixel selector 41 determines whether there are unselected pixels stored in the supervisor data storage unit 33. If it is determined in step S26 that there is an unselected pixel stored in the supervisor data storage unit 33, the process returns to step S22, and step S22 and the subsequent steps are repeated.

If it is determined in step S26 that they are no unselected pixels stored in the supervisor data storage unit 33, the adder 45 supplies the left-side matrix and the right-side vector in equation (8) for each class obtained in steps S22 through S26 to the tap coefficient calculator 46.

In step S27, the tap coefficient calculator 46 solves the normal equations in equation (8) for each class consisting of the left-side matrix and the right-side vector in equation (8) supplied from the adder 45, thereby determining and outputting the tap coefficient $w_n$ for each class. The process is then completed.

There may be some classes that cannot obtain a required number of normal equations for determining the tap coefficient due to an insufficient number of learning image data. For such classes, the tap coefficient calculator 46 outputs, for example, a default tap coefficient.

Figure 7:
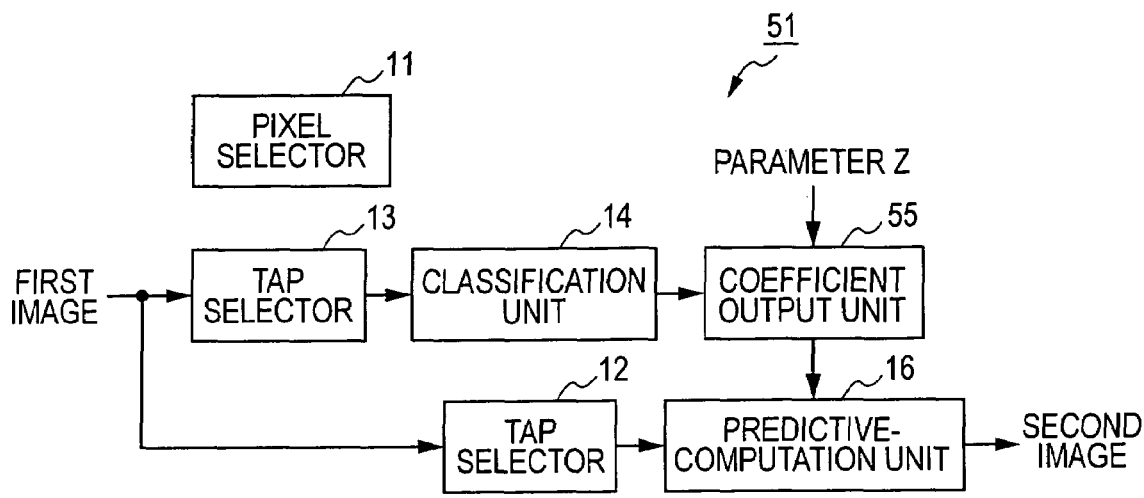
FIG. 7 is a block diagram illustrating an example of the configuration of an image converter for performing image conversion processing by utilizing classification adaptive processing.

FIG. 7 illustrates an example of the configuration of an image converter 51, which is another example of the image converter for performing image conversion processing by using classification adaptive processing.

In FIG. 7, elements corresponding to those shown in FIG. 1 are designated with like reference numerals, and an explanation thereof is thus omitted. The image converter 51 is configured similarly to the image converter 1 shown in FIG. 1, except that a coefficient output unit 55 is provided instead of the coefficient output unit 15.

Not only a class (class code) from the classification unit 14, but also a parameter z externally input by a user, is supplied to the coefficient output unit 55. The coefficient output unit 55 generates a tap coefficient corresponding to the parameter z for each class, and outputs the tap coefficient corresponding to the class supplied from the classification unit 14 to the predictive-computation unit 16.

Figure 8:
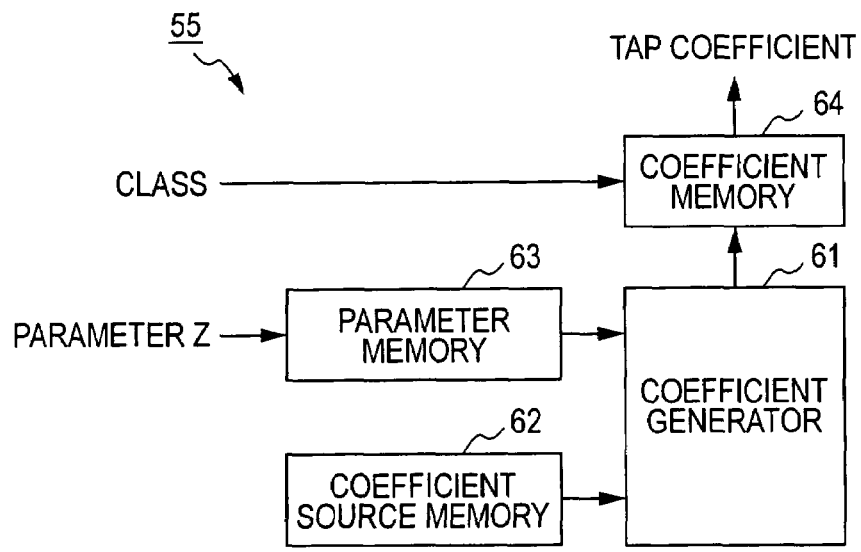
FIG. 8 is a block diagram illustrating an example of the configuration of a coefficient output unit of the image converter shown in FIG. 7.

FIG. 8 illustrates an example of the configuration of the coefficient output unit 55 shown in FIG. 7.

A coefficient generator 61 generates a tap coefficient for each class based on coefficient source data stored in a coefficient source memory 62 and the parameter z stored in a parameter memory 63, and stores the generated tap coefficient in a coefficient memory 64 by overwriting the previous tap coefficient.

The coefficient source memory 62 stores coefficient source data for each class obtained by learning, which is described below. The coefficient source data is a source for generating a tap coefficient.

The parameter z externally input by a user is stored in the parameter memory 63 by overwriting the previous parameter.

The coefficient memory 64 stores the tap coefficient for each class (tap coefficient for each class corresponding to the parameter z) supplied from the coefficient generator 61. The coefficient memory 64 reads the tap coefficient for the class supplied from the classification unit 14 shown in FIG. 7 and outputs the tap coefficient to the predictive-computation unit 16 shown in FIG. 7.

In the image converter 51 shown in FIG. 7, when the parameter z is externally input to the coefficient output unit 55, it is stored in the parameter memory 63 by overwriting the previous parameter z.

When the parameter z is stored (updated) in the parameter memory 63, the coefficient generator 61 reads the coefficient source data for each class from the coefficient source memory 62 and also reads the parameter z from the parameter memory 63 so as to determine the tap coefficient for the corresponding class based on the coefficient source data and the parameter z. Then, the coefficient generator 61 supplies the generated tap coefficient to the coefficient memory 64, and stores it therein by overwriting the previous tap coefficient.

Figure 2:
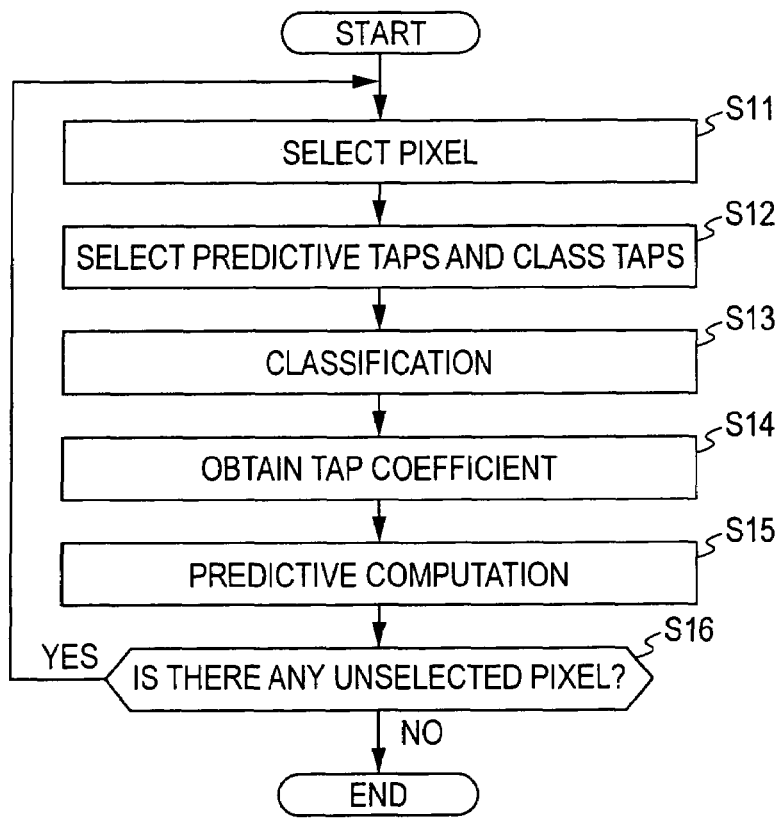
FIG. 2 is a flowchart illustrating image conversion processing performed by the image converter shown in FIG. 1.

In the image converter 51, processing similar to the processing indicated by the flowchart of FIG. 2 performed by the image converter 1 shown in FIG. 1 is executed, except that the coefficient output unit 55 generates and outputs a tap coefficient corresponding to the parameter z.

A description is now given of the predictive computation performed by the predictive-computation unit 16 shown in FIG. 7, the generation of tap coefficients by the coefficient generator 61 shown in FIG. 8, and the learning of the coefficient source data stored in the coefficient source memory 62 shown in FIG. 8.

It is now considered, as in the image converter 1 shown in FIG. 1, that high-quality image data is used as the second image data and low-quality image data generated by reducing the spatial resolution of the high-quality image data is used as the first image data, and predictive taps are selected from the low-quality image data, and that the values of the high-quality pixels of the high-quality image data are determined (predicted) by using the predictive taps and the tap coefficients according to, for example, the linear predictive computation in equation (1).

The pixel value y of the high-quality pixel may be determined by a higher-order expression rather than the linear expression represented by equation (1).

In the image converter 51, the coefficient generator 61 generates the tap coefficient $w_n$ from the coefficient source data stored in the coefficient source memory 62 and the parameter z stored in the parameter memory 63. The tap coefficient $w_n$ is generated, for example, by the following equation using the coefficient source data and the parameter z:

$$w_n = \sum_{m=1}^{M} \beta_{m,n} z^{m-1} \quad (9)$$

where $\beta_{m,n}$ represents the m-th coefficient source data used for determining the n-th tap coefficient $w_n$. In equation (9), the tap coefficient $w_n$ is determined by using M items of coefficient source data $\beta_{1,n}, \beta_{2,n}, \ldots \beta_{M,n}$.

The equation for determining the tap coefficient $w_n$ from the coefficient source data $\beta_{m,n}$ and the parameter z is not restricted to equation (9).

The value $z^{m-1}$ determined by the parameter z in equation (9) is defined by the following equation using a new variable $t_m$.

$$t_m = z^{m-1} (m=1,2,\ldots,M) \quad (10)$$

By substituting equation (10) into equation (9), the following equation can be obtained.

$$w_n = \sum_{m=1}^{M} \beta_{m,n} t_m \quad (11)$$

According to equation (11), the tap coefficient $w_n$ can be determined by the linear expression of the coefficient source data $\beta_{m,n}$ and the variable $t_m$.

When the true value of the pixel value of the high-quality pixel of the k-th sample is represented by $y_k$, and when the predictive value of the true value $y_k$ obtained by equation (1) is designated by $y_k'$, the predictive error $e_k$ between the two values is expressed by the following equation.

$$e_k = y_k - y_k' \quad (12)$$

Since the predictive value $y_k'$ in equation (12) can be determined by equation (1), the following equation can be obtained by modifying $y_k'$ in equation (12) into equation (1):

$$e_k = y_k - \left( \sum_{n=1}^{N} w_n x_{n,k} \right) \quad (13)$$

where $x_{n,k}$ represents the n-th low-quality pixel forming the predictive taps for the k-th sample high-quality pixel.

By substituting equation (11) into $w_n$ in equation (13), the following equation can be obtained.

$$e_k = y_k - \left( \sum_{n=1}^{N} \left( \sum_{m=1}^{M} \beta_{m,n} t_m \right) x_{n,k} \right) \quad (14)$$

The coefficient source data $\beta_{m,n}$ that allows the predictive error $e_k$ in equation (14) to be 0 is the optimal value for predicting the high-quality pixel. Generally, however, it is difficult to determine such coefficient source data $\beta_{m,n}$ for all the high-quality pixels.

As the standard for the optimal coefficient source data $\beta_{m,n}$, the method of least squares can be employed, and the optimal coefficient source data $\beta_{m,n}$ can be determined by minimizing the total sum E of the square errors expressed by the following equation:

$$E = \sum_{k=1}^{K} e_k^2 \qquad (15)$$

where K represents the number of learning samples of sets of the high-quality pixels $y_k$ and the low-quality pixels $x_{1,k}$, $x_{2,k}, \ldots, x_{N,k}$ forming the predictive taps for the high-quality pixel $y_k$.

The minimum (minimal) value of the total sum E of the square errors in equation (15) can be determined by the coefficient source data $\beta_{m,n}$ that allows the value obtained by partial-differentiating the total sum E with the coefficient source data $\beta_{m,n}$ to be 0, as expressed by equation (16).

$$\frac{\partial E}{\partial \beta_{m,n}} = \sum_{k=1}^{K} 2 \cdot \frac{\partial e_k}{\partial \beta_{m,n}} \cdot e_k = 0 \qquad (16)$$

By substituting equation (13) into equation (16), the following equation can be obtained.

$$\sum_{k=1}^{K} t_m x_{n,k} e_k = \sum_{k=1}^{K} t_m x_{n,k} \left( y_k - \left( \sum_{n=1}^{N} \left( \sum_{m=1}^{M} \beta_{m,n} t_m \right) x_{n,k} \right) \right) = 0 \qquad (17)$$

$X_{i,p,j,q}$ and $Y_{i,p}$ are defined by equations (18) and (19), respectively.

$$X_{i,p,j,q} = \sum_{k=1}^{K} x_{i,k} t_p x_{j,k} t_q \qquad (18)$$

$(i = 1, 2, \ldots, N: j = 1, 2, \ldots, N: p = 1, 2, \ldots, M: q = 1, 2, \ldots, M)$ $$Y_{i,p} = \sum_{k=1}^{K} x_{i,k} t_p y_k \qquad (19)$$

In this case, equation (17) can be expressed by normal equations in equation (20) using $X_{i,p,j,q}$ and $Y_{i,p}$ $$\begin{bmatrix} X_{1,1,1,1} & X_{1,1,1,2} & \cdots & X_{1,1,1,M} & X_{1,1,2,1} & \cdots & X_{1,1,N,M} \\ X_{1,2,1,1} & X_{1,2,1,2} & \cdots & X_{1,2,1,M} & X_{1,2,2,1} & \cdots & X_{1,2,N,M} \\ \vdots & \vdots & \ddots & \vdots & \vdots & & \vdots \\ X_{1,M,1,1} & X_{1,M,1,2} & \cdots & X_{1,M,1,M} & X_{1,M,2,1} & \cdots & X_{1,M,N,M} \\ X_{2,1,1,1} & X_{2,1,1,2} & \cdots & X_{2,1,1,M} & X_{2,1,2,1} & \cdots & X_{2,1,N,M} \\ \vdots & \vdots & & \vdots & \vdots & \ddots & \vdots \\ X_{N,M,1,1} & X_{N,M,1,2} & \cdots & X_{N,M,1,M} & X_{N,M,2,1} & \cdots & X_{N,M,N,M} \end{bmatrix}$$

-continued $$\begin{bmatrix} \beta_{1,1} \\ \beta_{2,1} \\ \vdots \\ \beta_{M,1} \\ \beta_{1,2} \\ \vdots \\ \beta_{M,N} \end{bmatrix} = \begin{bmatrix} Y_{1,1} \\ Y_{1,2} \\ \vdots \\ Y_{1,M} \\ Y_{2,1} \\ \vdots \\ Y_{N,M} \end{bmatrix}$$

The normal equations in equation (20) can be solved for the coefficient source data $\beta_{m,n}$ by using, for example, a sweeping-out method (Gauss-Jordan elimination).

In the image converter 51 shown in FIG. 7, by conducting learning by solving the normal equations in equation (20) for each class by using many items of high-quality pixels $y_1$, $y_2, \ldots, y_K$ as the supervisor data and using low-quality pixels $x_{1,k}, x_{2,k}, \ldots, x_{N,k}$ forming predictive taps for each high-quality pixel $y_k$ as the learner data, the coefficient source data $\beta_{m,n}$ for each class can be determined and stored in the coefficient source memory 62 of the coefficient output unit 55 shown in FIG. 8. The coefficient generator 61 generates the tap coefficient $w_n$ for each class from the coefficient source data $\beta_{m,n}$ and the parameter z stored in the parameter memory 63 according to equation (9). Then, the predictive-computation unit 16 computes equation (1) by using the tap coefficient $w_n$ and the low-quality pixels (pixels of the first image data) $x_n$ forming the predictive taps for the selected pixel serving as the high-quality pixel. As a result, the predicted value closer to the true value of the selected pixel serving as the high-quality pixel can be determined.

Figure 9:
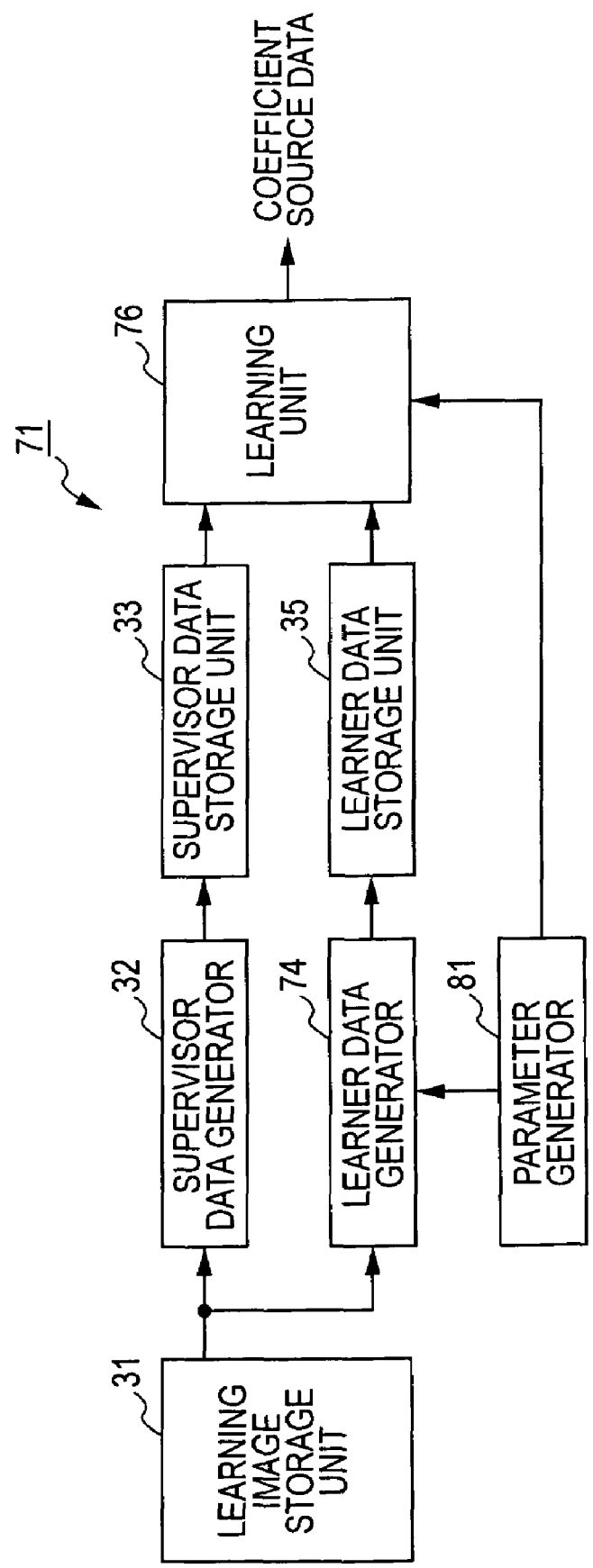
FIG. 9 is a block diagram illustrating an example of the configuration of a learning device for learning coefficient source data.

FIG. 9 illustrates an example of the configuration of a learning device 71 for conducting learning to determine the coefficient source data $\beta_{m,n}$ for each class by solving the normal equations in equation (20).

In FIG. 9, elements corresponding to those of the learning device 21 shown in FIG. 3 are designated with like reference numerals, and an explanation thereof is thus omitted. The learning device 71 is configured similarly to the learning device 21 shown in FIG. 3, except that a learner data generator 74 and a learning unit 76 are provided instead of the learner data generator 34 and the learning unit 36, respectively, and that a parameter generator 81 is added.

As in the learner data generator 34 shown in FIG. 3, the learner data generator 74 generates learner data from the learning image data and supplies it to the learner data storage unit 35.

Not only the learning image data, but also several values that can form the parameter z to be supplied to the parameter memory 63 shown in FIG. 8 are supplied to the learner data generator 74 from the parameter generator 81. If the values that can form the parameter z are real numbers ranging from 0 to Z, z=0, 1, 2, . . . , Z are supplied to the learner data generator 74 from the parameter generator 81.

The learner data generator 74 generates low-quality image data as the learner data by, for example, filtering the high-quality image data as the learning image data by using an LPF having the cut-off frequency corresponding to the parameter z supplied to the learner data generator 74.

Accordingly, in the learner data generator 74, (Z+1) items of low-quality image data serving as learner data items having different levels of spatial resolutions are generated for the high-quality image data serving as the learning image data.

In this case, as the parameter z is larger, the high-quality image data is filtered by using an LPF having a higher cut-off frequency so that low-quality image data as the learner data can be generated. Accordingly, low-quality image data corresponding to a larger parameter z has a higher level of spatial resolution.

In this embodiment, for simple description, the learner data generator 74 generates low-quality image data by reducing spatial resolutions both in the horizontal direction and in the vertical direction of the high-quality image data by an amount equal to the parameter z.

The learning unit 76 determines and outputs coefficient source data for each class by using the supervisor data stored in the supervisor data storage unit 33, the learner data stored in the learner data storage unit 35, and the parameter z supplied from the parameter generator 81.

The parameter generator 81 generates several values that can form the parameter z, for example, z=0, 1, 2, . . . , Z, and supplies them to the learner data generator 74 and the learning unit 76.

Figure 10:
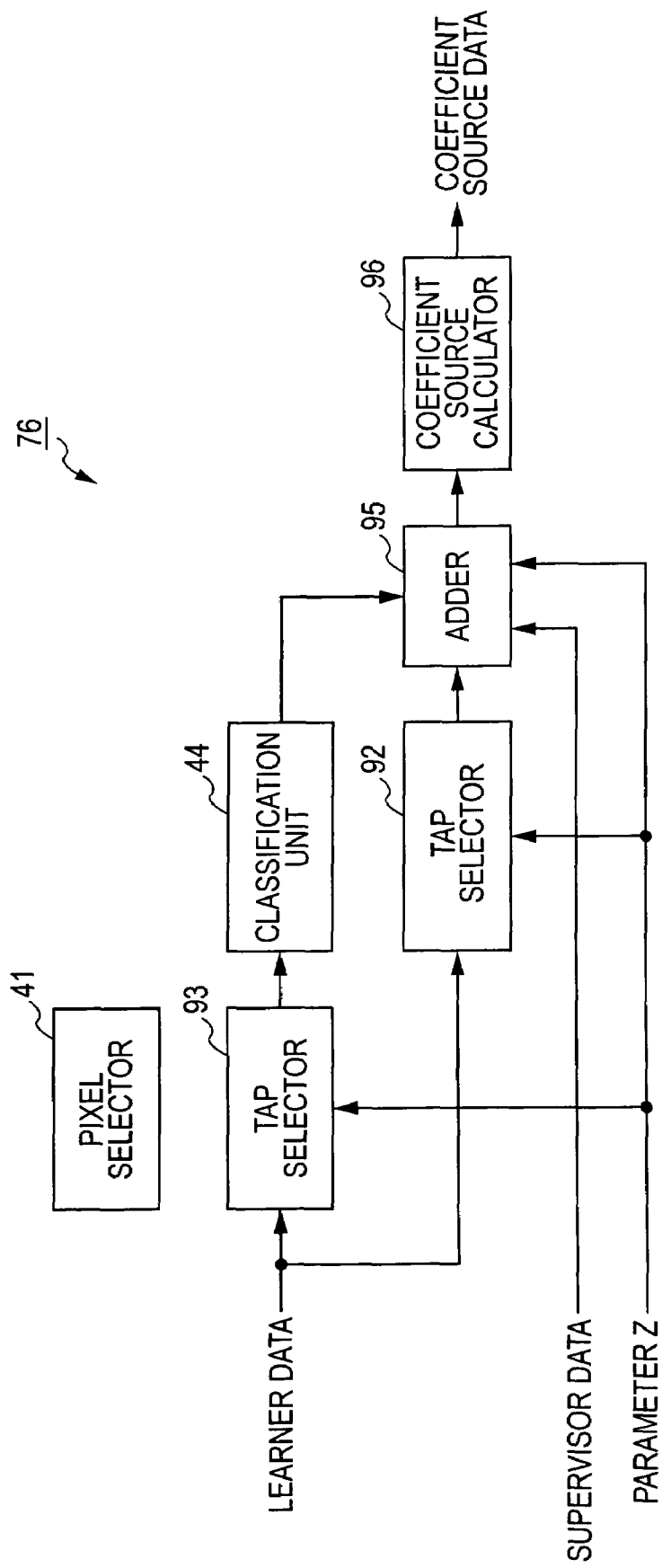
FIG. 10 is a block diagram illustrating an example of the configuration of a learning unit of the learning device shown in FIG. 9.

FIG. 10 illustrates an example of the configuration of the learning unit 76 shown in FIG. 9. In FIG. 10, elements corresponding to those of the learning unit 36 shown in FIG. 4 are indicated by like reference numerals, and an explanation thereof is thus omitted.

As in the tap selector 42 shown in FIG. 4, a tap selector 92 selects, for the selected pixel, predictive taps having the same tap structure as that of the predictive taps selected by the tap selector 12 shown in FIG. 7 from the low-quality pixels forming the low-quality image data as the learner data stored in the learner data storage unit 35, and supplies the selected predictive taps to an adder 95.

As in the tap selector 43 shown in FIG. 4, a tap selector 93 selects, for the selected pixel, class taps having the same tap structure as that of the class taps selected by the tap selector 13 shown in FIG. 7 from the low-quality pixels forming the low-quality image data as the learner data stored in the learner data storage unit 35, and supplies the selected class taps to the classification unit 44.

In FIG. 10, however, the parameter z generated by the parameter generator 81 shown in FIG. 9 is supplied to the tap selectors 92 and 93, and the tap selectors 92 and 93 select the predictive taps and the class taps, respectively, from the learner data generated in correspondence with the parameter z supplied from the parameter generator 81 (i.e., from the low-quality image data as the learner data generated by using an LPF having the cut-off frequency corresponding to the parameter z).

The adder 95 reads the selected pixel from the supervisor data storage unit 33 shown in FIG. 9 and performs addition for each class supplied from the classification unit 44 for the selected pixel, the learner data forming the predictive taps supplied from the tap selector 92, and the parameter z used for generating the learner data.

That is, the supervisor data $y_k$ as the selected pixel stored in the supervisor data storage unit 33, the predictive taps $x_{i,k}(x_{j,k})$ for the selected pixel output from the tap selector 92, and the class for the selected pixel output from the classification unit 44 are supplied to the adder 95. The parameter z used for generating the learner data forming the predictive taps for the selected pixel is also supplied to the adder 95 from the parameter generator 81.

The adder 95 then performs computation for the multiplication $(x_{i,k}t_p x_{j,k}t_q)$ of the learner data for determining the component $X_{i,p,j,q}$ defined in equation (18) and the parameter z and also performs summation ($\Sigma$) in the left-side matrix in equation (20) for each class supplied from the classification unit 44 by using the predictive taps (learner data) $x_{i,k}(x_{j,k})$ and the parameter z. The variable $t_p$ in equation (18) can be calculated from the parameter z according to equation (10). The variable $t_q$ in equation (18) can be calculated in the same manner.

The adder 95 also performs computation for the multiplication $(x_{i,k}t_p y_k)$ of the learner data $x_{i,k}$ for determining the component $Y_{i,p}$ defined in equation (19), the supervisor data $y_k$, and the parameter z and also performs summation ($\Sigma$) in the right-side vector in equation (20) for each class supplied from the classification unit 44 by using the predictive taps (learner data) $x_{i,k}$, the supervisor data Yk, and the parameter z. The variable $t_p$ in equation (19) can be calculated from the parameter z according to equation (10).

That is, the adder 95 stores in a built-in memory (not shown) the component $X_{i,p,j,q}$ in the left-side matrix in equation (20) and the component $Y_{i,p}$ in the right-side vector in equation (20), which are determined for the supervisor data as the previous selected pixel. The adder 95 then adds the component $x_{i,k}t_p x_{j,k}t_q$ or $x_{i,k}t_p y_k$, which are calculated by using the supervisor data $y_k$, the learner data $x_{i,k}(x_{j,k})$, and the parameter z, for the supervisor data as the newly selected pixel to the component $X_{i,p,j,q}$ or the $Y_{i,p}$, which are determined for the previous selected pixel. In short, the adder 95 performs addition (summation) in the component $X_{i,p,j,q}$ or the component $Y_{i,p}$ in equation (18) or (19), respectively.

The adder 95 performs the above-described addition for all the pixels of the supervisor data stored in the supervisor data storage unit 33 with respect to all the values of the parameter z (0, 1, . . . , Z) so that the normal equations in equation (20) can be established for each class. Then, the adder 95 supplies the normal equations to a coefficient source calculator 96.

The coefficient source calculator 96 solves the normal equations for each class supplied from the adder 95, thereby determining and outputting the coefficient source data $\beta_{m,n}$ for the corresponding class.

Figure 11:
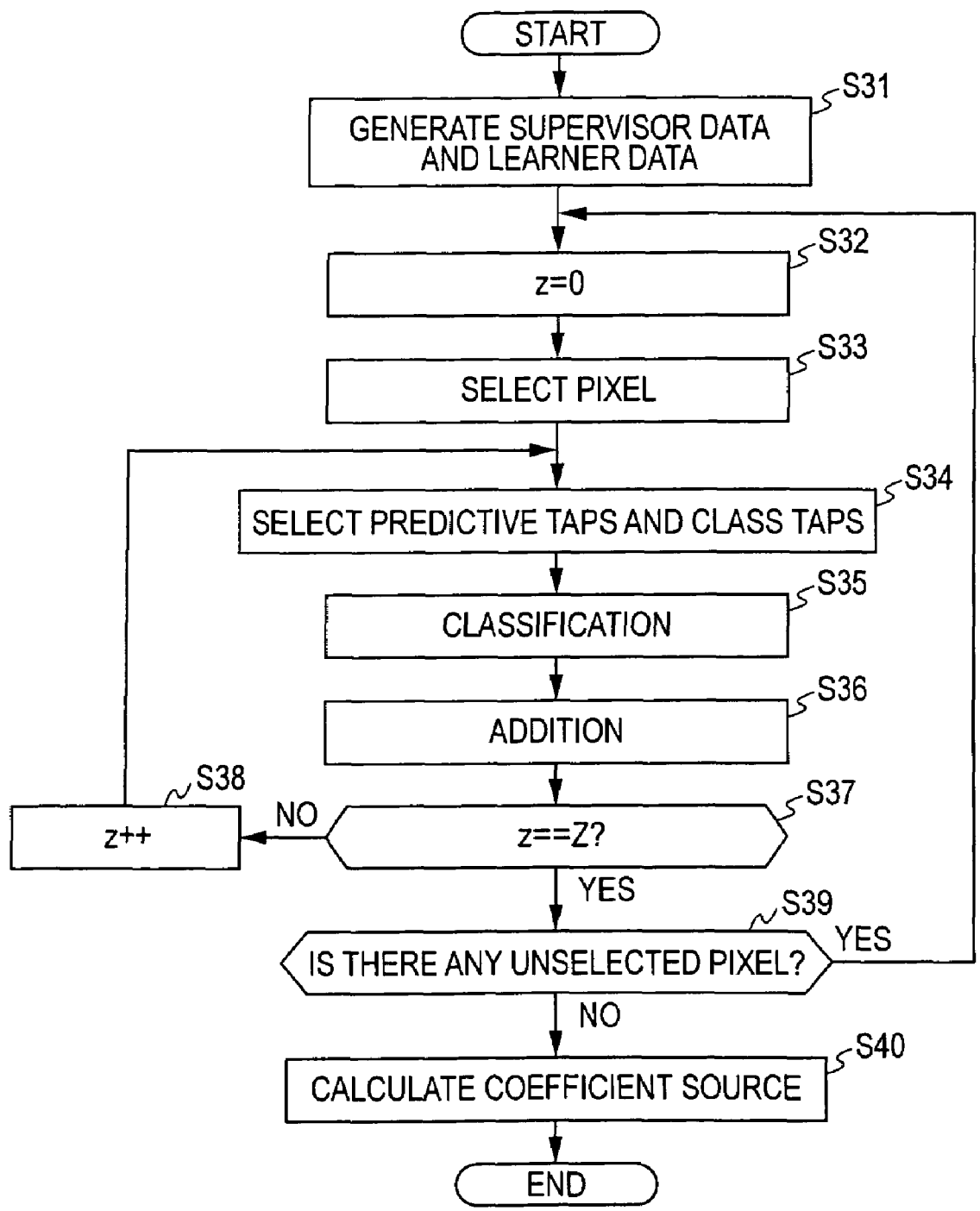
FIG. 11 is a flowchart illustrating learning processing performed by the learning device shown in FIG. 9.

The learning processing performed by the learning device 71 shown in FIG. 9 is discussed below with reference to the flowchart of FIG. 11.

First in step S31, the supervisor data generator 32 and the learner data generator 74 generate and outputs supervisor data and learner data, respectively, from the learning image data stored in the learning image storage unit 31. That is, the supervisor data generator 32 directly outputs the learning image data as supervisor data. (Z+1) parameters z generated by the parameter generator 81 are supplied to the learner data generator 74. The learner data generator 74 generates and outputs (Z+1) frames of learner data for the corresponding frames of the supervisor data (learning image data) by filtering the learning image data by using LPFs having the cut-off frequencies corresponding to the (Z+1) parameters z (0, 1, . . . , Z).

The supervisor data output from the supervisor data generator 32 is supplied to the supervisor data storage unit 33 and is stored therein. The learner data output from the learner data generator 74 is supplied to the learner data storage unit 35 and is stored therein.

Then, in step S32, the parameter generator 81 sets the parameter z to be the initial value, for example, 0, and supplies the parameter z to the tap selectors 92 and 93 and to the adder 95 of the learning device 76 shown in FIG. 10. In step S33, the pixel selector 41 selects one of the unselected pixels from the supervisor data stored in the supervisor data storage unit 33.

Then, in step S34, the tap selector 92 selects, for the selected pixel, predictive taps from the learner data corresponding to the parameter z output from the parameter generator 81 and stored in the learner data storage unit 35 (i.e., from the learner data generated by filtering the learning image data corresponding to the selected pixel of the supervisor data by using an LPF having the cut-off frequency corresponding to the parameter z), and supplies the selected predictive taps to the adder 95. Also in step S34, the tap selector 93 selects, for the selected pixel, class taps from the learner data corresponding to the parameter z output from the parameter generator 81 and stored in the learner data storage unit 35, and supplies the class taps to the classification unit 44.

Subsequently, in step S35, the classification unit 44 classifies the selected pixel based on the class taps, and outputs the resulting class to the adder 95.

In step S36, the adder 95 reads the selected pixel from the supervisor data storage unit 33 and computes the component $x_{i,K}t_p x_{j,K}t_q$ in the left-side matrix and the component $x_{i,K}t_p y_K$ in the right-side vector in equation (20) by using the selected pixel, the predictive taps supplied from the tap selector 92, and the parameter z output from the parameter generator 81. The adder 95 then adds the matrix component $x_{i,K}t_p x_{j,K}t_q$ and the vector component $X_{i,K}t_p y_K$ determined from the selected pixel, the predictive taps, and the parameter z to the previous matrix component and the previous vector component for the class of the selected pixel output from the classification unit 44.

The parameter generator 81 then determines in step S37 whether the parameter z output from the parameter generator 81 is equal to the maximum value Z that can form the parameter z. If it is determined in step S37 that the parameter z is not equal to the maximum value Z (less than the maximum value Z), the process proceeds to step S38. In step S38, the parameter generator 81 increments the parameter z by one, and outputs the resulting value to the tap selectors 92 and 93 and to the adder 95 of the learning device 76 shown in FIG. 10 as the new parameter z. The process then returns to step S34 and step S34 and the subsequent steps are repeated.

If it is determined in step S37 that the parameter z is equal to the maximum value Z, the process proceeds to step S39. In step S39, the pixel selector 41 determines whether there are unselected pixels of the supervisor data stored in the supervisor data storage unit 33. If it is found in step S39 that there is an unselected pixel stored in the supervisor data storage unit 33, the process returns to step S32, and step S32 and the subsequent steps are repeated.

If it is determined in step S39 that there is no unselected pixel in the supervisor data storage unit 33, the adder 95 supplies the left-side matrix and the right-side vector in equation (20) for each class to the coefficient source calculator 96.

Then, in step S40, the coefficient source calculator 96 solves the normal equations for each class consisting of the left-side matrix and the right-side vector in equation (20) supplied from the adder 95, thereby determining and outputting the coefficient source data $\beta_{m,n}$ for each class. The process is then completed.

There may be some classes that cannot obtain a required number of normal equations for determining the coefficient source data due to an insufficient number of learning image data. For such classes, the coefficient source calculator 96 outputs, for example, default coefficient source data.

In the learning device 71 shown in FIG. 9, by using high-quality image data serving as the learning image data as the supervisor data and by using low-quality image data generated by reducing the spatial resolution of the high-quality image data in accordance with the parameter z, the coefficient source data $\beta_{m,n}$ that allows the total sum of the square errors of the predictive value y of the supervisor data predicted from the linear expression in equation (1) to be minimum is directly determined from the tap coefficient $w_n$ and the learner data $x_n$. Alternatively, the coefficient source data $\beta_{m,n}$ may be learned, for example, as follows.

High-quality image data serving as the learning image data is used as the supervisor data, and low-quality image data generated by reducing the horizontal resolution and the vertical resolution of the high-quality image data by filtering the high-quality image data by using an LPF having the cut-off frequency corresponding to the parameter z is used as the learner data. Then, the tap coefficient $w_n$ that allows the total sum of the square errors of the predictive value y of the supervisor data predicted from the linear expression in equation (1) to be minimum is first determined for each of the parameters z (z=0, 1, . . . , Z) by using the tap coefficient $w_n$ and the learner data $x_n$. Then, by using the tap coefficient $w_n$ as the supervisor data and by using the parameter z as the learner data, the coefficient source data $\beta_{m,n}$ that allows the total sum of the square errors of the predictive value of the tap coefficient $w_n$ as the supervisor data predicted from the coefficient source data $\beta_{m,n}$ and the variable $t_m$ corresponding to the parameter z serving as the learner data to be minimum is determined.

As in the learning device 21 shown in FIG. 3, in the learning device 71, the tap coefficient $w_n$ that allows the total sum E of the square errors of the predictive value y of the supervisor data predicted from the linear expression in equation (1) to be minimum (minimal) can be determined for each of the parameters z (z=0, 1, . . . , Z) and for each class by solving the normal equations in equation (8).

The tap coefficient is determined by the coefficient source data $\beta_{m,n}$ and the variable $t_m$ corresponding to the parameter z, as expressed by equation (11). If the tap coefficient determined by equation (11) is represented by $w_n'$ the coefficient source data $\beta_{m,n}$ that allows the error $e_n$ expressed by the following equation between the optimal tap coefficient $w_n$ and the tap coefficient $w_n'$ determined by equation (11) to be 0 is the optimal coefficient source data for determining the optical tap coefficient $w_n$. Generally, however, it is difficult to determine such coefficient source data $\beta_{m,n}$ for all the tap coefficients $w_n$.

$$e_n = w_n - w_n' \qquad (21)$$

Equation (21) can be modified into the following equation by equation (11).

$$e_n = w_n - \left( \sum_{m=1}^{M} \beta_{m,n} t_m \right) \qquad (22)$$

As the standard for the optimal coefficient source data $\beta_{m,n}$ the method of least squares can be employed, and the optimal coefficient source data $\beta_{m,n}$ can be determined by minimizing the total sum E of the square errors expressed by the following equation.

$$E = \sum_{k=1}^{K} e_k^2 \qquad (23)$$

The minimum (minimal) value of the total sum E of the square errors in equation (23) can be determined by the coefficient source data $\beta_{m,n}$ that allows the value obtained by partial-differentiating the total sum E with the coefficient source data $\beta_{m,n}$ to be 0, as expressed by equation (24).

$$\frac{\partial E}{\partial \beta_{m,n}} = \sum_{m=1}^{M} 2 \frac{\partial e_n}{\partial \beta_{m,n}} \cdot e_n = 0 \qquad (24)$$

By substituting equation (22) into equation (24), the following equation can be obtained.

$$\sum_{m=1}^{M} t_m \left( w_n - \left( \sum_{m=1}^{M} \beta_{m,n} t_m \right) \right) = 0 \qquad (25)$$

$X_{i,j}$ and $Y_i$ are defined by equations (26) and (27), respectively.

$$X_{i,j} = \sum_{z=0}^{Z} t_i t_j \quad (i = 1, 2, \ldots, M; \; j = 1, 2, \ldots, M) \qquad (26)$$

$$Y_i = \sum_{z=0}^{Z} t_i w_n \qquad (27)$$

In this case, equation (25) can be expressed by normal equations in equation (28) using $X_{i,j}$ and $Y_i$.

$$\begin{bmatrix} X_{1,1} & X_{1,2} & \cdots & X_{1,M} \\ X_{2,1} & X_{2,1} & \cdots & X_{2,2} \\ \vdots & \vdots & \ddots & \vdots \\ X_{M,1} & X_{M,2} & \cdots & X_{M,M} \end{bmatrix} \begin{pmatrix} \beta_{1,n} \\ \beta_{2,n} \\ \vdots \\ \beta_{M,n} \end{pmatrix} \begin{pmatrix} Y_1 \\ Y_2 \\ \vdots \\ Y_M \end{pmatrix} \qquad (28)$$

The normal equations in equation (28) can be solved for the coefficient source data $\beta_{m,n}$ by using, for example, a sweeping-out method (Gauss-Jordan elimination).

Figure 12:
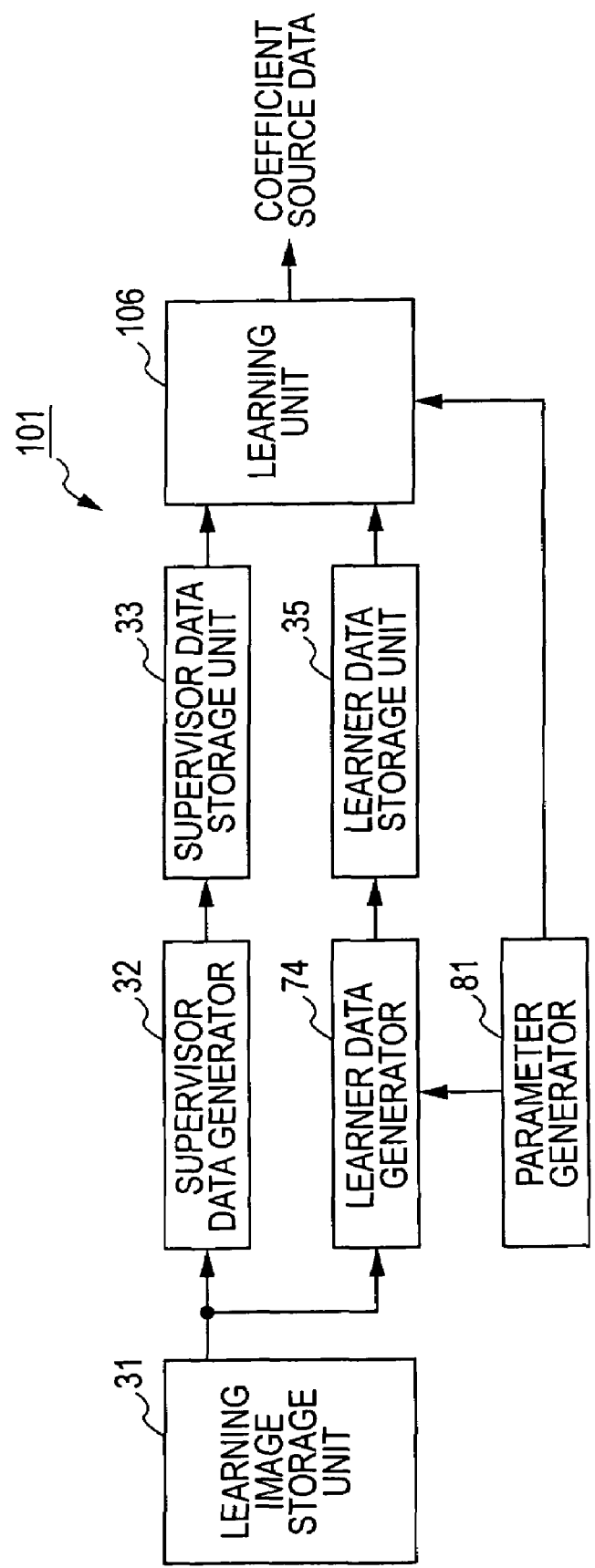
FIG. 12 is a block diagram illustrating an example of the configuration of a learning device for learning coefficient source data.

FIG. 12 illustrates an example of the configuration of a learning device 101 for determining the coefficient source data $\beta_{m,n}$ by solving the normal equations in equation (28).

In FIG. 12, elements corresponding to those of the learning device 21 shown in FIG. 3 or the learning device 71 shown in FIG. 9 are indicated by like reference numerals, and an explanation thereof is thus omitted. That is, the learning device 101 is configured similarly to the learning device 71 shown in FIG. 9, except that a learning unit 106 is provided instead of the learning unit 76 shown in FIG. 10.

Figure 13:
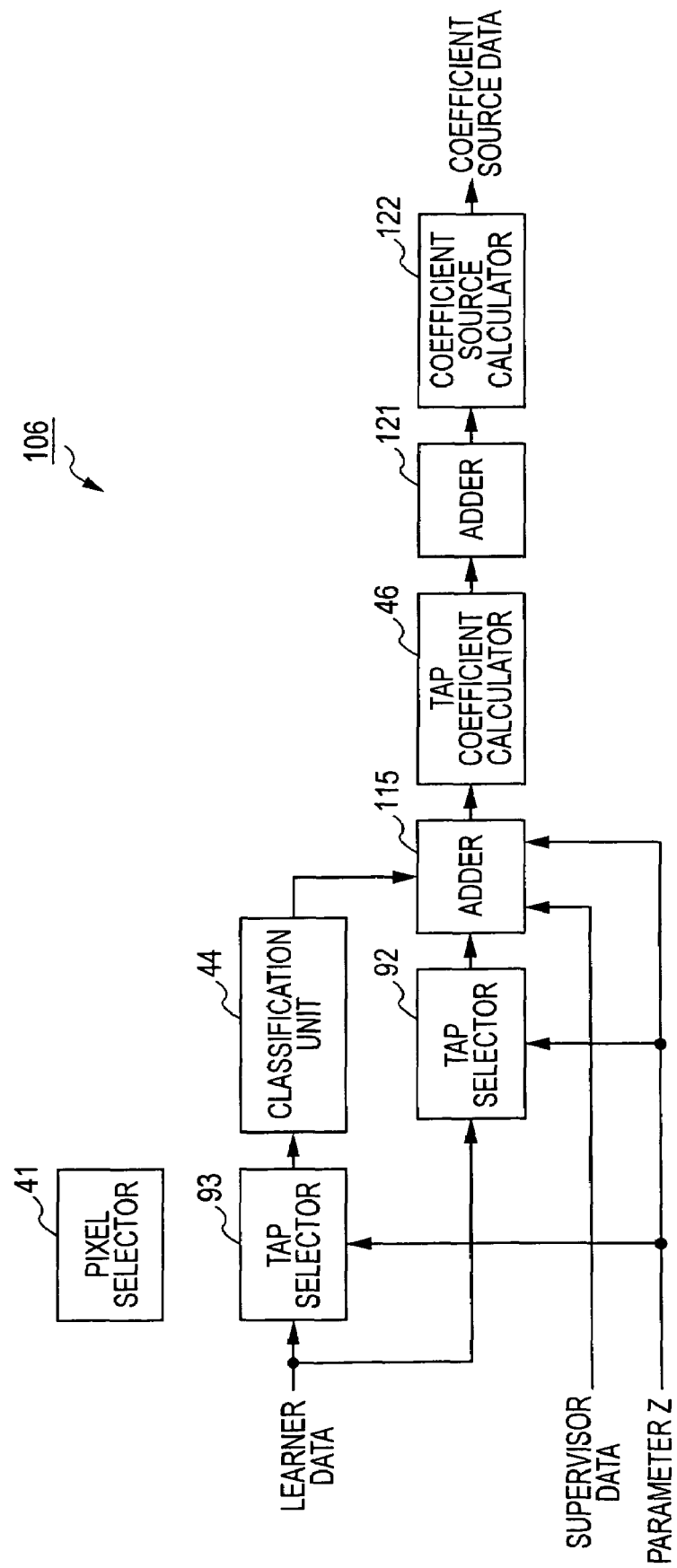
FIG. 13 is a block diagram illustrating an example of the configuration of a learning unit of the learning device shown in FIG. 12.

FIG. 13 illustrates an example of the configuration of the learning unit 106 shown in FIG. 12. In FIG. 13, elements corresponding to those of the learning unit 36 shown in FIG. 4 or the learning unit 76 shown in FIG. 10 are designated with like reference numerals, and an explanation thereof is thus omitted.

The class of a selected pixel output from the classification unit 44 and the parameter z output from the parameter generator 81 are supplied to an adder 115. The adder 115 then reads the selected pixel from the supervisor data storage unit 33 and performs addition for the selected pixel and learner data forming the predictive taps for the selected pixel supplied from the tap selector 92 with respect to each of the parameter z output from the parameter generator 81 and for each class supplied from the classification unit 44.

That is, the supervisor data $y_k$ stored in the supervisor data storage unit 33 shown in FIG. 12, the predictive taps $x_{n,k}$ output from the tap selector 92, the class output from the classification unit 44, and the parameter z used for generating the learner data forming the predictive taps $x_{n,k}$ output from the parameter generator 81 shown in FIG. 12 are supplied to the adder 115.

The adder 115 then performs computation for the multiplication ($x_{n,k}x_{n',k}$) of the learner data items and the summation ($\Sigma$) in the left-side matrix in equation (8) by using the predictive taps (learner data) $x_{n,k}$ for each of the parameters z output from the parameter generator 81 and for each class output from the classification unit 44.

The adder 115 also performs computation for the multiplication ($x_{n,k}y_k$) of the learner data $x_{n,k}$ and the supervisor data $y_k$ and the summation ($\Sigma$) in the right-side vector in equation (8) by using the predictive taps (learner data) $x_{n,k}$ and the supervisor data $y_k$ for each of the parameters z output from the parameter generator 81 and for each class output from the classification unit 44.

That is, the adder 115 stores in a built-in memory (not shown) the component in the left side matrix ($\Sigma x_{n,k}x_{n',k}$) and the component in the right side vector ($\Sigma x_{n,k}y_k$) in the normal equations in equation (8) determined for the supervisor data, which is the previous selected pixel. The adder 115 then adds the corresponding component $x_{n,k+1}x_{n',k+1}$ or $x_{n,k+1}y_{k+1}$ calculated by using the supervisor data $y_{k+1}$ and the learner data $x_{n,k+1}$ for the supervisor data, which is the newly selected pixel, to the matrix component ($\Sigma x_{n,k}x_{n',k}$) or the vector component ($\Sigma x_{n,k}y_k$) In short, the adder 115 performs addition represented by summation in the normal equations in equation (8).

Then, the adder 115 computes the above-described addition for all the pixels forming the supervisor data stored in the supervisor data storage unit 33 so that the normal equations in equation (8) can be established for each parameter z and for each class. The adder 45 then supplies the normal equations to the tap coefficient calculator 46.

That is, as in the adder 45 shown in FIG. 4, the adder 115 establishes the normal equations in equation (8) for each class. However, the adder 115 is different from the adder 45 in that the adder 115 establishes the normal equations in equation (8) for each parameter z.

The tap coefficient calculator 46 solves the normal equations for each parameter z and for each class supplied from the adder 115 so as to determine the optimal tap coefficient $w_n$ for each parameter z and for each class. The tap coefficient calculator 46 then supplies the tap coefficient $w_n$ to an adder 121.

The adder 121 performs addition for the parameter z (corresponding variable $t_m$) supplied from the parameter generator 81 shown in FIG. 12 and the optimal tap coefficient $w_n$ supplied from the tap coefficient calculator 46 for each class.

That is, the adder 121 performs computation for the multiplication ($t_i t_j$) of the variables $t_i (t_j)$ corresponding to the parameter z for determining the component $X_{i,j}$ defined in equation (26) and also performs summation ($\Sigma$) in the left-side matrix in equation (28) for each class by using the variable $t_i (t_j)$ determined in equation (10) from the parameter z supplied from the parameter generator 81 shown in FIG. 12.

Since the component $X_{i,j}$ is determined only by the parameter z regardless of the class, it is calculated only once.

The adder 121 also performs computation for the multiplication ($t_i w_n$) of the variables $t_i$ corresponding to the parameter z for determining the component $Y_i$ defined in equation (27) and also performs summation ($\Sigma$) in the right-side vector in equation (28) for each class by using the variable $t_i$ determined in equation (10) from the parameter z supplied from the parameter generator 81 shown in FIG. 12 and the optimal tap coefficient $w_n$ supplied from the tap coefficient calculator 46.

The adder 121 determines the component $X_{i,j}$ defined in equation (26) and the component $Y_i$ defined in equation (27) for each class so as to establish the normal equations in equation (28) for each class, and supplies the normal equations to a coefficient source calculator 122.

The coefficient source calculator 122 solves the normal equations in equation (28) supplied from the adder 121, thereby determining and outputting the coefficient source data $\beta_{m,n}$ for each class.

The coefficient source data $\beta_{m,n}$ for each class determined as described above can be stored in the coefficient source memory 62 of the coefficient output unit 55 shown in FIG. 8.

As in the learning for tap coefficients shown in FIGS. 5A through 5D, in the learning for coefficient source data, according to the type of learner data corresponding to the first image data and the type of supervisor data corresponding to the second image data, various image conversion processing by using the learned coefficient source data can be performed.

In the above-described example, by directly using the learning image data as the supervisor data corresponding to the second image data and by using the low-quality image data generated by reducing the spatial resolution of the learning image data as the learner data corresponding to the first image data, learning for the coefficient source data is conducted. Accordingly, it is possible to obtain coefficient source data that can perform spatial-resolution creation processing for converting the first image data into the second image data with improved spatial resolution.

In this case, in the image converter 51 shown in FIG. 7, the horizontal resolution and the vertical resolution of the image data can be improved to the resolution corresponding to the parameter z.

Coefficient source data can be learned by using high-quality image data as the supervisor data and by using image data by superimposing noise corresponding to the parameter z on the high-quality image data. In this case, it is possible to obtain coefficient source data that can perform noise removing processing for converting the first image data into the second image data without noise. In the image converter 51 shown in FIG. 7, image data having an S/N ratio corresponding to the parameter z can be obtained.

Coefficient source data can be learned by using certain image data as the supervisor data and by using, as the learner data, image data generated by reducing the number of pixels of the supervisor image data in accordance with the parameter z, or by using a certain size of image data as the learner data and by using, as the supervisor data, image data generated by reducing the number of pixels of the learner image data with a reduction ratio based on the parameter z. In this case, it is possible to obtain coefficient source data that can perform resealing processing for converting the first image data into the second image data enlarged or reduced from the first image data. In the image converter 51 shown in FIG. 7, image data with a size enlarged or reduced based on the parameter z can be obtained.

In the above-described example, the tap coefficient $w_n$ is defined by $\beta_{1,n}z^0 + \beta_{2,n}z^1 + \ldots + \beta_{M,n}z^{M-1}$, as expressed by equation (9), and the tap coefficient $w_n$ that can improve both the horizontal spatial resolution and the vertical spatial resolution is determined in accordance with the parameter z according to equation (9). However, different tap coefficients $w_n$ that can independently improve the horizontal resolution and the vertical resolution in accordance with independent parameters $z_x$ and $z_y$, respectively, may be determined.

More specifically, instead of equation (9), the tap coefficient $w_n$ is defined by, for example, a third-order expression $\beta_{1,n}z_x^0z_y^0 + \beta_{2,n}z_x^1z_y^0 + \beta_{3,n}z_x^2z_y^0 + \beta_{4,n}z_x^3z_y^0 + \beta_{5,n}z_x^0z_y^1 + \beta_{6,n}z_x^0z_y^2 + \beta_{7,n}z_x^0z_y^3 + \beta_{8,n}z_x^1z_y^1 + \beta_{9,n}z_x^2z_y^1 + \beta_{10,n}z_x^1z_y^2$, and instead of equation (10), the variable $t_m$ defined in equation (10) is defined by, for example, $t_1=z_x^0z_y^0$, $t_2=z_x^1z_y^0$, $t_3=z_x^2z_y^0$, $t_4=z_x^3z_y^0$, $t_5=z_x^0z_y^1$, $t_6=z_x^0z_y^2$, $t_7=z_x^0z_y^3$, $t_8=z_x^1z_y^1$, $t_9=z_x^2z_y^1$, $t_{10}=z_x^1z_y^2$. In this case, the final tap coefficient $w_n$ can be expressed by equation (11). Accordingly, in the learning device 71 shown in FIG. 9 or the learning device 101 shown in FIG. 12, learning is conducted by using, as the learner data, image data generated by reducing the horizontal resolution and the vertical resolution of the supervisor data in accordance with the parameters $z_x$ and $z_y$, respectively, so as to determine the coefficient source data $\beta_{m,n}$. Then, tap coefficients $w_n$ that can independently improve the horizontal resolution and the vertical resolution in accordance with the independent parameters $z_x$ and $z_y$, respectively, can be obtained.

Alternatively, in addition to the parameters $z_x$ and $z_y$, corresponding to the horizontal resolution and the vertical resolution, respectively, a parameter $z_t$ corresponding to the temporal resolution can be used, so that tap coefficients $w_n$ that can independently improve the horizontal resolution, vertical resolution, and temporal resolution in accordance with the independent parameters $z_x$, $z_y$, and $z_t$, respectively, can be determined.

As in the spatial-resolution creation processing, in the resealing processing, the tap coefficient $w_n$ that can rescale image data in the horizontal direction and the vertical direction in accordance with an enlargement ratio or a reduction ratio corresponding to the parameter z can be determined. Alternatively, tap coefficients $w_n$ that can rescale image data independently in the horizontal direction and the vertical direction in accordance with enlargement ratios or reduction ratios corresponding to parameters $z_x$ and $z_y$, respectively, may be determined.

In the learning device 71 shown in FIG. 9 or the learning device 101 shown in FIG. 12, learning can be conducted by using, as the learner data, image data generated by reducing the horizontal resolution and the vertical resolution of the supervisor data in accordance with the parameter $z_x$ and by adding noise to the supervisor data in accordance with the parameter $z_y$, so as to determine the coefficient source data $\beta_{m,n}$. Then, the tap coefficient $w_n$ which can improve the horizontal resolution and the vertical resolution in accordance with the parameter $z_x$ and which can remove noise in accordance with the parameter $z_y$ can be obtained.

An AV system according to a first embodiment of the present invention is described below with reference to FIG. 14.

Figure 14:
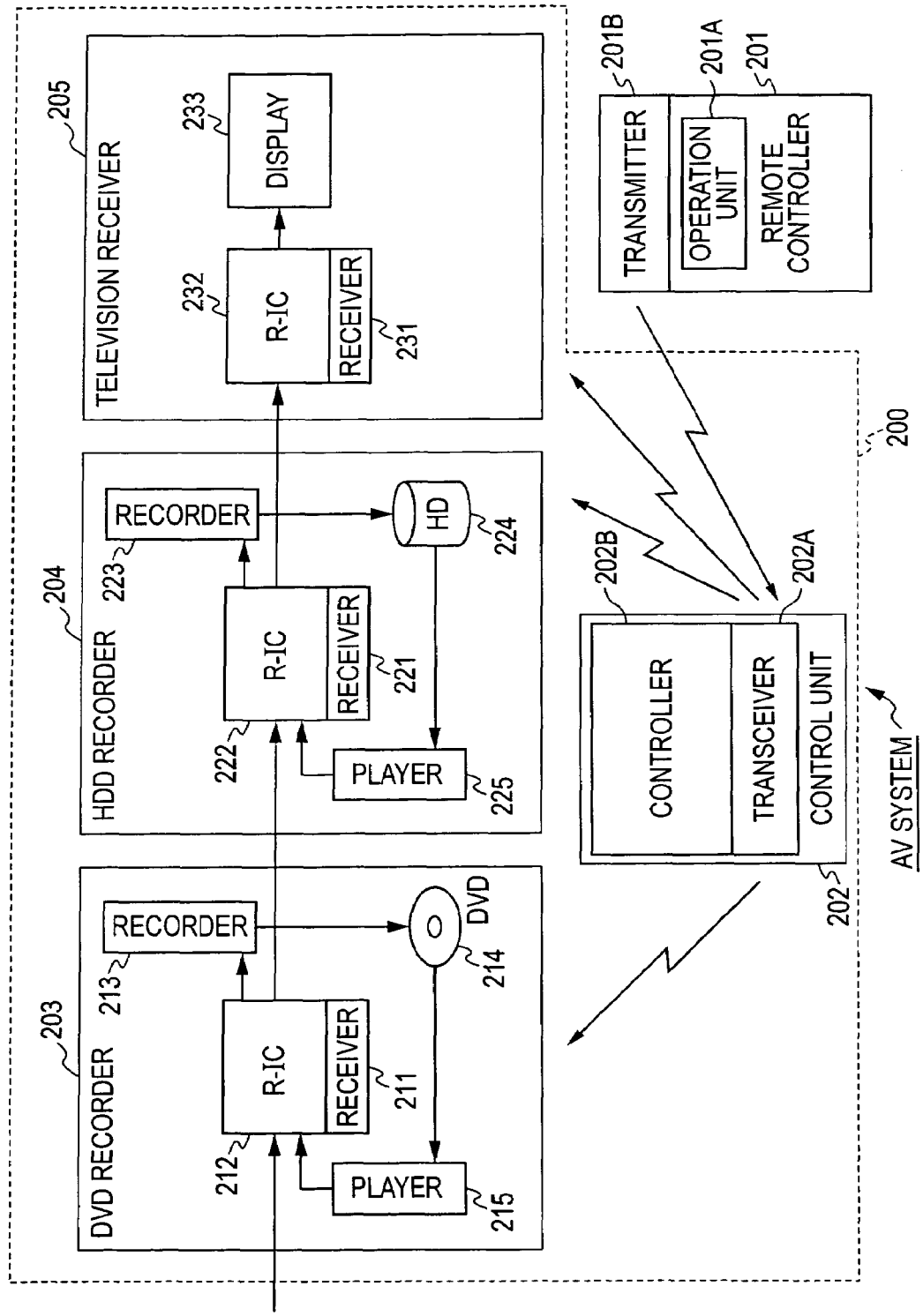
FIG. 14 a block diagram illustrating an example of the configuration of an AV system according to a first embodiment of the present invention.

In FIG. 14, the AV system is formed of a main body 200 and a remote controller (remote commander) 201.

The main body 200 includes a control unit 202, a digital versatile disc (DVD) recorder 203, a hard disk drive (HDD) recorder 204, and a television receiver 205.

The remote controller 201 includes an operation unit 201A and a transmitter 201B.

A user operates the operation unit 201A to input various commands into the main body 200. The transmitter 201B transmits an operation signal, for example, an infrared signal, corresponding to the operation performed on the operation unit 201A. The transmitter 201B may transmit an operation signal by wireless means which is compliant with, for example, the Bluetooth® standards.

The control unit 202 includes a transceiver 202A and a controller 202B.

The transceiver 202A receives the operation signal (infrared signal) transmitted from the remote controller 201 and supplies it to the controller 202B. The transceiver 202A also transmits (broadcasts) a command sequence consisting of at least one command supplied from the controller 202B by wired or wireless means. In this embodiment, the transceiver 202A transmits the command sequence by wireless means.

The controller 202B generates a command sequence consisting of at least one command for the DVD recorder 203, the HDD recorder 204, or the television receiver 205 in accordance with the operation signal supplied from the transceiver 202A, and supplies the generated command sequence to the transceiver 202A.

The DVD recorder 203 includes a receiver 211, a reconfigurable—integrated circuit (R-IC) 212, a recorder 213, a DVD 214, and a player 215. The DVD recorder 203 performs required signal processing on image data supplied from an external source, such as image data of a television broadcast program received by a tuner (not shown) or image data input via an external terminal (not shown), and supplies the image data to the HDD recorder 204 at the subsequent stage or records the image data on the DVD 214. The DVD recorder 203 also plays back image data from the DVD 214, performs required signal processing on the image data, and supplies it to the HDD recorder 204.

In the DVD recorder 203, the receiver 211 receives the command sequence wirelessly transmitted from the transceiver 202A of the control unit 202, and supplies the command sequence to the R-IC 212.

The R-IC 212, which is a one-chip IC having a reconfigurable internal structure, switches the internal structure according to at least one command of the command sequence supplied from the receiver 211, performs required signal processing (data processing) on image data supplied from an external source or image data supplied from the player 215, and supplies the image data to the HDD recorder 204 or to the recorder 213.

The receiver 211 and the R-IC 212 may be integrated into a one-chip IC. The same applies to a receiver 211 and a R-IC 222 of the HDD recorder 204 and a receiver 231 and a R-IC 232 of the television receiver 205, which are discussed below.

The recorder 213 performs required processing, such as MPEG coding, on the image data supplied from the R-IC 212 so as to convert the image data into recording data compliant with the DVD standards, and records the data on the DVD 214. The DVD 214 is easily attachable to and detachable from the DVD recorder 203.

The player 215 reads recording data from the DVD 214, decodes it into the image data (plays back the image data), and supplies it to the R-IC 212.

The HDD recorder 204 includes the receiver 221, the R-IC 222, a recorder 223, an HD 224, and a player 225. The HDD recorder 204 performs required signal processing on the image data supplied from the DVD recorder 203, and supplies the image data to the television receiver 205 or records it on the HD 224. The HDD recorder 204 also plays back image data from the HD 224, performs required signal processing on the image data, and supplies it to the television receiver 205.

That is, in the HDD recorder 204, the receiver 221 receives a command sequence wirelessly transmitted from the transceiver 202A of the control unit 202, and supplies the command sequence to the R-IC 222.

As in the R-IC 212, the R-IC 222, which is a one-chip IC having a reconfigurable internal structure, switches the internal structure according to at least one command of the command sequence supplied from the receiver 221, performs required signal processing on the image data supplied from the DVD recorder 203 or the image data supplied from the player 225, and supplies the image data to the television receiver 205 or the recorder 223.

The recorder 223 performs required signal processing on the image data supplied from the R-IC 222, and records it on the HD 224.

The player 225 reads (plays back) recording data from the HD 224 and supplies it to the R-IC 222.

The television receiver 205 includes the receiver 231, the R-IC 232, and a display 233, performs required signal processing on the image data supplied from the HDD recorder 204, and supplies it to the display 233 so that the image data is displayed on the display 233.

That is, in the television receiver 205, the receiver 231 receives a command sequence wirelessly transmitted from the transceiver 202A of the control unit 202, and supplies the command sequence to the R-IC 232.

As in the R-IC 212, the R-IC 232, which is a one-chip IC having a reconfigurable internal structure, switches the internal structure according to at least one command of the command sequence supplied from the receiver 231, performs required signal processing on the image data supplied from the HDD recorder 204, and supplies it to the display 233.

The display 233 displays the image data supplied from the R-IC 232.

In FIG. 14, the DVD recorder 203, the HDD recorder 204, and the television receiver 205 are accommodated in one housing serving as the main body 200. Alternatively, the DVD recorder 203, the HDD recorder 204, and the television receiver 205 may be separate devices accommodated in different housings. In this case, the DVD recorder 203, the HDD recorder 204, and the television receiver 205 can send and receive required data (signals) by wired or wireless means.

In FIG. 14, the control unit 202 generates a command sequence according to an operation signal from the remote controller 201, and wirelessly transmits the command sequence to the DVD recorder 203, the HDD recorder 204, or the television receiver 205. Alternatively, the remote controller 201 may generate a command sequence according to the operation signal, and wirelessly transmits the command sequence to the DVD recorder 203, the HDD recorder 204, or the television receiver 205.

The operation of the main body 200 of the AV system shown in FIG. 14 is described below with reference to FIGS. 15 through 26.

When the user operates the operation unit 201A of the remote controller 201, the transmitter 201B transmits an operation signal corresponding to the operation.

In the control unit 202, the transceiver 202A receives the operation signal from the transmitter 201B of the remote controller 201, and supplies it to the controller 202B.

The controller 202B receives the operation signal from the transceiver 202A, and determines in step S201 whether the operation signal indicates an instruction to record external image data on the DVD 214.

If it is determined in step S201 that the operation signal indicates an instruction to record the image data on the DVD 214, the process proceeds to step S202. In step S202, the controller 202B generates a command sequence corresponding to the operation signal.

FIG. 16 illustrates an example of the command sequence generated by the controller 202B in step S202.

The command sequence shown in FIG. 16 consists of one noise-removing processing command and two null commands.

In the command sequence shown in FIG. 16, the first noise-removing processing command instructs the R-IC 212 of the DVD recorder 203 to perform noise removing processing as the signal processing. The second null command instructs the R-IC 222 of the HDD recorder 204 not to perform any signal processing. The third null command instructs the R-IC 232 of the television receiver 205 not to perform any signal processing.

The null commands may be omitted, in which case, the command sequence shown in FIG. 16 consists of one noise-removing processing command for the DVD recorder 203.

Referring back to FIG. 15, in step S202, the controller 202B generates a command sequence and supplies it to the transceiver 202A. Then, in step S203, the transceiver 202A transmits (broadcasts) the command sequence from the controller 202B.

In step S204, the receiver 211 of the DVD recorder 203, the receiver 221 of the HDD recorder 204, and the receiver 231 of the television receiver 205 receive the command sequence transmitted by the transceiver 202A in step S203. The receivers 211, 221, and 231 supply the command sequence received from the transceiver 202A to the R-ICs 212, 222, 232, respectively.

Then, in step S205, the R-ICs 212, 222, 232 switch their internal structures according to the commands sent to the R-ICs 212, 222, 232 of the command sequence supplied from the receivers 211, 221, and 231, respectively.

More specifically, in step S205, the R-IC 212 of the DVD recorder 203 switches the internal structure to perform noise removing processing according to the noise-removing processing command at the head of the command sequence shown in FIG. 16. The R-IC 222 of the HDD recorder 204 and the R-IC 232 of the television receiver 205 switch the internal structures not to perform signal processing according to the second and third null commands of the command sequence shown in FIG. 16.

In step S206, the R-ICs 212, 222, and 232 perform the corresponding signal processing based on the internal structures switched in step S205.

More specifically, in step S206, the R-IC 212 perform noise removing processing on the image data input from the outside of the DVD recorder 203 and supplies it to the recorder 213. The recorder 213 performs MPEG-coding on the image data from the R-IC 212 and records it on the DVD 214. That is, image data subjected to noise removing processing performed by the R-IC 212 is recorded on the DVD 214.

Accordingly, among the R-ICs 212, 222, and 232, only the R-IC 212 serves as a signal processing device, i.e., a noise-removing processing device.

Figure 17:
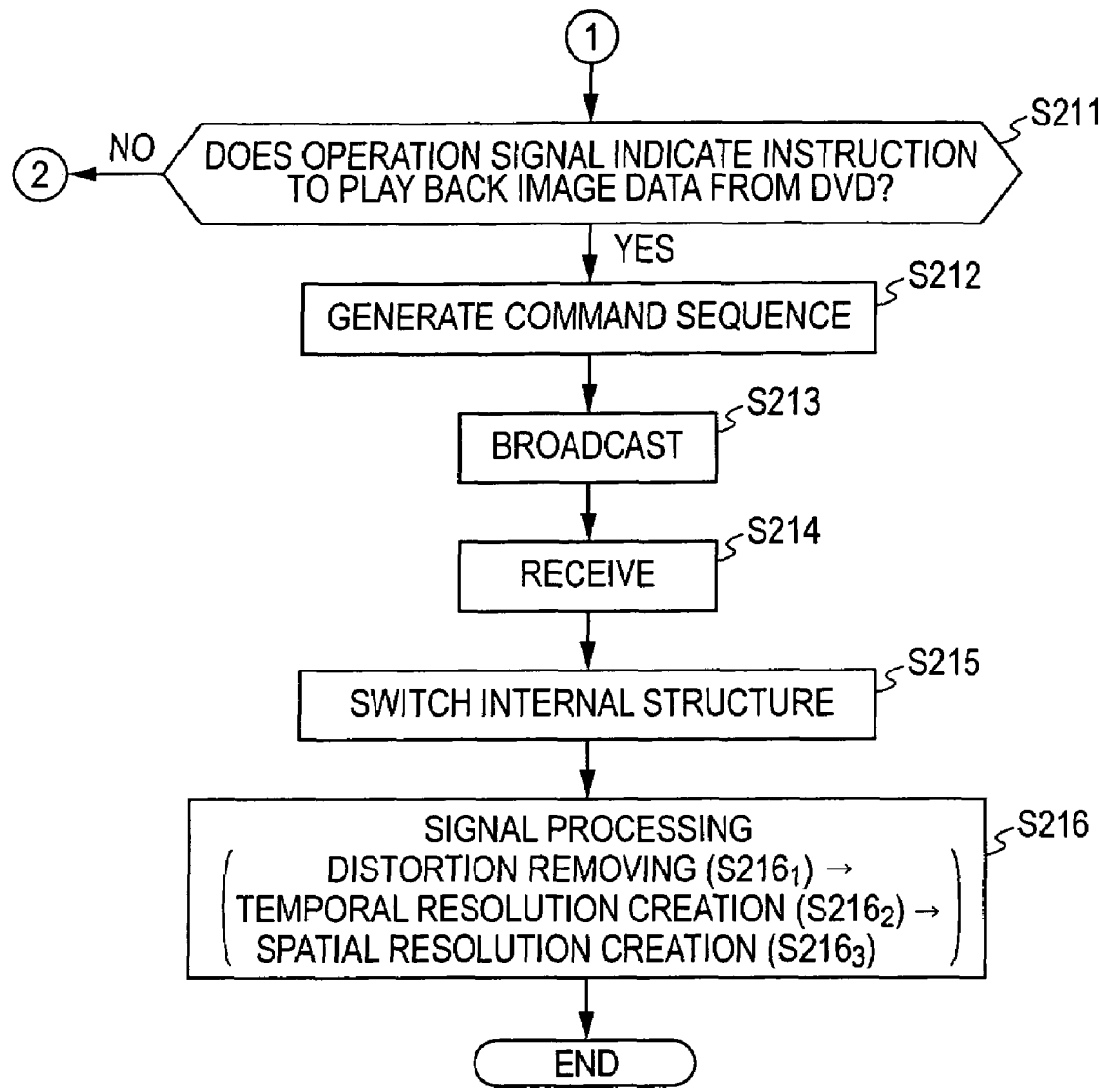
FIG. 17 is a flowchart illustrating the operation of a main body of the AV system shown in FIG. 14.

If the controller 202B determines in step S201 that the operation signal does not indicate an instruction to record external image data on the DVD 214, the process proceeds to step S211 of FIG. 17 to determine whether the operation signal indicates an instruction to play back image data recorded on the DVD 214.

If it is determined in step S211 that the operation signal indicates an instruction to play back the image data on the DVD 214, the process proceeds to step S212. In step S212, the controller 202B generates a command sequence according to the operation signal.

Figure 18:
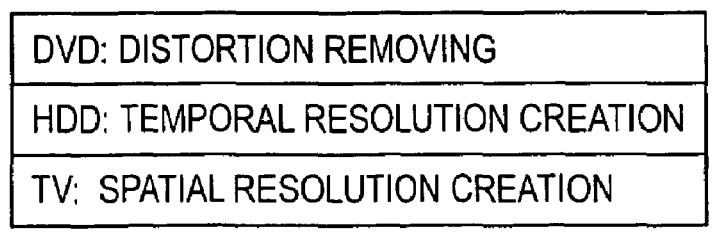
FIG. 18 illustrates an example of commands.

FIG. 18 illustrates an example of the command sequence generated by the controller 202B in step S212 of FIG. 17.

The command sequence shown in FIG. 18 consists of one distortion-removing processing command, one temporal-resolution creation processing command, and one spatial-resolution creation processing command.

The first distortion-removing processing command at the head of the command sequence shown in FIG. 18 instructs the R-IC 212 of the DVD recorder 203 to perform distortion removing processing for removing block distortions caused by MPEG coding/decoding. The second temporal-resolution creation processing command instructs the R-IC 222 of the HDD recorder 204 to perform temporal-resolution creation processing for improving the temporal resolution of the image data. The third spatial-resolution creation processing command instructs the R-IC 232 of the television receiver 205 to perform spatial-resolution creation processing for improving the spatial resolution of the image data.

Referring back to FIG. 17, in step S212, the controller 202B generates a command sequence and supplies it to the transceiver 202A. In step S213, the transceiver 202A transmits (broadcasts) the command sequence from the controller 202B.

In step S214, the receiver 211 of the DVD recorder 203, the receiver 221 of the HDD recorder 204, and the receiver 231 of the television receiver 205 receive the command sequence transmitted by the transceiver 202A in step S213. Then, the receivers 211, 221, and 231 then supply the command sequence received from the transceiver 202A to the R-ICs 212, 222, 232, respectively.

In step S215, the R-ICs 212, 222, 232 switch their internal structures according to the commands sent to the R-ICs 212, 222, and 232 of the command sequence supplied from the receivers 211, 221, and 231, respectively.

More specifically, in step S215, the R-IC 212 of the DVD recorder 203 switches the internal structure to perform distortion removing processing according to the distortion-removing processing command at the head of the command sequence shown in FIG. 18. The R-IC 222 of the HDD recorder 204 switches the internal structure to perform temporal-resolution creation processing according to the second temporal-resolution creation processing command of the command sequence. The R-IC 232 of the television receiver 205 switches the internal structure to perform spatial-resolution creation processing according to the third spatial-resolution creation processing command of the command sequence.

In step S216, the R-ICs 212, 222, 232 perform the corresponding signal processing based on the internal structures switched in step S215.

More specifically, in the DVD recorder 203, the player 215 reads the image data from the DVD 214, performs MPEG-decoding on the image data, and supplies it to the R-IC 212. In step S216$_1$, the R-IC 212 performs distortion removing processing on the image data supplied from the player 215, i.e., the image data with block distortions caused by MPEG coding/decoding, and then outputs the image data to the HDD recorder 204.

In the HDD recorder 204, the image data received from the R-IC 212 of the DVD recorder 203 is supplied to the R-IC 222. In step S216$_2$, the R-IC 222 performs temporal-resolution creation processing on the image data from the R-IC 212 and outputs it to the television receiver 205.

In the television receiver 205, the image data from the R-IC 222 of the HDD recorder 204 is supplied to the R-IC 232. In step S216$_3$, the R-IC 232 performs spatial-resolution creation processing on the image data from the R-IC 222, and supplies it to the display 233.

Accordingly, the R-IC 212 serves as a distortion-removing processing device (IC), the R-IC 222 serves as a device for performing temporal-resolution creation processing, and the R-IC 232 serves as a device for performing spatial-resolution creation processing.

As described above, the R-IC 212 performs distortion removing processing on the image data played back from the DVD 214, the R-IC 222 then performs temporal-resolution creation processing on the image data processed by the R-IC 212, and the R-IC 232 then performs spatial-resolution creation processing performed on the image data processed by the R-IC 222. As a result, image data without (reduced) block distortions and with high temporal resolution and high spatial resolution can be displayed on the display 233.

If the image data recorded on the DVD 214 is a film, the so-called "2-3 pull down" method is performed for converting the film into television image data. Accordingly, the image data recorded on the DVD 214 has a reduced temporal resolution caused by the 2-3 pull down method.

Accordingly, the R-IC 222 performs the temporal-resolution creation processing so that the temporal resolution of the image data can be recovered.

If the controller 202B determines in step S211 that the operation signal does not indicate an instruction to play back the image data recorded on the DVD 214, the process proceeds to step S221 of FIG. 19 to determine whether the operation signal indicates an instruction to record external image data on the HD 224.

If it is determined in step S221 that the operation signal indicates an instruction to record the image data on the HD 224, the process proceeds to step S222. In step S222, the controller 202B generates a command sequence according to the operation signal.

FIG. 20 illustrates an example of the command sequence generated by the controller 202B in step S222 of FIG. 19.

The command sequence shown in FIG. 20 consists of one noise-removing processing command, one spatial-resolution creation processing command, and one null command.

The noise-removing processing command at the head of the command sequence shown in FIG. 20 instructs the R-IC 212 of the DVD recorder 203 to perform noise removing processing as the signal processing. The second spatial-resolution creation processing command instructs the R-IC 222 of the HDD recorder 204 to perform spatial-resolution creation processing. The third null command instructs the R-IC 232 of the television receiver 205 not to perform signal processing.

Referring back to FIG. 19, in step S222, the controller 202B generates a command sequence and then supplies it to the transceiver 202A. Then, in step S223, the transceiver 202A transmits (broadcasts) the command sequence from the controller 202B.

In step S224, the receiver 211 of the DVD recorder 203, the receiver 221 of the HDD recorder 204, and the receiver 231 of the television receiver 205 receive the command sequence transmitted by the transceiver 202A in step S223. The receivers 211, 221, 231 then supply the received command sequence to the R-ICs 212, 222, 232, respectively.

In step S225, the R-ICs 212, 222, and 232 switch their internal structures according to the commands sent to the R-ICs 212, 222, and 232 of the command sequence supplied from the receivers 212, 221, 231, respectively.

More specifically, in step S225, the R-IC 212 of the DVD recorder 203 switches the internal structure to perform noise removing processing according to the noise-removing processing command at the head of the command sequence shown in FIG. 20. The R-IC 222 of the HDD recorder 204 switches the internal structure to perform spatial-resolution creation processing according to the second spatial-resolution creation processing command of the command sequence. The R-IC 232 of the television receiver 205 switches the internal structure not to perform signal processing according to the third null command of the command sequence.

In step S226, the R-ICs 212, 222, and 232 perform the corresponding signal processing based on the internal structures switched in step S225.

More specifically, in the DVD recorder 203, the R-IC 212 performs noise removing processing on the image data input from the outside of the DVD recorder 203, and outputs the image data to the HDD recorder 204.

In the HDD recorder 204, the image data from the R-IC 212 of the DVD recorder 203 is supplied to the R-IC 222. The R-IC 222 performs spatial-resolution creation processing on the image data from the R-IC 212 and supplies it to the recorder 223. The recorder 223 performs MPEG-coding on the image data from the R-IC 222 and records it on the HD 224. That is, the image data subjected to noise removing processing performed by the R-IC 212 and to the spatial-resolution creation processing performed by the R-IC 222 is recorded on the HD 224.

Accordingly, the R-IC 212 serves as a noise-removing processing device, and the R-IC 222 serves as a device for performing spatial-resolution creation processing.

Figure 21:
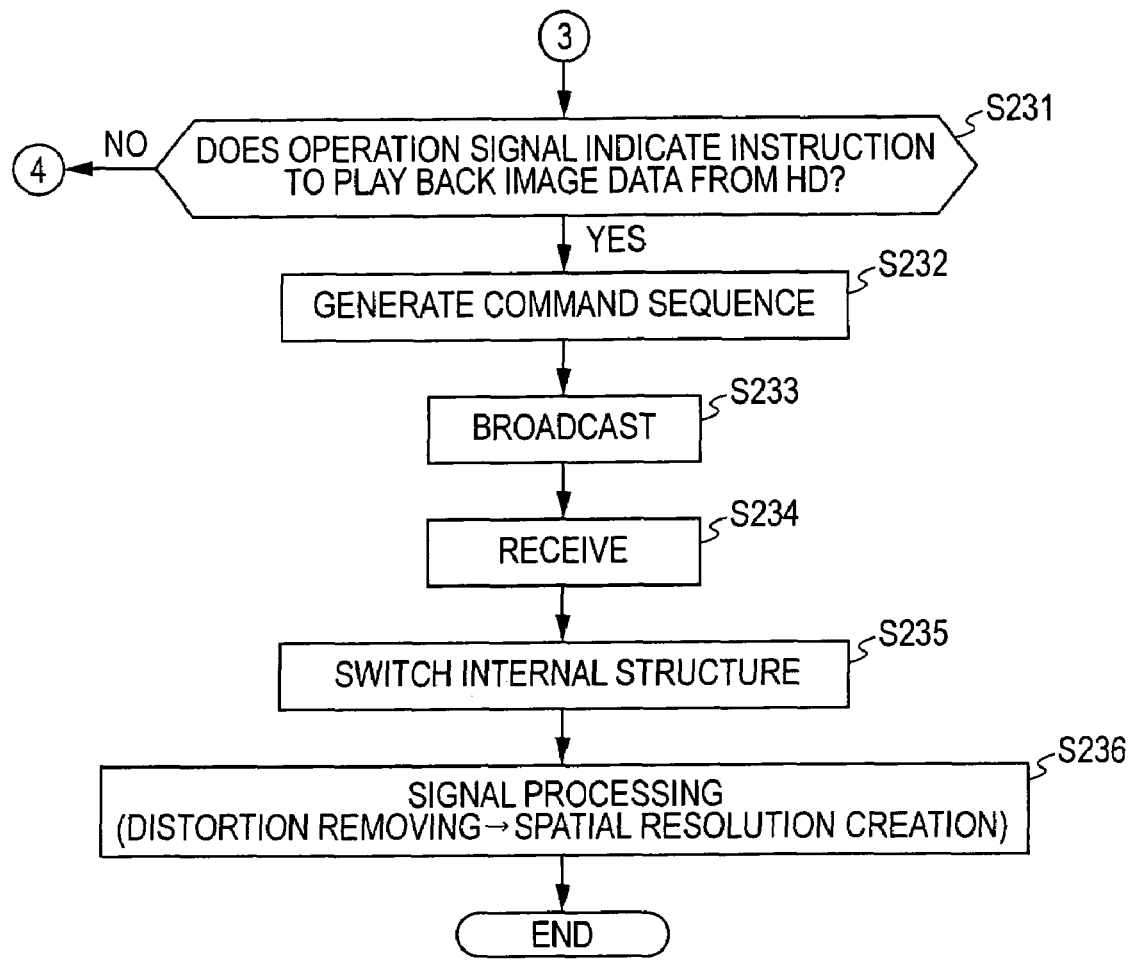
FIG. 21 is a flowchart illustrating the operation of a main body of the AV system shown in FIG. 14.

If the controller 202B determines in step S221 that the operation signal does not indicate an instruction to record the external image data on the HD 224, the process proceeds to step S231 of FIG. 21 to determine whether the operation signal indicates an instruction to play back image data recorded on the HD 224.

If it is determined in step S231 that the operation signal indicates an instruction to play back the image data recorded on the HD 224, the process proceeds to step S232. In step S232, the controller 202B generates a command sequence according to the operation signal.

Figure 22:
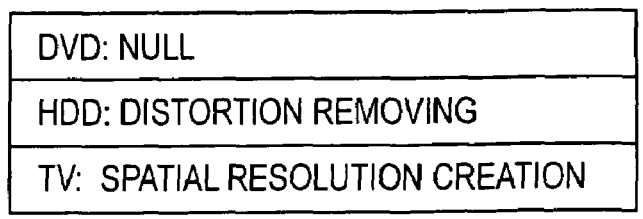
FIG. 22 illustrates an example of commands.

FIG. 22 illustrates an example of the command sequence generated by the controller 202B in step S232 of FIG. 21.

The command sequence shown in FIG. 21 consists of one null command, one distortion-removing processing command, and one spatial-resolution creation processing command.

The null command at the head of the command sequence shown in FIG. 22 instructs the R-IC 212 of the DVD recorder 203 not to perform any signal processing. The second distortion-removing processing command instructs the R-IC 222 of the HDD recorder 204 to perform distortion removing processing as the signal processing. The third spatial-resolution creation processing command instructs the R-IC 232 of the television receiver 205 to perform spatial-resolution creation processing as the signal processing.

Referring back to FIG. 21, in step S232, the controller 202B generates a command sequence and then supplies it to the transceiver 202A. In step S233, the transceiver 202A transmits (broadcasts) the command sequence from the controller 202B.

In step S234, the receiver 211 of the DVD recorder 203, the receiver 221 of the HDD recorder 204, and the receiver 231 of the television receiver 205 receive the command sequence transmitted by the transceiver 202A in step S233. The receivers 211, 221, 231 then supply the received command sequence to the R-ICs 212, 222, 232, respectively.

In step S235, the R-ICs 212, 222, and 232 switch their internal structures according to the commands sent to the R-ICs 212, 222, and 232 of the command sequence supplied from the receivers 211, 221, 231, respectively.

More specifically, in step S235, the R-IC 212 of the DVD recorder 203 switches the internal structure not to perform signal processing according to the null command at the head of the command sequence shown in FIG. 22. The R-IC 212 of the HDD recorder 204 switches the internal structure to perform distortion removing processing according to the second distortion-removing processing command of the command sequence. The R-IC 231 of the television receiver 205 switches the internal structure to perform spatial-resolution creation processing according to the third spatial-resolution creation processing command of the command sequence.

In step S236, the R-ICs 212, 222, and 232 perform the corresponding signal processing based on the internal structures switched in step S235.

More specifically, in step S236, in the HDD recorder 204, the player 225 reads the image data from the HD 224, performs MPEG-decoding on the image data, and supplies it to the R-IC 222. The R-IC 222 performs distortion removing processing on the image data supplied from the player 224, i.e., the image data with block distortions caused by MPEG-coding/decoding, and then outputs it to the television receiver 205.

In the television receiver 205, the image data from the R-IC 222 of the HDD recorder 204 is supplied to the R-IC 232. The R-IC 232 then performs spatial-resolution creation processing on the image data from the R-IC 222 and supplies it to the display 233.

Accordingly, the R-IC 222 serves as a device for performing distortion removing processing, and the R-IC 232 serves as a device for performing spatial-resolution creation processing.

As described above, the R-IC 222 performs distortion removing processing on the image data played back from the HD 224, and the R-IC 232 performs spatial-resolution creation processing on the image data processed in the R-IC 222. Accordingly, an image without (reduced) block distortions and with high spatial resolution can be displayed on the display 233.

Figure 23:
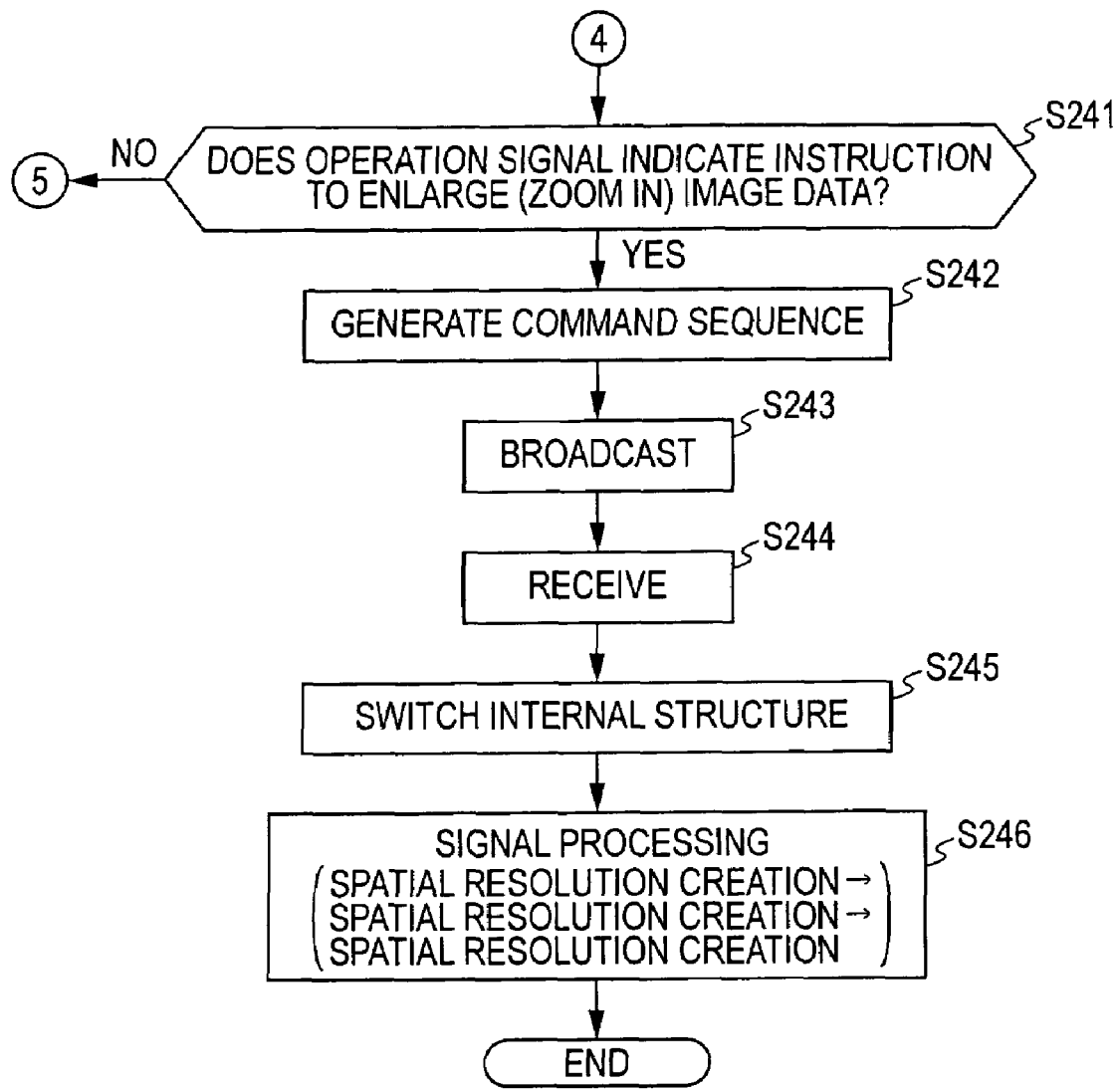
FIG. 23 is a flowchart illustrating the operation of a main body of the AV system shown in FIG. 14.

If the controller 202B determines in step S231 that the operation signal does not indicate an instruction to play back the image data recorded on the HD 224, the process proceeds to step S241 of FIG. 23 to determine whether the operation signal indicates an instruction to enlarge (zoom in) external image data.

If it is determined in step S241 that the operation signal indicates an instruction to enlarge the external image data, the process proceeds to step S242. In step S242, the controller 202B generates a command sequence according to the operation signal.

Figure 24:
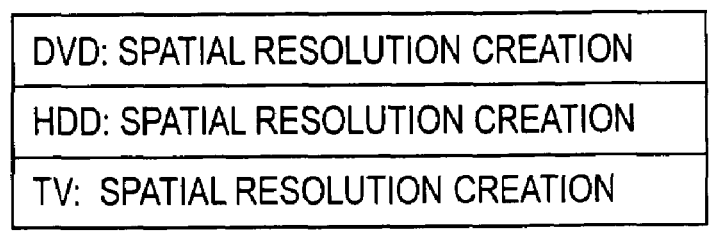
FIG. 24 illustrates an example of commands.

FIG. 24 illustrates an example of the command sequence generated by the controller 202B in step S242.

The command sequence shown in FIG. 24 consists of three spatial-resolution creation processing commands.

The first, second, and third spatial-resolution creation processing commands of the command sequence shown in FIG. 24 instruct the R-IC 212 of the DVD recorder 203, the R-IC 222 of the HDD recorder 204, and the R-IC 232 of the television receiver 205, respectively, to perform spatial-resolution creation processing as the signal processing.

Referring back to FIG. 23, in step S242, the controller 202B generates a command sequence and then supplies it to the transceiver 202A. In step S243, the transceiver 202A transmits (broadcasts) the command sequence from the controller 202B.

In step S244, the receiver 211 of the DVD recorder 203, the receiver 221 of the HDD recorder 204, and the receiver 231 of the television receiver 205 receive the command sequence transmitted by the transceiver 202A in step S243. The receivers 211, 221, 231 then supply the received command sequence to the R-ICs 212, 222, 232, respectively.

In step S245, the R-ICs 212, 222, and 232 switch their internal structures according to the commands sent to the R-ICs 212, 222, and 232 of the command sequence supplied from the receivers 211, 221, 231, respectively.

More specifically, in step S245, the R-IC 212 of the DVD recorder 203 switches the internal structure to perform spatial-resolution creation processing according to the spatial-resolution creation processing command at the head of the command sequence shown in FIG. 24. The R-IC 222 of the HDD recorder 204 and the R-IC 232 of the television receiver 205 also switch their internal structures to perform spatial-resolution creation processing according to the second and third spatial-resolution creation processing commands of the command sequence.

In step S246, the R-ICs 212, 222, and 232 perform the corresponding signal processing based on the internal structures switched in step S245.

More specifically, in step S246, in the DVD recorder 203, the R-IC 212 performs spatial-resolution creation processing on the image data input from the outside of the DVD recorder 203, and outputs it to the HDD recorder 204.

In the HDD recorder 204, the image data from the R-IC 212 of the DVD recorder 203 is supplied to the R-IC 222. The R-IC 222 then performs spatial-resolution creation processing on the image data from the R-IC 212, and outputs it to the television receiver 205.

In the television receiver 205, the image data from the R-IC 222 of the HDD recorder 204 is supplied to the R-IC 232. The R-IC 232 then performs spatial-resolution creation processing on the image data from the R-IC 222 and supplies it to the display 233.

Accordingly, the R-ICs 212, 222, and 232 each serve as a device for performing spatial-resolution creation processing.

If the image conversion processing as the spatial-resolution creation processing performed in the R-ICs 212, 222, and 232 is processing for converting the first image data to the second image data having a number of pixels larger than those of the first image data, i.e., if the spatial-resolution creation processing performed in the R-ICs 212, 222, and 232 is resealing processing, it can be considered that the following processing is performed in the R-ICs 212, 222, and 232. The R-IC 212 performs spatial-resolution creation processing, which is also resealing processing, on the external image data, the R-IC 222 then performs spatial-resolution creation processing, which is also resealing processing, on the image data processed in the R-IC 212, and the R-IC 232 then performs spatial-resolution creation processing, which is also resealing processing, on the image data processed in the R-IC 222.

As a result, an image enlarged from the original external image can be displayed on the display 233.

Figure 25:
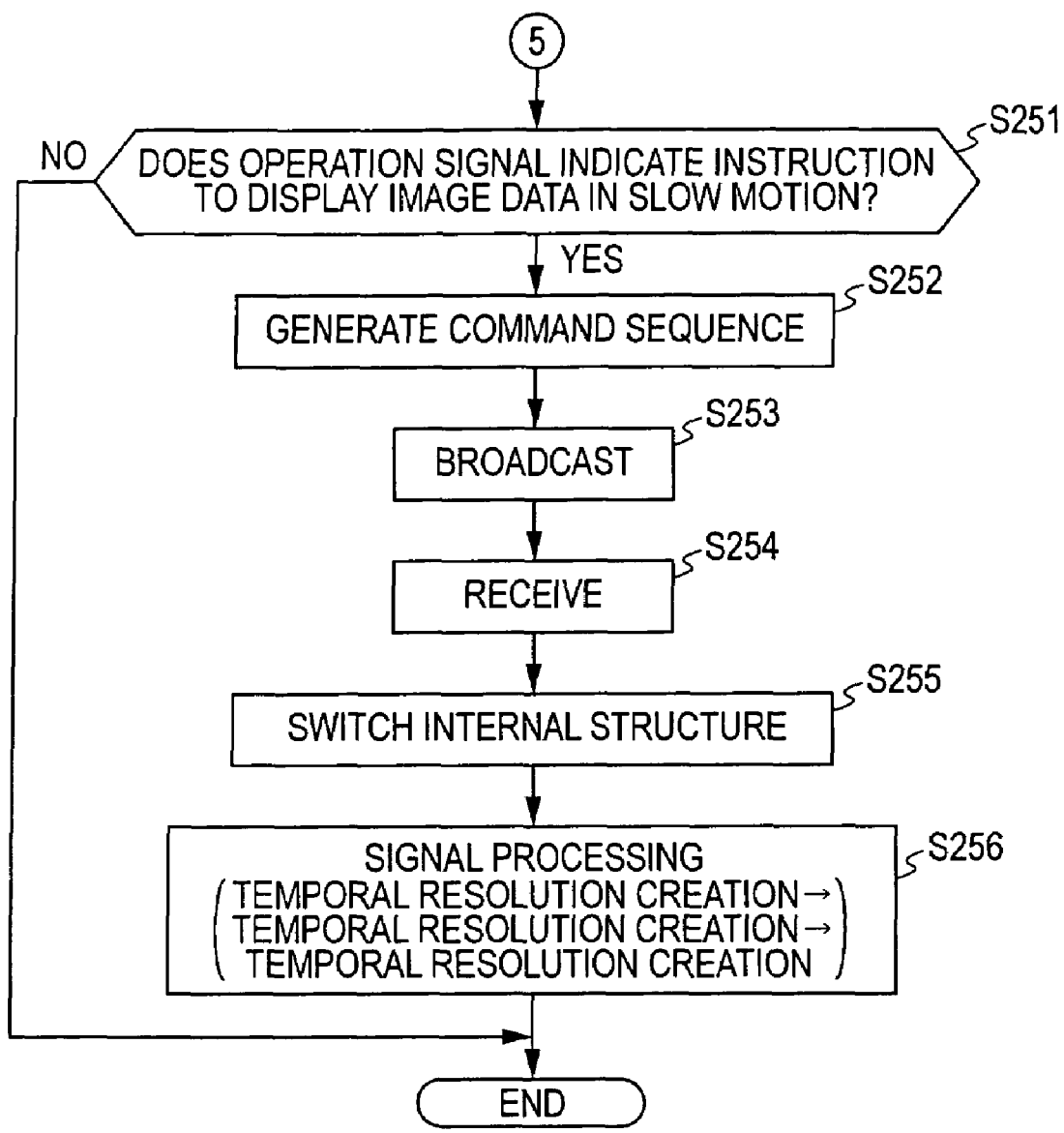
FIG. 25 is a flowchart illustrating the operation of a main body of the AV system shown in FIG. 14.

If the controller 202B determines in step S241 that the operation signal does not indicate an instruction to enlarge the external image data, the process proceeds to step S251 of FIG. 25 to determine whether the operation signal indicates an instruction to display external image data in slow motion.

If it is determined in step S251 that the operation signal indicates an instruction to indicate the external image data in slow motion, the process proceeds to step S252. In step S252, the controller 202B generates a command sequence according to the operation signal.

Figure 26:
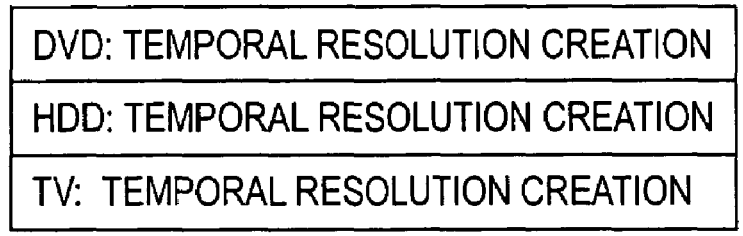
FIG. 26 illustrates an example of commands.

FIG. 26 illustrates an example of the command sequence generated by the controller 202B in step S252 of FIG. 25.

The command sequence shown in FIG. 26 consists of three temporal-resolution creation processing commands.

The first, second, and third temporal-resolution creation processing commands of the command sequence shown in FIG. 26 instruct the R-IC 212 of the DVD recorder 203, the R-IC 222 of the HDD recorder 204, and the R-IC 232 of the television recorder 205 to perform temporal-resolution creation processing as the signal processing.

Referring back to FIG. 25, in step S252, the controller 202B generates a command sequence and then supplies it to the transceiver 202A. In step S253, the transceiver 202A transmits (broadcasts) the command sequence from the controller 202B.

In step S254, the receiver 211 of the DVD recorder 203, the receiver 221 of the HDD recorder 204, and the receiver 231 of the television receiver 205 receive the command sequence transmitted by the transceiver 202A in step S253. The receivers 211, 221, 231 then supply the received command sequence to the R-ICs 212, 222, 232, respectively.

In step S255, the R-ICs 212, 222, and 232 switch their internal structures according to the commands sent to the corresponding R-ICs 212, 222, and 232 of the command sequence supplied from the receivers 211, 221, 231, respectively.

More specifically, in step S255, the R-IC 212 of the DVD recorder 203 switches the internal structure to perform temporal-resolution creation processing according to the temporal-resolution creation processing command at the head of the command sequence shown in FIG. 26. Similarly, the R-IC 222 of the HDD recorder 204 and the R-IC 232 of the television receiver 205 also switch their internal structures to perform temporal-resolution creation processing according to the second and third temporal-resolution creation processing commands of the command sequence.

In step S256, the R-ICs 212, 222, and 232 perform the corresponding signal processing based on the internal structures switched in step S255.

More specifically, in step S256, in the DVD recorder 203, the R-IC 212 performs temporal-resolution creation processing on the image data input from the outside of the DVD recorder 203, and outputs it to the HDD recorder 204.

In the HDD recorder 204, the image data from the R-IC 212 of the DVD recorder 203 is supplied to the R-IC 222. The R-IC 222 then performs temporal-resolution creation processing on the image data from the R-IC 212, and outputs it to the television receiver 205.

In the television receiver 205, the image data from the R-IC 222 of the HDD recorder 204 is supplied to the R-IC 232. The R-IC 232 then performs temporal-resolution creation processing on the image data from the R-IC 222 and supplies it to the display 233.

Accordingly, the R-ICs 212, 222, and 232 each serve as a device for performing temporal-resolution creation processing.

If the image conversion processing as the temporal-resolution creation processing performed in the R-ICs 212, 222, and 232 is processing for converting the first image data to the second image data having a number of frames (or fields) larger than that of the first image data, it can be considered that the following processing is performed in the R-ICs 212, 222, and 232. The R-IC 212 performs temporal-resolution creation processing on the external image data to obtain image data having an increased number of frames. Then, the R-IC 222 performs temporal-resolution creation processing on the image data processed in the R-IC 212 to obtain image data having an increased number of frames, and then, the R-IC 232 performs temporal-resolution creation processing on the image data processed in the R-IC 222 to obtain image data having an increased number of frames.

In this manner, the image data having an increased number of frames is supplied to the display 233 and is displayed with the same frame (field) rate as that for displaying the original external image data is displayed. Thus, the image can be displayed on the display 233 in slow motion.

The processes indicated by the flowcharts of FIGS. 15, 17, 19, 21, 23, and 25 are performed by the R-ICs 212, 222, and 232, which is hardware. However, steps S201 through S203 of FIG. 15, steps S211 through S213 of FIG. 17, steps S221 through S223 of FIG. 19, steps S231 through S233 of FIG. 21, steps S241 through S243 of FIG. 23, and steps S251 through S253 of FIG. 25 may be implemented by executing a program on a computer, such as a microcomputer.

Figure 27:
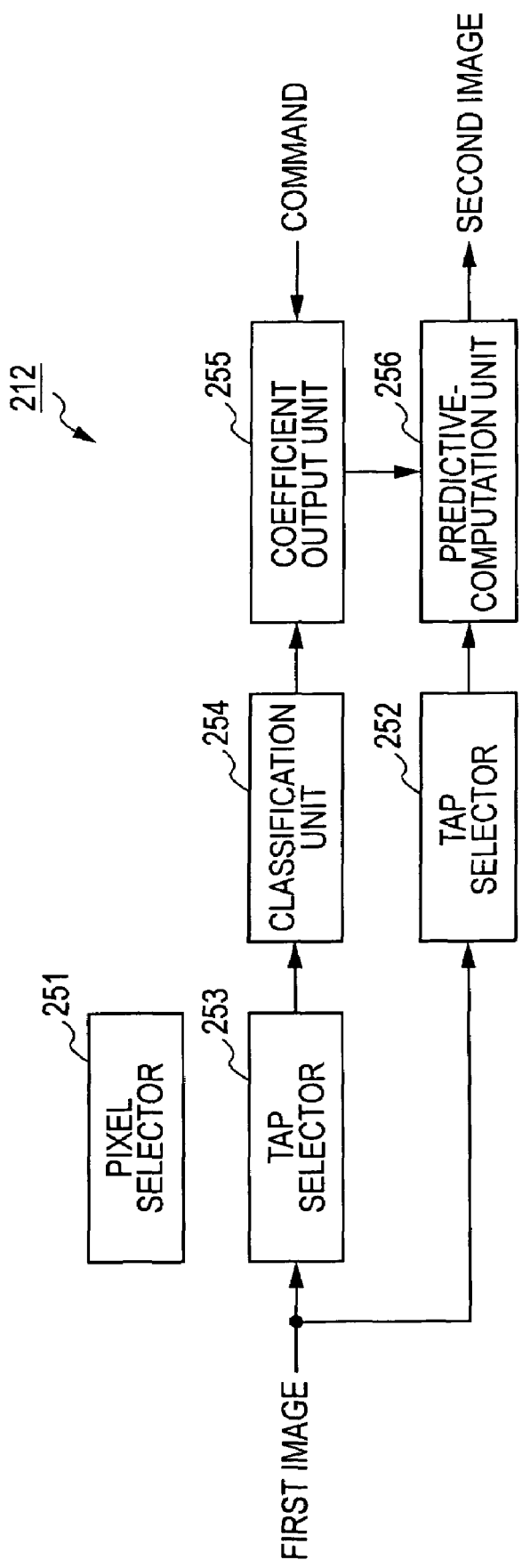
FIG. 27 is a block diagram illustrating an example of the configuration of a reconfigurable integrated circuit (R-IC)

FIG. 27 illustrates an example of the configuration of the R-IC 212 shown in FIG. 14. The R-ICs 222 and 232 are configured similarly to the R-IC 212.

The R-IC 212 switches the internal structure thereof according to a command forming a command sequence supplied from the receiver 211 shown in FIG. 14, and performs various types of signal processing by using the above-described classification adaptive processing.

The R-IC 212 includes a pixel selector 251, tap selectors 252 and 253, a classification unit 254, a coefficient output unit 255, and a predictive-computation unit 256. The pixel selector 251, the tap selectors 252 and 253, the classification unit 254, the coefficient output unit 255, and the predictive-computation unit 256 correspond to the pixel selector 11, the tap selectors 12 and 13, the classification unit 14, the coefficient output unit 15, and the predictive-computation unit 16, respectively, shown in FIG. 1.

Accordingly, the R-IC 212 converts the first image data into the second image data and outputs the second image data.

The command of the command sequence received by the receiver 211 shown in FIG. 14 for the R-IC 212 of the DVD recorder 203 is supplied to the coefficient output unit 255.

FIG. 28 illustrates an example of the configuration of the coefficient output unit 255 shown in FIG. 27.

In FIG. 28, the coefficient output unit 255 includes coefficient memory devices $261_1$, $261_2$, $261_3$, and $261_4$, and a selector 262.

The coefficient memory devices $261_1$, $261_2$, $261_3$, and $261_4$ store therein a noise-removing processing tap coefficient, a distortion-removing processing tap coefficient, a temporal-resolution creation processing tap coefficient, and a spatial-resolution creation processing tap coefficient, respectively, which have been determined by learning.

The class (class code) output from the classification unit 254 shown in FIG. 27 is supplied to the coefficient memory devices $261_1$, $261_2$, $261_3$, and $261_4$. The coefficient memory devices $261_1$, $261_2$, $261_3$, and $261_4$ read the tap coefficients corresponding to the class from the classification unit 254, and output the tap coefficients to the selector 262.

Not only the tap coefficients read from the coefficient memory devices $261_1$, $261_2$, $261_3$, and $261_4$, but also a command of the command sequence received by the receiver 211 shown in FIG. 14 for the R-IC 212, is supplied to the selector 262. The selector 262 selects one of the output terminals of the coefficient memory devices $261_1$, $261_2$, $261_3$, and $261_4$ according to the command supplied from the receiver 211, and connects the selected output terminal to the input terminal of the predictive-computation unit 256 shown in FIG. 27, thereby switching the internal structure of the R-IC 212.

If the selector 262 selects the output terminal of the coefficient memory device $261_1$ and connects the selected output terminal to the input terminal of the predictive-computation unit 256, the noise-removing processing tap coefficient read from the coefficient memory device $261_1$ is supplied to the predictive-computation unit 256. As a result, the R-IC 212 serves as a noise-removing processing device.

Similarly, if the selector 262 selects the output terminal of the coefficient memory device $261_2$, $261_3$, or $261_4$ and connects the selected output terminal to the input terminal of the predictive-computation unit 256, the distortion-removing processing tap coefficient, the temporal-resolution creation processing tap coefficient, or the spatial-resolution creation processing tap coefficient read from the coefficient memory device $261_2$, $261_3$, or $261_4$ is supplied to the predictive-computation unit 256. As a result, the R-IC 212 serves as a distortion-removing processing device, a temporal-resolution creation processing device, or a spatial-resolution creation processing device.

The processing performed by the R-IC 212 shown in FIG. 27 is described below with reference to the flowchart of FIG. 29.

When a command for the R-IC 212 is supplied to the R-IC 212 from the receiver 211 shown in FIG. 14, in step S261, the R-IC 212 switches the internal structure according to the command.

More specifically, in step S261, the command from the receiver 211 is supplied to the coefficient output unit 255. In the coefficient output unit 255, the selector 262 selects the output terminal of the coefficient memory device storing the tap coefficient corresponding to the command from the receiver 211, and connects the selected output terminal to the input terminal of the predictive-computation unit 256, thereby switching the internal structure of the R-IC 212.

Then, steps S262 through S267 similar to steps S11 through 16, respectively, in FIG. 2 are performed.

More specifically, in step S262, the pixel selector 251 selects one of the unselected pixels forming the second image data corresponding to the first image data input into the R-IC 212.

In step S263, the tap selectors 252 and 253 select predictive taps and class taps, respectively, for the selected pixel from the first image data. The tap selector 252 supplies the predictive taps to the predictive-computation unit 256, while the tap selector 253 supplies the class taps to the classification unit 254.

Upon receiving the class taps from the tap selector 253, in step S264, the classification unit 254 classifies the selected pixel based on the class taps. The classification unit 254 then outputs the resulting class of the selected pixel to the coefficient output unit 255.

In step S265, the coefficient output unit 255 outputs the tap coefficient of the class supplied from the classification unit 254. That is, the coefficient output unit 255 reads the tap coefficient of the class supplied from the classification unit 254 from the output terminal of the coefficient memory device selected by the selector 262, and outputs the tap coefficient to the predictive-computation unit 256. The predictive-computation unit 256 obtains the tap coefficient output from the coefficient output unit 255.

In step S266, the predictive-computation unit 256 performs predictive computation expressed by equation (1) by using the predictive taps output from the tap selector 252 and the tap coefficient obtained by the coefficient output unit 255, thereby determining and outputting the pixel value of the selected pixel.

In step S267, the pixel selector 251 determines whether there are unselected pixels of the second image data. If it is determined in step S267 that there is an unselected pixel, the process returns to step S262 and step S262 and the subsequent steps are repeated.

If it is determined in step S267 that there is no unselected pixel forming the second image data, the process is completed.

FIG. 30 illustrates another example of the configuration of the R-IC 212 shown in FIG. 14. In FIG. 30, elements corresponding to those shown in FIG. 27 are designated with like reference numerals, and an explanation thereof is thus omitted. The R-IC 212 shown in FIG. 30 is configured similarly to the R-IC 212 shown in FIG. 27, except that a coefficient output unit 275 is provided instead of the coefficient output unit 255.

The R-ICs 222 and 232 may be configured similarly to the R-IC 212 shown in FIG. 30.

As in the R-IC 212 shown in FIG. 27, the R-IC 212 shown in FIG. 30 also switches the internal structure according to the command supplied from the receiver 211, and performs various types of signal processing by using the above-described classification adaptive processing. That is, the R-IC 212 shown in FIG. 30 also converts the image data supplied to the R-IC 212 into the second image data and outputs it.

The command from the receiver 211 is supplied to the coefficient output unit 275. A parameter z supplied from the outside of the R-IC 212 is also supplied to the coefficient output unit 275.

The parameter z can be input by operating the operation unit 201A of the remote controller 201 shown in FIG. 14 by a user.

More specifically, the user can operate the remote controller 201 to instruct the main body 200 to record or play back image data on or from the DVD 214 or the HD 224, or to display images on the display 233 in an enlarged manner or in slow motion. Then, in response to the instruction, the R-IC 212 performs noise removing processing, distortion removing processing, temporal-resolution creation processing, or spatial-resolution creation processing on the first image data input into the R-IC 212, and outputs the resulting second image data.

In the R-IC 212 shown in FIG. 27, the tap coefficients stored in the coefficient output unit 255 are fixed. Accordingly, the amount of noise to be removed by the noise removing processing (the level of the S/N ratio), the amount of distortions to be removed by the distortion removing processing, or the amount of high frequency components to be increased by the temporal-resolution creation processing or the spatial-resolution creation processing are fixed. Generally, however, the level of such processing varies depending on the user.

As discussed above, images can be displayed slow motion by temporal-resolution creation processing, and images can be enlarged by spatial-resolution creation processing. In this case, the user may wish to specify the display rate (frame rate) when displaying images in slow motion or the enlargement ratio when enlarging images.

In the example shown in FIG. 30, the user can operate the remote controller 201 to given an instruction to record or play back image data on or from the DVD 214 or the HD 224 or to display images on the display 233 in an enlarged manner or in slow motion. The user can also specify the amount of noise to be removed, the amount of distortions to be removed, the amount of high frequency components to be increased by temporal-resolution creation processing or spatial-resolution creation processing, the display rate when displaying images in slow motion, or the enlargement ratio when enlarging images.

When the user operates the operation unit 201A of the remote controller 201 to specify the above-described amount or the rate (ratio), the transmitter 201B transmits the parameter z corresponding to the specified value. The parameter z is received by the receiver 211, 221, or 231 via the control unit 202, and is supplied to the R-IC 212, 222, or 232.

In the R-IC 212 shown in FIG. 30, the parameter z from the receiver 211 is supplied to the coefficient output unit 275.

FIG. 31 illustrates an example of the configuration of the coefficient output unit 275 shown in FIG. 30.

The coefficient output unit 275 includes a coefficient generator 281, a coefficient source output device 282, a parameter memory 283, and a coefficient memory 284. The coefficient generator 281, the coefficient source output device 282, the parameter memory 283, and the coefficient memory 284 correspond to the coefficient generator 61, the coefficient source memory 62, the parameter memory 63, and the coefficient memory 64, respectively, forming the coefficient output unit 55 shown in FIG. 8.

In the coefficient output unit 275 shown in FIG. 31, the parameter z from the receiver 211 is supplied to and stored in the parameter memory 283. The command of the command sequence received by the receiver 211 for the R-IC 212 is supplied to the coefficient source output device 282. The class output from the classification unit 254 shown in FIG. 30 is supplied to the coefficient memory 284.

The coefficient source output device 282 includes coefficient source memory devices $291_1$, $291_2$, $291_3$, and $291_4$, and a selector 292.

The coefficient source memory devices $291_1$, $291_2$, $291_3$, and $291_4$ store therein noise-removing processing coefficient source data, distortion-removing processing coefficient source data, temporal-resolution processing coefficient source data, and spatial-resolution processing coefficient source data, which have been determined by learning.

The coefficient source memory devices $291_1$, $291_2$, $291_3$, and $291_4$ read the stored coefficient source data for each class and output them to the selector 292.

Not only the coefficient source data read from the coefficient source memory devices $291_1$, $291_2$, $2913$, and $291_4$, but also the command of the command sequence received by the receiver 211 for the R-IC 212, is supplied to the selector 292. The selector 292 then selects the output terminal of the coefficient source memory device $291_1$, $291_2$, $291_3$, or $291_4$ according to the command supplied from the receiver 211, and connects the selected output terminal to the input terminal of the coefficient generator 281, thereby switching the internal structure of the R-IC 212.

If the selector 292 selects the output terminal of the coefficient memory device $291_1$ and connects the selected output terminal to the input terminal of the coefficient generator 281, the noise-removing processing coefficient source data read from the coefficient source memory device $291_1$ is supplied to the coefficient generator 281.

Similarly, if the selector 292 selects the output terminal of the coefficient source memory device $291_2$, $291_3$, or $291_4$ and connects the selected output terminal to the input terminal of the coefficient generator 281, the distortion-removing processing coefficient source data, the temporal-resolution creation processing coefficient source data, or the spatial-resolution creation processing coefficient source data read from the coefficient source memory device $291_2$, $291_3$, or $291_4$, respectively, is supplied to the coefficient generator 281.

The coefficient generator 281 computes equation (9) based on the coefficient source data supplied from the coefficient source output device 282 and the parameter z stored in the parameter memory 283 so as to generate a tap coefficient corresponding to the parameter z for each class, and supplies the tap coefficient to the coefficient memory 284. The tap coefficient is stored in the coefficient memory 284 by overwriting the previous tap coefficient.

Upon receiving the class from the classification unit 254 shown in FIG. 30, the coefficient memory 284 reads the tap coefficient corresponding to the parameter z for the received class, and outputs the tap coefficient to the predictive-computation unit 256 shown in FIG. 30.

The R-IC 212 shown in FIG. 30 performs processing similar to the processing performed by the R-IC 212 shown in FIG. 27, except that the coefficient output unit 275, which is disposed instead of the coefficient output unit 255 storing fixed tap coefficients, generates and outputs the tap coefficient corresponding to the parameter z.

Accordingly, if, in the coefficient output unit 275, the selector 292 selects the output terminal of the coefficient source memory device $291_1$ so that the noise-removing processing coefficient source data read from the coefficient source memory device $291_1$ is supplied to the coefficient generator 281, the coefficient generator 281 generates the noise-removing processing tap coefficient corresponding to the parameter z stored in the parameter memory 283 from the coefficient source data and the parameter z, and stores the tap coefficient in the coefficient memory 284. In this case, the noise-removing processing tap coefficient is supplied to the predictive-computation unit 256 from the coefficient output unit 275. As a result, the R-IC 212 serves as a noise-removing processing device.

Similarly if the selector 292 selects the output terminal of the coefficient source memory device $291_2$, $291_3$, or $291_4$ so that the distortion-removing processing coefficient source data, the temporal-resolution creation processing coefficient source data, or the spatial-resolution creation processing coefficient source data read from the coefficient source memory device $291_2$, $291_3$, or $291_4$, respectively, is supplied to the coefficient generator 281, the coefficient generator 281 generates the distortion-removing processing tap coefficient, the temporal-resolution creation processing tap coefficient, or the spatial-resolution creation processing tap coefficient corresponding to the parameter z stored in the parameter memory 283 from the coefficient source data and the parameter z, and stores the tap coefficient in the coefficient memory 284. Accordingly, if the selector 292 selects the output terminal of the coefficient source memory device $291_2$, $291_3$, or $291_4$, the distortion-removing processing tap coefficient, the temporal-resolution creation processing tap coefficient, or the spatial-resolution creation processing tap coefficient is supplied to the predictive-computation unit 256 from the coefficient output unit 275. As a result, the R-IC 212 serves as a distortion-removing processing device, a temporal-resolution creation processing device, or a spatial-resolution creation processing device.

In the R-IC 212 shown in FIG. 30, the tap coefficient corresponding to the parameter z is stored in the coefficient memory 284 of the coefficient output unit 275. Accordingly, by operating the remote controller 201, the user can specify the amount of noise to be removed in the noise removing processing, the amount of distortions to be removed by the distortion removing processing, or the amount of high frequency components to be increased in the temporal-resolution creation processing or the spatial-resolution creation processing. The user can also specify the display rate when displaying images in slow motion or the enlargement ratio when enlarging images.

As described above, the R-ICs 212, 222, and 232 switch their internal structures according to at least one command forming a command sequence, and then, perform signal processing on image data supplied to the R-ICs 212, 222, and 232, and output the resulting image data. Thus, a plurality of functions can be easily implemented by using a single unit of hardware.

Additionally, the R-IC 222 performs signal processing on the image data processed in the R-IC 212, and the R-IC 232 performs signal processing on the image data processed in the R-IC 222. Accordingly, more functions can be implemented in the overall R-ICs 211, 222, and 232.

In the AV system shown in FIG. 14, three R-ICs, such as those 212, 222, and 232, are disposed. However, one or two R-ICs, or four or more R-ICs may be disposed.

A second embodiment of the present invention is described below.

FIG. 32 illustrates an example of the configuration of a television receiver 301 constructed in accordance with the second embodiment of the present invention.

An antenna 302 is connected to the television receiver 301. The antenna 302 receives a transmission signal indicating a television broadcast program as broadcast waves (radio waves) transmitted from a broadcasting station (not shown), and supplies the transmission signal to the television receiver 301. Upon receiving the transmission signal from the antenna 302, the television receiver 301 selects the television broadcast program of a predetermined channel contained in the transmission signal according to an operation signal from a remote controller (remote commander) 303. The television receiver 301 then displays images and also outputs sound contained in the television broadcast program.

More specifically, the television receiver 301 includes a tuner 311, and supplies the transmission signal from the antenna 302 to the tuner 311. The tuner 311 receives the transmission signal from the antenna 302 and obtains the image data and audio data contained in the television broadcast program of a predetermined channel from the received transmission signal by selecting the channel under the control of a system controller 318.

The tuner 311 then supplies sound of the selected channel to an amplifying circuit 312 and also supplies a red (R) signal, a green (G) signal, and a blue (B) signal of the image data to signal processors 314, 315, and 316, respectively.

The amplifying circuit 312 amplifies sound from the tuner 311 and supplies it to a speaker 313.

The signal processors 314, 315, and 316 perform signal processing on the R, G, and B signals from the tuner 311 under the control of the system controller 318, and supply those signals to a display 317 so that the corresponding image can be displayed on the display 317.

The system controller 318 supplies control signals to the tuner 311 and the signal processors 314, 315, and 316 according to an operation signal supplied from a remote controller receiver 319, thereby controlling the tuner 311 and the signal processors 314, 315, and 316.

The remote controller receiver 319 receives the operation signal, for example, an infrared signal or another type of radio signal, transmitted from the remote controller 303 by the operation on the remote controller 303 by a user, and supplies the operation signal to the system controller 318.

The broadcast received by the television receiver 301 is not particularly restricted, and the television receiver 301 can receive satellite broadcasting, terrestrial broadcasting, analog broadcasting, digital broadcasting, and other broadcasting.

A description of the sound is not given below unless it is necessary.

The control operation performed by the system controller 318 on the tuner 311 and the signal processors 314, 315, and 316 is discussed below.

The same processing is performed in the signal processors 314, 315, and 316, except that the types of signals, i.e., the R signal, G signal, and B signal, to be processed in the signal processors 314, 315, and 316, are different. Accordingly, a description is given of only the signal processor 314.

It is now assumed that an image output from the tuner 311 is a progressive image (non-interlace image). However, the image output from the tuner 311 may be an interlace image, in which case, instead of a "frame", a "frame" is used in the second embodiment.

The system controller 318 controls the switching of the operation mode of the television receiver 301 between the multi-screen mode and the normal-screen mode according to the operation signal supplied to the remote controller receiver 319 from the remote controller 303. That is, the system controller 318 switches the operation mode of the television receiver 301 to the multi-screen mode or the normal-screen mode based on the operation performed by the user, and controls the tuner 311 and the signal processors 314, 315, and 316 to perform the processing in accordance with the switched operation mode.

The tuner 311 and the signal processors 314, 315, and 316 perform the multi-screen mode processing or the normal-screen mode processing under the control of the system controller 318.

The image data supplied (input) to the signal processor 314 from the tuner 311 is referred to as "input image data", and the image data obtained as a result of signal processing performed by the signal processor 314 is referred to as "output image data". The multi-screen mode is a mode in which the same frames of input image data of a plurality of channels are processed into multi-screen output image data and the resulting image data is then displayed in a multi-screen on the display 317. The normal-screen mode is a mode in which input image data of one channel is processed into output image data and is then displayed on the display 317.

Since, in the multi-screen mode, a plurality of channels of images are displayed in a multi-screen, the user can easily select the channel of a desired program by checking the images in the multi-screen.

In the multi-screen mode, a cursor for specifying a desired channel of the image from a plurality of channels of images displayed in the multi-screen can be displayed, and can be moved according to the operation performed on the remote controller 303 by the user. In this case, sound of the channel specified by the cursor can be output from the speaker 313.

FIGS. 33A and 33B illustrate the control operation performed by the system controller 318 on the tuner 311 shown in FIG. 32. In FIGS. 33A and 33B, the vertical axis represents the vertical direction of the image, while the horizontal direction designates the lapse of time.

In the normal-screen mode, the system controller 318 controls the tuner 311 to select the channel corresponding to the operation performed on the remote controller 303 by the user.

Accordingly, if the user currently selects the channel CH1 by operating the remote controller 303, the tuner 311 continues selecting the channel CH1 from the transmission signal output from the antenna 302, and supplies the image data of the channel CH1 in a frame cycle $T_1$, as shown in FIG. 33A.

In contrast, in the multi-screen mode, the system controller 318 controls the tuner 311 to sequentially switch the selected channel in a certain frame cycle.

Accordingly, if the number of channels to be changed is four channels, i.e., channels CH1, CH2, CH3, and CH4, the tuner 311 selects, as shown in FIG. 33B, the channel CH1 in the first frame, then selects the channel CH2 in the second frame, and sequentially selects the channels CH3 and CH4 in the third and fourth frames, respectively. Then, the tuner 311 re-selects the channel CH1, and thereafter, sequentially re-selects the channels CH2, CH3, and CH4. As a result, the image of the channel CH1 is supplied to the signal processor 314 from the tuner 311 in a cycle four times as long as the frame cycle $T_1$. That is, the image of the channel CH1 is output from the tuner 311 while dropping three frames in the frame cycle ($T_1 \times 4$). The same applies to the images of the channels CH2, CH3, and CH4.

The number of channels to be changed in the multi-screen mode is not restricted to four. If the number of channels to be switched is indicated by N, the cycle in which the image of one channel is supplied to the signal processor 314 from the tuner 311 is the cycle N times as long as the frame cycle $T_1$.

In the multi-screen mode, all channels that can be received by the television receiver 301 can be switched, or a plurality of channels selected by the user can be switched. If the number of channels that can be switched, i.e., the number of channels of images displayed in one frame in the multi-screen mode, exceeds a predetermined threshold, the displayed images can be scrolled.

For simple description, the channels that can be switched by the tuner 311 in the multi-screen mode are fixed to be the above-described channels CH1 through CH4.

FIG. 34A illustrates the image of the channel CH1 obtained by the tuner 311 and displayed in the normal-screen mode. FIG. 34B illustrates the images of the four channels CH1 through CH4 obtained by the tuner 311 and displayed in the multi-screen mode, i.e., in a multi-screen having the same number of sub-screens as the number of channels.

In this example, in the multi-screen mode, one frame is equally divided into 2×2—(four) sub-screens in which the images of the four channels CH1 through CH4 are displayed. That is, the images of the four channels CH1 through CH4 are displayed in the top left, top right, bottom left, and bottom right sub-screens of the multi-screen.

In the normal-screen mode, the image of the channel CH1 is obtained in the tuner 311 in the frame cycle $T_1$, as shown in FIG. 33A. Accordingly, the image of the channel CH1 is simply displayed, as shown in FIG. 34A, in the frame cycle $T_1$.

In the multi-screen mode, in the tuner 311, the images of the four channels CH1 through CH4 are obtained, as shown in FIG. 33B, in the cycle $4T_1$, which is four times as long as the frame cycle $T_1$. Accordingly, when the images of the four channels CH1 through Ch4 obtained in the tuner 311 are displayed in a four-division multi-screen, the image of the channel CH1 is displayed, as shown in FIG. 34B, in the top-left sub-screen of the multi-screen in the first frame, and the image of the channel CH2 is displayed in the top-right sub-screen in the second frame. Then, the image of the channel CH3 is displayed in the bottom-left sub-screen in the third frame, and the image of the channel CH4 is displayed in the bottom-right sub-screen in the fourth frame. Subsequently, the image of the channel CH1 is re-displayed on the top-left sub-screen in the fifth frame. Thereafter, similarly, the images of the channels CH1 through CH4 in the cycle $4T_1$ are displayed in the corresponding sub-screens of the multi-screen.

In the multi-screen mode, after a certain channel is selected by the tuner 311, if the sub-screen for the same channel is frozen until the same channel is subsequently selected, the motion of the images of the four channels CH1 through CH4 displayed in the multi-screen becomes discontinuous (not smooth) since the four channels CH1 through CH4 are selected in the cycle $4T_1$ in a time division manner.

In the television receiver 301 shown in FIG. 32, the signal processor 314 can generate output images so that they can be displayed with smooth motion in a multi-screen.

FIG. 35 illustrates an example of the configuration of the signal processor 314 shown in FIG. 32.

The signal processor 314 includes a command sequence generator 330, signal processing chips 331 and 332, a memory 333, and a signal processing chip 334.

Each of those elements is formed into, for example, one chip IC, or the entire signal processor 314 may be formed as one chip IC. Alternatively, two or more of the command sequence generator 330, the signal processing chips 331 and 332, the memory 333, and the signal processing chip 334 may be formed into one chip IC.

A control signal from the system controller 318 shown in FIG. 32 is supplied to the command sequence generator 330. In response to the control signal from the system controller 318, the command sequence generator 330 generates a command sequence consisting of a plurality of commands, and transmits the command sequence to the signal processing chips 331 and 332, the memory 333, and the signal processing chip 334 by using, for example, wireless means.

Input image data output from the tuner 311 shown in FIG. 32 is supplied to the signal processing chip 331. Motion vectors, which are the signal processing result of the signal processing chip 334, are supplied to the signal processing chip 331.

The signal processing chip 331 receives the command sequence transmitted from the signal sequence generator 330, and switches the reconfigurable internal configuration according to the command for the signal processing chip 331, as in the R-IC 212 of the first embodiment. The signal processing chip 331 also performs signal processing on the input image data from the tuner 311 as the first image data used in the classification adaptive processing, and outputs the resulting image data to the signal processing chip 332 as the second image data used in the classification adaptive processing.

The signal processing chip 331 performs signal processing on the input image data from the tuner 311 by using the motion vectors supplied from the signal processing chip 334.

By switching the internal configuration, the signal processing chip 331 performs, as the signal processing, for example, spatial-resolution creation processing for improving the spatial resolution of the image or resealing processing for resealing the image to generate a reduced image (hereinafter sometimes referred to as "reduced-image generating processing").

Not only the image data as the signal processing result of the signal processing chip 331, but also the motion vectors as the signal processing result of the signal processing chip 334, are supplied to the signal processing chip 332.

Upon receiving the command sequence from the command sequence generator 330, the signal processing chip 332 switches the reconfigurable internal structure in a manner similar to the R-IC 212 of the first embodiment. The signal processing chip 332 also performs signal processing on the image data output from the signal processing chip 331, i.e., the first image data in the classification adaptive processing, and outputs the resulting image data to the memory 333 as the second image data in the classification adaptive processing.

As in the signal processing chip 331, the signal processing chip 332 performs signal processing on the image data from the signal processing chip 331 by using the motion vectors supplied from the signal processing chip 334.

By switching the internal configuration, the signal processing chip 332 performs, as the signal processing, for example, noise removing processing for removing noise contained in the image or temporal-resolution creation processing for improving the temporal resolution of the image.

The memory 333 receives the command sequence from the command sequence generator 330, and writes the image data output from the signal processing chip 332 in a built-in memory (not shown) according to the command forming the command sequence. The memory 333 also reads the image data stored in the memory 333 and supplies it to the display 317 shown in FIG. 32 as the output image data.

As in the signal processing chip 331, the input image data output from the tuner 311 is supplied to the signal processing chip 334.

The signal processing chip 334 receives the command sequence from the command sequence generator 330 and switches the reconfigurable internal structure according to the command forming the command sequence, as in the R-IC 212 of the first embodiment. The signal processing chip 334 also performs signal processing on the input image data from the tuner 311 so as to detect motion vectors and supplies them to the signal processing chips 331 and 332.

By switching the internal structure, the signal processing chip 334 performs, as the signal processing, for example, motion vector processing for detecting motion vectors for a normal screen or motion vectors for a multi-screen.

An example of the command sequence generated by the command sequence generator 330 shown in FIG. 35 is discussed below with reference to FIG. 36.

The system controller 318 supplies a control signal indicating an instruction to perform normal-screen mode processing or multi-screen mode processing to the command sequence generator 330.

When the control signal from the system controller 318 indicates an instruction to perform the normal-screen mode processing, the command sequence generator 330 generates a command sequence shown in FIG. 36A (hereinafter sometimes referred to as a "normal-screen mode command sequence"). When the control signal indicates an instruction to perform the multi-screen mode processing, the command sequence generator 330 generates a command sequence shown in FIG. 36B (hereinafter sometimes referred to as a "multi-screen mode command sequence").

The normal-screen mode command sequence shown in FIG. 36A consists of a normal-screen motion-vector detecting command, a spatial-resolution creation processing command, a noise removing command, and a normal-screen memory control command from the top. The multi-screen mode command sequence shown in FIG. 36B consists of a multi-screen motion-vector detecting command, a reduced-image generating command, a temporal-resolution creation command, and a multi-screen memory control command from the top.

The normal-screen motion-vector detecting command gives an instruction to execute the motion-vector detecting processing for detecting motion vectors for the normal screen from the image. The spatial-resolution creation processing command and the noise removing command give instructions to execute spatial-resolution creation processing and noise removing processing, respectively, in the above-described classification adaptive processing.

The normal-screen memory control command gives an instruction to write and read image data for one channel into and from the memory 333 so that the image data can be displayed on the overall screen of the display 317.

The multi-screen motion-vector detecting command gives an instruction to execute motion-vector detecting processing for detecting motion vectors for the multi-screen from the image. The reduced-image generating command and the temporal-resolution creation command give instructions to perform reduced-image generating processing as resealing processing and temporal-resolution creation processing, respectively, in the above-described classification adaptive processing.

The multi-screen memory control command gives an instruction to write and read image data for a plurality of channels into and from the memory 333 so that the image data for the plurality of channels can be displayed on the overall screen of the display 317.

In each of the command sequences shown in FIGS. 36A and 36B, at least one command is simply disposed. However, an IC to execute processing corresponding to each command, that is, in the example shown in FIG. 35, IC information for specifying one of the signal processing chips 331 and 332, the memory 333, and the signal processing chip 334, may be added to each command. In this case, each of the signal processing chips 331 and 332, the memory 333, and the signal processing chip 334 executes processing in accordance with the command provided with the corresponding IC information among the commands forming the command sequence received from the command sequence generator 330.

In the second embodiment, the command sequence is simply formed of at least one command, as shown in FIG. 36A or 36B. In this case, the signal processing chips 331 and 332, the memory 333, and the signal processing chip 334 each execute processing corresponding to the commands that can be performed by the signal processing chips 331 and 332, the memory 333, and the signal processing chip 334, respectively.

If the normal-screen mode command sequence shown in FIG. 36A is sent from the command sequence generator 330 shown in FIG. 35, the signal processing chips 331 and 332, the memory 333, and the signal processing chip 334 each receive the normal-screen mode command sequence, and execute processing corresponding to the commands that can be performed by the signal processing chips 331 and 332, the memory 333, and the signal processing chip 334, respectively.

In this case, for example, the signal processing chip 334 switches the internal configuration thereof to detect motion vectors for the normal screen as the signal processing according to the normal-screen motion-vector detecting command.

The signal processing chip 334 then detects the normal-screen motion vectors from image data for one channel, for example, from the image data of the channel CH1, supplied from the tuner 311 in the normal-screen mode, and supplies the detected motion vectors to the signal processing chips 331 and 332.

The signal processing chip 331 switches the internal configuration thereof to perform spatial-resolution creation processing as the signal processing according to the spatial-resolution creation processing command in the normal-screen mode command sequence shown in FIG. 36A.

The signal processing chip 331 then performs the spatial-resolution creation processing on the image data of the channel CH1 supplied from the tuner 311 by using the motion vectors supplied from the signal processing chip 334, and outputs the resulting image data to the signal processing chip 332.

FIGS. 37A and 37B illustrate image data to be input and output into and from the signal processing chip 331 that performs spatial-resolution creation processing. In FIGS. 37A and 37B, the i-th frame is represented by $t_i$.

The command sequence generator 330 shown in FIG. 35 sends the normal-screen mode command sequence shown in FIG. 36A when the normal-screen mode is selected as the operation mode. In the normal-screen mode, the tuner 311 selects a predetermined channel, for example, the channel CH1, so that the frames $t_i$ of the input image data of the channel CH1 are sequentially input into the signal processing chip 331 in the frame cycle $T_1$, as shown in FIG. 37A.

The signal processing chip 331 then performs spatial-resolution creation processing on the received frames $t_i$ of the input image data of the channel CH1 so as to sequentially output the frames $t_i$ with improved spatial resolution in the frame cycle $T_1$, as shown in FIG. 37B.

The frames $t_i$ with improved spatial resolution are sequentially supplied to the signal processing chip 332.

The signal processing chip 332 switches the internal structure thereof to perform noise removing processing according to the noise removing command of the normal-screen mode command sequence shown in FIG. 36A.

The signal processing chip 332 then performs the noise removing processing on the image data of the channel CH1 supplied from the signal processing chip 331 by using the motion vectors supplied from the signal processing chip 334, and outputs the resulting image data to the memory 333.

FIGS. 38A and 38B illustrate image data to be input and output into and from the signal processing chip 332 that performs noise removing processing. In FIGS. 38A and 38B, the i-th frame is represented by $t_i$.

The frames $t_i$ of the image data of the channel CH1 with improved spatial resolution are sequentially input, as shown in FIG. 38A, into the signal processing chip 332 from the signal processing chip 331 in the frame cycle $T_1$.

The signal processing chip 332 then performs noise removing processing on the received frames $t_i$, and sequentially outputs the frames $t_i$ with an improved S/N ratio in the frame cycle $T_1$, as shown in FIG. 38B.

The frames $t_i$ with an improved S/N ratio are sequentially supplied to the memory 333.

The memory 333 temporarily stores the frames $t_i$ of the image data output from the signal processing chip 332 in a built-in memory according to the normal-screen memory control command of the normal-screen mode command sequence shown in FIG. 36A. The memory 333 then reads the frames $t_i$ and supplies them to the display 317 shown in FIG. 32 as the output image data.

Thus, when the normal-screen mode command sequence shown in FIG. 36A is sent from the command sequence generator 330, an image having spatial resolution and an S/N ratio higher than the image data of the channel CH1 received by the tuner 311 is displayed on the display 317.

When the multi-screen mode command sequence shown in FIG. 36B is sent from the command sequence generator 330, the signal processing chips 331 and 332, the memory 333, and the signal processing chip 334 receive the multi-screen mode command sequence, and executes the processing that can be performed by the signal processing chips 331 and 332, the memory 333, and the signal processing chip 334, respectively.

In this case, the signal processing chip 334 switches the internal configuration thereof to detect motion vectors for the multi-screen mode as the signal processing according to the multi-screen motion-vector detecting command of the multi-screen mode command sequence.

The signal processing chip 334 then detects the motion vectors for the multi-screen mode from the image data of a plurality of channels, e.g., the channels CH1 through CH4, supplied from the tuner 311 in a time division manner, and supplies the motion vectors to the signal processing chips 331 and 332.

The signal processing chip 331 switches the internal structure thereof to perform reduced-image generating processing (resealing processing for reducing the size) as the signal processing according to the reduced-image generating command of the multi-screen mode command sequence shown in FIG. 36B.

The signal processing chip 331 then performs the reduced-image generating processing on the image data of the channels CH1 through CH4 supplied from the tuner 311 in a time division manner by using the motion vectors supplied from the signal processing chip 334, and outputs the resulting reduced image data of the channels CH1 through CH4 to the signal processing chip 332.

FIGS. 39A and 39B illustrate image data to be input and output into and from the signal processing chip 331 that performs the reduced-image generating processing. In FIGS. 39A and 39B, the i-th frame is represented by $t_i$.

The command sequence generator 330 sends the multi-screen mode command sequence shown in FIG. 36B when the multi-screen mode is selected as the operation mode. In the multi-screen mode, the tuner 311 selects the channels CH1 through CH4 in a time division manner so that the frames $t_i$ of the image data of the channels CH1 through CH4 are input into the signal processing chip 331 in a time division manner, as shown in FIG. 39A.

That is, in the multi-screen mode, the tuner 311 supplies the image data of one of the four channels CH1 through CH4 with three frames dropped to the signal processor 314 in the cycle $4T_1$. Accordingly, while the image data of each of the four channels CH1 through CH4 is supplied to the signal processing chip 331 of the signal processor 314, three frames are dropped in the cycle $4T_1$.

The frames dropped, i.e., frames that are not received by the tuner 311, are hereafter referred to as "missing frames". In contrast, frames received by the tuner 311 are referred to as "existing frames".

The signal processing chip 331 performs reduced-image generating processing on the frames $t_i$ of the image data of the channels CH1 through CH4, and outputs the resulting reduced image data, as shown in FIG. 39B.

Although the reduced image data is output from the signal processing chip 331 in the frame cycle $T_1$, the reduced image data of one channel of the channels CH1 through CH4 is output in the cycle $4T_1$. That is, missing frames are present in the reduced image data of each of the four channels CH1 through CH4. In a certain channel of the reduced image data, three missing frames are present between adjacent existing frames.

The reduced image data of the channels CH1 through CH4 are supplied to the signal processing chip 332 from the signal processing chip 331.

The signal processing chip 332 switches the internal configuration thereof to perform temporal-resolution creation processing as the signal processing according to the temporal-resolution creation command of the multi-screen mode command sequence shown in FIG. 36B.

The signal processing chip 332 then performs temporal-resolution creation processing on the reduced image data of the channels CH1 through CH4 supplied from the signal processing chip 331 by using the motion vectors supplied from the signal processing chip 334, and outputs the resulting image data to the memory 333.

FIGS. 40A and 40B illustrate image data to be input and output into and from the signal processing chip 332 that performs temporal-resolution creation processing. In FIGS. 40A and 40B, the i-th frame of the channel CH#k is represented by CH#k($t_i$).

In the multi-screen mode, the tuner 311 selects the channels CH1 through CH4 in a time division manner so that the frames of the reduced image data of the channels CH1 through CH4 are sequentially input, as shown in FIG. 40A, into the signal processing chip 332 from the signal processing chip 331 in the cycle $4T_1$.

More specifically, in FIG. 40A, the first frame CH1($t_1$) of the channel CH1 is input into the signal processing chip 332 at the timing of the frame $t_1$, the second frame CH2($t_2$) of the channel CH2 is input into the signal processing chip 332 at the timing of the frame $t_2$, the third frame CH3($t_3$) of the channel CH3 is input into the signal processing chip 332 at the timing of the frame $t_3$, the fourth frame CH4($t_4$) of the channel CH4 is input into the signal processing chip 332 at the timing of the frame $t_4$, and the fifth frame CH1($t_5$) of the channel CH1 is input into the signal processing chip 332 at the timing of the frame $t_5$. Thereafter, similarly, the frames of the channels CH1 through CH4 are sequentially input into the signal processing chip 332 in the cycle $4T_1$.

The signal processing chip 332 then performs temporal-resolution creation processing on the reduced image data of the channels CH1 through CH4 with missing frames so as to generate reduced image data of the channels CH1 through CH4 without missing frames.

That is, in the signal processing chip 332, as shown in FIG. 40B, the reduced image data of the channel CH1 with frames $CH1(t_2)$, $CH1(t_3)$, $CH1(t_4)$, $CH1(t_6)$, and so on is generated, and the reduced image data of the channel CH2 with frames $CH2(t_1)$, $CH2(t_3)$, $CH2(t_4)$, $CH2(t_5)$, and so on is generated. The reduced image data of the channel CH3 with frames $CH3(t_1)$, $CH3(t_2)$, $CH3(t_4)$, $CH3(t_5)$, and so on is generated, and the reduced image data of the channel CH4 with frames $CH4(t_1)$, $CH4(t_2)$, $CH4(t_3)$, $CH4(t_5)$, and so on is generated.

In this manner, the signal processing chip 332 generates and outputs the reduced image data of each of the four channels CH1 through CH4 with frames in the frame cycle $T_1$.

The frames $t_i$ of the reduced image data of the channels CH1 through CH4 without missing frames are sequentially supplied to the memory 333.

The memory 333 writes the reduced image data of the channels CH1 through CH4 in a built-in memory according to the multi-screen memory control command of the multi-screen mode command sequence shown in FIG. 36B, and reads the reduced image data from the built-in memory so as to combine the same frames of the reduced image data of the channels CH1 through CH4. Then, the reduced image data of the channels CH1 through CH4 to be displayed in a multi-screen is generated and output to the display 317.

That is, the memory 333 writes the same frames of the reduced image data of the channels CH1 through CH4 from the signal processing chip 332 into the storage areas of the memory 333 corresponding to the top left, top right, bottom left, and bottom right sub-screens of the multi-screen according to the multi-screen memory control command, thereby generating (storing) the frames of the output image data, as indicated by the bottom portion of FIG. 40B.

The memory 333 then reads the frames of the output image data according to the multi-screen memory control command and supplies them to the display 317.

Accordingly, when the multi-screen mode command sequence shown in FIG. 36B is sent from the command sequence generator 330, the images of the channels CH1 through CH4 without missing frames can be displayed with smooth motion in a multi-screen.

The processing performed by the signal processor 314 shown in FIG. 35 is described below with reference to the flowchart of FIG. 41.

When a control signal is transmitted from the system controller 318 shown in FIG. 32 to the signal processor 314 (and signal processors 315 and 316), in step S301, the command sequence generator 330 of the signal processor 314 receives the control signal.

In step S302, the command sequence generator 330 generates a command sequence consisting of at least one command in response to the control signal received from the system controller 318, and wirelessly transmits the generated command sequence.

In step S303, the blocks forming the signal processor 314, i.e., the signal processing chips 331 and 332, the memory 333, and the signal processing chip 334, receive the command sequence from the command sequence generator 330. Also in step S303, the signal processing chips 331, 332, and 334 identify the commands that can be executed by the signal processing chips 331, 332, and 334, respectively, from the commands forming the command sequence, and determine the signal processing corresponding to the identified commands. That is, the signal processing chips 331, 332, and 334 switch the internal structures thereof according to the corresponding commands, and perform the corresponding signal processing.

Then, in step S304, the signal processing chip 334 executes the signal processing determined in step S303 on the image data supplied from the tuner 311 shown in FIG. 32, and supplies the signal processing result to the signal processing chips 331 and 332.

In step S305, the signal processing chip 331 executes the signal processing determined in step S303 on the image data supplied from the tuner 311, and supplies the image data to the signal processing chip 332 as the signal processing result.

In step S306, the signal processing chip 332 executes the signal processing determined in step S303 on the image data supplied from the signal processing chip 331, and supplies the image data to the memory 333 as the signal processing result.

The signal processing chips 331 and 332 perform the signal processing by using the signal processing result of the signal processing chip 334.

In step S307, the memory 333 writes in a built-in memory the image data supplied from the signal processing chip 332 according to the command that can be executed by the memory 333 of the command sequence received from the command sequence generator 330 in step S303, and also reads the image data and outputs it to the display 317 shown in FIG. 32. The process is then completed.

Figure 41:
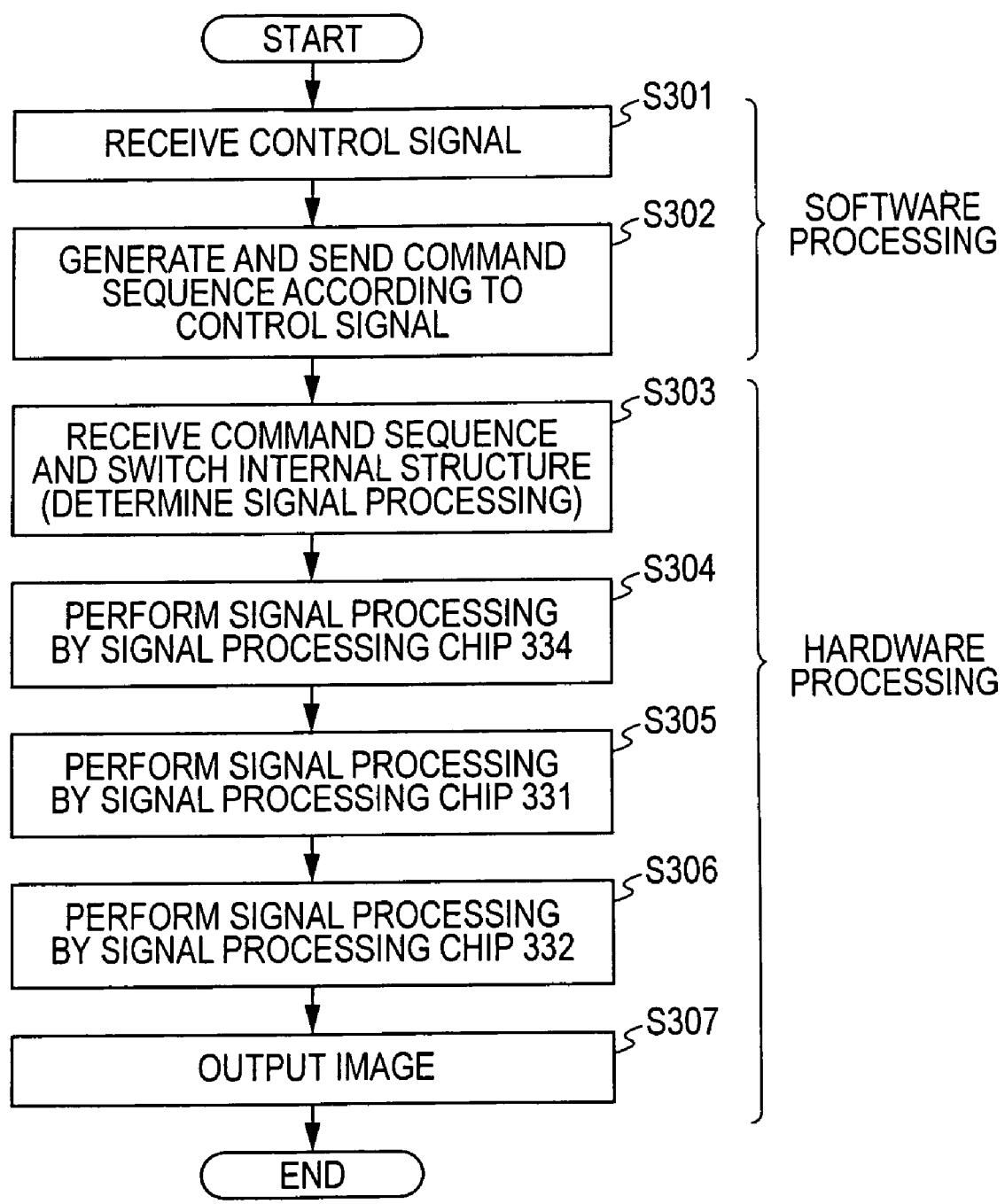
FIG. 41 is a flowchart illustrating processing performed by the signal processor shown in FIG. 35.

Steps S301 through S307 of FIG. 41 are executed by hardware, i.e., the signal processing chips 331 and 332, the memory 333, and the signal processing chip 334. However, steps S301 and S302 may be executed by controlling a computer, such as a microcomputer, to run a program.

Figure 42:
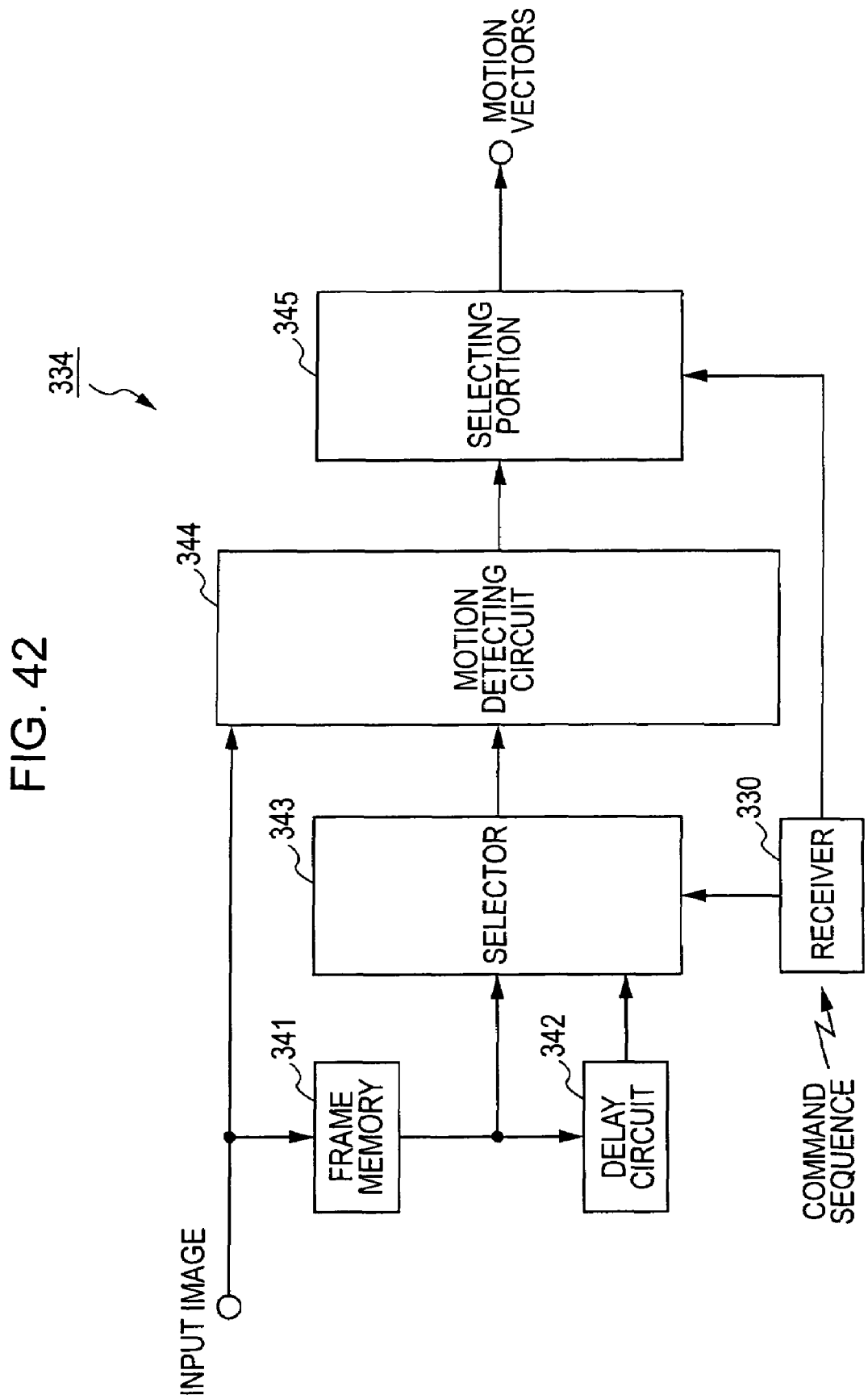
FIG. 42 is a block diagram illustrating an example of the configuration of a signal processing chip of the signal processor shown in FIG. 35.

FIG. 42 is a block diagram illustrating an example of the configuration of the signal processing chip 334 shown in FIG. 35.

Image data output from the tuner 311 is supplied to a frame memory 341 and a motion detecting circuit 344.

A receiver 340 receives the command sequence from the command sequence generator 330. The receiver 340 then identifies the command that can be executed by the signal processing chip 334 from the commands forming the command sequence received from the command sequence generator 330, and supplies the identified command to a selector 343 and a selecting portion 345.

The frame memory 341 delays the input image data for one frame by temporarily storing the image data, and supplies the image data to a delay circuit 342 and the selector 343. Accordingly, when the (n+4)-th frame is supplied to the motion detecting circuit 344, the previous frame, i.e., the (n+3)-th frame, is supplied to the delay circuit 342 and the selector 343 from the frame memory 341.

The delay circuit 342 delays the image data supplied from the frame memory 341 for three frames, and supplies the image data to the selector 343. Accordingly, the input image data supplied to the signal processing chip 334 from the tuner 311 is delayed for a total of four frames in the frame memory 341 and the delay circuit 342 before being supplied to the selector 343. Thus, when the (n+4)-th frame is supplied to the motion detecting circuit 344, the n-th frame, which is four frames before the (n+4)-th frame, is supplied to the selector 343 from the delay circuit 342.

As stated above, the selector 343 receives the (n+3)-th frame from the frame memory 341 and also receives the n-th frame from the delay circuit 342. The selector 343 switches the internal structure of the signal processing chip 334 so that it selects the output from the frame memory 341 or the output from the delay circuit 342 according to the command received from the receiver 340.

Then, the (n+3)-th frame output from the frame memory 341 or the n-th frame output from the delay circuit 342 is supplied to the motion detecting circuit 344 via the selector 343.

The motion detecting circuit 344 detects the motion vector of each pixel of the frame of the input image data supplied via the selector 343 by referring to the image data supplied from the tuner 311, and supplies the detected motion vector to the selecting portion 345.

The selecting portion 345 outputs the motion vectors from the motion detecting circuit 344 as they are, or reduces the size of the motion vectors to one half before outputting them to the signal processing chips 331 and 332 according to the command supplied from the receiver 340.

The processing performed by the signal processing chip 334 shown in FIG. 42 is discussed below with reference to the flowchart of FIG. 43.

In step S311, the receiver 340 of the signal processing chip 334 receives a command sequence from the command sequence generator 330. The receiver 340 identifies the command that can be executed by the signal processing chip 334 from the command sequence, and supplies the command to the selector 343 and the selecting portion 345.

In the second embodiment, the commands that can be executed by the signal processing chip 334 include the normal-screen motion-vector detecting command in the normal-screen mode command sequence shown in FIG. 36A and the multi-screen motion-vector detecting command in the multi-screen mode command sequence shown in FIG. 36B.

Accordingly, when receiving the normal-screen mode command sequence, the receiver 340 supplies the normal-screen motion-vector detecting command to the selector 343 and the selecting portion 345. When receiving the multi-screen mode command sequence, the receiver 340 supplies the multi-screen motion-vector detecting command to the selector 343 and the selecting portion 345.

In step S312, the selector 343 switches the internal structure of the signal processing chip 334 so that one of the output from the frame memory 341 and the output from the delay circuit 342 is supplied to the motion detecting circuit 344 according to the command received from the receiver 340. Also in step S312, the selecting portion 345 switches the internal structure thereof so that the motion vectors supplied from the motion detecting circuit 344 are output as they are or by reducing the size of the motion vectors to one half according to the command received from the receiver 340.

If the command supplied to the selector 343 and the selecting portion 345 from the receiver 340 is the normal-screen motion-vector detecting command, the selector 343 selects the output from the frame memory 341 and switches the internal structure of the signal processing chip 334 to detect the motion vectors for the normal-screen mode. Additionally, the selecting portion 345 switches the internal structure thereof so that the motion vectors supplied from the motion detecting circuit 344 are output as they are.

In contrast, if the command supplied to the selector 343 and the selecting portion 345 from the receiver 340 is the multi-screen motion-vector detecting command, the selector 343 selects the output from the delay circuit 342, and switches the internal structure of the signal processing chip 343 to detect the motion vectors for the multi-screen mode. Additionally, the selecting portion 345 also switches the internal structure thereof to reduce the size of the motion vectors supplied from the motion detecting circuit 344 to one half.

In step S313, the signal processing chip 334 performs signal processing on the image data supplied from the tuner 311, that is, detecting the motion vectors for the normal screen or the motion vectors for the multi-screen, based on the internal structure switched in step S312.

In the normal-screen mode in which the command sequence generator 330 sends the normal-screen mode command sequence shown in FIG. 36A, because of the absence of missing frames in the image data of, for example, the channel CH1, if the designated frame of the image data is the n-th frame, the motion vectors of the n-th frame can be detected by referring to the subsequent (n+1)-th frame.

In the multi-screen mode in which the command sequence generator 330 sends the multi-screen mode command sequence shown in FIG. 36B, because of the presence of three missing frames in the image data of each of the channels CH1 through CH4, if the designated existing frame is the n-th frame, the motion vectors of the n-th frame should be detected by referring to the (n+4)-th frame, which is the subsequent existing frame.

Accordingly, in the normal-screen mode, the signal processing chip 334 detects the motion vectors of the n-th frame by referring to the (n+1)-th frame as the normal-screen mode motion vector detecting processing. In the multi-screen mode, the signal processing chip 334 detects the motion vectors of the n-th existing frame by referring to the (n+4)-th existing frame as the multi-screen mode motion vector detecting processing.

That is, in the normal-screen mode, the image data of, for example, the channel CH1, output from the tuner 311 is supplied to the signal processing chip 334, and more particularly, to the frame memory 341 and the motion vector detecting circuit 344.

The frame memory 341 delays the image data of the channel CH1 for one frame by temporarily storing the image data, and then supplies the image data to the delay circuit 342 and the selector 343. In the normal-screen mode, the selector 343 outputs the image data from the frame memory 341 to the motion detecting circuit 344 according to the normal-screen motion-vector detecting command. Accordingly, the image data of the channel CH1 is supplied to the motion detecting circuit 344 via the selector 343.

As discussed above, when the (n+4)-th frame of the image data of the channel CH1 is supplied to the motion detecting circuit 344, the previous frame, i.e., the (n+3)-th frame of the image data, is supplied to the selector 343 from the frame memory 341. In this example, since the selector 343 supplies the frame of the image data from the frame memory 341 to the motion detecting circuit 344, the (n+3)-th frame and the (n+4)-th frame of the image data of the channel CH1 are supplied to the motion detecting circuit 344. That is, if a certain frame of the image data is a designated frame, the designated frame and the subsequent frame are supplied to the motion detecting circuit 344.

The motion detecting circuit 344 detects the motion vector of each pixel of the designated frame by referring to the frame subsequent to the designated frame, and supplies the motion vector to the selecting portion 345.

In the normal-screen mode, the selecting portion 345 directly outputs the motion vectors supplied from the motion detecting circuit 344 according to the normal-screen motion-vector detecting command.

In contrast, in the multi-screen mode, image data with missing frames of each of the channels CH1 through CH4 output from the tuner 311 is supplied to the signal processing chip 334, and more particularly, to the frame memory 341 and the motion detecting circuit 344.

The frame memory 341 delays the image data with missing frames for one frame by temporarily storing the image data, and then supplies the image data to the delay circuit 342 and the selector 343. The delay circuit 342 delays the image data with missing frames for three frames, and supplies the image data to the selector 343.

In the multi-screen mode, since the selector 343 selects the output from the delay circuit 342 according to the multi-screen motion-vector detecting command, the image data with missing frames from the delay circuit 342 is supplied to the motion detecting circuit 344 via the selector 343.

As discussed above, when the (n+4)-th frame is supplied to the motion detecting circuit 344, the n-th frame, which is the frame four frames before the (n+4)-th frame, is supplied to the selector 343 from the delay circuit 342. In this example, since the selector 343 supplies the n-th frame from the delay circuit 342 to the motion detecting circuit 344, the n-th frame and the (n+4)-th frame are supplied to the motion detecting circuit 344.

As stated above, in the multi-screen mode, the image data with missing frames of the channels CH1 through CH4 is supplied to the signal processing chip 334 from the tuner 311. In each channel, since an existing frame is present in every four frames, the existing frame of a certain channel and the subsequent existing frame are supplied to the motion detecting circuit 344.

The motion detecting circuit 344 detects the motion vector of each pixel of the received existing frame by referring to the subsequent existing frame, and supplies the detected motion vector to the selecting portion 345.

In the multi-screen mode, the selecting portion 345 reduces the size of the motion vectors received from the motion detecting circuit 344 according to the multi-screen motion-vector detecting command, and then outputs the reduced motion vectors.

The reason for reducing the size of the motion vectors to one half in the selecting portion 345 is as follows.

In the multi-screen mode, the command sequence generator 330 sends the multi-screen mode command sequence shown in FIG. 36B. In this case, the signal processing chip 331 performs reduced-image generating processing according to the reduced-image generating command on the image data with missing frames of the channels CH1 through CH4 so as to reduce the size of the image data into the size of the above-described 2×2 sub-screens.

The reduced image data of the channels CH1 through CH4 includes missing frames, as in the image data before being reduced.

The reduced image data with missing frames is supplied to the signal processing chip 332 from the signal processing chip 331. In the multi-screen mode, the signal processing chip 332 performs temporal-resolution creation processing on the reduced image data with missing frames according to the temporal-resolution creation command so as to generate reduced image data without missing frames.

As discussed above, in the multi-screen mode, the signal processing chips 331 and 332 perform signal processing on the reduced image data with the size of the sub-screens, i.e., the image data obtained by reducing the number of pixels to one half in the horizontal direction and in the vertical direction.

The signal processing chip 334 detects motion vectors of the image data, which is not reduced, with missing frames of the channels CH1 through CH4 output from the tuner 311. Theoretically, the size of the motion vectors is twice as that of the reduced image data. Accordingly, in the multi-screen mode, the selecting portion 345 of the signal processing chip 334 reduces the size of the image data and supplies the reduced image data to the signal processing chips 331 and 332.

In step S314, the signal processing chip 334 determines whether there is image data to be subjected to the signal processing. If image data is found, i.e., if the signal processing chip 334 continues to receive image data from the tuner 311, the process returns to step S313 to detect the motion vectors for the normal-screen or for the multi-screen.

If it is determined in step S314 that there is no image data to be subjected to the signal processing, i.e., if image data is not supplied to the signal processing chip 334 from the tuner 311, the process is completed.

Figure 43:
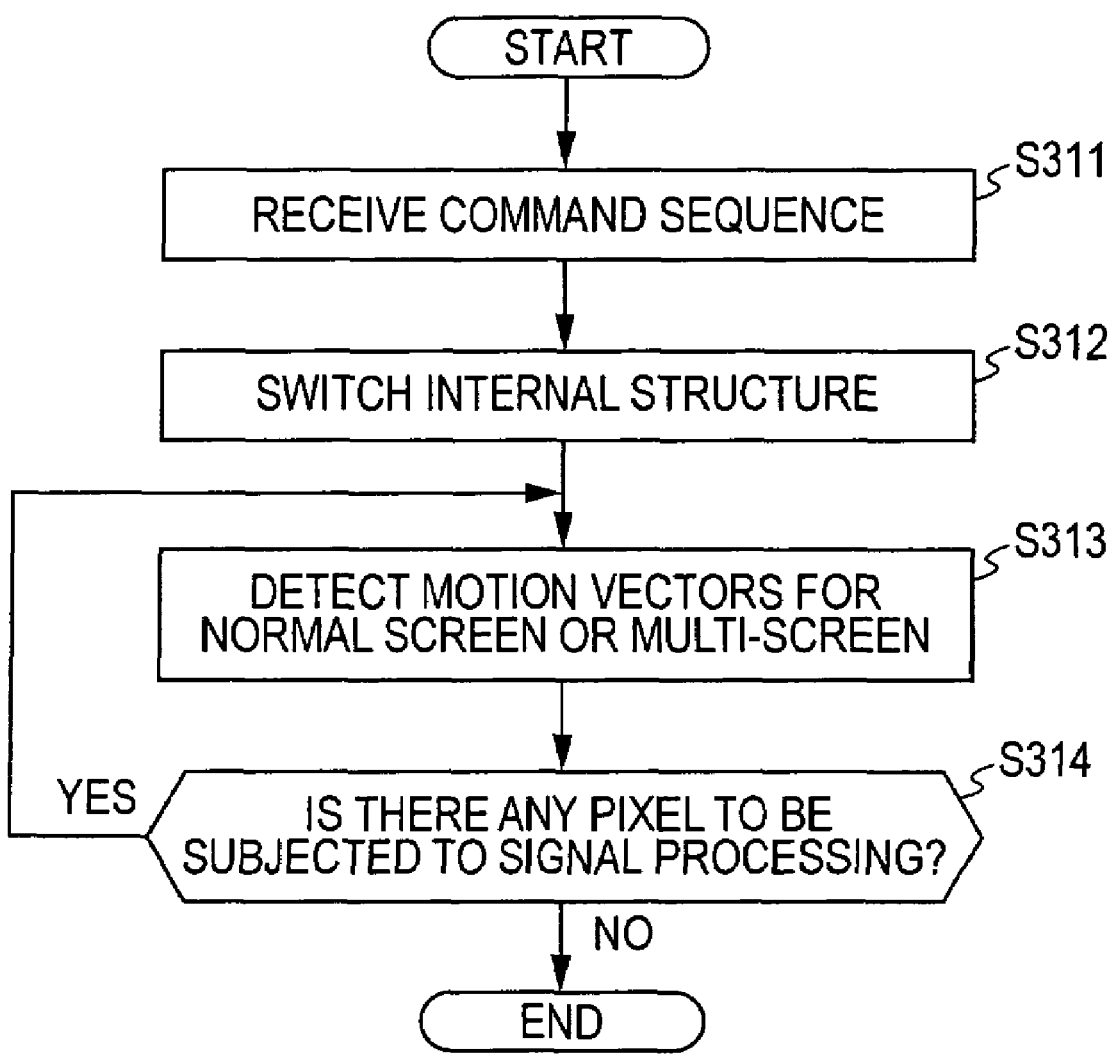
FIG. 43 is a flowchart illustrating processing performed by the signal processing chip shown in FIG. 42.

If a new command sequence is supplied to the signal processing chip 334 from the command sequence generator 330, the process shown in FIG. 43 is suspended, and is restarted from step S311.

As the method for detecting motion vectors in the motion detecting circuit 344, the block matching or gradient method can be employed.

In the above-described example, a motion vector is detected for each pixel. Alternatively, a motion vector may be detected every predetermined number of pixels or for each block consisting of a predetermined number of pixels. In this case, for pixels which are not subjected to the motion detecting processing, the detected motion vector of an adjacent pixel or the detected motion vector in the same block can be used.

Figure 44:
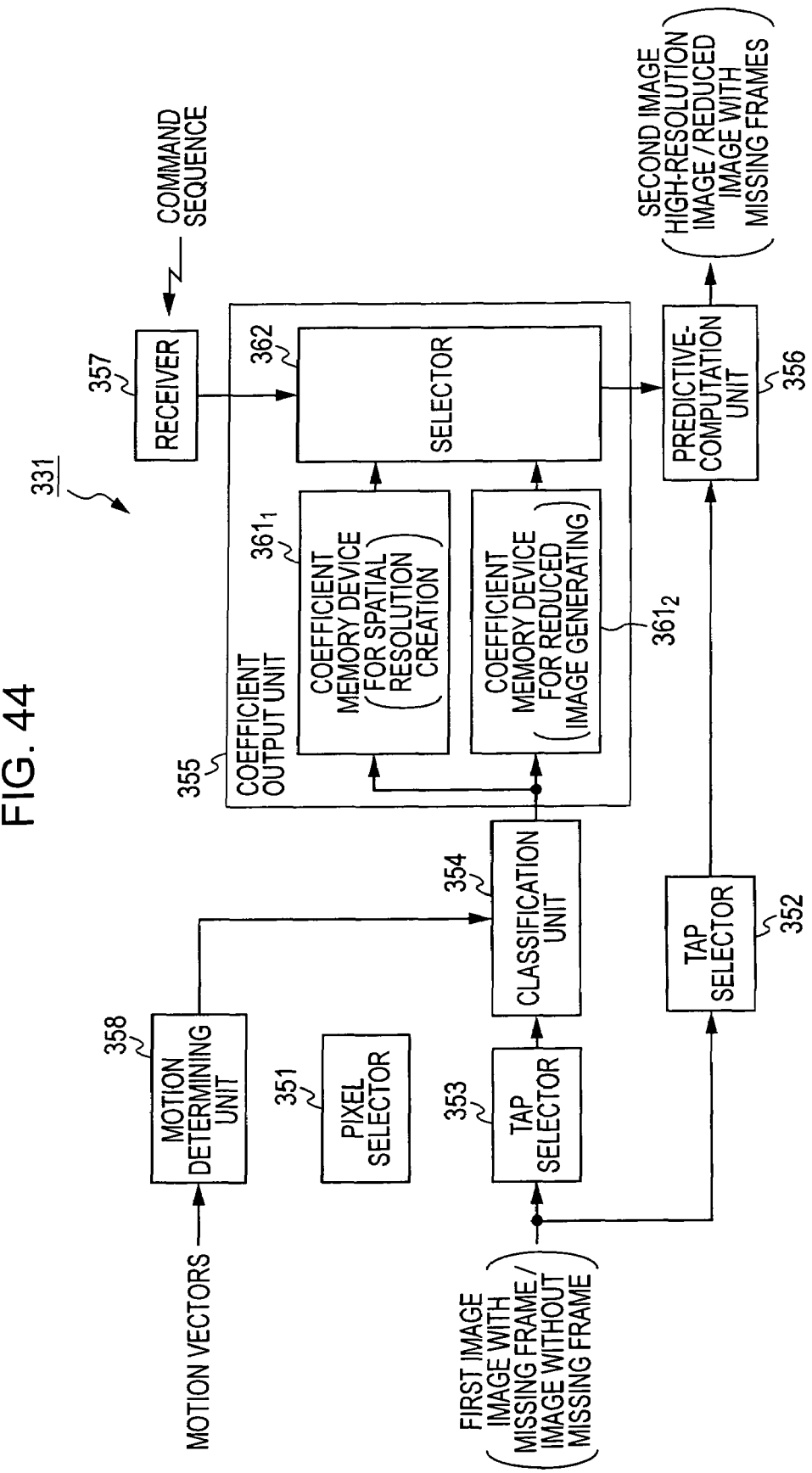
FIG. 44 is a block diagram illustrating an example of the configuration of a signal processing chip of the signal processor shown in FIG. 35.

FIG. 44 illustrates an example of the configuration of the signal processing chip 331 shown in FIG. 35.

The signal processing chip 331 switches the internal configuration thereof according to the commands forming the command sequence supplied from the command sequence generator 330, and performs spatial-resolution creation processing or reduced-image generating processing as resealing processing by using the above-described classification adaptive processing.

The signal processing chip 331 includes a pixel selector 351, tap selectors 352 and 353, a classification unit 354, a coefficient output unit 355, a predictive-computation unit 356, a receiver 357, and a motion determining unit 358. The pixel selector 351, the tap selectors 352 and 353, the classification unit 354, the coefficient output unit 355, and the predictive-computation unit 356 correspond to the pixel selector 11, the tap selectors 12 and 13, the classification unit 14, the coefficient output unit 15, and the predictive-computation unit 16, respectively, shown in FIG. 1.

In the signal processing chip 331, the first image data supplied from the tuner 311 is converted into the second image data by using the classification adaptive processing.

In FIG. 44, the coefficient output unit 355 includes coefficient memory devices $361_1$ and $361_2$ and a selector 362.

The coefficient memory devices $361_1$ and $361_2$ store therein tap coefficients for spatial-resolution creation processing and tap coefficients for reduced-image generating processing, respectively, which have been determined. The tap coefficients for the reduced-image generating processing reduce the size of image data output from the tuner 311 into the size of the 2×2 sub-screens.

The class (class code) output from the classification unit 354 is supplied to the coefficient memory devices $361_1$ and $361_2$. The coefficient memory devices $361_1$ and $361_2$ read the tap coefficients corresponding to the class and output them to the selector 362.

The selector 362 receives, not only the tap coefficients from the coefficient memory devices 361$_1$ and 361$_2$, but also the command sequence from the receiver 357. THE selector 362 selects one of the output terminals of the coefficient memory devices 361$_1$ and 361$_2$ according to the command sequence from the receiver 357 and connects the selected output terminal to the input terminal of the predictive-computation unit 356, thereby switching the internal structure of the signal processing chip 331.

If the selector 362 selects the output terminal of the coefficient memory device 361$_1$ and connects the selected output terminal to the input terminal of the predictive-computation unit 356, the tap coefficient for spatial-resolution creation processing read from the coefficient memory device 361$_1$ is supplied to the predictive-computation unit 356. As a result, the signal processing chip 331 serves as an IC for performing spatial-resolution creation processing.

If the selector 362 selects the output terminal of the coefficient memory device 361$_2$ and connects the selected output terminal to the input terminal of the predictive-computation unit 356, the tap coefficient for reduced-image generating processing read from the coefficient memory device 361$_2$ is supplied to the predictive-computation unit 356. As a result, the signal processing chip 331 serves as an IC for performing reduced-image generating processing.

In FIG. 44, the classification unit 354 receives, not only class taps from the tap selector 353, but also motion determining information, which is discussed below, from the motion determining unit 358. The classification unit 354 adds a bit indicating the motion determining information to the uppermost bit or the lowermost bit of the class code obtained by classifying the selected pixel based on the class taps, and supplies the resulting bit string to the coefficient output unit 355 as the final class code.

In FIG. 44, the receiver 357 receives the command sequence wirelessly transmitted from the command sequence generator 330, and then identifies the command for the signal processing that can be executed by the signal processing chip 331 so as to supply the command to the selector 362.

That is, upon receiving the normal-screen mode command sequence shown in FIG. 36A, the receiver 357 identifies the spatial-resolution creation processing command as the command that can be executed by the signal processing chip 331, and supplies this command to the selector 362. In this case, the selector 362 selects the output terminal of the coefficient memory device 361$_1$ and connects the output terminal to the input terminal of the predictive-computation unit 356.

Upon receiving the multi-screen mode command sequence shown in FIG. 36B, the receiver 357 identifies the reduced-image generating command as the command that can be executed by the signal processing chip 331, and supplies this command to the selector 362. In this case, the selector 362 selects the output terminal of the coefficient memory device 361$_2$ and connects the output terminal to the input terminal of the predictive-computation unit 356.

In FIG. 44, the motion vectors of the individual pixels forming the first image data received from the tuner 311 are supplied to the motion determining unit 358 from the signal processing chip 334. The motion determining unit 358 determines the magnitude or the direction of the motion vector of a pixel of the first image data corresponding to the selected pixel (for example, the pixel of the first image data located closest to the spatio-temporal position of the selected pixel in the same frame), and supplies one bit or several bits indicating the magnitude or the direction of the motion vector to the classification unit 354 as the motion determining information.

Figure 45:
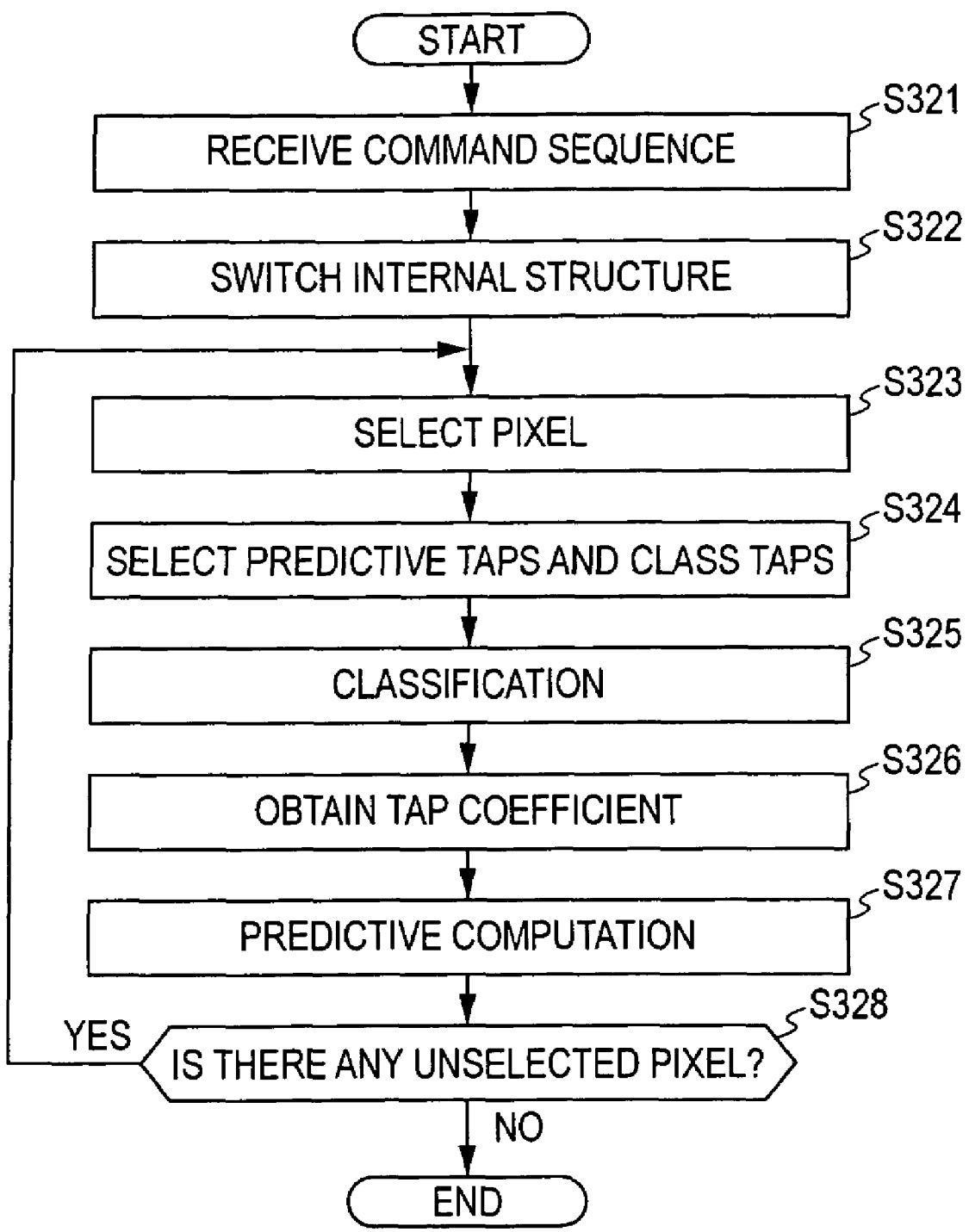
FIG. 45 is a flowchart illustrating processing performed by the signal processing chip shown in FIG. 44.

The processing performed by the signal processing chip 331 shown in FIG. 44 is described below with reference to the flowchart of FIG. 45.

In step S321, the receiver 357 receives a command sequence from the command sequence generator 330. The receiver 357 then identifies the command for the signal processing that can be executed by the signal processing chip 331, and supplies the command to the selector 362.

In step S322, the selector 362 switches the internal structure of the signal processing chip 331 according to the command from the receiver 357.

That is, the selector 362 selects one of the output terminals of the coefficient memory devices 361$_1$ and 361$_2$ and connects the selected output terminal to the input terminal of the predictive-computation unit 356, thereby switching the internal structure of the signal processing chip 331.

Then, steps S323 through S328 are executed similarly to steps S11 through S16, respectively, of FIG. 2.

More specifically, in step S323, the pixel selector 351 selects one of the unselected pixels forming the second image data corresponding to the first image data input into the signal processing chip 331.

In step S324, the tap selectors 352 and 353 select pixels from the first image data as predictive taps and class taps, respectively, used for the selected pixel. The tap selector 352 supplies the predictive taps to the predictive-computation unit 356, and the tap selector 353 supplies the class taps to the classification unit 354.

Also in step S324, the motion determining unit 358 determines the magnitude or the direction of the motion vector of a pixel of the first image corresponding to the selected pixel from the motion vectors supplied from the signal processing chip 334, and supplies one bit or several bits indicating the magnitude or the direction of the motion vector to the classification unit 354 as the motion determining information for the selected pixel.

Upon receiving the class taps for the selected pixel from the tap selector 353 and the motion determining information for the selected pixel from the motion determining unit 358, in step S325, the classification unit 354 classifies the selected pixel based on the class taps and the motion determining information. The classification unit 354 outputs the resulting class to the coefficient output unit 355.

In step S326, the coefficient output unit 355 outputs the tap coefficient corresponding to the class supplied from the classification unit 354. That is, the coefficient output unit 355 reads the tap coefficient corresponding to the received class from the output terminal of the coefficient memory device 361$_1$ or 361$_2$ selected by the selector 362, and outputs the tap coefficient to the predictive-computation unit 356.

In step S327, the predictive-computation unit 356 performs predictive computation expressed by equation (1) by using the predictive taps output from the tap selector 352 and the tap coefficient output from the coefficient output unit 355, thereby determining and outputting the pixel value of the selected pixel.

In step S328, the pixel selector 351 determines whether there is any unselected pixel of the second image data. If there is an unselected pixel, the process returns to step S323 and step S323 and the subsequent steps are repeated.

If it is determined in step S328 that there is no unselected pixel, the process is completed.

When receiving the normal-screen mode command sequence shown in FIG. 36A from the command sequence generator 330, the receiver 357 supplies the spatial-resolution creation command contained in the command sequence to the selector 362. In this case, since the selector 362 selects the output terminal of the coefficient memory device $361_1$, the tap coefficient for spatial-resolution creation processing is supplied to the predictive-computation unit 356.

The command sequence generator 330 sends the normal-screen mode command sequence shown in FIG. 36A when the normal-screen mode is selected as the operation mode. In this case, the tuner 311 selects a predetermined channel, for example, the channel CH1 so that the signal processing chip 331 receives image data without missing frames of the channel CH1.

Accordingly, the signal processing chip 331 executes spatial-resolution creation processing on the image data without missing frames as the first image data, and outputs the image data with improved spatial resolution (hereinafter sometimes referred to as "high-resolution image data") to the signal processing chip 332 as the second image data.

When receiving the multi-screen mode command sequence shown in FIG. 36B from the command sequence generator 330, the receiver 357 supplies the reduced-image generating command contained in the command sequence to the selector 362. In this case, since the selector 362 selects the output terminal of the coefficient memory device $361_2$, the tap coefficient for reduced-image generating processing is supplied to the predictive-computation unit 356.

The command sequence generator 330 sends the multi-screen mode command sequence shown in FIG. 36B when the multi-screen mode is selected as the operation mode. In this case, the tuner 311 selects a plurality of channels, for example, the channels CH1 through CH4, in a time division manner so that the signal processing chip 331 receives image data with missing frames.

Accordingly, the signal processing chip 331 performs reduced-image generating processing on the image data with missing frames as the first image data, and outputs the image data with missing frames having a reduced size (smaller number of pixels) as the second image data to the signal processing chip 332.

Figure 46:
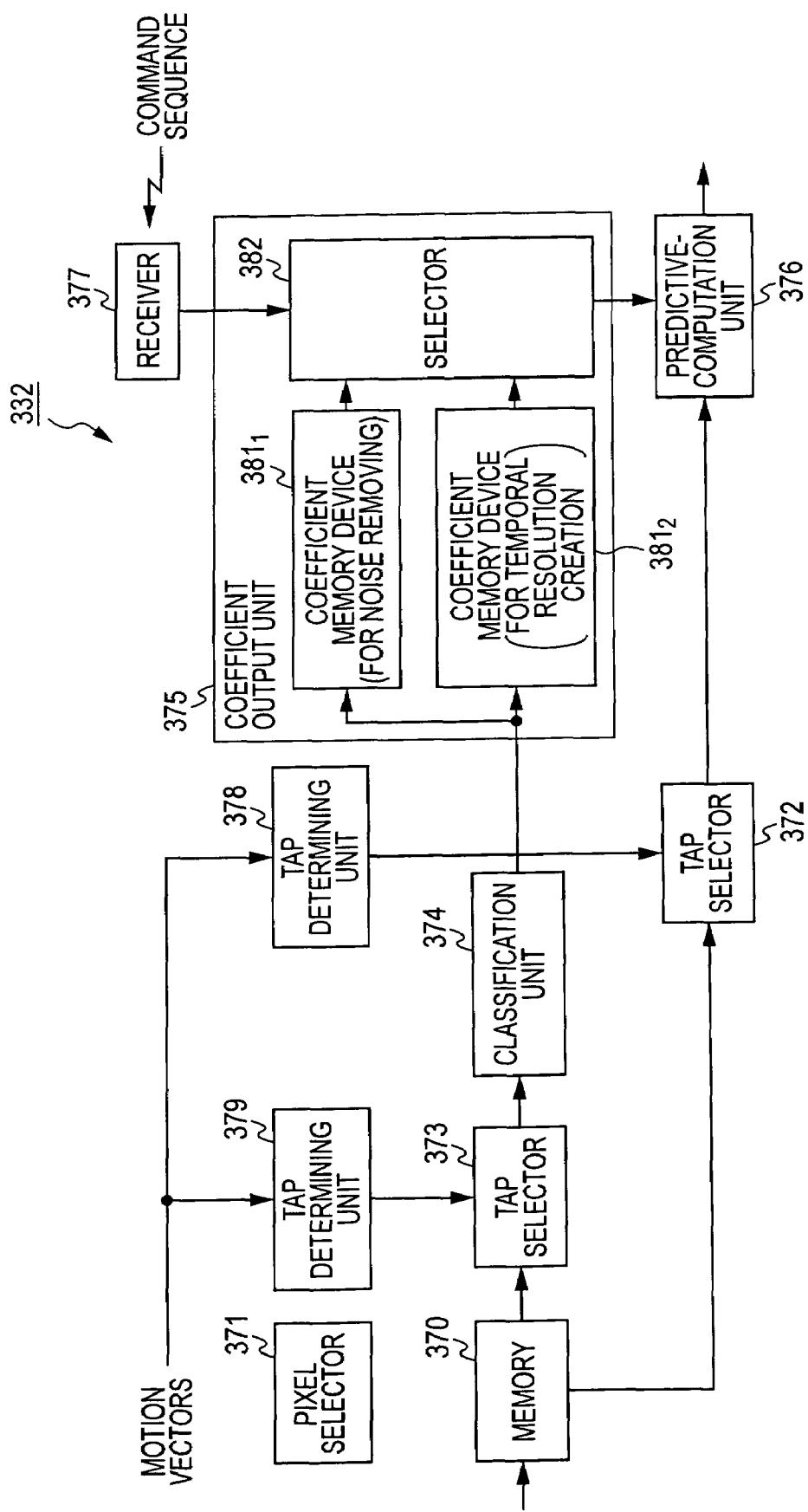
FIG. 46 is a block diagram illustrating an example of the configuration of another signal processing chip of the signal processor shown in FIG. 35.

FIG. 46 illustrates an example of the configuration of the signal processing chip 332 shown in FIG. 35.

The signal processing chip 332 switches the internal structure thereof according to the command forming the command sequence supplied from the command sequence generator 330 and performs noise removing processing or temporal-resolution creation processing by using the above-described classification adaptive processing.

The signal processing chip 332 includes a memory 370, a pixel selector 371, tap selectors 372 and 373, a classification unit 374, a coefficient output unit 375, a predictive-computation unit 376, a receiver 377, and tap determining units 378 and 379. The pixel selector 371, the tap selectors 372 and 373, the classification unit 374, the coefficient output unit 375, and the predictive-computation unit 376 correspond to the pixel selector 11, the tap selectors 12 and 13, the classification unit 14, the coefficient output unit 15, and the predictive-computation unit 16, respectively, shown in FIG. 1.

In the signal processing chip 332, the high-resolution image data without missing frames of the channels CH1 through CH4 supplied or the reduced image data with missing frames of the channels CH1 through CH4 supplied from the signal processing chip 331 is converted into the second image data in the classification adaptive processing.

In FIG. 46, the coefficient output unit 375 includes coefficient memory devices $381_1$ and $381_2$ and a selector 382.

The coefficient memory devices $381_1$ and $381_2$ store therein tap coefficients for noise removing processing and tap coefficients for temporal-resolution creation processing, respectively, which have been determined by learning. The tap coefficients for temporal-resolution creation processing convert the reduced image data with missing frames into reduced image data without missing frames.

The class (class code) output from the classification unit 374 is supplied to the coefficient memory devices $381_1$ and $381_2$. The coefficient memory devices $381_1$ and $381_2$ read the tap coefficients corresponding to the received class and output them to the selector 382.

The selector 382 receives, not only the tap coefficients read from the coefficient memory devices $381_1$ and $381_2$, but also the command from the receiver 377. The selector 382 selects one of the output terminals of the coefficient memory devices $381_1$ and $381_2$ according to the command supplied from the receiver 377 and connects the selected output terminal to the input terminal of the predictive-computation unit 376, thereby switching the internal structure of the signal processing chip 332.

If the selector 382 selects the output terminal of the coefficient memory device $381_1$ and connects the selected output terminal to the input terminal of the predictive-computation unit 376, the tap coefficient for noise removing processing read from the coefficient memory $381_1$ is supplied to the predictive-computation unit 376. As a result, the signal processing chip 332 serves as an IC for performing noise removing processing.

If the selector 382 selects the output terminal of the coefficient memory device $381_2$ and connects the selected output terminal to the input terminal of the predictive-computation unit 376, the tap coefficient for temporal-resolution creation processing read from the coefficient memory $381_2$ is supplied to the predictive-computation unit 376. As a result, the signal processing chip 332 serves as an IC for performing temporal-resolution creation processing.

In FIG. 46, the receiver 377 receives the command sequence wirelessly transmitted from the command sequence generator 330, and then identifies the command for the signal processing that can be executed by the signal processing chip 332 from the received command sequence so as to supply the command to the selector 382.

That is, upon receiving the normal-screen mode command sequence shown in FIG. 36A, the receiver 377 identifies the noise removing command as the command for the signal processing that can be executed by the signal processing chip 332, and supplies this command to the selector 382. In this case, the selector 382 selects the output terminal of the coefficient memory device $381_1$ and connects the output terminal to the input terminal of the predictive-computation unit 376.

In contrast, upon receiving the multi-screen mode command sequence shown in FIG. 36B, the receiver 377 identifies the temporal-resolution creation processing command as the command for the signal processing that can be executed by the signal processing chip 332, and supplies this command to the selector 382. In this case, the selector 382 selects the output terminal of the coefficient memory device $381_2$ and connects the output terminal to the input terminal of the predictive-computation unit 376.

In FIG. 46, the motion vectors of the individual pixels forming the image data supplied to the signal processor 314 from the tuner 311 are supplied to the tap determining units 378 and 379 from the signal processing chip 334.

The tap determining units 378 and 379 determine predictive taps and class taps, respectively, for the selected pixel based on the motion vectors supplied from the signal processing chip 334.

Pixels to be selected as predictive taps and class taps (hereinafter sometimes simply referred to as "taps") for the selected pixel from the first image data are not particularly restricted.

In the signal processing chip 332 shown in FIG. 46, as discussed above, if the multi-screen mode command sequence is received, classification adaptive processing by using the tap coefficient for temporal-resolution creation processing is performed so that the reduced image data with missing frames as the first image data is converted into reduced image data without missing frames as the second image data.

In the temporal-resolution creation processing, reduced image data of each frame in the frame cycle $T_1$ is predicted (generated) for each of the four channels CH1 and CH4. For this prediction, it is desirable that pixels in a plurality of existing frames be used rather than pixels in a single existing frame. That is, pixels in two existing frames close to the frame of the pixel to be predicted (selected pixel), i.e., the existing frame immediately before the frame of the selected pixel (hereinafter sometimes simply referred to as the "preceding existing frame") and the existing frame immediately after the frame of the selected pixel (hereinafter sometimes simply referred to as the "subsequent existing frame") are desirably used. However, if the selected pixel is contained in an existing frame, this existing frame is used instead of the preceding existing frame. It is also desirable that the selected pixel in the temporal-resolution creation processing be predicted by considering the motion of the image (subject).

Then, the tap determining unit 378 determines predictive taps for the selected pixel based on the motion vector of the pixel of the preceding existing frame corresponding to the selected pixel from the pixels of the preceding frame and the pixels of the subsequent existing frame.

More specifically, it is now assumed that the preceding existing frame, the frame of the selected pixel, and the subsequent existing frame are arranged in chronological order, and that the motion vector of the pixel in the preceding existing frame corresponding to the selected pixel is corrected so that it passes through the selected pixel. In this case, the tap determining unit 378 determines several pixels of the preceding existing frame around the start point of the corrected motion vector and several pixels of the subsequent existing frame around the end point of the corrected motion vector as predictive taps for the selected pixel.

The motion vectors supplied to the signal processing chip 332 from the signal processing chip 334 when performing the temporal-resolution creation processing are not motion vectors of the pixels of the reduced image data of the preceding existing frame and the subsequent existing frame, but motion vectors of the image data before being reduced. Accordingly, the tap determining unit 378 uses the motion vectors of the unreduced image data located at the same position as those of the reduced image data.

After determining the pixels serving as predictive taps for the selected pixel, the tap determining unit 378 supplies information concerning the determined pixels (hereinafter sometimes referred to as the "predictive tap information") to the tap selector 372. The tap selector 372 then selects pixels serving as the predictive taps from the image data stored in the memory 370 based on the predictive tap information.

In a manner similar to the tap determining unit 378, the tap determining unit 379 determines pixels serving as class taps for the selected pixel, and supplies information concerning the determined pixels (hereinafter sometimes referred to as the "class tap information") to the tap selector 373. The tap selector 373 then selects pixels serving as the class taps from the image data stored in the memory 370 based on the class tap information.

In the signal processing chip 332 shown in FIG. 46, taps are selected from two frames of the image data supplied from the signal processing chip 331. Thus, in the signal processing chip 332, the memory 370 is provided for temporarily storing the frames of the image data.

Additionally, in the signal processing chip 332, temporal-resolution creation processing is performed for each of the four channels CH1 through CH4. In this case, while temporal-resolution creation processing is being executed for one of the channels CH1 through CH4, the image data of the other three channels should be stored. This is another reason for disposing the memory 370.

In the signal processing chip 332, not only temporal-resolution creation processing, but also noise removing processing is performed. When performing noise removing processing, the tap determining units 378 and 389 also determine pixels serving as taps.

However, since noise removing processing is executed on high-resolution image data without missing frames of the channel CH1, the frame of a selected pixel can be used instead of the preceding existing frame, and the frame subsequent to the frame of the selected pixel can be used instead of the subsequent existing frame.

Figure 47:
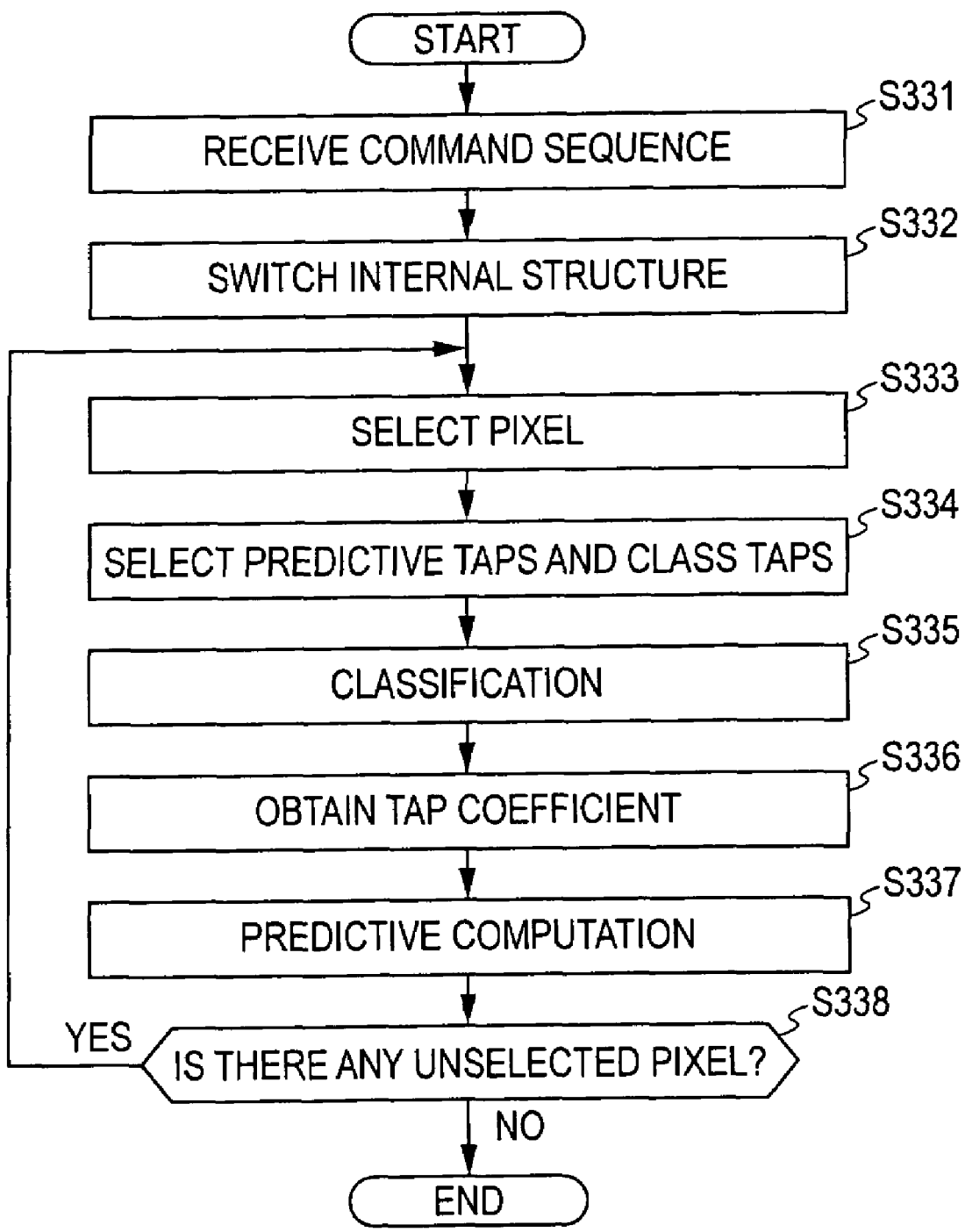
FIG. 47 is a flowchart illustrating processing performed by the signal processing chip shown in FIG. 46.

The processing performed by the signal processing chip 332 shown in FIG. 46 is discussed below with reference to the flowchart of FIG. 47.

In step S331, the receiver 377 receives a command sequence from the command sequence generator 330. Then, the receiver 377 identifies the command for the signal processing that can be executed by the signal processing chip 332 from the command sequence, and supplies the command to the selector 382.

In step S332, the selector 382 switches the internal structure of the signal processing chip 332 according to the command from the receiver 377.

More specifically, the selector 382 selects one of the output terminals of the coefficient memory devices $381_1$ and $381_2$ according to the received command, and connects the selected output terminal to the input terminal of the predictive-computation unit 376, thereby switching the internal structure of the signal processing chip 332.

Steps S333 through S338 are similarly executed to steps S11 through S16, respectively, of FIG. 2.

More specifically, high-resolution image data without missing frames of the channel CH1 or reduced image data with missing frames of the channels CH1 through CH4 are sequentially supplied to the memory 370 as the first image data used in the classification adaptive processing.

In step S333, the pixel selector 371 selects one of the unselected pixels forming the second image data used in the classification adaptive processing.

In step S334, the tap determining units 378 and 379 determine pixels of the first image data serving as predictive taps and class taps, respectively, based on the motion vectors supplied from the signal processing chip 334, and supply the predictive tap information and the class tap information to the tap selectors 372 and 373, respectively.

Also in step S334, the tap selectors 372 and 373 select pixels from the first image data as predictive taps and class taps, respectively, for the selected pixel based on the predictive tap information and the class tap information supplied from the tap determining units 378 and 379, respectively. The tap selector 372 supplies the predictive taps to the predictive-computation unit 376, and the tap selector 373 supplies the class taps to the classification unit 374.

Upon receiving the class taps for the selected pixel from the tap selector 373, in step S335, the classification unit 374 classifies the selected pixel based on the class taps. The classification unit 374 outputs the resulting class to the coefficient output unit 375.

In step S336, the coefficient output unit 375 outputs the tap coefficient corresponding to the class supplied from the classification unit 374. That is, the coefficient output unit 375 reads the tap coefficient corresponding to the received class from the output terminal of the coefficient memory device $381_1$ or $381_2$ selected by the selector 368, and outputs the tap coefficient to the predictive-computation unit 376.

In step S337, the predictive-computation unit 376 executes predictive computation expressed by equation (1) by using the predictive taps output from the tap selector 372 and the tap coefficient output from the coefficient output unit 375, thereby determining and outputting the pixel value of the selected pixel.

In step S338, the pixel selector 371 determines whether there is any unselected pixel of the second image data. If there is an unselected pixel, the process returns to step S333 and step S333 and the subsequent steps are repeated.

If it is determined in step S338 that there is no unselected pixel, the process is completed.

Upon receiving the normal-screen mode command sequence shown in FIG. 36A from the command sequence generator 330, the receiver 377 supplies the noise removing command contained in the command sequence to the selector 382. In this case, since the selector 382 selects the output terminal of the coefficient memory device $381_1$, the tap coefficient for noise removing processing is supplied to the predictive-computation unit 376.

The command sequence generator 330 sends the normal-screen mode command sequence shown in FIG. 36A when the normal-screen mode is selected as the operation mode. In this case, the tuner 311 selects a predetermined channel, for example, the channel CH1, and the signal processing chip 331 converts the image data of the channel CH1 into high-resolution image data so that the signal processing chip 332 receives the high-resolution image data of the channel CH1.

Accordingly, the signal processing chip 332 executes noise removing processing on the high-resolution image data of the channel CH1 as the first image data, and outputs the image data with an improved S/N ratio to the memory 333 as the second image data.

Upon receiving the multi-screen mode command sequence shown in FIG. 36B from the command sequence generator 330, the receiver 377 supplies the temporal-resolution creation processing command contained in the command sequence to the selector 382. In this case, since the selector 382 selects the output terminal of the coefficient memory device $381_2$, the tap coefficient for temporal-resolution creation processing is supplied to the predictive-computation unit 376.

The command sequence generator 330 sends the multi-screen mode command sequence shown in FIG. 36B when the multi-screen mode is selected as the operation mode. In this case, the tuner 311 selects a plurality of channels, for example, the channels CH1 through CH4, in a time division manner. Then, the signal processing chip 331 converts the image data with missing frames into reduced image data with missing frames. Thus, the signal processing chip 332 receives the reduced image data with missing frames of the channels CH1 through CH4.

Accordingly, the signal processing chip 332 performs temporal-resolution creation processing on the image data with missing frames as the first image data, and outputs the image data without missing frames as the second image data to the memory 333.

As described above, the signal processing chips 331, 332, and 334 switch their internal structures according to at least one command forming a command sequence, and then, perform signal processing on image data supplied to the signal processing chips 331, 332, and 334, and output the resulting image data. Thus, a plurality of functions can be easily implemented by using a single unit of hardware.

Additionally, the signal processing chip 332 performs signal processing on the image data processed in the signal processing chip 331. Accordingly, more functions can be implemented in the overall signal processor 314.

In the signal processor 314, a desired number of signal processing chips, such as the signal processing chips 331 and 332, may be disposed.

In this embodiment, tap coefficients are stored in the coefficient output unit 355 of the signal processing chip 331. Instead of tap coefficients, however, coefficient source data may be stored to generate tap coefficients from the coefficient source data. The same applies to the signal processing chip 332.

A third embodiment of the present invention is described below.

Figure 48:
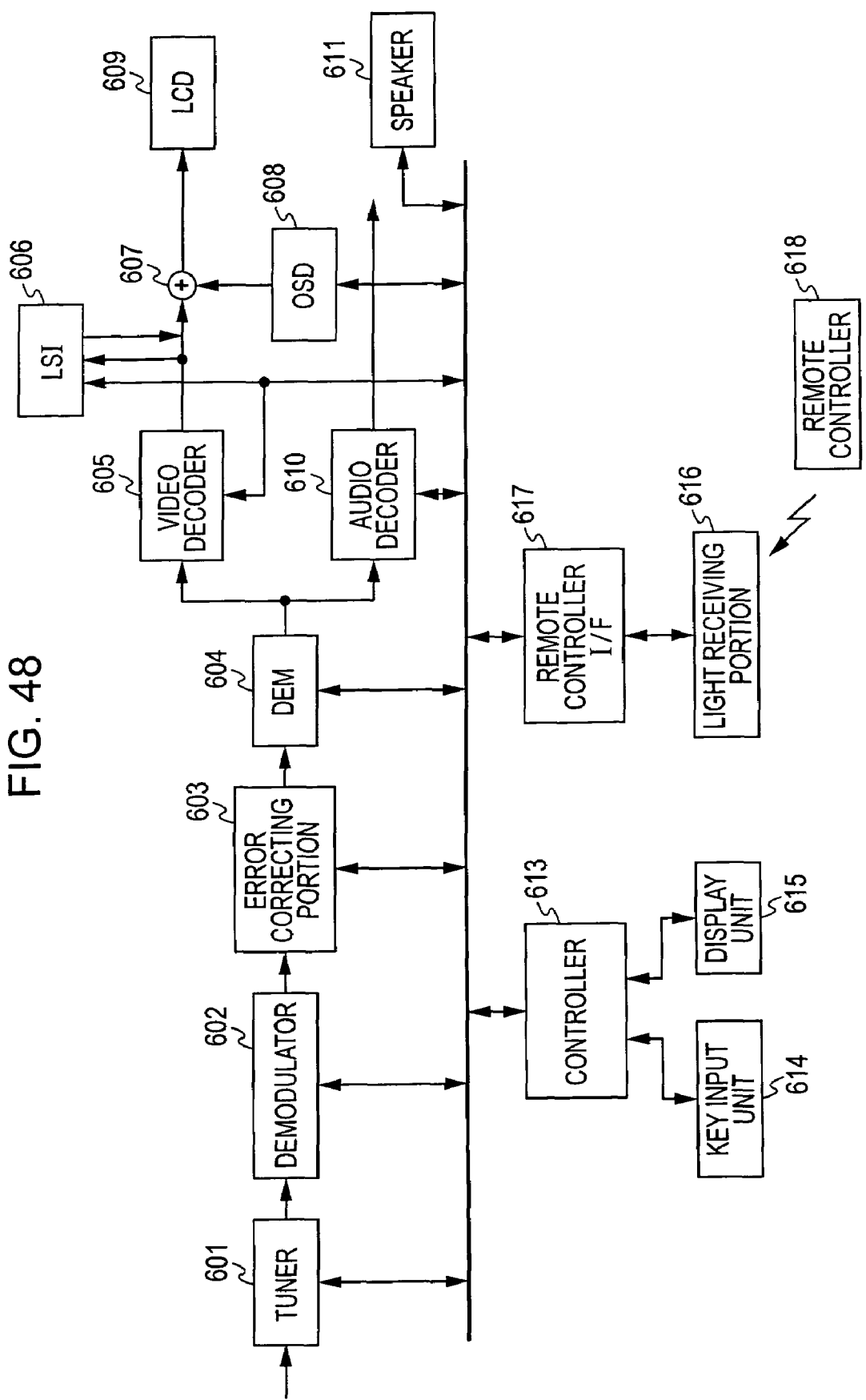
FIG. 48 is a block diagram illustrating an example of the configuration of a television receiver according to a third embodiment of the present invention.

FIG. 48 illustrates an example of the configuration of a television receiver constructed in accordance with the third embodiment of the present invention.

A digital broadcast signal (transmission signal) received by an antenna (not shown) is supplied to a tuner 601. The digital broadcast signal, which is digital data defined in MPEG2, is transmitted as a transport stream consisting of a plurality of transport stream packets (TS packets). The tuner 601 selects a predetermined channel (frequency) from a plurality of channels of the broadcast signal under the control of a controller 613, and supplies the broadcast signal of the selected channel to a demodulator 602.

The demodulator 602 demodulates, under the control of the controller 613, the transport stream of the predetermined channel supplied from the tuner 601 by, for example, quadrature phase shift keying (QPSK) modulation, and supplies the demodulated transport stream to an error correcting portion 603.

The error correcting portion 603 detects and corrects for errors in the transport stream supplied from the demodulator 602 under the control of the controller 613, and supplies the corrected transport stream to a demultiplexer (DEM) 604.

The demultiplexer 604 descrambles the transport stream supplied from the error correcting portion 603 under the control of the controller 613. The demultiplexer 604 also extracts TS packets of the predetermined program from the received transport stream by referring to packet identifiers (PIDs) of the TS packets, and supplies the TS packet of video data and the TS packet of audio data to a video decoder 605 and an audio decoder 610, respectively.

The video decoder 605 decodes the TS packet of the video data supplied from the demultiplexer 604 according to an MPEG2 method, and supplies the decoded TS packet to a large scale integrated circuit (LSI) 606 and or a synthesizer 607.

As in the R-IC 212 of the first embodiment, the LSI 606 receives the command sequence from the controller 613 and switches the reconfigurable internal structure thereof according to the command sequence. The LSI 606 performs signal processing on the image data (video data) output from the video decoder 605, and supplies the resulting image data to the synthesizer 607.

The synthesizer 607 selects image data output from the LSI 606. If image data is not supplied from the LSI 606, the synthesizer 607 selects image data supplied from the video decoder 605. The synthesizer 607 also superimposes image data supplied from an on screen display (OSD) portion 608 on the selected image data from the video decoder 605 or the LSI 606, and supplies the superimposed data to a liquid crystal display (LCD) 609.

If image data is not supplied from the OSD portion 608, the synthesizer 607 supplies the selected image data from the video decoder 605 or the LSI 606 directly to the LCD 609.

The OSD portion 608 generates image data, such as the number and volume of the currently selected channel, under the control of the controller 613, and supplies the image data to the synthesizer 607.

Meanwhile, the audio decoder 610 decodes the TS packet of the audio data supplied from the demultiplexer 604 according to the MPEG2 method, and supplies the decoded packet to an output terminal (not shown) and also to a speaker 611.

The controller 613 controls the tuner 601, the demodulator 602, the error correcting portion 603, the demultiplexer 604, the video decoder 605, the audio decoder 610, and the OSD portion 608. The controller 613 also executes various types of processing based on an operation signal input from a user through a key input unit 614 or a remote controller I/F 617.

For example, the controller 613 generates a command sequence consisting of at least one command according to an operation signal input from a user through the remote controller I/F 617, and sends the command sequence to the LSI 606.

The key input unit 614, which is formed of, for example, switch buttons, receives an operation performed when the user selects a desired channel and supplies the corresponding operation signal to the controller 613. A display unit 615 displays, for example, a channel selected by the tuner 601, based on the control signal supplied from the controller 613.

The remote controller I/F 617 supplies the operation signal input from the user through a light receiving portion 616 to the controller 613. The light receiving portion 616 receives an operation signal input from the user through a remote controller (remote commander) 618, and supplies the operation signal to the remote controller I/F 617.

Figure 49:
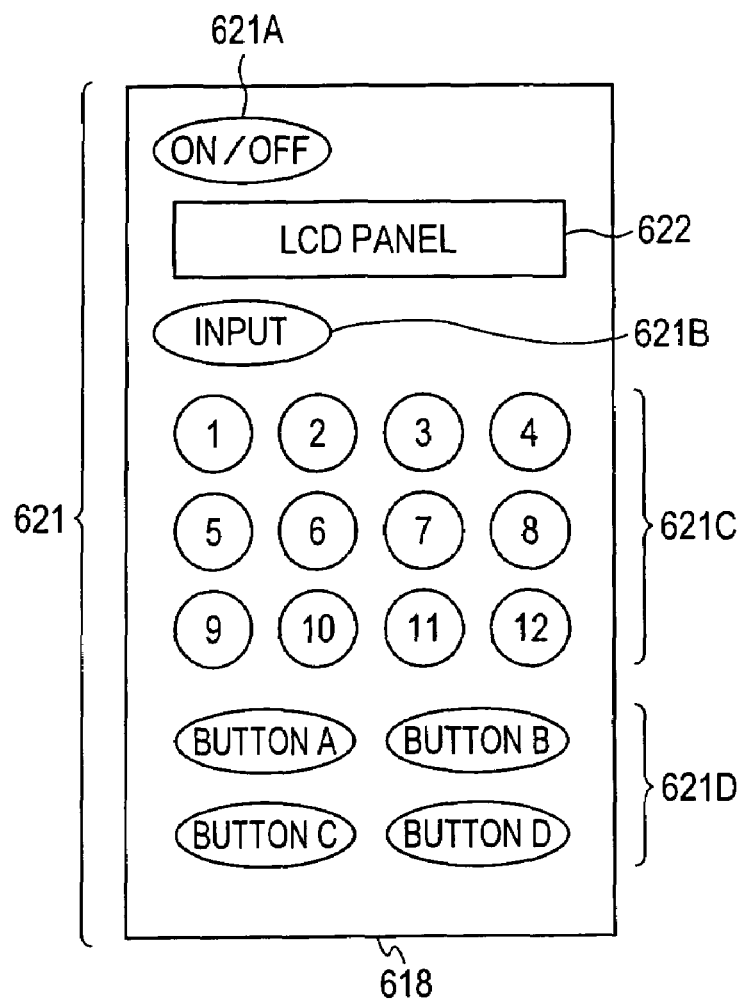
FIG. 49 is a plan view illustrating an example of the external configuration of a remote controller of the television receiver shown in FIG. 48.

FIG. 49 is a plan view illustrating an example of the configuration of the remote controller 618 shown in FIG. 48.

The remote controller 618 includes a user interface 621 and an LCD panel 622.

The user interface 621 includes an ON/OFF button 621A operated when the power of the television receiver shown in FIG. 48 is turned ON or OFF, an input button 621B operated when the input of the television receiver is switched between television broadcasting and the input from an external source, channel buttons 621C operated when a channel is selected, and function buttons 621D operated when instructing the LSI 606 of the television receiver to perform a predetermined function.

In FIG. 49, the function buttons 621D include four buttons A, B, C, and D.

The LCD panel 622 displays predetermined information, for example, information concerning the previously operated button of the user interface 621.

Figure 50:
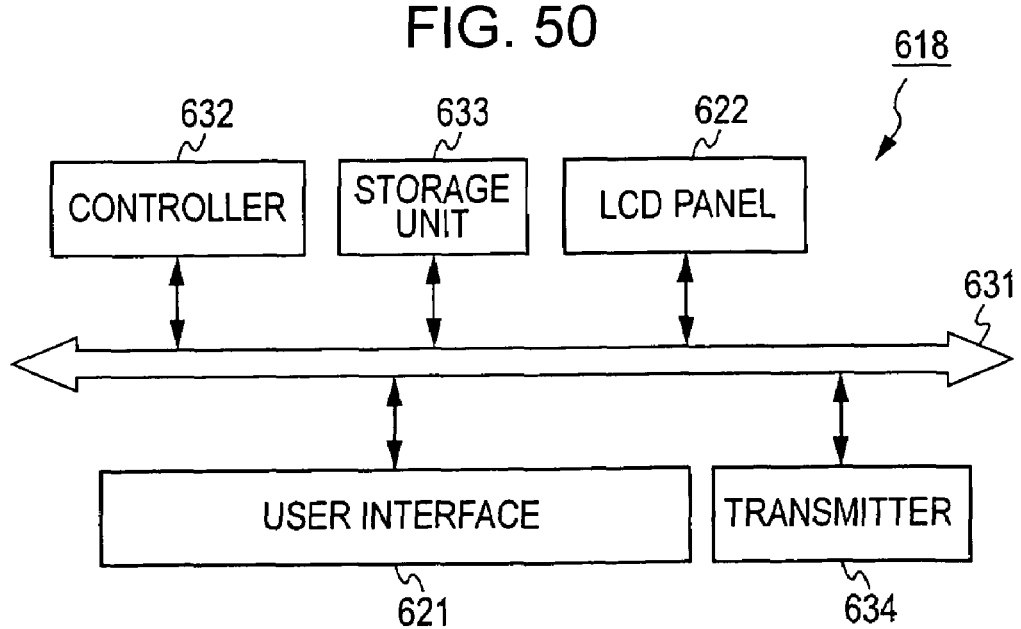
FIG. 50 is a block diagram illustrating an example of the electrical configuration of the remote controller.

FIG. 50 illustrates an example of the electrical configuration of the remote controller 618 shown in FIG. 49.

The remote controller 618 includes the user interface 621, the LCD panel 622, a controller 632, a storage unit 633, and a transmitter 634, which are connected to each other via a bus 631.

The controller 632, which is formed of, for example, a CPU, controls the individual blocks forming the remote controller 618 by executing a program stored in the storage unit 633. The storage unit 633 stores therein programs and data executed by the controller 632.

The transmitter 634 transmits an operation signal (for example, infrared signal or radio waves) corresponding to an operation performed on the user interface 621 by the user. The operation signal transmitted from the transmitter 634 is received by the light receiving portion 616.

The processing performed by the controller 613 shown in FIG. 48 is discussed below with reference to the flowchart of FIG. 51.

In step S601, the controller 613 determines whether the user interface 621 of the remote controller 618 has been operated by the user. If it is determined in step S601 that the user interface 621 has not been operated, the process returns to step S601.

If it is determined in step S601 that the user interface 621 has been operated, i.e., that the user has operated the user interface 621 and the corresponding operation signal has been supplied to the controller 613 via the light receiving portion 616 and the remote controller I/F 617, the process proceeds to step S602 to determine based on the operation signal whether the ON/OFF button 621A has been operated.

If it is determined in step S602 that the ON/OFF button 621A has been operated, i.e., that the user has operated the ON/OFF button 621A and the corresponding operation signal has been supplied to the controller 613 via the light receiving portion 616 and the remote controller I/F 617, the process proceeds to step S603. In step S603, the controller 613 turns ON or OFF the power of the television receiver shown in FIG. 48. Then, the process returns to step S601.

If it is determined in step S602 that the ON/OFF button 612A has not been operated, i.e., that a button other than the ON/OFF button 612A has been operated, the process proceeds to step S604. In step S604, the controller 613 performs processing corresponding to the operated button. The process then returns to step S601.

If one of the function buttons 621D of the remote controller 618 is operated and the controller 613 receives the corresponding operation signal via the light receiving portion 616 and the remote controller I/F 617, the controller 613 generates a command sequence according to the operation signal (according to the operated function button 621D) and sends the command sequence to the LSI 606.

Figure 52:
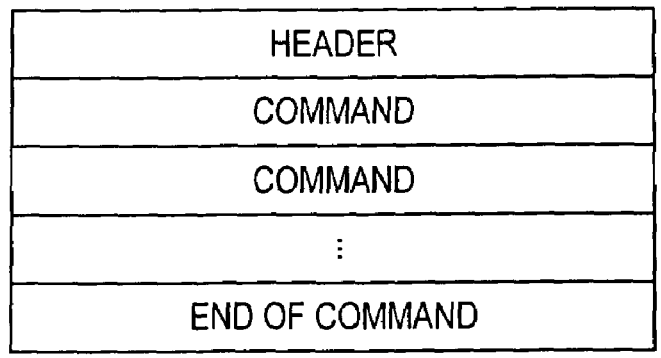
FIG. 52 illustrates the format of a command sequence generated by the controller.
Figure 53:
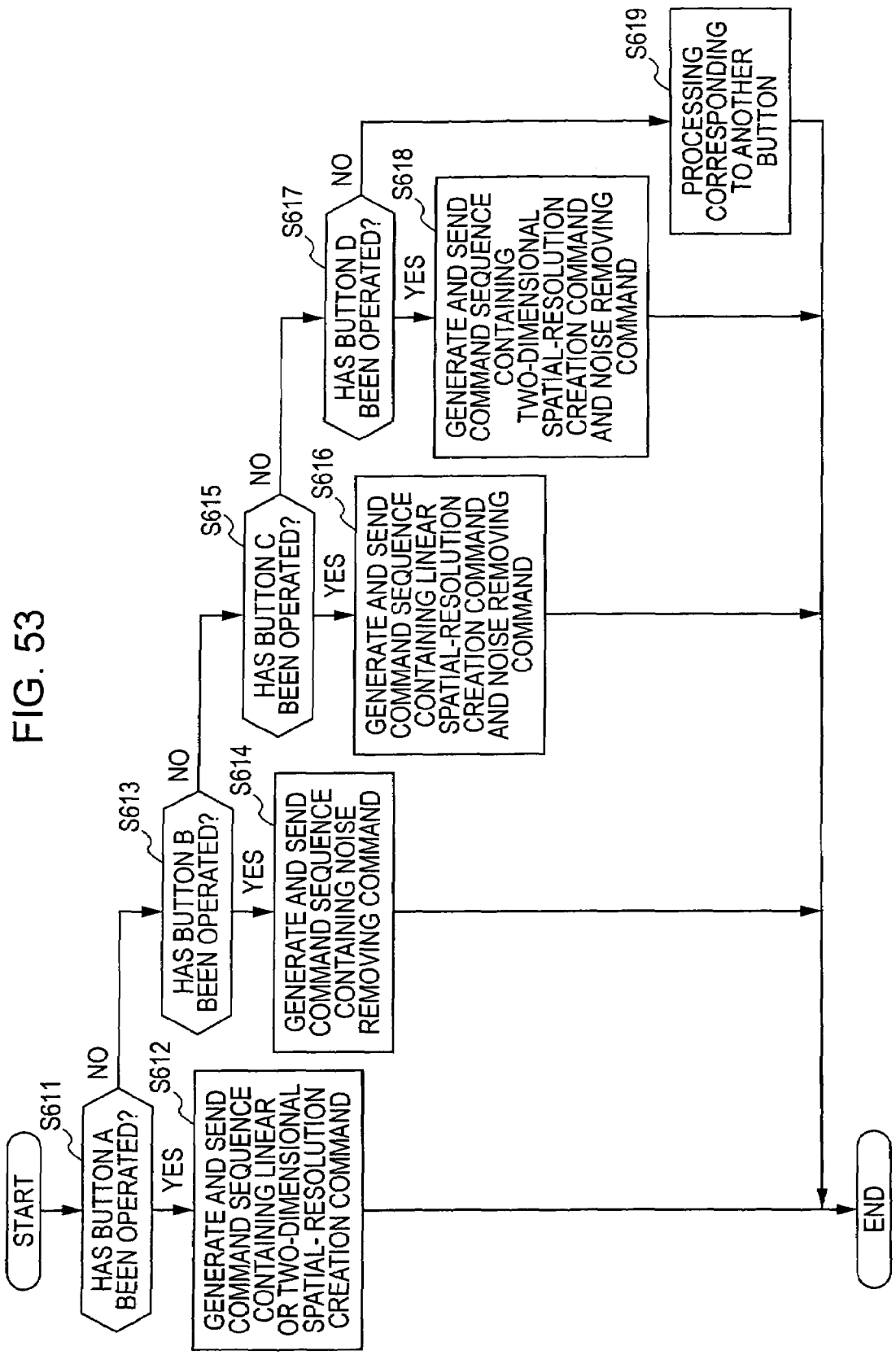
FIG. 53 is a flowchart illustrating processing performed by the controller.

FIG. 52 illustrates the format of the command sequence generated by the controller 613.

The command sequence sequentially consists of, for example, the header, at least one command, and the end of command (EOC) code.

Figure 51:
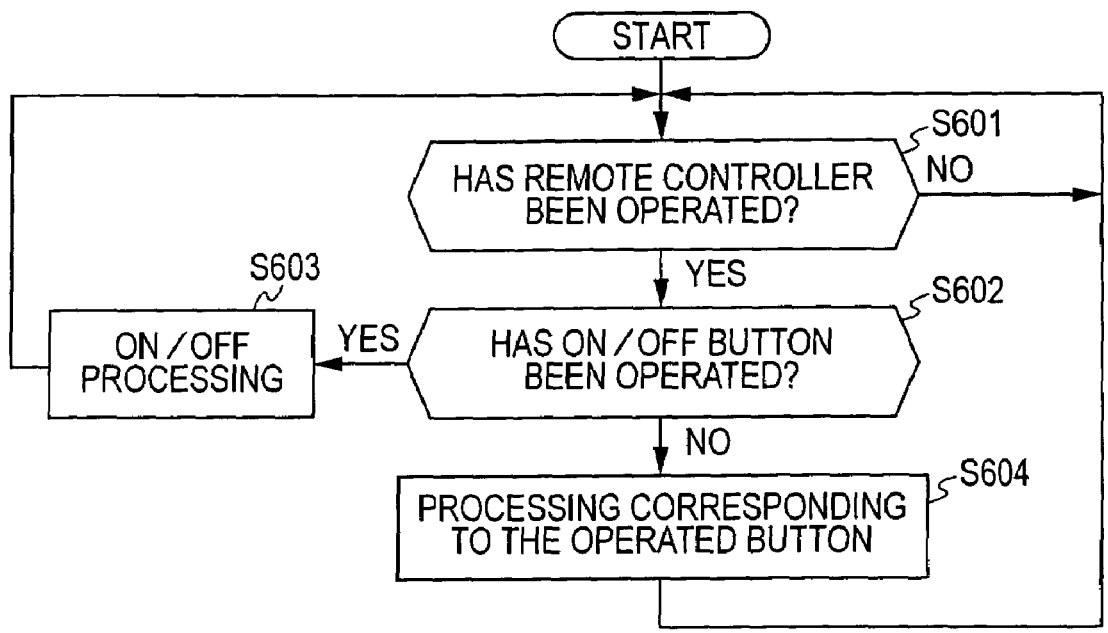
FIG. 51 is a flowchart illustrating processing performed by a controller of the television receiver shown in FIG. 48.

A description is further given of the processing of step S604 in FIG. 51 performed by the controller 613.

In step S611, the controller 613 determines whether the button A of the function buttons 621D has been operated. If it is determined in step S611 that the button A has been operated, the process proceeds to step S612. In step S612, the controller 613 generates a command sequence consisting of a linear spatial-resolution creation command or a two-dimensional spatial-resolution creation command, and sends the command sequence to the LSI 606. The process then returns to step S601.

If it is determined in step S611 that the button A has not been operated, the process proceeds to step S613 to determine whether the button B of the function buttons 621D has been operated.

If it is determined in step S613 that the button B has been operated, the process proceeds to step S614. In step S614, the controller 613 generates a command sequence consisting of a noise removing command and sends the command sequence to the LSI 606. The process then returns to step S601.

If it is determined in step S613 that the button B has not been operated, the process proceeds to step S615 to determine whether the button C of the function buttons 621D has been operated.

If it is determined in step S615 that the button C has been operated, the process proceeds to step S616. In step S616, the controller 613 generates a command sequence consisting of a linear spatial-resolution creation command and a noise removing command and sends the command sequence to the LSI 606. The process then returns to step S601.

If it is determined in step S615 that the button C has not been operated, the process proceeds to step S617 to determine whether the button D of the function buttons 621D has been operated.

If it is determined in step S617 that the button D has been operated, the process proceeds to step S618. In step S618, the controller 613 generates a command sequence consisting of a two-dimensional spatial-resolution creation command and a noise removing command and sends the command sequence to the LSI 606. The process then returns to step S601.

If it is determined in step S617 that the button D has not been operated, i.e., that a button other than the ON/OFF button 621A and the function buttons 621D has been operated, the process proceeds to step S619 in which the controller 613 performs processing corresponding to the operated button. The process then returns to step S601.

FIGS. 54A through 54D illustrate examples of the command sequences generated in accordance with the operation of the function buttons 621D and transmitted to the LSI 606 by the controller 613.

Figure 54A:
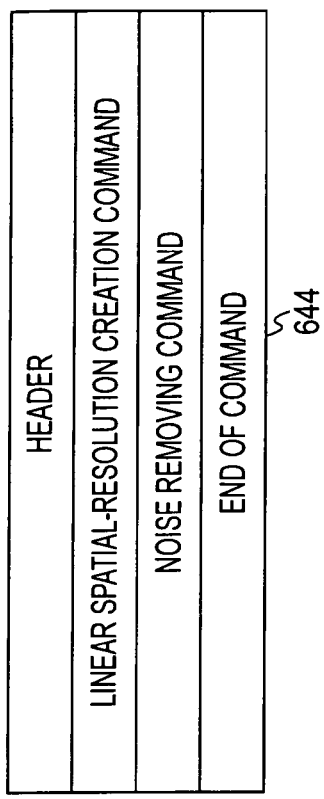
FIGS. 54A through 54E illustrate examples of command sequences generated by the controller according to the operation of operation buttons of the remote controller.
Figure 54B:
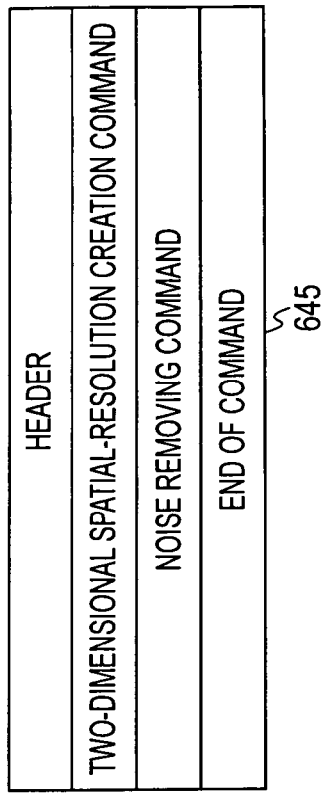

When the button A is operated, the controller 613 generates an A-button command sequence 641 consisting of a linear spatial-resolution creation command or an A-button command sequence 642 consisting of a two-dimensional spatial-resolution creation command, as shown in FIG. 54A or 54B, respectively, and sends the command sequence 641 or 642 to the LSI 606.

Figure 54C:
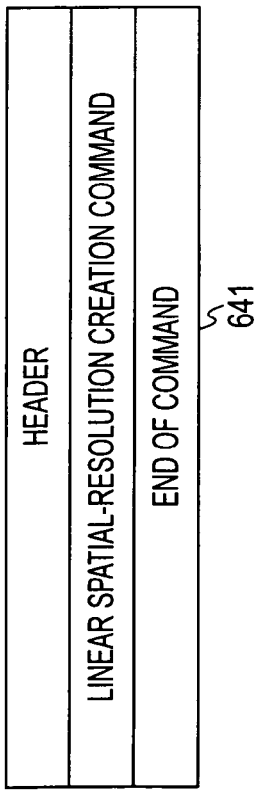

When the button B is operated, the controller 613 generates a B-button command sequence 643 consisting of a noise removing command, as shown in FIG. 54C, and sends the command sequence 643 to the LSI 606.

Figure 54D:
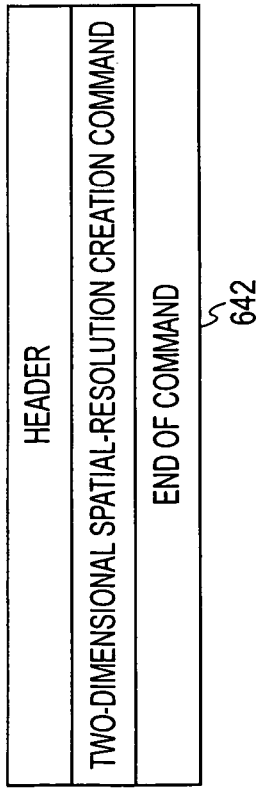

When the button C is operated, the controller 613 generates a C-button command sequence 644 consisting of a linear spatial-resolution creation command and a noise removing command, as shown in FIG. 54D, and sends the command sequence 644 to the LSI 606.

Figure 54E:
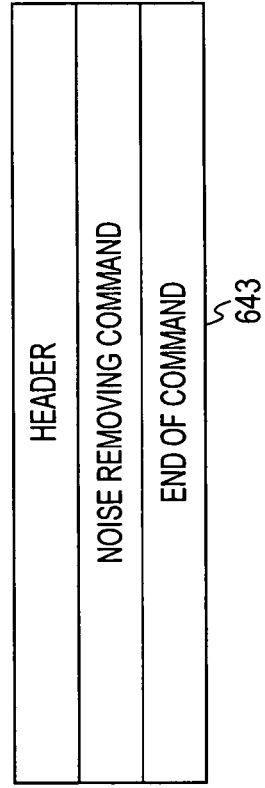

When the button D is operated, the controller 613 generates a D-button command sequence 645 consisting of a two-dimensional spatial-resolution creation command and a noise removing command, as shown in FIG. 54E, and sends the command sequence 645 to the LSI 606.

Figure 55:
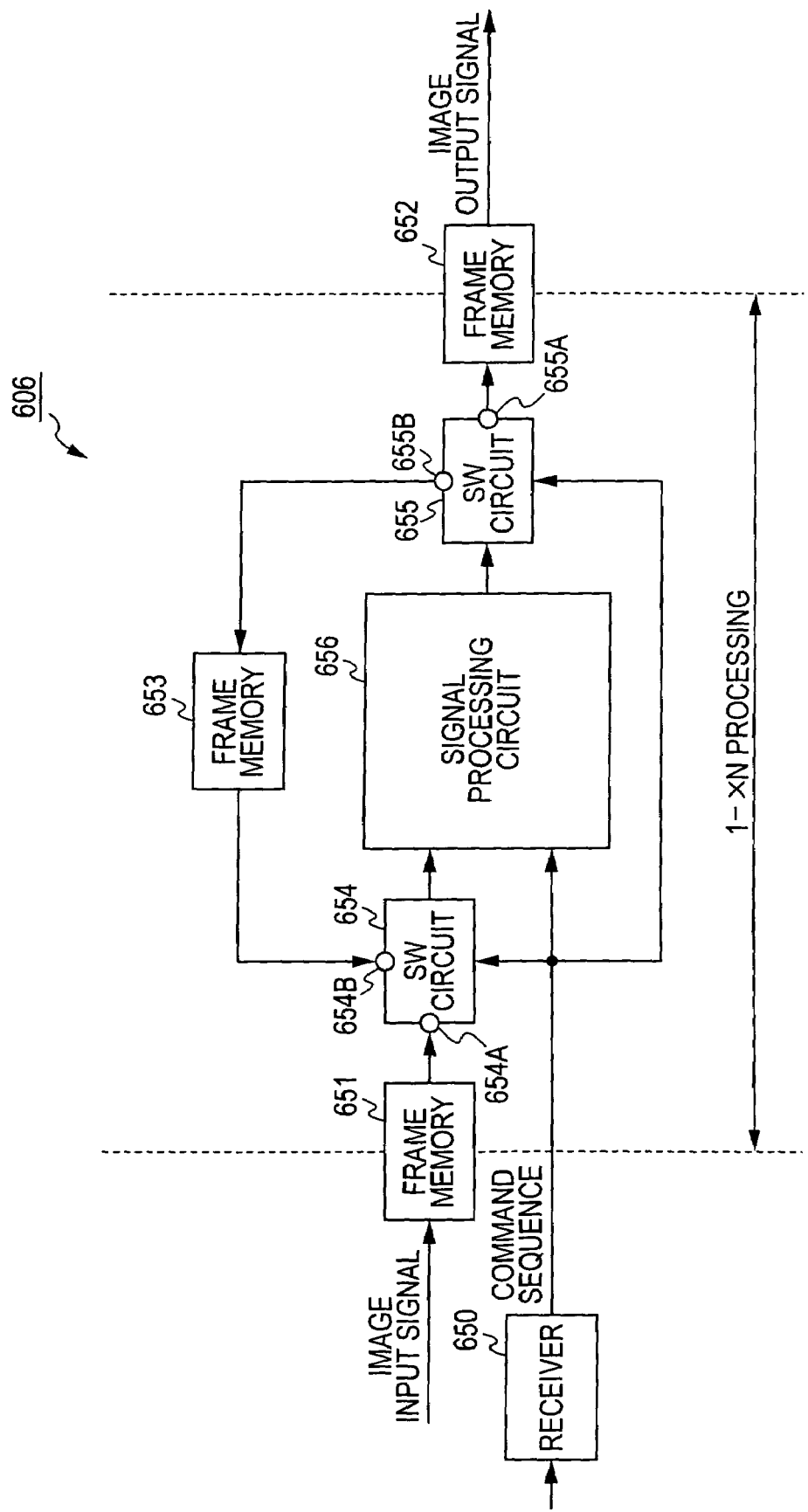
FIG. 55 is a block diagram illustrating an example of the configuration of an LSI of the television receiver shown in FIG. 48.

FIG. 55 illustrates an example of the configuration of the LSI 606 shown in FIG. 48.

A receiver 650 receives a command sequence from the controller 613, and supplies it to switch (SW) circuits 654 and 655 and a signal processing circuit 656.

A frame memory 651 stores image data (image input signal) supplied from the video decoder 605, for example, in units of frames, and supplies the image data to an input terminal 654A of the SW circuit 654.

A frame memory 652 stores image data (image output signal) supplied from the signal processing circuit 656 via an output terminal 655A, for example, in units of frames, and supplies the image data to the synthesizer 607.

A frame memory 653 stores image data supplied from an output terminal 655B of the SW circuit 655, for example, in units of frames, and supplies the image data to an input terminal 654B of the SW circuit 654.

The SW circuit 654 includes the two input terminals 654A and 654B, and the image data stored in the frame memory 651 is supplied to the input terminal 654A, while the image data stored in the frame memory 653 is supplied to the input terminal 654B. The SW circuit 654 selects the input terminal 654A or 654B according to the command supplied from the receiver 650, and supplies the image data input from the selected input terminal to the signal processing circuit 656.

The SW circuit 655 includes the two output terminals 655A and 655B in which the output terminal 655A is connected to the frame memory 652, while the output terminal 655B is connected to the frame memory 653. The SW circuit 655 receives processed image data from the signal processing circuit 656, and selects the output terminal 655A or 655B according to the command sequence received from the receiver 650, and outputs the image data to the selected output terminal.

The signal processing circuit 656 switches the reconfigurable internal structure according to the command sequence received from the receiver 650, performs signal processing on the image data supplied from the SW circuit 654, and supplies the processed image data to the SW circuit 655.

The processing performed by the LSI 606 shown in FIG. 55 is described below with reference to the flowchart of FIG. 56.

In step S631, the receiver 650 of the LSI 606 receives a command sequence from the controller 613, and supplies it to the SW circuits 654 and 655 and the signal processing circuit 656.

The command sequence received by the receiver 650 has N commands (N is an integer greater than one).

In step S632, the frame memory 651 stores image data for one frame (field) supplied from the video decoder 605.

In step S633, the SW circuits 654 and 655 determine whether the command sequence received from the receiver 650 has only one command.

If it is determined in step S633 that the number of commands is only one, the process proceeds to step S634 in which the SW circuit 654 selects the input terminal 654A and the SW circuit 655 selects the output terminal 655A.

In step S635, the signal processing circuit 656 selects the command from the command sequence. In this case, since the command sequence has only one command, the command determined by the signal processing circuit 656 is determined.

Also in step S635, the signal processing circuit 656 switches the internal structure according to the selected command so that the signal processing corresponding to the selected command can be executed.

In step S636, the signal processing circuit 656 reads image data for one frame from the frame memory 651 via the input terminal 654A selected by the SW circuit 654, and performs signal processing on the image data according to the selected command.

More specifically, in step S636, the signal processing circuit 656 performs signal processing at the rate of ×N corresponding to the number N of commands forming the command sequence received from the receiver 650. In this case, since the command sequence has only one command, the signal processing circuit 656 performs signal processing on the image data at the rate of ×1, i.e., the processing rate corresponding to the frame rate (or field rate), in other words, the processing rate at which signal processing on one frame of image data is completed within the time equal to the frame cycle.

The resulting image data is then supplied to the SW circuit 655. Since the output terminal 655A is selected by the SW circuit 655 in step S634, the image data supplied to the SW circuit 655 is output to the frame memory 652 via the output terminal 655A.

In step S637, the frame memory 652 stores therein the image data supplied from the signal processing circuit 656, and outputs the stored image data to the synthesizer 607.

If it is determined in step S633 that the command sequence has a plurality of commands, the process proceeds to step S638. In step S638, the SW circuit 654 selects the input terminal 654A and the SW circuit 655 selects the output terminal 655B.

In step S639, the signal processing circuit 656 selects one of the commands forming the command sequence received from the receiver 650. That is, the signal processing circuit 656 selects the unselected command closest to the head.

Also in step S639, the signal processing circuit 656 switches the internal structure according to the selected command so that the signal processing corresponding to the selected command can be executed.

In step S640, the signal processing circuit 656 reads image data for one frame from the frame memory 651 via the terminal 654A selected by the SW circuit 654, and performs signal processing on the image data according to the selected command at the rate of ×N equal to the number N of commands.

The resulting image data is then supplied to the SW circuit 655. Since the output terminal 655B is selected by the SW circuit 655 in step S638, the image data supplied to the SW circuit 655 is output to the frame memory 653 via the output terminal 655B.

In step S641, the frame memory 653 stores therein the image data supplied from the signal processing circuit 656.

In step S642, the SW circuit 654 switches the terminal from the input terminal 654A to the input terminal 654B.

As in step S639, in step S643, the signal processing circuit 656 selects a new command forming the command sequence received from the receiver 650.

Also in step S643, the signal processing circuit 656 switches the internal structure according to the selected command so that the signal processing corresponding to the selected command can be executed.

In step S644, the signal processing circuit 656 determines whether the selected command is the final command of the command sequence.

If it is determined in step S644 that the selected command is not the final command, i.e., that there is an unselected command in the command sequence, the process proceeds to step S645. In step S645, the signal processing circuit 656 reads the image data from the frame memory 653 via the input terminal 654B selected by the SW circuit 654, i.e., the image data obtained by the previous signal processing, and performs signal processing on the image data corresponding to the selected command at the rate of ×N equal to the number N of commands.

The resulting image data is then supplied to the SW circuit 655. Since the output terminal 655B remains being selected by the SW circuit 655 in step S638, the image data supplied to the SW circuit 655 is output to the frame memory 653 via the output terminal 655B.

In step S646, the frame memory 653 stores the image data supplied from the signal processing circuit 656 via the SW circuit 655 by overwriting the previous image data. The process then returns to step S643.

If it is determined in step S644 that the selected command is the final command of the command sequence, the process proceeds to step S647 in which the SW circuit 655 switches the terminal from the output terminal 655B to the output terminal 655A.

In step S648, the signal processing circuit 656 reads image data for one frame from the frame memory 653 via the terminal 654B selected by the SW circuit 654, i.e., the image data obtained by the previous signal processing, and performs signal processing on the image data according to the selected command at the rate of ×N equal to the number N of commands.

The resulting image data is then supplied to the SW circuit 655. Since the output terminal 655A is selected by the SW circuit 655 in step S647, the image data supplied to the SW circuit 655 is output to the frame memory 652 via the output terminal 655A.

In step S649, the frame memory 652 stores the image data supplied from the signal processing circuit 656 via the SW circuit 655, and outputs the stored image data to the synthesizer 607.

In step S650, it is determined whether image data of the subsequent frame has been supplied to the frame memory 651. If it is determined in step S650 that the subsequent frame has been supplied to the frame memory 651, the process returns to step S632 in which the frame memory 651 stores the image data therein, and processing similar to that described above is repeated. In this case, none of the commands forming the command sequence has been selected.

If it is determined in step S650 that the subsequent frame has not been supplied to the frame memory 651, the process is completed.

As discussed above, one of a plurality of commands forming a command sequence is selected, and the LSI 606 switches the internal structure according to the selected command, and performs the signal processing corresponding to the selected command on the image data. Then, the LSI 606 switches the internal structure according to a new command, and performs signal processing corresponding to the new command on the image data obtained by the previous signal processing. Accordingly, a plurality of functions can be easily implemented by using a single unit of hardware.

Figure 57:
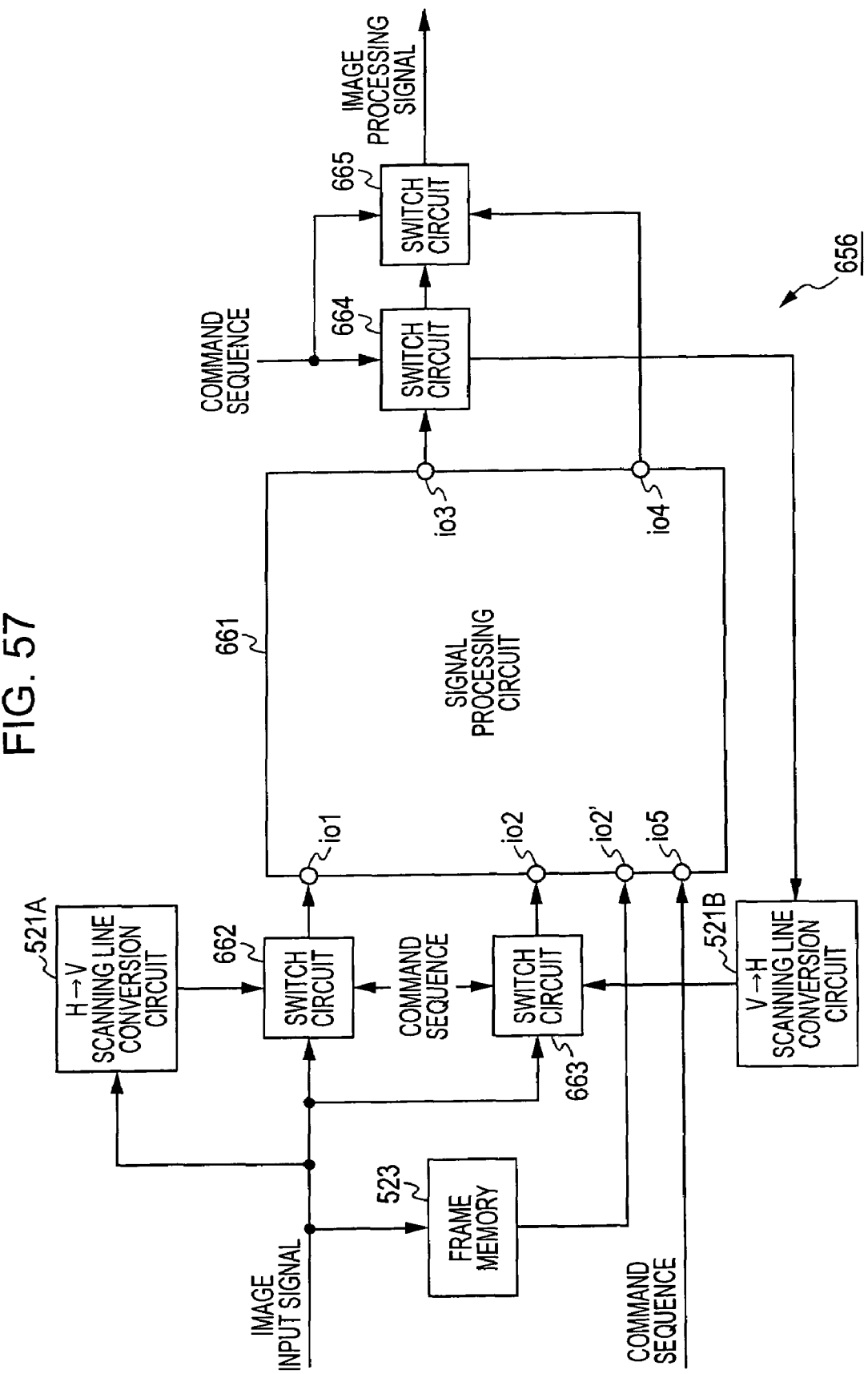
FIG. 57 is a block diagram illustrating an example of the configuration of a signal processing circuit of the LSI shown in FIG. 55.

FIG. 57 illustrates an example of the configuration of the signal processing circuit 656 shown in FIG. 55.

Image data from the SW circuit 654 is supplied to a scanning-line conversion circuit 521A. A scanning-line conversion circuit 521B converts the scanning direction of the received image data and supplies the image data to a switch circuit 662.

Image data processed in a signal processing circuit 661 is supplied from a switch circuit 664 to the scanning-line conversion circuit 521B. The scanning-line conversion circuit 521B converts the scanning direction of the received image data and supplies the image data to a switch circuit 663.

Image data from the SW circuit 654 is supplied to a frame memory 523. The frame memory 523 delays the image data for one frame by storing the image data, and supplies the delayed image data to a terminal io2' of the signal processing circuit 661.

The signal processing circuit 661 includes terminals io1, io2, io2', io3, io4, and io5. Image data from the switch circuit 662 is supplied to the terminal io1. Image data from the switch circuit 663 is supplied to the terminal io2. Image data from the frame memory 523 is supplied to the terminal io2'. The terminals io3 and io4 output image data obtained by performing signal processing in the signal processing circuit 661 to the switch circuit 664 and a switch circuit 665, respectively. A command sequence from the receiver 650 is supplied to the terminal io5.

The signal processing circuit 661 switches the internal structure thereof according to the command sequence supplied to the terminal io5, performs signal processing on the image data supplied to the terminals io1, io2, or io2', and outputs the resulting data via the terminal io3 or io4.

The command sequence from the receiver 650 is supplied to the switch circuit 662. Image data from the SW circuit 654 and image data from the scanning-line conversion circuit 521A are also supplied to the switch circuit 662. The switch circuit 662 selects the image data from the SW circuit 654 or from the scanning-line conversion circuit 521A according to the command sequence from the receiver 650, and supplies the selected image data to the terminal io1 of the signal processing circuit 661.

The command sequence from the receiver 650 is supplied to the switch circuit 663. Image data from the SW circuit 654 and image data from the scanning-line conversion circuit 521B are also supplied to the switch circuit 663. The switch circuit 663 selects the image data from the SW circuit 654 or from the scanning-line conversion circuit 521B according to the command sequence from the receiver 650, and supplies the selected image data to the terminal io2 of the signal processing circuit 661.

The command sequence from the receiver 650 is supplied to the switch circuit 664. Image data from the terminal io3 of the signal processing circuit 661 is also supplied to the switch circuit 664. The switch circuit 664 selects the switch circuit 665 or the scanning-line conversion circuit 521B according to the command sequence from the receiver 650, and supplies the image data from the terminal io3 to the selected circuit.

The command sequence from the receiver 650 is supplied to the switch circuit 665. Image data from the switch circuit 664 and image data from the terminal io4 of the signal processing circuit 661 are also supplied to the switch circuit 665. The switch circuit 665 selects the image data from the switch circuit 664 or the image data from the terminal io4 of the signal processing circuit 661 according to the command sequence from the receiver 650, and supplies the selected image data to the SW circuit 655.

Figure 58:
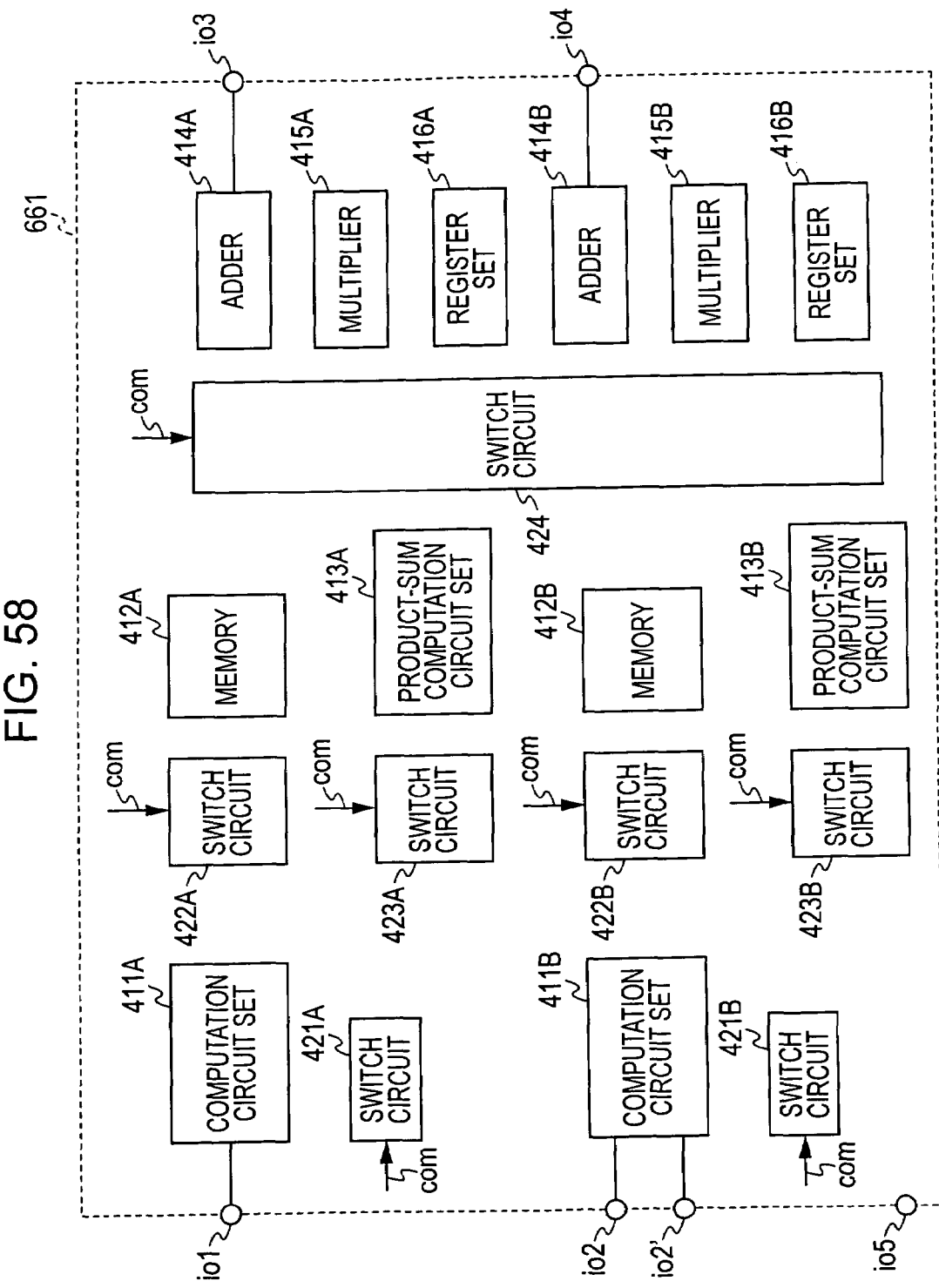
FIG. 58 is a block diagram illustrating an example of the configuration of a signal processing circuit of the signal processing circuit shown in FIG. 57.

FIG. 58 illustrates an example of the configuration of the signal processing circuit 661 shown in FIG. 57.

The signal processing circuit 661 is provided with, not only the terminals io1, io2, io2', io3, io4, and io5, but also a power supply terminal, although it is not shown.

In FIG. 58, the signal processing circuit 661 includes computation circuit sets 411A and 411B, memory devices 412A and 412B, product-sum computation circuit sets 413A and 413B, adders 414A and 414B, multipliers 415A and 415B, and register sets 416A and 416B.

Switch circuits for switching the connection states of the input and output of the circuits or circuit sets, or the connection states between the circuit sets and the circuits, or the connection states of the circuits within the circuit sets are provided within the signal processing circuit 661.

In other words, the flow of digital signals within the signal processing circuit 661 and the functions of the circuit sets can be controlled by control signals. More specifically, switch circuits 421A and 421B are disposed in association with the computation circuit sets 411A and 411B, respectively. Switch circuits 422A and 422B are disposed in association with the memory devices 412A and 412B, respectively. Switch circuits 423A and 423B are disposed in association with the product-sum computation sets 413A and 413B, respectively. A switch circuit 424 is disposed in association with the adders 414A and 414B, the multipliers 415A and 415B, and the register sets 416A and 416B.

The command sequence com is supplied to the switch circuits 421A, 421B, 422A, 422B, 423A, 423B, and 424 from the terminal io5. The switch circuits 421A and 421B switch the connection between the computation circuit sets 411A and 411B. The switch circuits 422A and 422B switch the connection between the memory devices 412A and 412B. The switch circuits 423A and 423B switch the connection between the product-sum computation circuit sets 413A and 413B. The switch circuit 424 switches the connection between the adders 414A and 414B, between the multipliers 415A and 415B, and between the register sets 416A and 416B. By this switching operation, the internal structure of the signal processing circuit 661 is switched.

Figure 59:
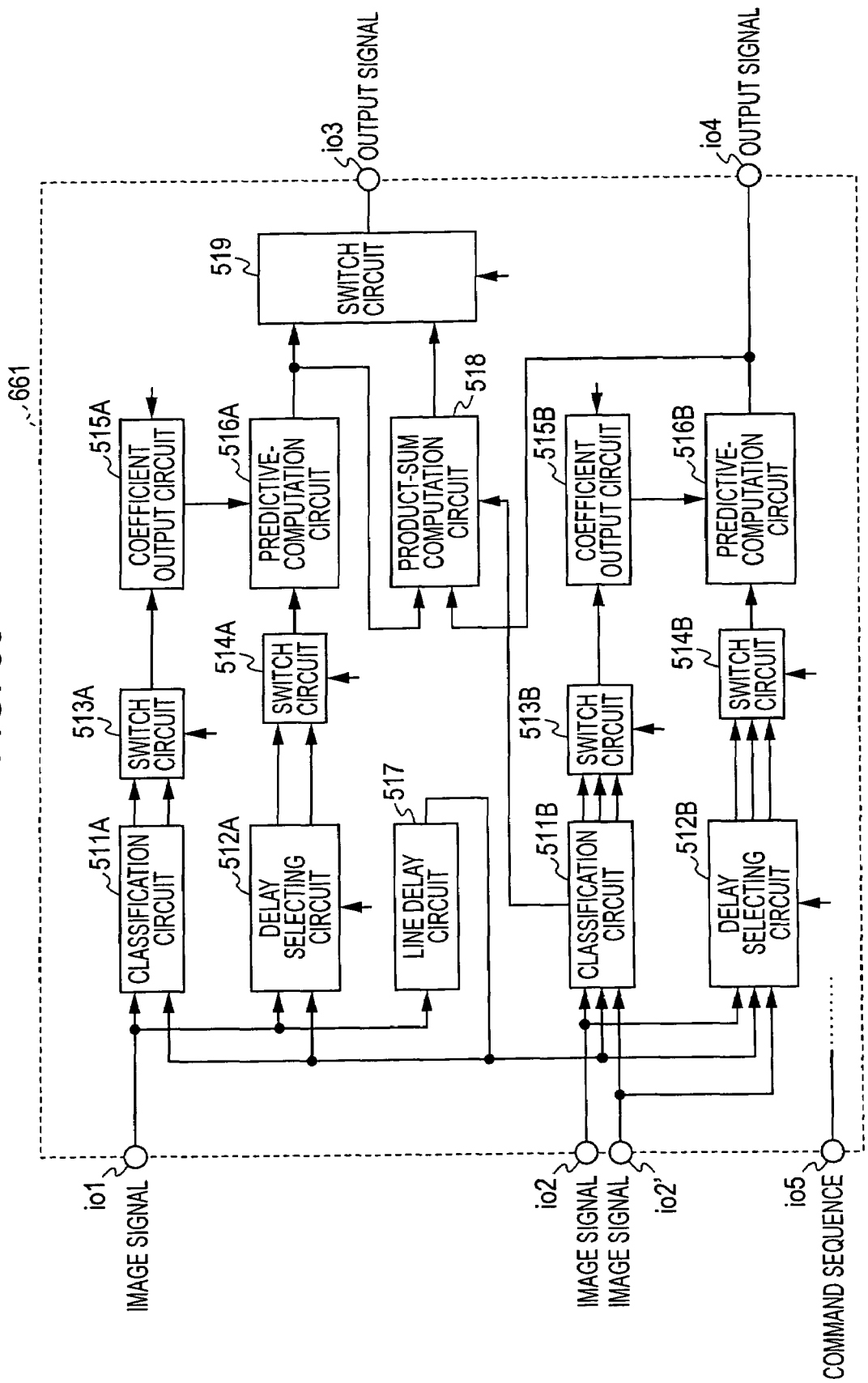
FIG. 59 is a block diagram illustrating another example of the configuration of the signal processing circuit shown in FIG. 57.

FIG. 59 illustrates another example of the configuration of the signal processing circuit 661 shown in FIG. 57.

Image data from the terminal io1 is supplied to a classification circuit 511A, a delay selecting circuit 512A, and a line delay circuit 517.

The classification circuit 511A corresponds to the tap selector 13 and the classification circuit 14 shown in FIG. 1. The classification circuit 511A selects several pixels from the image data from the terminal io1 or image data from the line delay circuit 517, performs classification by using the selected pixels as class taps, and supplies the resulting class code to a switch circuit 513A.

The classification circuit 511A may select a plurality of linear pixels or two-dimensional pixels as the class taps. The linear pixels include, for example, pixels arranged in the horizontal direction or in the vertical direction. The two-dimensional pixels include, for example, pixels within a rectangular area consisting of X pixels in the horizontal direction and Y pixels in the vertical direction around a certain pixel.

Accordingly, the classification circuit 511A may perform classification by using a plurality of linear pixels or two-dimensional pixels as the class taps. Classification using a plurality of linear pixels as class taps is hereinafter referred to as "linear classification". Classification using a plurality of two-dimensional pixels as class taps is hereinafter referred to as "two-dimensional classification".

Class taps may be formed of a plurality of three-dimensional pixels. Three-dimensional pixels include, for example, pixels in a rectangular-parallelepiped area consisting of X pixels in the horizontal direction, Y pixels in the vertical direction, T pixels in the time direction. Classification using a plurality of three-dimensional pixels as class taps is hereinafter referred to as "three-dimensional classification".

The classification circuit 511A performs linear classification and two-dimensional classification, and supplies two resulting class codes to the switch circuit 513A.

The delay selecting circuit 512A corresponds to the tap selector 12 shown in FIG. 1. The delay selecting circuit 512A selects several pixels from the image data from the terminal io1 or the image data from the line delay circuit 517, and supplies the selected pixels to a switch circuit 514A as predictive taps.

The delay selecting circuit 512A may select a plurality of linear pixels or two-dimensional pixels as the predictive taps. Predictive taps formed of linear pixels are referred to as "linear predictive taps", and predictive taps formed of two-dimensional pixels are referred to as "two-dimensional predictive taps".

The predictive taps may be formed of three-dimensional pixels, and predictive taps formed of three-dimensional pixels are hereinafter referred to as "three-dimensional predictive taps".

The delay selecting circuit 512A obtains linear predictive taps and two-dimensional predictive taps, and supplies them to the switch circuit 514A.

The delay selecting circuit 512A delays the linear predictive taps and the two-dimensional predictive taps by a predetermined time to adjust the timing of supplying the resulting predictive taps and a tap coefficient to a predictive-computation circuit 516A.

The switch circuit 513A selects one of the output terminals for outputting two class codes from the classification circuit 511A according to the command sequence from the terminal io5, and connects the selected output terminal to a coefficient output circuit 515A. As a result, one of the class code obtained by linear classification or the class code obtained by two-dimensional classification is supplied from the classification circuit 511A to the coefficient output unit 515A via the switch circuit 513A.

The switch circuit 514A selects one of the output terminals for outputting two predictive taps from the delay selecting circuit 512A according to the command sequence from the terminal io5, and connects the selected output terminal to the predictive-computation circuit 516A. As a result, the linear predictive taps or the two-dimensional predictive taps are supplied from the delay selecting circuit 512A to the predictive-computation circuit 516A via the switch circuit 514A.

The coefficient output circuit 515A corresponds to the coefficient output unit 15 shown in FIG. 1, and stores several different types of tap coefficients obtained by learning. The coefficient output circuit 515A selects several tap coefficients according to the command sequence from the terminal io5, reads, among such tap coefficients, the tap coefficient corresponding to the class code supplied from the classification circuit 511A via the switch circuit 513A, and supplies the tap coefficient to the predictive-computation circuit 516A.

The coefficient output circuit 515A stores tap coefficients used for linear predictive taps and tap coefficients used for two-dimensional predictive taps, and also stores tap coefficients used for linear classification and tap coefficients used for two-dimensional classification. In this manner, the coefficient output circuit 515A stores a plurality of patterns of tap coefficients, and an explanation thereof is omitted.

The predictive-computation circuit 516A corresponds to the predictive-computation unit 16 shown in FIG. 1. The predictive-computation circuit 516A computes equation (1) by using the predictive tap supplied from the delay selecting circuit 512A via the switch circuit 514A and the tap coefficient supplied from the coefficient output circuit 515A, and supplies the computation result to a product-sum computation circuit 518 and a switch circuit 519 as the value of the selected pixel.

The computation of the predictive tap and the tap coefficient according to equation (1) is equivalent to computation by using a finite impulse response (FIR) filter. Accordingly, the computation of equation (1) by using a linear predictive tap, a two-dimensional predictive tap, or a three-dimensional predictive tap is hereinafter referred to as "linear filter computation", "two-dimensional filter computation", or "three-dimensional filter computation", respectively.

A classification circuit 511B, a delay selecting circuit 512B, switch circuits 513B and 514B, a coefficient output circuit 515B, and a predictive-computation circuit 516B are configured similarly to the classification circuit 511A, the delay selecting circuit 512A, the switch circuits 513A and 514A, the coefficient output circuit 515A, and the predictive-computation circuit 516A, respectively. The connection state of the classification circuit 511B, the delay selecting circuit 512B, the switch circuits 513B and 514B, the coefficient output circuit 515B, and the predictive-computation circuit 516B is similar to that of the classification circuit 511A, the delay selecting circuit 512A, the switch circuits 513A and 514A, the coefficient output circuit 515A, and the predictive-computation circuit 516A.

Image data from the terminal io2, image data from the terminal io2', and image data from the line delay circuit 517 are supplied to the classification circuit 511B and the delay selecting circuit 512B.

The classification circuit 511B selects pixels from the received image data as class taps, and performs linear classification, two-dimensional classification, and three-dimensional classification based on the class taps. The classification circuit 511B then supplies three class codes obtained by performing the three types of classification to the switch circuit 513B.

The classification circuit 511B detects the motion of the image data supplied from the terminal io2 or io2', and supplies information concerning the detected motion to the product-sum computation circuit 518.

The delay selecting circuit 512B selects several pixels from the received image data to form linear predictive taps, two-dimensional predictive taps, and three-dimensional predictive taps, and supplies those taps to the switch circuit 514B.

The switch circuit 513B selects one of the three class codes from the classification circuit 511B according to the command sequence from the terminal io5, and supplies the selected class code to the coefficient output circuit 515B.

The switch circuit 514B selects one of the three types of predictive taps from the delay selecting circuit 512B according to the command sequence from the terminal io5, and supplies the selected predictive taps to the predictive-computation circuit 516B.

As in the coefficient output circuit 515A, the coefficient output circuit 515B stores several different types of tap coefficients. The coefficient output circuit 515B selects tap coefficients of the type according to the command sequence from the terminal io5, reads, among such tap coefficients, the tap coefficient corresponding to the class of the class code supplied from the classification circuit 511B via the switch circuit 513B, and supplies the read tap coefficient to the predictive-computation circuit 516B.

The predictive-computation circuit 516B computes equation (1) by using the predictive taps supplied from the delay selecting circuit 512B via the switch circuit 514B and the tap coefficient supplied from the coefficient output circuit 515B, and supplies the computation result to the terminal io4 and the product-sum computation circuit 518 as the value of the selected pixel.

The line delay circuit 517, which is formed of a memory, delays image data from the terminal io1 by one to several lines and supplies the delayed image data to the classification circuits 511A and 511B and the delay selecting circuits 512A and 512B.

The product-sum computation circuit 518 performs weighting addition of the outputs from the predictive-computation circuits 516A and 516B by using the motion information supplied from the classification circuit 511B as a weight, and supplies the addition result to the switch circuit 519.

The switch circuit 519 selects one of the output from the predictive-computation circuit 516A and the output from the product-sum computation circuit 518 according to the command sequence from the terminal io5, and supplies the selected output to the terminal io3.

As stated above, in FIG. 59, the classification circuits 511A and 511B correspond to the tap selector 13 and the classification unit 14, respectively, shown in FIG. 1. The delay selecting circuits 512A and 512B correspond to the tap selector 12 shown in FIG. 1. The coefficient output circuits 515A and 515B correspond to the coefficient output unit 15 shown in FIG. 1. The predictive-computation circuits 516A and 516B correspond to the predictive-computation unit 16 shown in FIG. 1.

Accordingly, in the classification circuit 511A, the delay selecting circuit 512A, the coefficient output circuit 515A, and the predictive-computation circuit 516A, image conversion processing as classification adaptive processing is performed by using the image data from the terminal io1 and the image data from the line delay circuit 517 as the first image data, and the resulting image data output from the predictive-computation circuit 516A serves as the second image data.

Also, in the classification circuit 511B, the delay selecting circuit 512B, the coefficient output circuit 515B, and the predictive-computation circuit 516B, image conversion processing as classification adaptive processing is performed by using the image data from the terminal io2, the image data from the terminal io2', and the image data from the line delay circuit 517 as the first image data, and the resulting image data output from the predictive-computation circuit 516B serves as the second image data.

Figure 60:
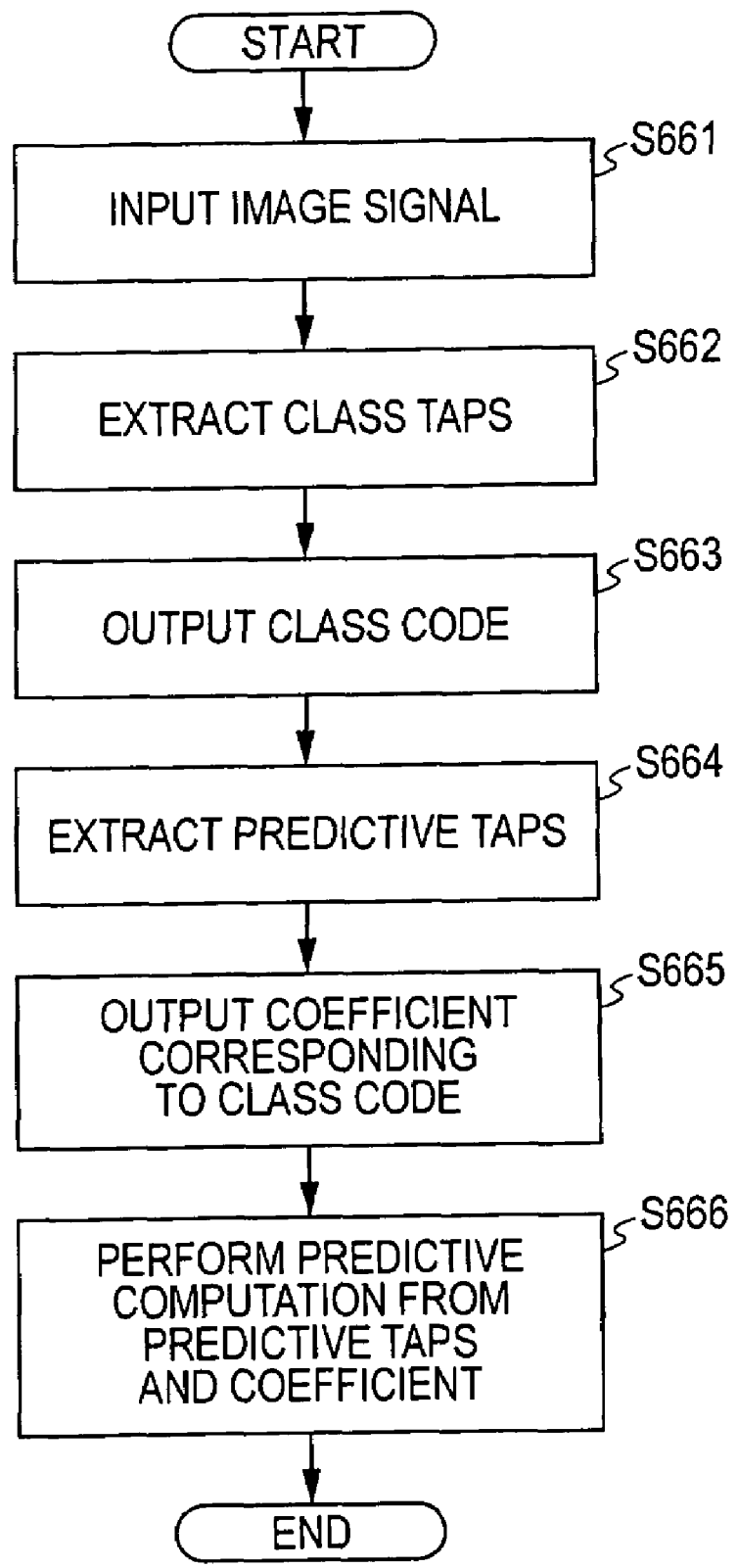
FIG. 60 is a flowchart illustrating image conversion processing as classification adaptive processing performed by the signal processing circuit shown in FIG. 59.

A description is now given, with reference to the flowchart of FIG. 60, of image conversion processing as classification adaptive processing performed in the classification circuits 511A and 511B, the delay selecting circuits 512A and 512B, the switch circuits 513A and 513B, 514A and 514B, the coefficient output circuits 515A and 515B, and the predictive-computation circuits 516A and 516B.

Hereinafter, the classification circuits 511A and 511B are collectively referred to as the "classification circuit 511", the delay selecting circuits 512A and 512B are collectively referred to as the "delay selecting circuit 512", the switch circuits 513A and 513B are collectively referred to as the "switch circuit 513", the switch circuits 514A and 514B are collectively referred to as the "switch circuit 514", the coefficient output circuits 515A and 515B are collectively referred to as the "coefficient output circuit 515", and the predictive-computation circuits 516A and 516B are collectively referred to as the "predictive-computation circuit 516".

In step S661, image data is input into the classification circuit 511 and the delay selecting circuit 512. The image data input into the classification circuit 511 and the delay selecting circuit 512 is the first image data in classification adaptive processing, and the first image data is converted into the second image data.

One of the unselected pixels is selected from the second image data. Then, in step S662, the classification circuit 511 selects (extracts) pixels for the selected pixel as class taps from the first image data. In step S663, the classification circuit 511 classifies the selected pixel based on the class taps, and outputs the resulting class code to the coefficient output circuit 515 via the switch circuit 513.

In step S664, the delay selecting circuit 512 selects (extracts) pixels for the selected pixel as predictive taps from the first image data, and supplies the selected pixels to the predictive-computation circuit 516.

In step S665, the coefficient output circuit 515 outputs the tap coefficient corresponding to the class code output from the classification circuit 511 in step S663 to the predictive-computation circuit 516.

Then, in step S666, the predictive-computation circuit 516 executes computation (filter computation) according to equation (1) by using the predictive taps from the delay selecting circuit 512 and the tap coefficient from the coefficient output circuit 515, and outputs the computation result as the value of the selected pixel. The process is then completed.

All the pixels forming the second image data are sequentially used to execute steps S662 through S666 of FIG. 60.

The processing performed by the signal processing circuit 656 shown in FIG. 57 including the signal processing circuit 661 shown in FIG. 59 is as follows.

The button A of the remote controller 618 shown in FIG. 49 is operated, and then, the A-button command sequence 641 containing a linear spatial-resolution creation command shown in FIG. 54A is received by the receiver 650 shown in FIG. 55 and is then supplied to the signal processing circuit 656 shown in FIG. 57.

The A-button command sequence 641 supplied to the signal processing circuit 656 is output to the switch circuits 662 through 665 and the terminal io5 of the signal processing circuit 661.

The switch circuit 662 selects the output from the scanning-line conversion circuit 521A according to the linear spatial-resolution creation command contained in the A-button command sequence 641, and connects the output to the terminal io1 of the signal processing circuit 661. The switch circuit 663 selects the output from the scanning-line conversion circuit 521B according to the linear spatial-resolution creation command contained in the A-button command sequence 641, and connects the output to the terminal io2 of the signal processing circuit 661.

The switch circuit 664 selects the input into the scanning-line conversion circuit 521B according to the linear spatial-resolution creation command contained in the A-button command sequence 641, and connects the terminal io3 of the signal processing circuit 661 to the scanning-line conversion circuit 521B. The switch circuit 665 selects the terminal io4 of the signal processing circuit 661 according to the linear spatial-resolution creation command contained in the A-button command sequence 641, and connects the terminal io4 to the switch circuit 655 shown in FIG. 55.

The switch circuits 513A, 513B, 514A, 514B, and 519 of the signal processing circuit 661 switch the selection states of the signal lines (connection states of the individual blocks) according to the linear spatial-resolution creation command to perform linear spatial-resolution creation processing.

The linear spatial-resolution creation processing is spatial-resolution creation processing by using linear predictive taps.

Figure 61:
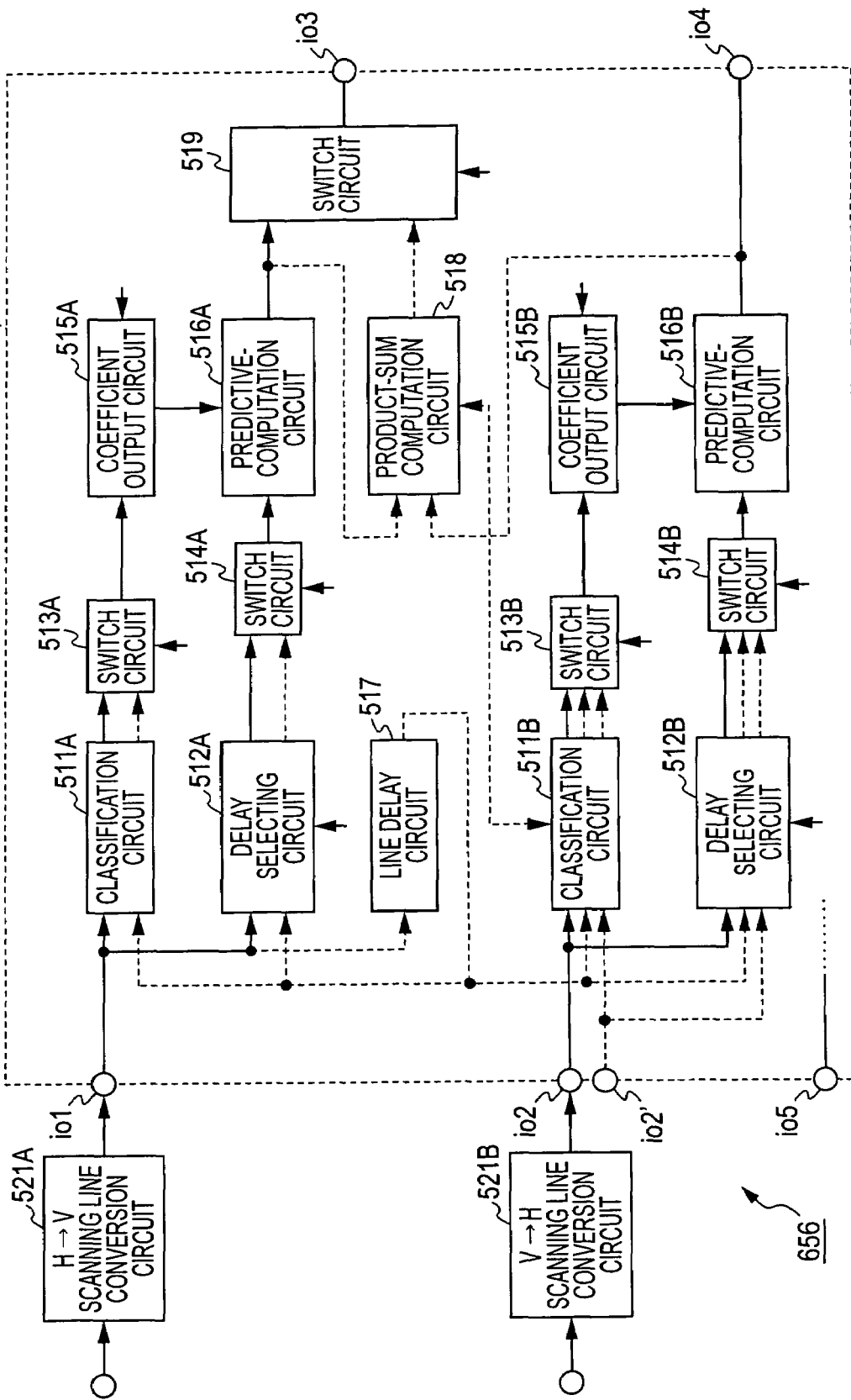
FIG. 61 is a block diagram illustrating the internal structure of the signal processing circuit shown in FIG. 57 containing the signal processing circuit shown in FIG. 59 in which the selection states of signal lines are switched to perform linear spatial-resolution creation processing.

FIG. 61 illustrates the signal processing circuit 656 shown in FIG. 57 including the signal processing circuit 661 in which the selection states of the signal lines are switched to perform linear spatial-resolution creation processing.

In FIG. 61, the switch circuits 513A and 531B, 514A and 514B, and 519 of the signal processing circuit 661 switch the selection states of the signal lines, as indicated by the solid lines in FIG. 61, according to the linear spatial-resolution creation command in the A-button command sequence 641, thereby performing linear spatial-resolution creation processing.

The signal lines indicated by the broken lines in FIG. 61 are signal lines that are not used for signal processing in the current signal processing circuit 661 although they are physically disposed.

In FIG. 61, the frame memory 523 and the switch circuits 662 through 665 in FIG. 57 are not shown.

In the signal processing circuit 656 shown in FIG. 61, linear spatial-resolution creation processing for converting standard-resolution image data (hereinafter referred to as "SD image data") as the first image data in the classification adaptive processing into high-resolution image data (hereinafter referred to as "HD image data") as the second image data in the classification adaptive processing is performed by doubling the numbers of pixels of the first image data both in the horizontal direction and in the vertical direction.

In this example, the number of pixels of the SD image data (first image data) in the vertical direction is doubled, and then, the number of pixels of the SD image data in the horizontal direction is doubled, thereby resulting in the HD image data (second image data) having the number of pixels four times as large as that of the SD image.

In FIG. 61, SD image data is supplied to the scanning-line conversion circuit 521A. In the scanning-line conversion circuit 521A, the scanning direction of the SD image data is converted from horizontal scanning (television raster scanning order) to vertical scanning.

The resulting SD image data is then supplied to the terminal io1 of the signal processing circuit 661, and is further supplied to the classification circuit 511A and the delay selecting circuit 512A.

The classification circuit 511A selects class taps from the SD image data output from the terminal io1, and performs linear classification based on the selected class taps. The classification circuit 511A then supplies the resulting class code to the coefficient output circuit 515A via the switch circuit 513A.

The coefficient output circuit 515A stores a plurality of types of tap coefficients including at least tap coefficients for linear spatial-resolution creation processing, and selects the tap coefficients for linear spatial-resolution creation processing according to the linear spatial-resolution creation command contained in the A-button command sequence 641 supplied form the terminal io5. The coefficient output circuit 515A then selects the tap coefficient corresponding to the class of the class code supplied from the classification circuit 511A via the switch circuit 513A and supplies the selected tap coefficient to the predictive-computation circuit 516A.

Meanwhile, the delay selecting circuit 512A selects linear predictive taps from the SD image data output from the terminal io1, and supplies the linear predictive taps to the predictive-computation circuit 516A via the switch circuit 514A.

The predictive-computation circuit 516A performs linear filter computation according to equation (1) by using the pixels of the SD image data as the linear predictive taps supplied from the delay selecting circuit 512A via the switch circuit 514A and the tap coefficient supplied from the coefficient output circuit 515A, thereby determining and outputting the pixel value of the image data having the number of pixels in the vertical direction twice as large as that of the original SD image data.

The image data output from the predictive-computation circuit 516A is output from the terminal io3 via the switch circuit 519, and is supplied to the scanning-line conversion circuit 521B via the switch circuit 664 shown in FIG. 57.

In the scanning-line conversion circuit 521B, the scanning direction of the image data is converted from vertical scanning to horizontal scanning (television scanning raster direction). The converted image data is then supplied to the terminal io2, and is then supplied to the classification circuit 511B and the delay selecting circuit 512B.

The classification circuit 511B selects class taps from the image data output from the terminal io2, and performs linear classification based on the selected class taps. The classification circuit 511B then supplies the resulting class code to the coefficient output circuit 515B via the switch circuit 513B.

The coefficient output circuit 515B stores a plurality of types of tap coefficients including at least tap coefficients for linear spatial-resolution creation processing, and selects the tap coefficients for linear spatial-resolution creation processing according to the linear spatial-resolution creation command contained in the A-button command sequence 641 supplied form the terminal io5. The coefficient output circuit 515B then selects the tap coefficient corresponding to the class of the class code supplied from the classification circuit 511B via the switch circuit 513B and supplies the selected tap coefficient to the predictive-computation circuit 516B.

Meanwhile, the delay selecting circuit 512B selects linear predictive taps from the image data output from the terminal io2, and supplies the linear predictive taps to the predictive-computation circuit 516B via the switch circuit 514B.

The predictive-computation circuit 516B performs linear filter computation according to equation (1) by using the pixels of the image data as the linear predictive taps supplied form the delay selecting circuit 512B via the switch circuit 514B and the tap coefficient supplied from the coefficient output circuit 515B, thereby determining and outputting the pixel value of the HD image data having the numbers of pixels twice as large as that of the original image data both in the vertical direction and in the horizontal direction.

The image data output from the predictive-computation circuit 516B is output from the terminal io4, and is supplied to the switch circuit 655 shown in FIG. 55 via the switch circuit 665 shown in FIG. 57.

A description is now given of the processing when the button A of the remote controller 618 shown in FIG. 49 is operated, and when the A-button command sequence 641 containing a two-dimensional spatial-resolution creation command shown in FIG. 54B is received by the receiver 650 shown in FIG. 55 and is then supplied to the signal processing circuit 656 shown in FIG. 57.

The A-button command sequence 642 supplied to the signal processing circuit 656 is output to the switch circuits 662 through 665 and the terminal io5 of the signal processing circuit 661.

The switch circuit 662 selects the output from the scanning-line conversion circuit 521A according to the two-dimensional spatial-resolution creation command contained in the A-button command sequence 642, and connects the output to the terminal io1 of the signal processing circuit 661. The switch circuit 663 selects the output from the scanning-line conversion circuit 521B according to the two-dimensional spatial-resolution creation command contained in the A-button command sequence 642, and connects the output to the terminal io2 of the signal processing circuit 661.

The switch circuit 664 selects the input into the scanning-line conversion circuit 521B according to the two-dimensional spatial-resolution creation command contained in the A-button command sequence 642, and connects the terminal io3 of the signal processing circuit 661 to the scanning-line conversion circuit 521B. The switch circuit 665 selects the terminal io4 of the signal processing circuit 661 according to the two-dimensional spatial-resolution creation command contained in the A-button command sequence 642, and connects the terminal io4 to the switch circuit 655 shown in FIG. 55.

The switch circuits 513A, 513B, 514A, 514B, and 519 of the signal processing circuit 661 switch the selection states of the signal lines according to the two-dimensional spatial-resolution creation command to perform two-dimensional spatial-resolution creation processing.

The two-dimensional spatial-resolution creation processing is spatial-resolution creation processing by using two-dimensional predictive taps.

Figure 62:
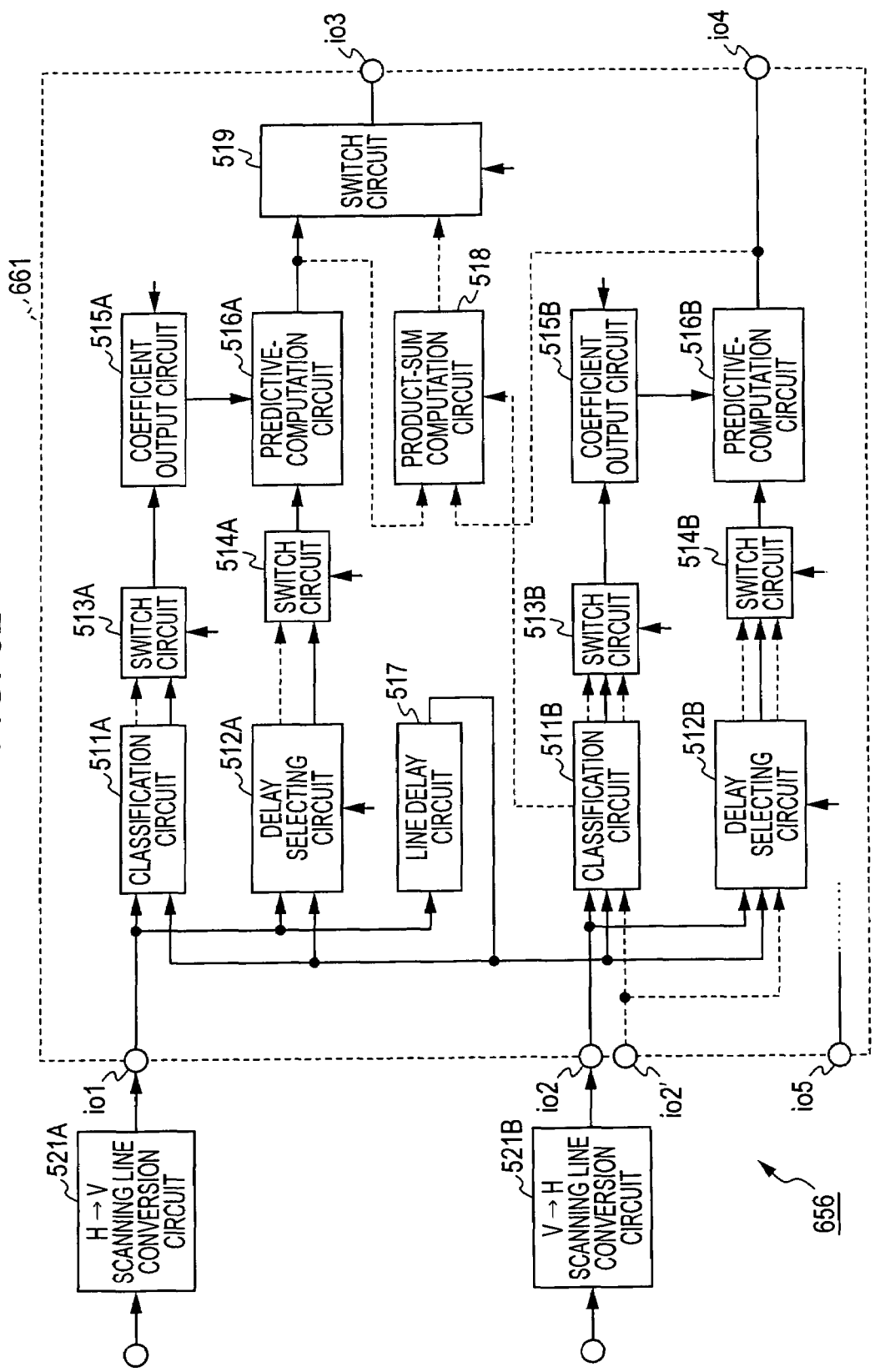
FIG. 62 is a block diagram illustrating the internal structure of the signal processing circuit shown in FIG. 57 containing the signal processing circuit shown in FIG. 59 in which the selection states of signal lines are switched to perform two-dimensional spatial-resolution creation processing.

FIG. 62 illustrates the signal processing circuit 656 shown in FIG. 57 including the signal processing circuit 661 in which the selection states of the signal lines are switched to perform two-dimensional spatial-resolution creation processing.

In FIG. 62, the switch circuits 513A and 531B, 514A and 514B, and 519 of the signal processing circuit 661 switch the selection states of the signal lines, as indicated by the solid lines in FIG. 62, according to the two-dimensional spatial-resolution creation command in the A-button command sequence 642, thereby performing two-dimensional spatial-resolution creation processing.

The signal lines indicated by the broken lines in FIG. 62 are signal lines that are not used for signal processing in the current signal processing circuit 661 although they are physically disposed.

In FIG. 62, the frame memory 523 and the switch circuits 662 through 665 in FIG. 57 are not shown.

In the signal processing circuit 656 shown in FIG. 62, two-dimensional spatial-resolution creation processing for converting SD image data as the first image data in the classification adaptive processing into HD image data as the second image data in the classification adaptive processing is performed by doubling the numbers of pixels of the first image data both in the horizontal direction and in the vertical direction. In FIG. 62, two-dimensional classification processing is performed by using two-dimensional predictive taps.

In this example, the number of pixels of the SD image data (first image data) in the vertical direction is doubled, and then, the number of pixels of the image data in the horizontal direction is doubled, thereby resulting in the HD image data (second image data) having the number of pixels four times as great as that of the SD image.

In FIG. 62, SD image data is supplied to the scanning-line conversion circuit 521A. In the scanning-line conversion circuit 521A, the scanning direction of the SD image data is converted from horizontal scanning to vertical scanning.

The resulting SD image data is then supplied to the terminal io1 of the signal processing circuit 661, and is further supplied to the classification circuit 511A, the delay selecting circuit 512A, and the line delay circuit 517.

The line delay circuit 517 delays the SD image data by one or several lines and supplies the delayed SD image data to the classification circuits 511A and 511B and the delay selecting circuits 512A and 512B.

The classification circuit 511A selects class taps from the SD image data output from the terminal io1 and the SD image data from the line delay circuit 517, and performs two-dimensional classification based on the selected class taps. The classification circuit 511A then supplies the resulting class code to the coefficient output circuit 515A via the switch circuit 513A.

The coefficient output circuit 515A stores a plurality of types of tap coefficients including at least tap coefficients for two-dimensional spatial-resolution creation processing, and selects the tap coefficients for two-dimensional spatial-resolution creation processing according to the linear spatial-resolution creation command contained in the A-button command sequence 642 supplied form the terminal io5. The coefficient output circuit 515A then selects the tap coefficient corresponding to the class of the class code supplied from the classification circuit 511A via the switch circuit 513A and supplies the selected tap coefficient to the predictive-computation circuit 516A.

Meanwhile, the delay selecting circuit 512A selects two-dimensional predictive taps from the SD image data output from the terminal io1 and the SD image data from the line delay circuit 517, and supplies the two-dimensional predictive taps to the predictive-computation circuit 516A via the switch circuit 514A.

The predictive-computation circuit 516A performs two-dimensional filter computation according to equation (1) by using the pixels of the SD image data as the two-dimensional predictive taps supplied form the delay selecting circuit 512A via the switch circuit 514A and the tap coefficient supplied from the coefficient output circuit 515A, thereby determining and outputting the pixel value of the image data having the number of pixels in the vertical direction twice as large as that of the original SD image data.

The image data output from the predictive-computation circuit 516A is output from the terminal io3 via the switch circuit 519, and is supplied to the scanning-line conversion circuit 521B via the switch circuit 664 shown in FIG. 57.

In the scanning-line conversion circuit 521B, the scanning direction of the image data is converted from vertical scanning to horizontal scanning (television scanning raster direction). The converted image data is then supplied to the terminal io2, and is then supplied to the classification circuit 511B and the delay selecting circuit 512B.

The classification circuit 511B selects class taps from the image data output from the terminal io2 and the image data output from the line delay circuit 517, and performs two-dimensional classification based on the selected class taps. The classification circuit 511B then supplies the resulting class code to the coefficient output circuit 515B via the switch circuit 513B.

The coefficient output circuit 515B stores a plurality of types of tap coefficients including at least tap coefficients for two-dimensional spatial-resolution creation processing, and selects the tap coefficients for two-dimensional spatial-resolution creation processing according to the two-dimensional spatial-resolution creation command contained in the A-button command sequence 642 supplied form the terminal io5. The coefficient output circuit 515B then selects the tap coefficient corresponding to the class of the class code supplied from the classification circuit 511B via the switch circuit 513B and supplies the selected tap coefficient to the predictive-computation circuit 516B.

Meanwhile, the delay selecting circuit 512B selects two-dimensional predictive taps from the image data output from the terminal io2 and the image data output from the line delay circuit 517, and supplies the two-dimensional predictive taps to the predictive-computation circuit 516B via the switch circuit 514B.

The predictive-computation circuit 516B performs two-dimensional filter computation according to equation (1) by using the pixels of the image data as the two-dimensional predictive taps supplied form the delay selecting circuit 512B via the switch circuit 514B and the tap coefficient supplied from the coefficient output circuit 515B, thereby determining and outputting the pixel value of the HD image data having the numbers of pixels twice as large as that of the original image data both in the vertical direction and in the horizontal direction.

The image data output from the predictive-computation circuit 516B is output from the terminal io4, and is supplied to the switch circuit 655 shown in FIG. 55 via the switch circuit 665 shown in FIG. 57.

A description is now given of the processing when the button B of the remote controller 618 shown in FIG. 49 is operated, and when the B-button command sequence 643 containing a noise removing command shown in FIG. 54C is received by the receiver 650 shown in FIG. 55 and is then supplied to the signal processing circuit 656 shown in FIG. 57.

The B-button command sequence 643 supplied to the signal processing circuit 656 is output to the switch circuits 662 through 665 and the terminal io5 of the signal processing circuit 661.

The switch circuit 662 selects the input into the signal processing circuit 656 according to the noise removing command contained in the B-button command sequence 643, and connects the input to the terminal io1 of the signal processing circuit 661. The switch circuit 663 also selects the input into the signal processing circuit 656 according to the noise removing command contained in the B-button command sequence 643, and connects the input to the terminal io2 of the signal processing circuit 661.

The switch circuit 664 selects the input into the switch circuit 665 according to the noise removing command contained in the B-button command sequence 643, and connects the terminal io3 of the signal processing circuit 661 to the switch circuit 665. The switch circuit 665 selects the output from the switch circuit 664 according to the noise removing command contained in the B-button command sequence 643, and connects the output to the switch circuit 655 shown in FIG. 55.

The switch circuits 513A, 513B, 514A, 514B, and 519 of the signal processing circuit 661 switch the selection states of the signal lines according to the noise removing command to perform noise removing processing.

The noise removing processing is performed by adding the processing result of two-dimensional noise removing processing and the processing result of three-dimensional noise removing processing according to the motion of the image. The two-dimensional noise removing processing and the three-dimensional noise removing processing are noise removing processing by using two-dimensional predictive taps and three-dimensional predictive taps, respectively. If the image contains motion, two-dimensional noise removing processing is effective. If the image contains no (very small) motion, three-dimensional noise removing processing is effective.

Figure 63:
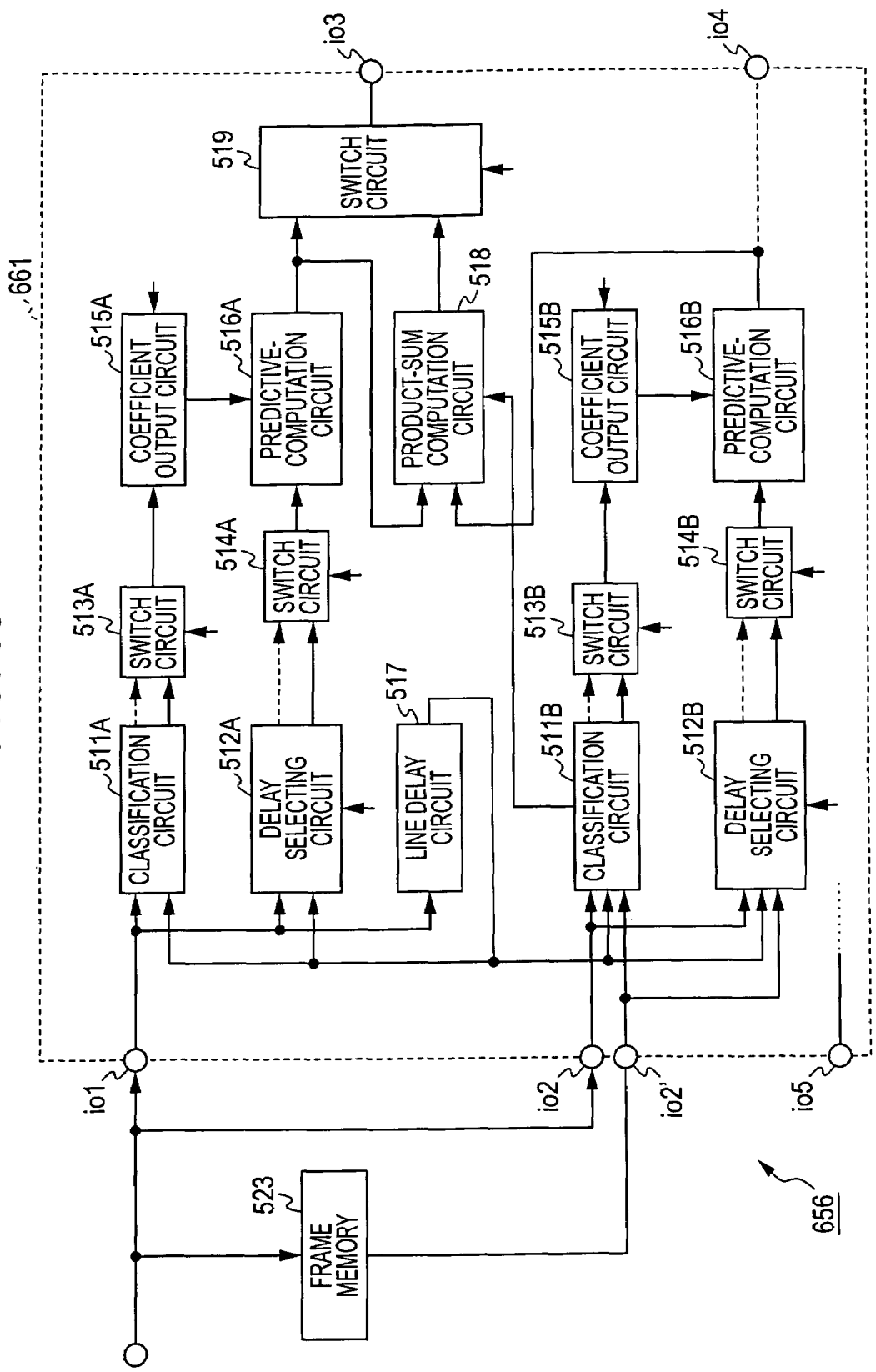
FIG. 63 is a block diagram illustrating the internal structure of the signal processing circuit shown in FIG. 57 containing the signal processing circuit shown in FIG. 59 in which the selection states of signal lines are switched to perform noise removing processing.

FIG. 63 illustrates the signal processing circuit 656 shown in FIG. 57 including the signal processing circuit 661 in which the selection states of the signal lines are switched to perform noise removing processing.

In FIG. 63, the switch circuits 513A and 531B, 514A and 514B, and 519 of the signal processing circuit 661 switch the selection states of the signal lines, as indicated by the solid lines in FIG. 63, according to the noise removing command contained in the B-button command sequence 643, thereby performing noise removing processing.

The signal lines indicated by the broken lines in FIG. 63 are signal lines that are not used for signal processing in the current signal processing circuit 661 although they are physically disposed.

In FIG. 63, the scanning-line conversion circuits 521A and 521B and the switch circuits 662 through 665 in FIG. 57 are not shown.

In the signal processing circuit 656 shown in FIG. 63, two-dimensional noise removing processing and three-dimensional noise removing processing for converting the first image data into the second image data in classification adaptive processing by improving the S/N ratio is performed.

Then, the processing result of the two-dimensional noise removing processing and the processing result of the three-dimensional noise removing processing are added according to the motion of the image, thereby obtaining image data with high S/N ratio as the final signal processing result.

In FIG. 63, image data input into the signal processing circuit 656 is supplied to the fame memory 523 and the terminals io1 and io2 of the signal processing circuit 661.

The frame memory 523 delays the image data by one frame (or one field) by storing the image data therein, and supplied the delayed image data to the terminal io2' of the signal processing circuit 661.

The frame of the image data supplied to the terminals io1 and io2 is referred to as the "current frame". The frame, which is one frame before the current frame, of the image data supplied to the terminal io2' from the frame memory 523 is referred to as the "previous frame".

The image data of the current frame supplied to the terminal io1 is output to the classification circuit 511A, the delay selecting circuit 512A, and the line delay circuit 517. The image data of the current frame supplied to the terminal io2 is output to the classification circuit 511B and the delay selecting circuit 512B. The image data of the previous frame supplied to the terminal io2' is output to the classification circuit 511B and the delay selecting circuit 512B.

The line delay circuit 517 delays the image data of the current frame by one or several lines and supplies the delayed image data to the classification circuits 511A and 511B and the delay selecting circuits 512A and 512B.

The classification circuit 511A selects class taps from the image data output from the terminal io1 and the image data from the line delay circuit 517, and performs two-dimensional classification based on the selected class taps. The classification circuit 511A then supplies the resulting class code to the coefficient output circuit 515A via the switch circuit 513A.

The coefficient output circuit 515A stores a plurality of types of tap coefficients including at least tap coefficients for two-dimensional noise removing processing, and selects the tap coefficients for two-dimensional noise removing processing according to the noise removing command contained in the B-button command sequence 643 supplied form the terminal io5. The coefficient output circuit 515A then selects the tap coefficient corresponding to the class of the class code supplied from the classification circuit 511A via the switch circuit 513A and supplies the selected tap coefficient to the predictive-computation circuit 516A.

Meanwhile, the delay selecting circuit 512A selects two-dimensional predictive taps from the image data output from the terminal io1 and the image data from the line delay circuit 517, and supplies the two-dimensional predictive taps to the predictive-computation circuit 516A via the switch circuit 514A.

The predictive-computation circuit 516A performs two-dimensional filter computation according to equation (1) by using the pixels of the image data as the two-dimensional predictive taps supplied form the delay selecting circuit 512A via the switch circuit 514A and the tap coefficient supplied from the coefficient output circuit 515A, thereby determining and outputting the pixel value of the image data of the current frame subjected to two-dimensional noise removing processing. The image data is then output to the product-sum computation circuit 518.

Meanwhile, the classification circuit 511B selects class taps from the image data of the current frame from the terminal io2, the image data of the current frame from the line delay circuit 517, and the image data of the previous frame from the terminal io2', and performs three-dimensional classification based on the class taps. The classification circuit 511B supplies the resulting class code to the coefficient output circuit 515B via the switch circuit 513B.

The classification circuit 511B also detects the motion of the image data of the current frame from the image data of the current frame from the terminal io2, the image data of the current frame from the line delay circuit 517, and the image data of the previous frame from the terminal io2', and supplies motion information K concerning the motion of the image to the product-sum computation circuit 118.

To detect the motion of the image data by the classification circuit 511B, the gradient method may be employed. In this method, the difference between a pixel in the current frame and the corresponding frame in the previous frame in a motion area and gradient information (sampling difference in the horizontal direction and line difference in the vertical direction) are used to determine the amount of motion.

More specifically, according to the gradient method, the frame difference $\Delta F$ (difference between the value of a pixel in the current frame and the value of the corresponding pixel in the previous frame) and the sampling difference $\Delta E$ (difference between the value of a pixel in the current frame and the value of the left-adjacent pixel) are determined. From the accumulative value $\Sigma|\Delta F|$ of the absolute values $|\Delta F|$ of the frame differences $\Delta F$ in a motion area and the accumulative value $\Sigma|\Delta E|$ of the absolute values $|\Delta E|$ of the sampling differences $\Delta E$, the magnitude $|v1|$ of the horizontal components v1 of the motion is determined from equation $|v1|=\Sigma|\Delta F|/\Sigma|\Delta E|$. The direction (left or right) of the horizontal components v1 of the motion is determined by the relationship between the polarity of the frame difference $\Delta F$ and the polarity of the sampling difference $\Delta E$. The vertical components v2 of the motion can be determined in a manner similar to the horizontal components v1.

The classification circuit 511B determines the motion of the image from the horizontal components v1 and the vertical components v2 of the motion, and supplies information concerning the magnitude of the motion represented by a predetermined number of bits to the product-sum computation circuit 118 as the motion information K.

The classification circuit 511B may perform classification using the horizontal components v1 and the vertical components v2 of the motion rather than three-dimensional classification.

The coefficient output unit 515B stores a plurality of types of tap coefficients including tap coefficients for three-dimensional noise removing processing, and selects the tap coefficients for three-dimensional noise removing processing according to the noise removing command contained in the B-button command sequence 643 supplied from the terminal io5. The coefficient output circuit 515B then reads the tap coefficient corresponding to the class of the class code supplied from the classification circuit 511B via the switch circuit 513B and supplies the read tap coefficient to the predictive-computation circuit 516B.

The delay selecting circuit 512B selects three-dimensional predictive taps from the image data of the current frame from the terminal io2, the image data of the current frame of the line delay circuit 517, and the image data of the previous frame from the terminal io2', and supplies the predictive taps to the predictive-computation circuit 516B via the switch circuit 514B.

The predictive-computation circuit 516B executes three-dimensional filter computation according to equation (1) by using the pixels of the image data as the three-dimensional predictive taps supplied from the delay selecting circuit 512B via the switch circuit 514B and the tap coefficient supplied from the coefficient output circuit 515B, thereby obtaining the pixel value of the image data of the current frame subjected to three-dimensional noise removing processing. The pixel of the image data is then output to the product-sum computation circuit 518.

The product-sum computation circuit 518 performs weighting addition of the image data of the current frame subjected to the two-dimensional noise removing processing and output from the predictive-computation circuit 516A and the image data of the current frame subjected to the three-dimensional noise removing processing and output from the predictive-computation circuit 516B by using the motion information K supplied from the classification circuit 511B as a weighting coefficient.

That is, when the image data of the current frame subjected to two-dimensional noise removing processing and the image data of the current frame subjected to three-dimensional noise removing processing are represented by P2 and P3, respectively, and when the motion information K ranges from 0 to 1, the product-sum computation circuit 518 determines the image data P as the final noise removing processing result according to the equation $P=K\times P2+(1-K)\times P3$.

The image data output from the product-sum computation circuit 518 is output from the terminal io3 via the switch circuit 519, and is further supplied to the switch circuit 655 via the switch circuits 664 and 665.

A description is now given of processing when the button C of the remote controller 618 shown in FIG. 49 is operated and when the C-button command sequence 644 containing a linear spatial-resolution creation command and a noise removing command shown in FIG. 54D is received by the receiver 650 shown in FIG. 55 and supplied to the signal processing circuit 656 shown in FIG. 57.

The C-button command sequence 644 supplied to the signal processing circuit 656 is further supplied to the switch circuits 662 through 665 and the terminal io5 of the signal processing circuit 661.

The switch circuit 662 selects the output from the scanning-line conversion circuit 521A according to the linear spatial-resolution creation command contained in the C-button command sequence 644, and connects the output to the terminal io1 of the signal processing circuit 661. The switch circuit 663 selects the output from the scanning-line conversion circuit 521B according to the linear spatial-resolution creation command contained in the C-button command sequence 644, and connects the output to the terminal io2 of the signal processing circuit 661.

The switch circuit 664 selects the input into the scanning-line conversion circuit 521B according to the linear spatial-resolution creation command contained in the C-button command sequence 644, and connects the terminal io3 of the signal processing circuit 661 to the scanning-line conversion circuit 521B. The switch circuit 665 selects the terminal io4 of the signal processing circuit 661 according to the linear spatial-resolution creation command contained in the C-button command sequence 644, and connects the terminal io4 to the switch circuit 655 shown in FIG. 55.

The switch circuits 513A, 513B, 514A, 514B, and 519 of the signal processing circuit 661 switch the selection states of the signal lines according to the linear spatial-resolution creation command contained in the C-button command sequence 644 to perform linear spatial-resolution creation processing.

That is, the switch circuits 513A, 513B, 514A, 514B, and 519 of the signal processing circuit 661 switch the selection states of the signal lines, as indicated by the solid lines shown in FIG. 61, according to the linear spatial-resolution creation command contained in the C-button command sequence 644.

Accordingly, in the signal processing circuit 656, linear spatial-resolution creation processing is performed on image data input into the signal processing circuit 656, and image data obtained with improved spatial resolution is output from the terminal io4 and is supplied to the switch circuit 655 via the switch circuit 665.

Figure 56:
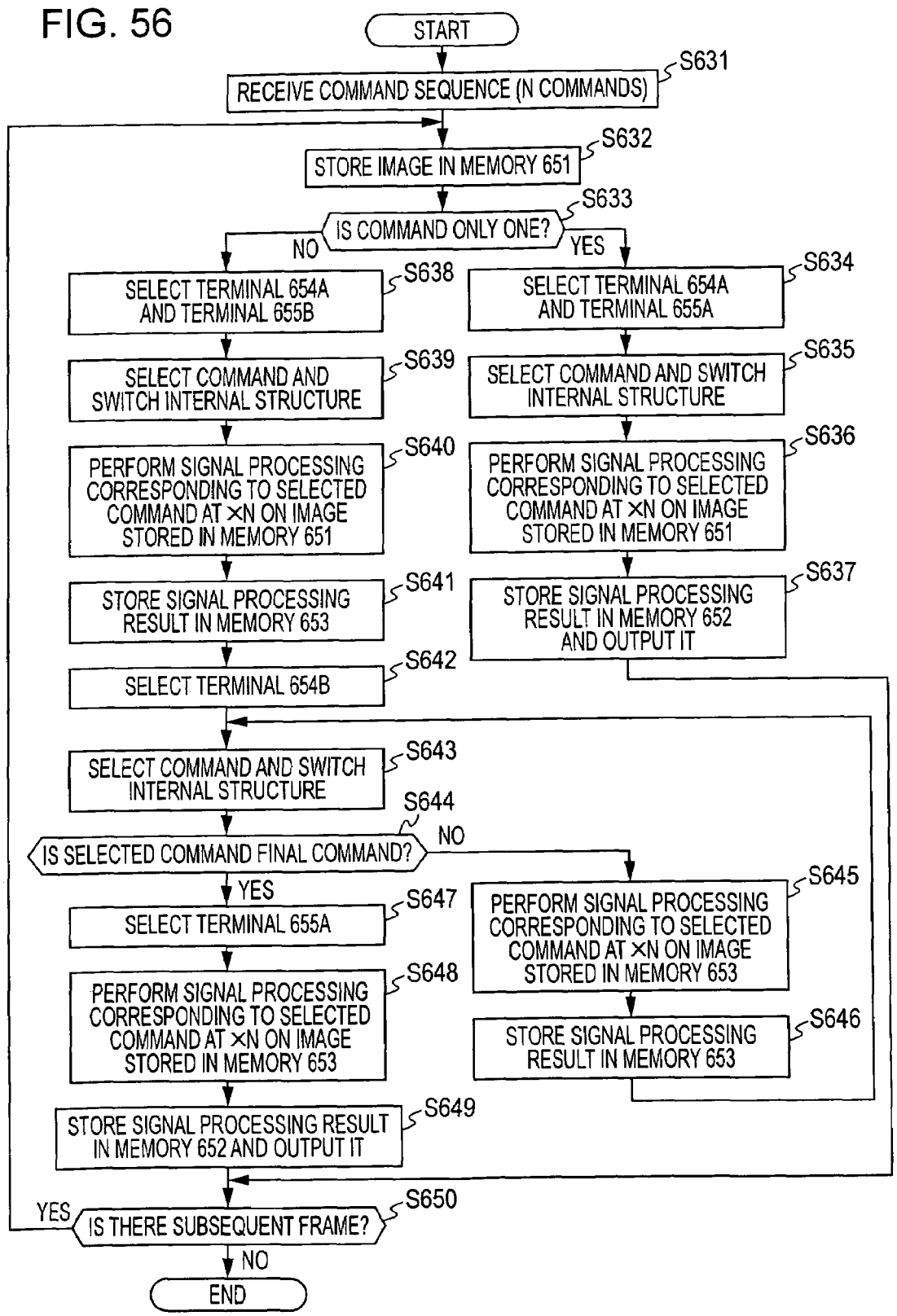
FIG. 56 is a flowchart illustrating processing performed by the LSI.

According to the processing indicated by the flowchart of FIG. 56, when linear spatial-resolution creation processing corresponding to the linear spatial-resolution creation command contained in the C-button command sequence 644 is performed in the LSI 606 shown in FIG. 55, the switch circuit 655 supplies the image data output from the signal processing circuit 656 to the frame memory 653 and stores it therein. The switch circuit 654 supplies the image data stored in the frame memory 653 to the signal processing circuit 656.

Accordingly, the image data obtained by performing linear spatial-resolution creation processing in the signal processing circuit 656 is re-input into the signal processing circuit 656 via the switch circuit 665, the frame memory 653, and the switch circuit 654.

Then, in the signal processing circuit 656 shown in FIG. 57, the switch circuit 662 selects the input into the signal processing circuit 656 according to the noise removing command contained in the C-button command sequence 644, and connects the input to the terminal io1 of the signal processing circuit 661. The switch circuit 663 also selects the input into the signal processing circuit 656 according to the noise removing command contained in the C-button command sequence 644, and connects the input to the terminal io2 of the signal processing circuit 661.

The switch circuit 664 selects the input into the signal processing circuit 656 according to the noise removing command contained in the C-button command sequence 644, and connects the terminal io3 of the signal processing circuit 661 to the switch circuit 665. The switch circuit 665 selects the output from the switch circuit 664 according to the noise removing command contained in the C-button command sequence 644, and connects the output to the switch circuit 655.

The switch circuits 513A, 513B, 514A, 514B, and 519 of the signal processing circuit 661 switch the selection states of the signal lines according to the noise removing command contained in the C-button command sequence 644.

That is, the switch circuits 513A, 513B, 514A, 514B, and 519 of the signal processing circuit 661 switch the selection states of the signal lines, as indicated by the solid lines in FIG. 63, according to the noise removing command contained in the C-button command sequence 644.

Accordingly, in the signal processing circuit 656, noise removing processing is performed on the image data with improved spatial resolution subjected to linear spatial-resolution creation processing and re-input into the signal processing circuit 656. Then, the image data with improved S/N ratio is output from the terminal io3, and is supplied to the switch circuit 655 via the switch circuits 664 and 665.

According to the processing indicated by the flowchart of FIG. 56, when noise removing processing corresponding to the noise removing command in the C-button command sequence 644 is performed in the LSI 606 shown in FIG. 55, the switch circuit 655 supplies the image data from the signal processing circuit 656 to the synthesizer 607 shown in FIG. 48 via the frame memory 652.

Accordingly, image data with improved spatial resolution and higher S/N ratio is supplied to the synthesizer 607.

A description is now given of processing when the button D of the remote controller 618 shown in FIG. 49 is operated and when the D-button command sequence 645 containing a two-dimensional spatial-resolution creation command and a noise removing command shown in FIG. 54E is received by the receiver 650 shown in FIG. 55 and supplied to the signal processing circuit 656 shown in FIG. 57.

The D-button command sequence 645 supplied to the signal processing circuit 656 is further supplied to the switch circuits 662 through 665 and the terminal io5 of the signal processing circuit 661.

The switch circuit 662 selects the output from the scanning-line conversion circuit 521A according to the two-dimensional spatial-resolution creation command contained in the D-button command sequence 645, and connects the output to the terminal io1 of the signal processing circuit 661. The switch circuit 663 selects the output from the scanning-line conversion circuit 521B according to the two-dimensional spatial-resolution creation command contained in the D-button command sequence 645, and connects the output to the terminal io2 of the signal processing circuit 661.

The switch circuit 664 selects the input into the scanning-line conversion circuit 521B according to the two-dimensional spatial-resolution creation command contained in the D-button command sequence 645, and connects the terminal io3 of the signal processing circuit 661 to the scanning-line conversion circuit 521B. The switch circuit 665 selects the terminal io4 of the signal processing circuit 661 according to the two-dimensional spatial-resolution creation command contained in the D-button command sequence 645, and connects the terminal io4 to the switch circuit 655 shown in FIG. 55.

The switch circuits 513A, 513B, 514A, 514B, and 519 of the signal processing circuit 661 switch the selection states of the signal lines according to the two-dimensional spatial-resolution creation command contained in the D-button command sequence 645 to perform two-dimensional spatial-resolution creation processing.

That is, the switch circuits 513A, 513B, 514A, 514B, and 519 of the signal processing circuit 661 switch the selection states of the signal lines, as indicated by the solid lines shown in FIG. 62, according to the two-dimensional spatial-resolution creation command contained in the D-button command sequence 645.

Accordingly, in the signal processing circuit 656, two-dimensional spatial-resolution creation processing is performed on image data input into the signal processing circuit 656, and image data obtained with improved spatial resolution is output from the terminal io4 and is supplied to the switch circuit 655 via the switch circuit 665.

According to the processing indicated by the flowchart of FIG. 56, when two-dimensional spatial-resolution creation processing corresponding to the two-dimensional spatial-resolution creation command contained in the D-button command sequence 645 is performed in the LSI 606 shown in FIG. 55, the switch circuit 655 supplies the image data output from the signal processing circuit 656 to the frame memory 653 and stores it therein. The switch circuit 654 supplies the image data stored in the frame memory 653 to the signal processing circuit 656.

Accordingly, the image data obtained by performing two-dimensional spatial-resolution creation processing in the signal processing circuit 656 is re-input into the signal processing circuit 656 via the switch circuit 665, the frame memory 653, and the switch circuit 654.

Then, in the signal processing circuit 656 shown in FIG. 57, the switch circuit 662 selects the input into the signal processing circuit 656 according to the noise removing command contained in the D-button command sequence 645, and connects the input to the terminal io1 of the signal processing circuit 661. The switch circuit 663 also selects the input into the signal processing circuit 656 according to the noise removing command contained in the D-button command sequence 645, and connects the input to the terminal io2 of the signal processing circuit 661.

The switch circuit 664 selects the input into the signal processing circuit 665 according to the noise removing command contained in the D-button command sequence 645, and connects the terminal io3 of the signal processing circuit 661 to the switch circuit 665. The switch circuit 665 selects the output from the switch circuit 664 according to the noise removing command contained in the D-button command sequence 645, and connects the output to the switch circuit 655.

The switch circuits 513A, 513B, 514A, 514B, and 519 of the signal processing circuit 661 switch the selection states of the signal lines according to the noise removing command contained in the D-button command sequence 645 to perform noise removing processing.

That is, the switch circuits 513A, 513B, 514A, 514B, and 519 of the signal processing circuit 661 switch the selection states of the signal lines, as indicated by the solid lines in FIG. 63, according to the noise removing command contained in the D-button command sequence 644.

Accordingly, in the signal processing circuit 656, noise removing processing is performed on the image data with improved spatial resolution subjected to two-dimensional spatial-resolution creation processing and re-input into the signal processing circuit 656. Then, the image data with improved S/N ratio is output from the terminal io3, and is supplied to the switch circuit 655 via the switch circuits 664 and 665.

According to the processing indicated by the flowchart of FIG. 56, when noise removing processing corresponding to the noise removing command in the D-button command sequence 645 is performed in the LSI 606 shown in FIG. 55, the switch circuit 655 supplies the image data from the signal processing circuit 656 to the synthesizer 607 shown in FIG. 48 via the frame memory 652.

Accordingly, image data with improved spatial resolution and higher S/N ratio is supplied to the synthesizer 607.

As is seen from the foregoing description, in the LSI 606, when a command sequence consists of a plurality of commands, for example, first and second commands, first signal processing is executed after switching the internal structure of the LSI 606 to the state in which the first signal processing corresponding to the first command is performed, and then, second signal processing is executed after switching the internal structure of the LSI 606 to the state in which the second signal processing corresponding to the second command is performed. Thus, in the LSI 606, a plurality of functions can be easily implemented by using a single unit of hardware.

A fourth embodiment of the present invention is described below.

Figure 64:
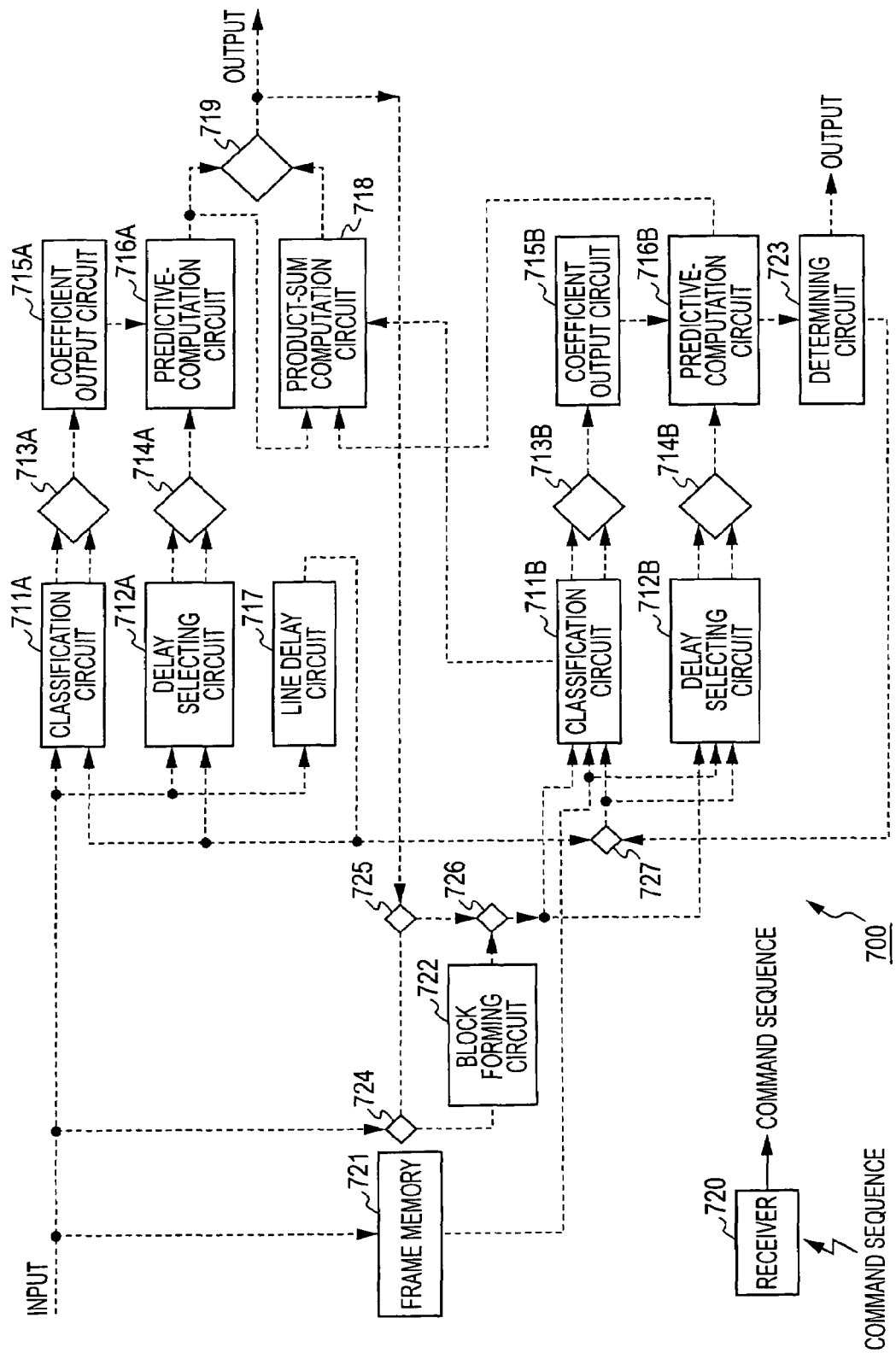
FIG. 64 is a block diagram illustrating an example of the configuration of an IC according to a fourth embodiment of the present invention.

FIG. 64 illustrates an example of the configuration of an IC 700 constructed in accordance with the fourth embodiment of the present invention. The IC 700 may be used instead of the LSI 606 in the television receiver shown in FIG. 48.

The IC 700 receives a command sequence consisting of at least one command supplied from an external source, for example, from the controller 613 shown in FIG. 48, and switches the reconfigurable internal structure according to each of the commands of the command sequence.

If the command sequence consists of a plurality of commands, for example, first and second commands, the IC 700 performs first signal processing corresponding to the first command and then performs second signal processing corresponding to the second command.

In FIG. 64, a classification circuit 711A, a delay selecting circuit 712A, switch circuits 713A and 714A, a coefficient output circuit 715A, and a predictive-computation circuit 716A are configured similarly to the classification circuit 511A, the delay selecting circuit 512A, the switch circuits 513A and 514A, the coefficient output circuit 515A, and the predictive-computation circuit 516A, respectively, shown in FIG. 59.

In FIG. 64, a classification circuit 711B, a delay selecting circuit 712B, switch circuits 713B and 714B, a coefficient output circuit 715B, and a predictive-computation circuit 716B are configured similarly to the classification circuit 511B, the delay selecting circuit 512B, the switch circuits 513B and 514B, the coefficient output circuit 515B, and the predictive-computation circuit 516B, respectively, shown in FIG. 59.

In FIG. 64, a line delay circuit 717, a product-sum computation circuit 718, and a switch circuit 719 are also configured similarly to the line delay circuit 517, the product-sum computation circuit 518, and the switch circuit 519, respectively, in FIG. 59.

The classification circuit 511B shown in FIG. 59 performs linear classification, two-dimensional classification, and three-dimensional classification, and then, the switch circuit 513B selects one of the class codes obtained by the three types of classification and outputs the selected class code to the coefficient output circuit 515B. In FIG. 64, however, the classification circuit 711B performs two-dimensional classification and three-dimensional classification, and then, the switch circuit 713B selects one of the class codes obtained by the two types of classification and outputs the selected class code to the coefficient output circuit 715B.

The delay selecting circuit 512B shown in FIG. 59 forms linear predictive taps, two-dimensional predictive taps, and three-dimensional predictive taps, and the switch circuit 514B selects one of the three types of predictive taps and supplies the selected type to the predictive-computation circuit 516B. In FIG. 64, however, the delay selecting circuit 712B forms two-dimensional predictive taps and three-dimensional predictive taps, and the switch circuit 714B selects one of the two types of predictive taps and supplies the selected type to the predictive-computation circuit 716B.

A receiver 720 receives a command sequence consisting of at least one command from an external source, for example, from the controller 613 shown in FIG. 48, and supplies the command sequence to the required blocks forming the IC 700.

Image data input into the IC 700 is supplied to a frame memory 721. The frame memory 721 delays the image data by one frame by storing the image data therein, and supplies the delayed image data to the classification circuit 711B and the delay selecting circuit 712B.

The image data input into the IC 700 (hereinafter simply referred to as the "input image data") is supplied to, not only the frame memory 721, but also the classification circuit 711A, the delay selecting circuit 712A, and a switch circuit 724.

The image data is supplied to a block forming circuit 722 from the switch circuit 724. The block forming circuit 722 extracts a rectangular block around a predetermined point (pixel) as the center (centroid) from the received image data, and outputs the extracted block to a switch circuit 726.

A determining circuit 723 receives image data obtained by performing predictive computation according to equation (1) from the predictive-computation circuit 716B. The determining circuit 723 performs determining processing, which is discussed below, on the image data supplied from the predictive-computation circuit 716B, and outputs the image data to a switch circuit 727 or to an external source as the processing result of the IC 700 based on the determination result.

The switch circuit 724 receives the input image data and image data output from a switch circuit 725. The switch circuit 724 selects the input image data or the image data from the switch circuit 725 according to the command sequence supplied from the receiver 720, and outputs the selected image data to the block forming circuit 722.

The switch circuit 724 outputs the input image data to the switch circuit 725 according to the command sequence supplied from the receiver 720.

Not only the image data output from the switch circuit 724, but also image data output from the switch circuit 719, is supplied to the switch circuit 725. The switch circuit 725 supplies the image data from the switch circuit 724 to the switch circuit 726 according to the command sequence supplied from the receiver 720.

The switch circuit 725 selects one of the switch circuits 724 and 726 according to the command sequence from the receiver 720, and outputs the image data from the switch circuit 719 to the selected switch circuit 724 or 726.

The switch circuit 726 selects the image data supplied from the block forming circuit 722 or the image data supplied from the switch circuit 725 according to the command sequence from the receiver 720, and supplies the selected image data to the classification circuit 711B and the delay selecting circuit 712B.

The switch circuit 727 receives the image data from the line delay circuit 717 and the image data from the determining circuit 723. The switch circuit 727 selects the image data from the line delay circuit 717 or the image data from the determining circuit 723 according to the command sequence from the receiver 720, and outputs the selected image data to the classification circuit 711B and the delay selecting circuit 712B.

FIGS. 65A, 65B, and 65C illustrate examples of commands forming the command sequence received by the receiver 720 shown in FIG. 64 and supplied to the required blocks of the IC 700.

In the fourth embodiment, the command sequence consists of, for example, "Kaizodo 1dimensional", "Kaizodo 2dimensional", "Kaizodo 3dimensional", "Zoom ver1", and "Zoom ver2" shown in FIG. 65A.

The command "Kaizodo 1dimensional", "Kaizodo 2dimensional", and "Kaizodo 3dimensional" are commands giving instructions to perform linear spatial-resolution creation processing, two-dimensional spatial-resolution creation processing, and three-dimensional spatial-resolution creation processing, respectively, i.e., spatial-resolution creation processing using linear predictive taps, two-dimensional predictive taps, and three-dimensional predictive taps, respectively.

The command "Zoom ver1" is a command giving an instruction to perform enlarging processing for enlarging image data at a desired scaling factor by repeatedly (recursively) resealing the image at a certain scaling factor. The command "Zoom ver2" is a command giving an instruction to perform enlarging processing for enlarging image data at a desired scaling ratio by resealing the image data only once.

The enlarging processing corresponding to the command "Zoom ver1" is hereinafter referred to as the "recursive enlarging processing", and the enlarging processing corresponding to the command "Zoom ver2" is hereinafter referred to as the "single enlarging processing".

The receiver 720 receives a command sequence consisting of at least one command from an external source and supplies the command sequence to the required blocks of the IC 700.

The receiver 720 receives, for example, the command sequence consisting of one command "Kaizodo 2dimensional" shown in FIG. 65B from an external source, and supplies the command sequence to the required blocks of the IC 700.

Alternatively, the receiver 720 receives, for example, the command sequence consisting of two commands "Kaizodo 2dimensional" and "Zoom ver1" shown in FIG. 65C from an external source, and supplies the command sequence to the required blocks of the IC 700.

Figure 66:
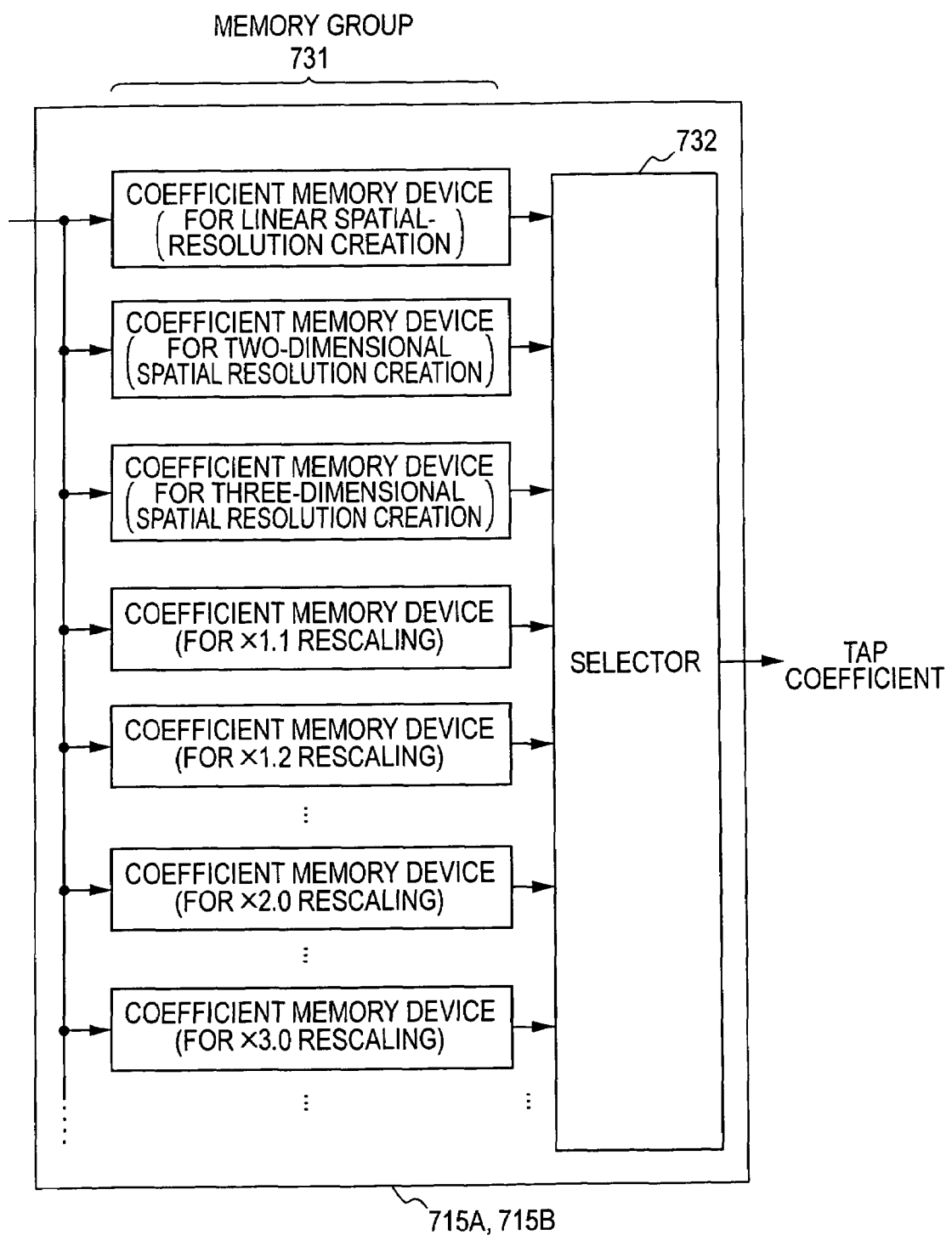
FIG. 66 is a block diagram illustrating an example of the configuration of a coefficient output circuit of the IC shown in FIG. 64.

FIG. 66 illustrates an example of the configuration of the coefficient output unit 715A shown in FIG. 64.

In FIG. 66, the coefficient output unit 715A includes a coefficient memory group 731 and a selector 732.

The coefficient memory group 731 is formed of a plurality of coefficient memory devices storing therein tap coefficients for linear spatial-resolution creation processing, tap coefficients for two-dimensional spatial-resolution creation processing, tap coefficients for three-dimensional spatial-resolution creation, and tap coefficients for resealing image data at various scaling factors, which have been determined by learning.

A class code from the classification circuit 711A via the switch circuit 713A is supplied to the coefficient memory devices of the coefficient memory group 731. The coefficient memory devices read the tap coefficients corresponding to the class of the class code and outputs them to the selector 732.

As stated above, not only the tap coefficients read from the coefficient memory devices, but also the command sequence from the receiver 720, is supplied to the selector 732. The selector 732 selects the tap coefficient from the tap coefficients supplied from the coefficient memory devices according to the command sequence from the receiver 720, and supplies the selected tap coefficient to the predictive-computation circuit 716A.

The coefficient output circuit 715B shown in FIG. 64 is configured similarly to the coefficient output circuit 715A shown in FIG. 66. It is not essential, however, that the coefficient memory devices forming the coefficient output circuits 715A and 715B are the same. That is, the tap coefficients stored in the coefficient output circuit 715A may be partially or wholly different from those stored in the coefficient output circuit 715B.

The processing performed by the IC 700 shown in FIG. 64 when a command sequence consisting of one command "Kaizodo 1dimensional" is received from an external source is described below with reference to the flowchart of FIG. 67.

In step S701, the receiver 720 receives the command sequence and supplies it to the required blocks of the IC 700.

In step S702, the IC 700 switches the internal structure thereof according to the received command sequence.

More specifically, the switch circuits 713A, 713B, 714A, 714B, 719, and 724 through 727 of the IC 700 switch the selection states of the signal lines according to the command "Kaizodo 1dimenisonal" to perform linear spatial-resolution creation processing.

Figure 68:
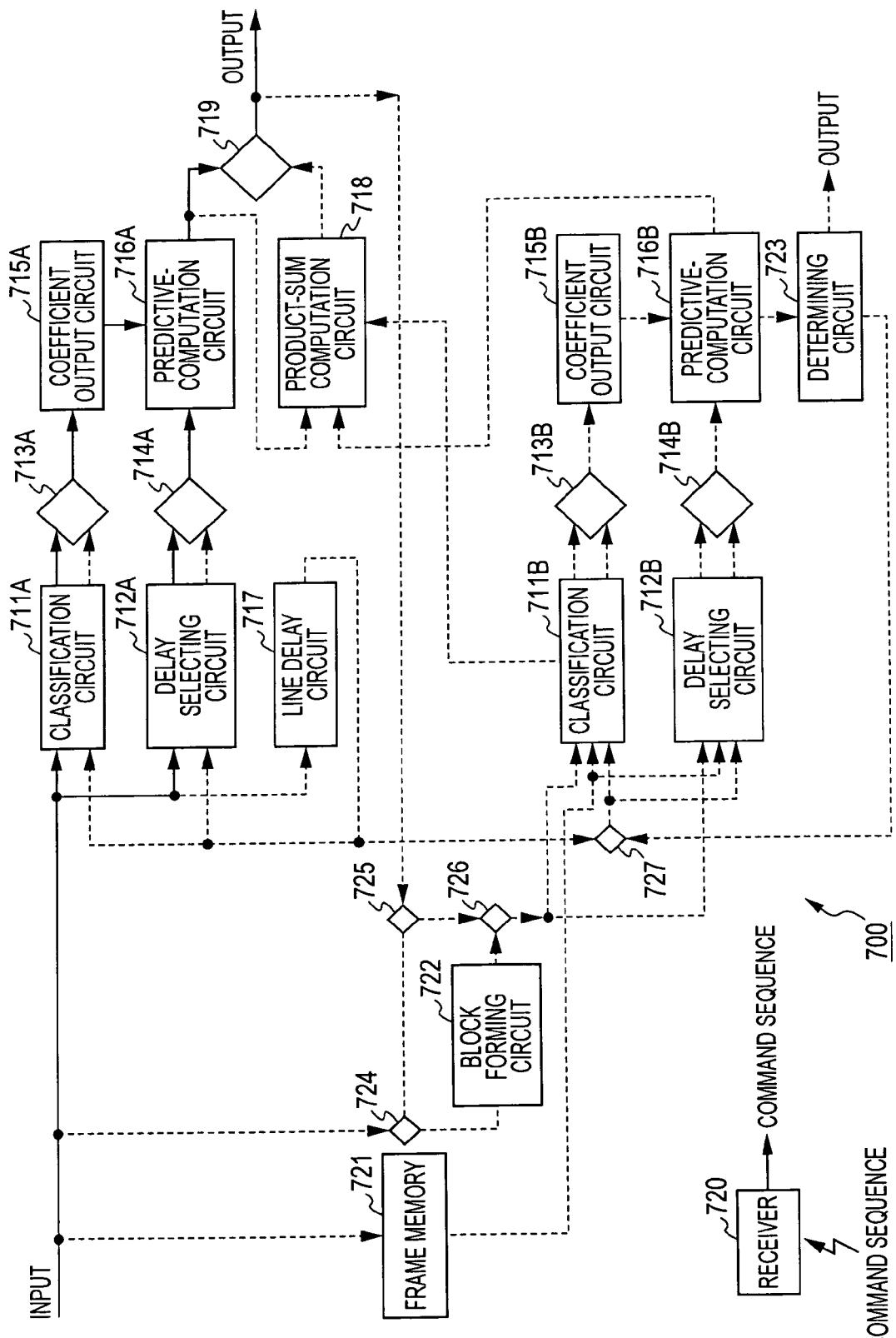
FIG. 68 is a block diagram illustrating the internal structure of the IC in which the selection states of signal lines are switched to perform linear spatial-resolution creation processing.

FIG. 68 illustrates the IC 700 in which the selection states of the signal lines are switched to perform linear spatial-resolution creation processing.

In FIG. 68, the switch circuits 713A, 713B, 714A, 714B, 719, and 724 through 727 of the IC 700 switch the selection states of the signal lines, as indicated by the solid lines in FIG.

68, according to the command "Kaizodo 1dimenisonal" to perform linear spatial-resolution creation processing.

The signal lines indicated by the broken lines in FIG. 68 are signal lines that are not used for signal processing in the current IC 700 though they are physically disposed.

In the IC 700 shown in FIG. 68, linear spatial-resolution creation processing for converting the image data input into the IC 700 as the first image data into HD image data with improved spatial resolution as the second image data in the classification adaptive processing is performed.

Figure 67:
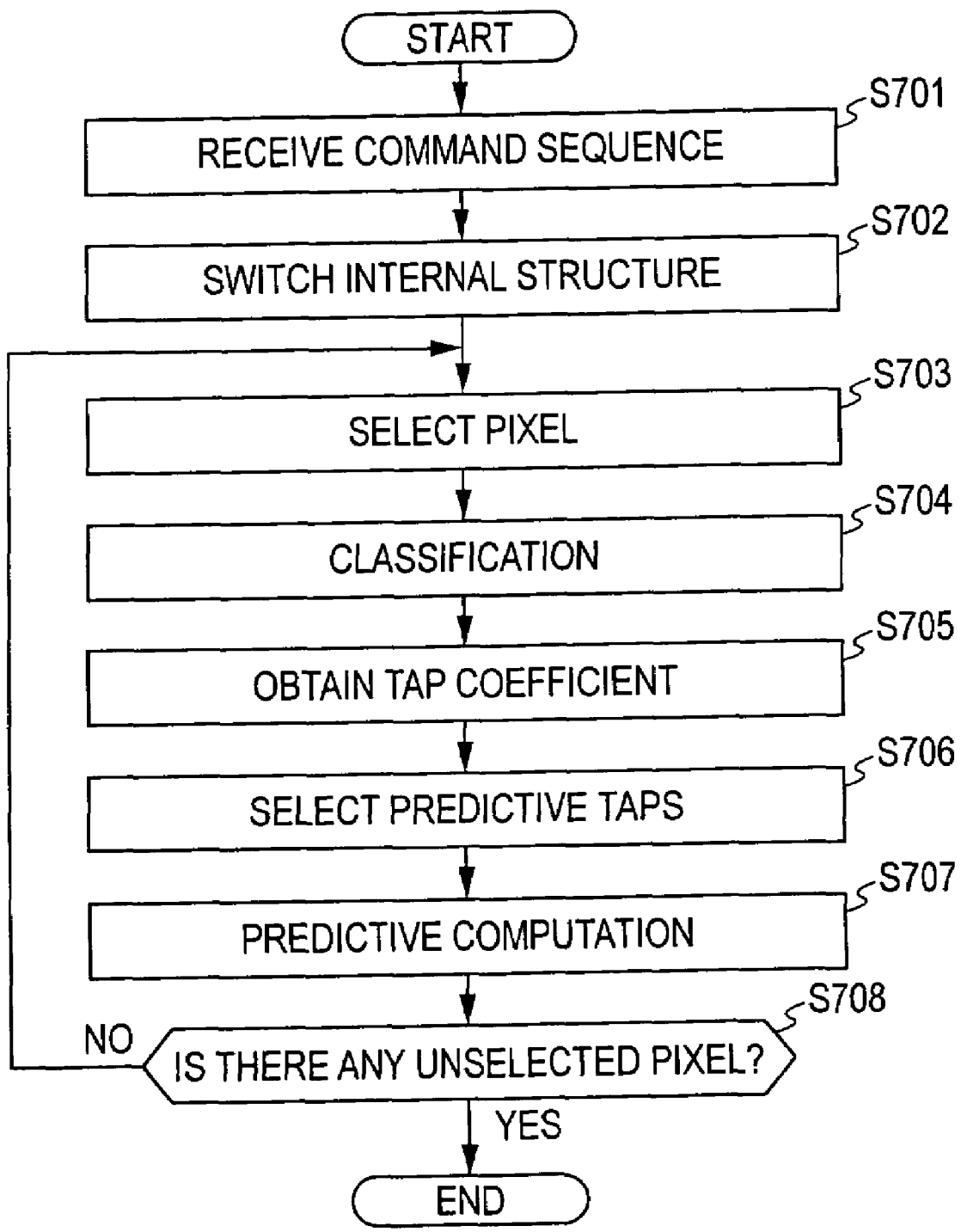
FIG. 67 is a flowchart illustrating processing performed by the IC when a command sequence consisting of a command "Kaizodo 1dimensional" is received.

Steps S703 and the subsequent steps in FIG. 67 are performed in the IC 700 having the internal structure switched as shown in FIG. 68.

More specifically, in step S703, one of the unselected pixels forming HD image data as the second image data is selected.

In step S704, the classification circuit 711A selects class taps for the selected pixel from the input image data as the first image data, and performs linear classification based on the selected class taps. The classification circuit 711A then supplies the resulting class code to the coefficient output circuit 715A via the switch circuit 713A.

The coefficient output circuit 715A selects the tap coefficients for linear spatial-resolution creation processing among the plurality of types of tap coefficients discussed with reference to FIG. 66 according to the command "Kaizodo 1dimensional" of the command sequence received from the receiver 720. In step S705, the coefficient output circuit 715A reads the tap coefficient corresponding to the class of the class code supplied from the classification circuit 711A via the switch circuit 713A, and supplies the read tap coefficient to the predictive-computation circuit 716A.

In step S706, the delay selecting circuit 712A selects linear predictive taps for the selected pixel from the input image data as the first image data, and supplies the selected linear predictive taps to the predictive-computation circuit 716A via the switch circuit 714A.

Then, in step S707, the predictive-computation circuit 716A performs linear filter computation according to equation (1) by using the linear predictive taps supplied from the delay switching circuit 712A via the switch circuit 714A and the tap coefficient supplied from the coefficient output circuit 715A, thereby obtaining and outputting the value of the selected pixel of the second image data with improved spatial resolution over the first image data.

In this case, the IC 700 serves as a linear digital filter for filtering linear predictive taps.

The image data output from the predictive-computation circuit 716A is output to the outside of the IC 700 via the switch circuit 719.

It is then determined in step S708 whether there is any unselected pixel forming the selected frame. If there is any unselected pixel, the process returns to step S703, and step S703 and the subsequent steps are repeated.

If it is determined in step S708 that there is no unselected pixel, the process is completed.

If the subsequent frame is supplied to the IC 700, steps S703 through S708 are repeated for the subsequent frame.

The processing performed by the IC 700 shown in FIG. 64 when a command sequence consisting of one command "Kaizodo 2dimensional" is received from an external source is described below with reference to the flowchart of FIG. 69.

In step S711, the receiver 720 receives the command sequence from an external source and supplies it to the required blocks of the IC 700.

In step S712, the IC 700 switches the internal structure thereof according to the received command sequence.

More specifically, the switch circuits 713A, 713B, 714A, 714B, 719, and 724 through 727 of the IC 700 switch the selection states of the signal lines according to the command "Kaizodo 2dimenisonal" to perform two-dimensional spatial-resolution creation processing.

Figure 70:
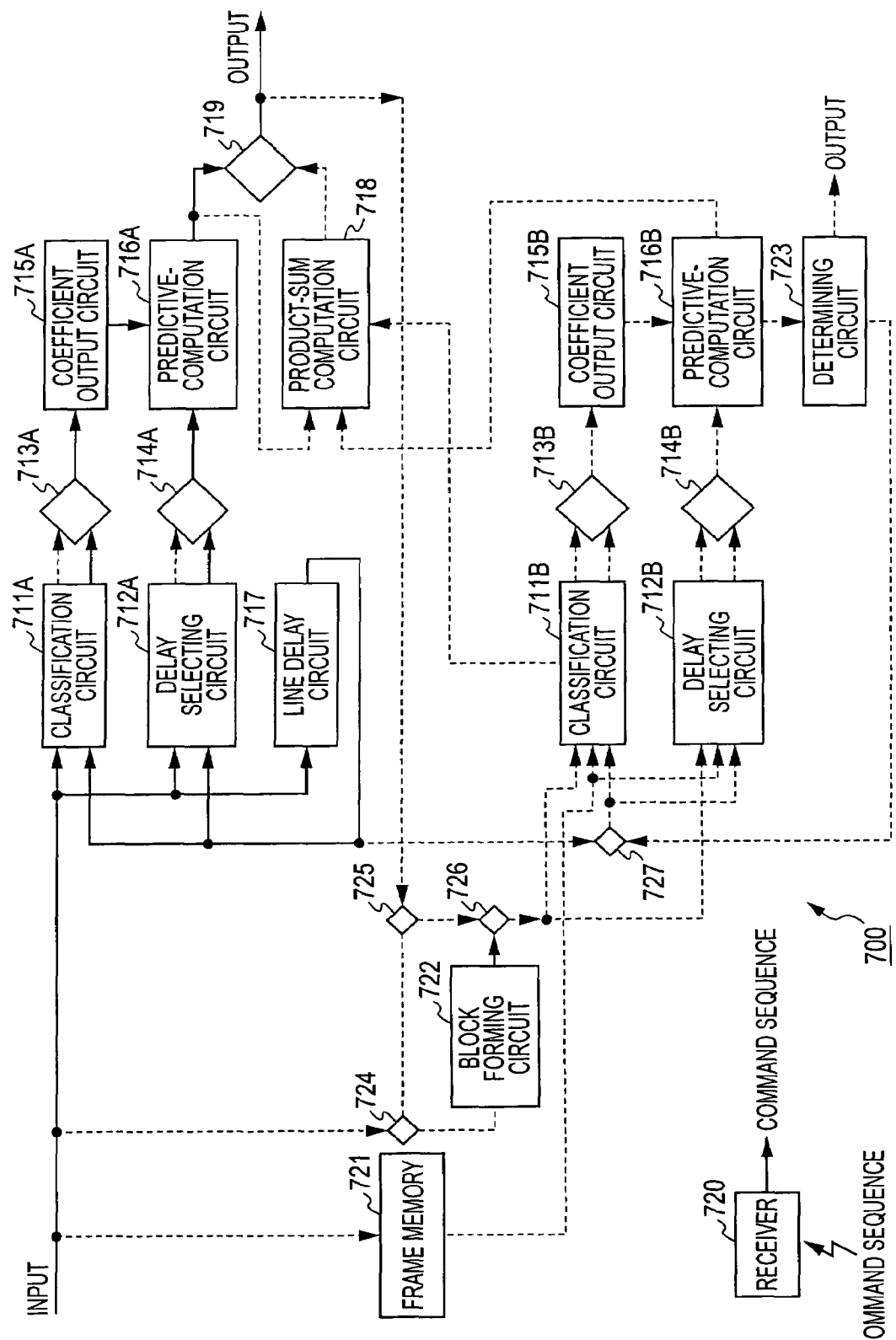
FIG. 70 is a block diagram illustrating the internal structure of the IC in which the selection states of signal lines are switched to perform two-dimensional spatial-resolution creation processing.

FIG. 70 illustrates the IC 700 in which the selection states of the signal lines are switched to perform two-dimensional spatial-resolution creation processing.

In FIG. 70, the switch circuits 713A, 713B, 714A, 714B, 719, and 724 through 727 of the IC 700 switch the selection states of the signal lines, as indicated by the solid lines in FIG. 70, according to the command "Kaizodo 2dimenisonal" to perform two-dimensional spatial-resolution creation processing.

The signal lines indicated by the broken lines in FIG. 70 are signal lines that are not used for signal processing in the current IC 700 though they are physically disposed.

In the IC 700 shown in FIG. 70, two-dimensional spatial-resolution creation processing for converting the image data input into the IC 700 as the first image data into HD image data with improved spatial resolution as the second image data in the classification adaptive processing is performed.

Figure 69:
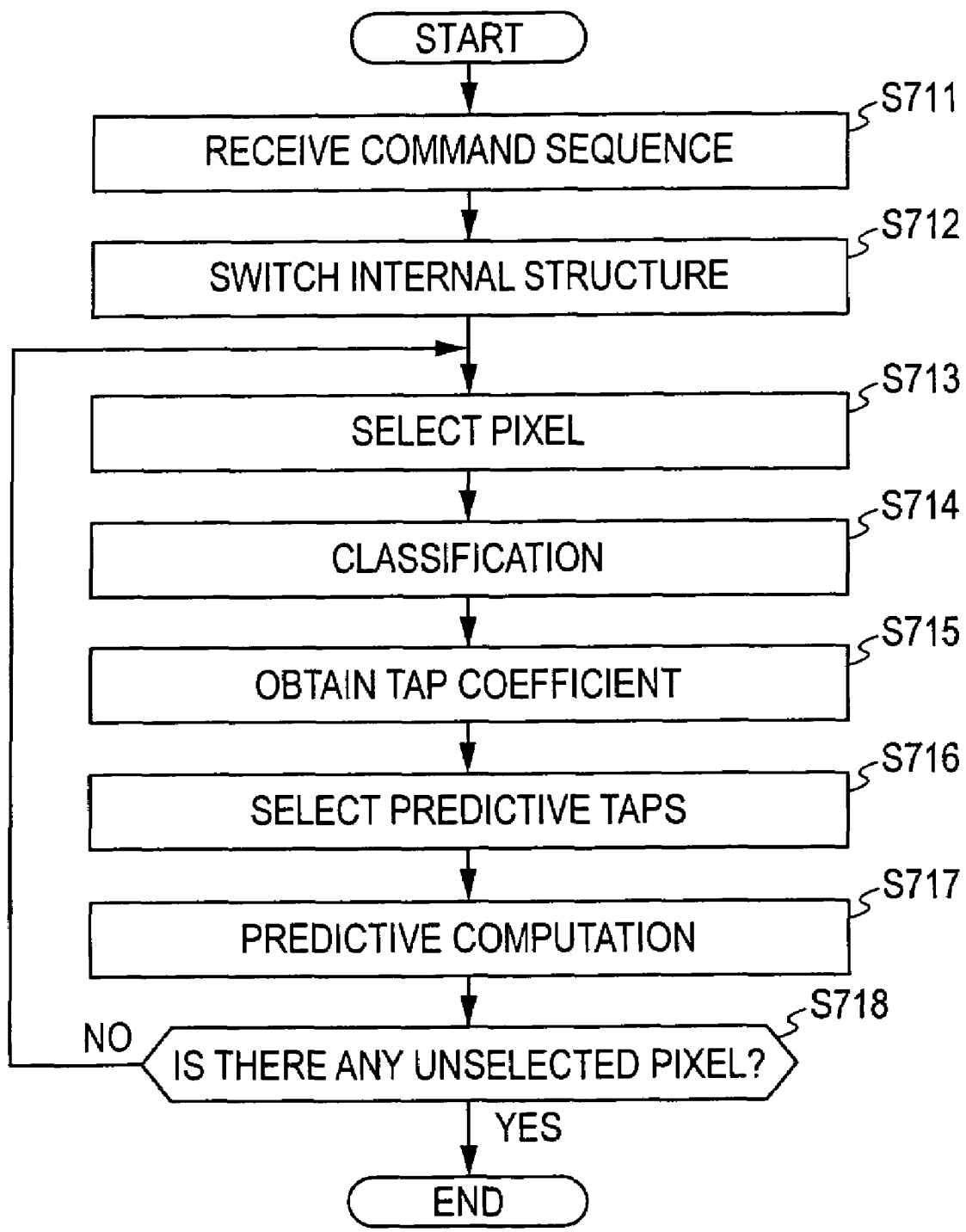
FIG. 69 is a flowchart illustrating processing performed by the IC when a command sequence consisting of a command "Kaizodo 2dimensional" is received.

Steps S713 and the subsequent steps in FIG. 69 are performed in the IC 700 having the internal structure switched as shown in FIG. 70.

More specifically, in step S713, one of the unselected pixels forming HD image data as the second image data is selected.

In step S714, the classification circuit 711A selects class taps for the selected pixel from the input image data as the first image data and the image data generated by delaying the input image data by the delay line circuit 717, and performs two-dimensional classification based on the selected class taps. The classification circuit 711A then supplies the resulting class code to the coefficient output circuit 715A via the switch circuit 713A.

The coefficient output circuit 715A selects the tap coefficients for two-dimensional spatial-resolution creation processing among the plurality of types of tap coefficients discussed with reference to FIG. 66 according to the command "Kaizodo 2dimensional" of the command sequence received from the receiver 720. In step S715, the coefficient output circuit 715A reads the tap coefficient corresponding to the class of the class code supplied from the classification circuit 711A via the switch circuit 713A, and supplies the read tap coefficient to the predictive-computation circuit 716A.

In step S716, the delay selecting circuit 712A selects two-dimensional predictive taps for the selected pixel from the input image data as the first image data and the image data generated by delaying the input image data by the line delay circuit 717, and supplies the selected two-dimensional predictive taps to the predictive-computation circuit 716A via the switch circuit 714A.

Then, in step S717, the predictive-computation circuit 716A performs two-dimensional filter computation according to equation (1) by using the two-dimensional predictive taps supplied from the delay switching circuit 712A via the switch circuit 714A and the tap coefficient supplied from the coefficient output circuit 715A, thereby obtaining and outputting the value of the selected pixel of the second image data with improved spatial resolution over the first image data.

In this case, the IC 700 serves as a two-dimensional digital filter for filtering two-dimensional predictive taps.

The image data output from the predictive-computation circuit 716A is output to the outside of the IC 700 via the switch circuit 719.

It is then determined in step S718 whether there is any unselected pixel forming the selected frame. If there is any unselected pixel, the process returns to step S713, and step S713 and the subsequent steps are repeated.

If it is determined in step S718 that there is no unselected pixel, the process is completed.

If the subsequent frame is supplied to the IC 700, steps S713 through S718 are repeated for the subsequent frame.

The processing performed by the IC 700 shown in FIG. 64 when a command sequence consisting of one command "Kaizodo 3dimensional" is received from an external source is described below with reference to the flowchart of FIG. 71.

In step S721, the receiver 720 receives the command sequence from an external source and supplies it to the required blocks of the IC 700.

In step S722, the IC 700 switches the internal structure thereof according to the received command sequence.

More specifically, the switch circuits 713A, 713B, 714A, 714B, 719, and 724 through 727 of the IC 700 switch the selection states of the signal lines according to the command "Kaizodo 3dimenisonal" to perform three-dimensional spatial-resolution creation processing.

Figure 72:
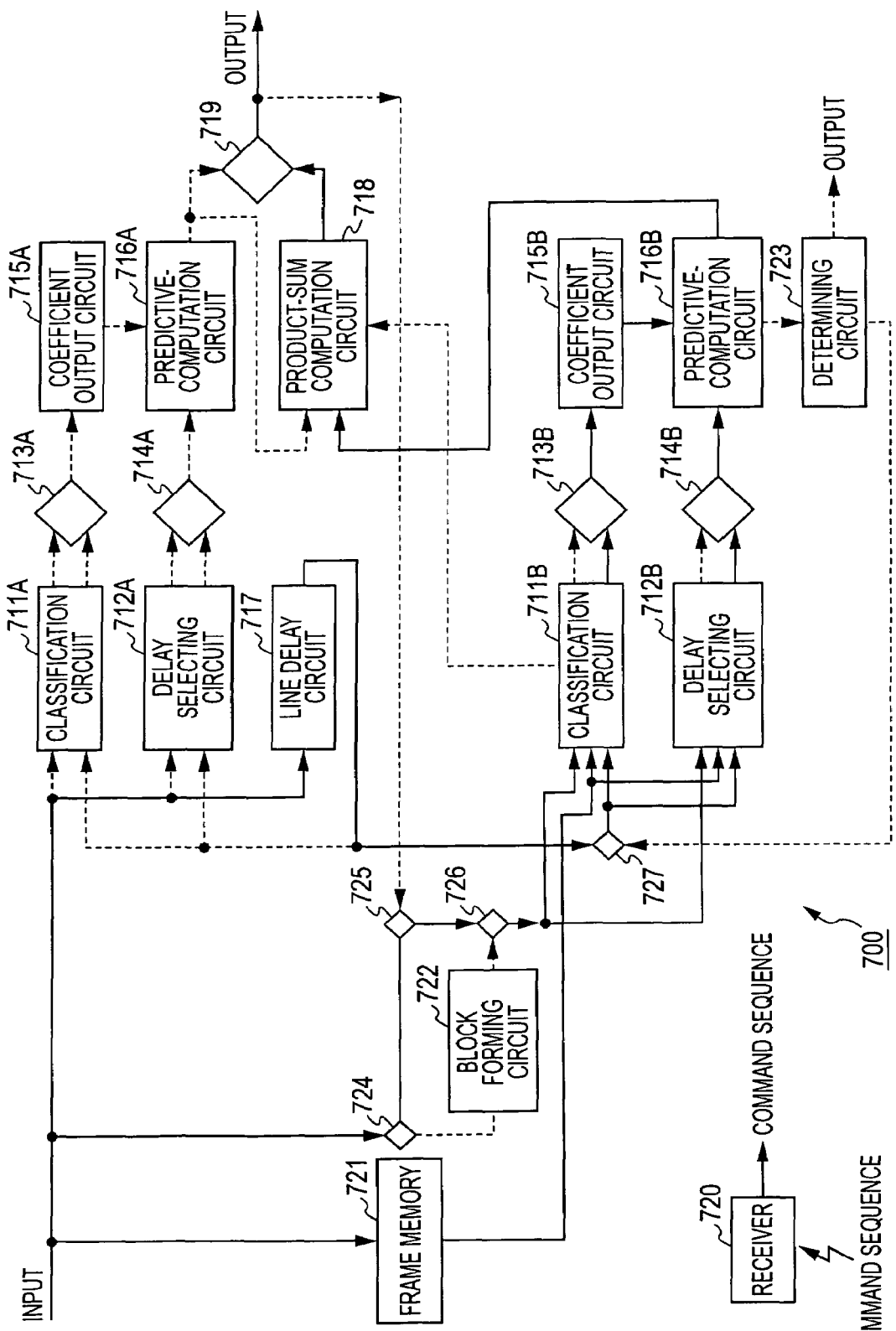
FIG. 72 is a block diagram illustrating the internal structure of the IC in which the selection states of signal lines are switched to perform three-dimensional spatial-resolution creation processing.

FIG. 72 illustrates the IC 700 in which the selection states of the signal lines are switched to perform three-dimensional spatial-resolution creation processing.

In FIG. 72, the switch circuits 713A, 713B, 714A, 714B, 719, and 724 through 727 of the IC 700 switch the selection states of the signal lines, as indicated by the solid lines in FIG. 72, according to the command "Kaizodo 3dimenisonal" to perform three-dimensional spatial-resolution creation processing.

The signal lines indicated by the broken lines in FIG. 72 are signal lines that are not used for signal processing in the current IC 700 though they are physically disposed.

In the IC 700 shown in FIG. 72, three-dimensional spatial-resolution creation processing for converting the image data input into the IC 700 as the first image data into HD image data with improved spatial resolution as the second image data in the classification adaptive processing is performed.

Figure 71:
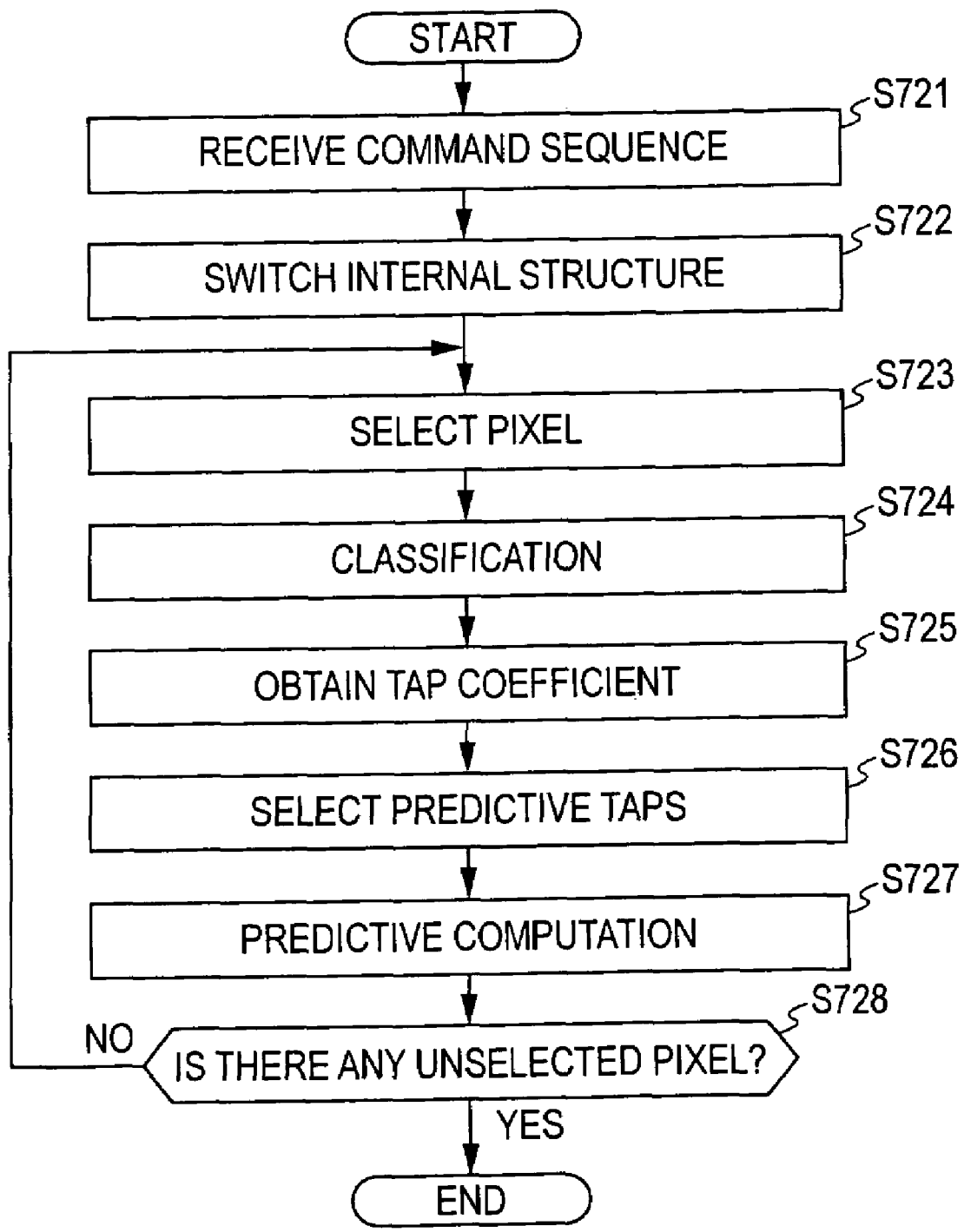
FIG. 71 is a flowchart illustrating processing performed by the IC when a command sequence consisting of a command "Kaizodo 3dimensional" is received.

Steps S723 and the subsequent steps in FIG. 71 are performed in the IC 700 having the internal structure switched as shown in FIG. 72.

More specifically, in step S723, one of the unselected pixels forming HD image data as the second image data is selected.

In step S724, the classification circuit 711B selects class taps for the selected pixel, and performs three-dimensional classification based on the selected class taps.

In FIG. 72, the input image data as the first image data in classification adaptive processing is supplied to the classification circuit 711B via the switch circuits 724, 725, and 726. The image data generated by delaying the input image data by one line or several lines in the line delay circuit 717 is also supplied to the classification circuit 711B via the switch circuit 727. The image data generated by delaying the input image data by one frame in the frame memory 721 is also supplied to the classification circuit 711B.

The classification circuit 711B selects class taps from the above-described image data and performs three-dimensional classification based on the selected class taps.

The classification circuit 711B then supplies the resulting class code to the coefficient output circuit 715B via the switch circuit 713B.

The coefficient output circuit 715B selects the tap coefficients for three-dimensional spatial-resolution creation processing among the plurality of types of tap coefficients discussed with reference to FIG. 66 according to the command "Kaizodo 3dimensional" of the command sequence received from the receiver 720. In step S725, the coefficient output circuit 715B reads the tap coefficient corresponding to the class of the class code supplied from the classification circuit 711B via the switch circuit 713B, and supplies the read tap coefficient to the predictive-computation circuit 716B.

In step S726, the delay selecting circuit 712B selects three-dimensional predictive taps for the selected pixel, and supplies the selected three-dimensional predictive taps to the predictive-computation circuit 716B via the switch circuit 714B.

In FIG. 72, the input image data as the first image data in classification adaptive processing is supplied to the delay selecting circuit 712B via the switch circuits 724, 725, and 726. The image data generated by delaying the input image data by one or several lines in the line delay circuit 717 is also supplied to the delay selecting circuit 712B via the switch circuit 727. The image data generated by delaying the input image data by one frame in the frame memory 721 is also supplied to the delay selecting circuit 712B.

The delay selecting circuit 712B selects three-dimensional predictive taps from the above-described image data and supplies the selected three-dimensional predictive taps to the predictive-computation circuit 716B via the switch circuit 714B.

Then, in step S727, the predictive-computation circuit 716B performs three-dimensional filter computation according to equation (1) by using the three-dimensional predictive taps supplied from the delay switching circuit 712B via the switch circuit 714B and the tap coefficient supplied from the coefficient output circuit 715B, thereby obtaining and outputting the value of the selected pixel of the second image data with improved spatial resolution over the first image data.

In this case, the IC 700 serves as a three-dimensional digital filter for filtering three-dimensional predictive taps.

The image data output from the predictive-computation circuit 716B is output to the outside of the IC 700 via (bypassing) the product-sum computation circuit 718 and the switch circuit 719.

It is then determined in step S728 whether there is any unselected pixel forming the selected frame. If there is any unselected pixel, the process returns to step S723, and step S723 and the subsequent steps are repeated.

If it is determined in step S728 that there is no unselected pixel, the process is completed.

If the subsequent frame is supplied to the IC 700, steps S723 through S728 are repeated for the subsequent frame.

The processing performed by the IC 700 shown in FIG. 64 when a command sequence consisting of two commands "Kaizodo 2dimensional" and "Kaizodo 3dimensional" is received from an external source is described below with reference to the flowchart of FIG. 73.

In step S731, the receiver 720 receives the command sequence from an external source and supplies it to the required blocks of the IC 700.

In step S732, the IC 700 switches the internal structure thereof according to the received command sequence.

More specifically, the switch circuits 713A, 713B, 714A, 714B, 719, and 724 through 727 of the IC 700 switch the selection states of the signal lines according to the commands "Kaizodo 2dimensional" and "Kaizodo 3dimenisonal" to perform two-dimensional spatial-resolution creation processing and three-dimensional spatial-resolution creation processing, respectively, and then to perform weighting addition (hereinafter sometimes referred to as "adaptive spatial-resolution creation processing") on the image data subjected to the two-dimensional spatial-resolution creation processing and the image data subjected to the three-dimensional spatial-resolution creation processing by using a weight depending on the motion of the image.

Figure 74:
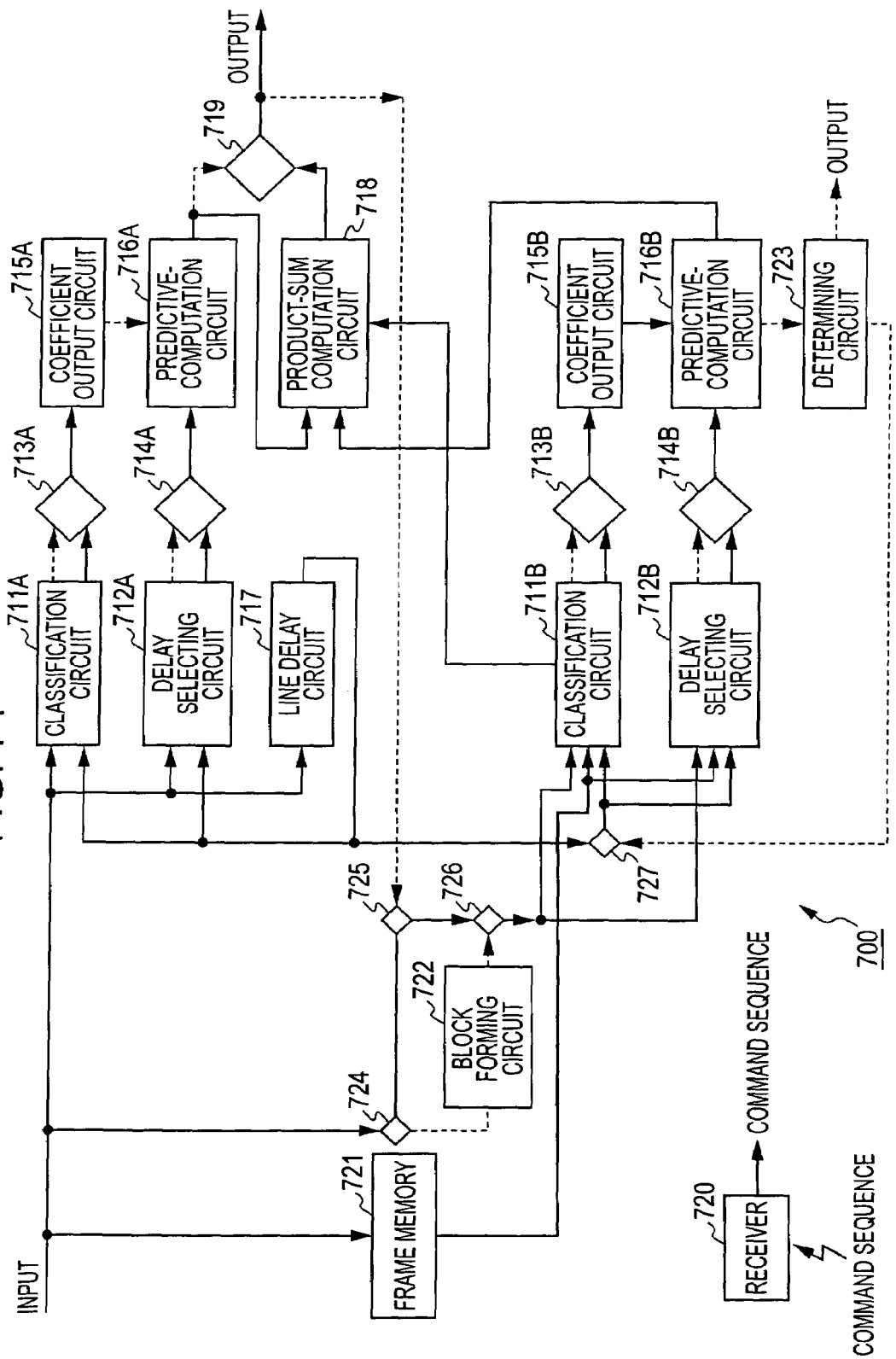
FIG. 74 is a block diagram illustrating the internal structure of the IC in which the selection states of signal lines are switched to perform adaptive spatial-resolution creation processing.

FIG. 74 illustrates the IC 700 in which the selection states of the signal lines are switched to perform adaptive spatial-resolution creation processing.

In FIG. 74, the switch circuits 713A, 713B, 714A, 714B, 719, and 724 through 727 of the IC 700 switch the selection states of the signal lines, as indicated by the solid lines in FIG. 74, according to the commands "Kaizodo 2dimensional" and "Kaizodo 3dimenisonal" to perform adaptive spatial-resolution creation processing.

The signal lines indicated by the broken lines in FIG. 74 are signal lines that are not used for signal processing in the current IC 700 though they are physically disposed.

In the IC 700 shown in FIG. 74, two-dimensional spatial-resolution creation processing and three-dimensional spatial-resolution creation processing for converting the image data input into the IC 700 as the first image data into HD image data with improved spatial resolution as the second image data in the classification adaptive processing are simultaneously performed. Then, weighting addition is performed by using a weight depending on the motion of the image on the image data obtained as a result of the two-dimensional spatial-resolution creation processing and the image data obtained as a result of the three-dimensional spatial-resolution creation processing.

Figure 73:
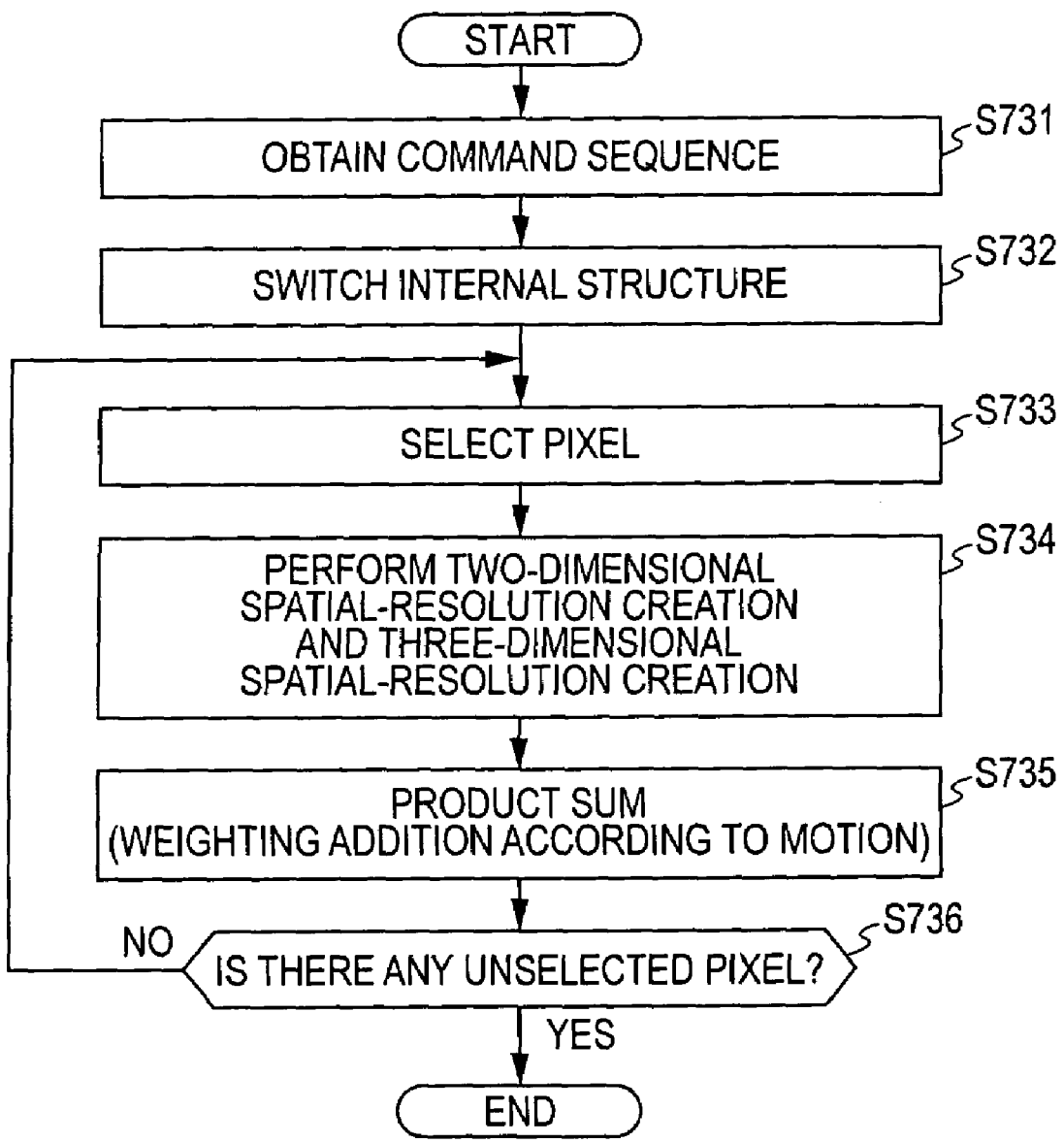
FIG. 73 is a flowchart illustrating processing performed by the IC when a command sequence consisting of commands "Kaizodo 2dimensional" and "Kaizodo 3dimensional" is received.

Steps S733 and the subsequent steps in FIG. 73 are performed in the IC 700 having the internal structure switched as shown in FIG. 74.

More specifically, in step S733, one of the unselected pixels forming HD image data as the second image data is selected.

In step S734, the two-dimensional spatial-resolution creation processing discussed with reference to FIGS. 69 and 70 and the three-dimensional spatial-resolution creation processing discussed with reference to FIGS. 71 and 72 are performed for the selected pixel. Then, the pixel value of the selected pixel obtained by the two-dimensional spatial-resolution creation processing is supplied to the product-sum computation circuit 718 from the predictive-computation circuit 716A, and the pixel value of the selected pixel obtained by the three-dimensional spatial-resolution creation processing is supplied to the product-sum computation circuit 718 from the predictive-computation circuit 716B.

Also in step S734, as in the classification circuit 511B of the third embodiment shown in FIG. 59, the classification circuit 711B detects the motion of the input image data and supplies motion information K concerning the detected motion to the product-sum computation circuit 718.

In step S735, the product-sum computation circuit 718 performs weighting addition on the pixel value of the selected pixel obtained by the two-dimensional spatial-resolution creation processing from the predictive-computation circuit 716A and the pixel value of the selected pixel obtained by the three-dimensional spatial-resolution creation processing from the predictive-computation circuit 716B by using the motion information K for the selected pixel of the input image data supplied from the classification circuit 711B as a weight coefficient.

That is, when the pixel value obtained by the two-dimensional spatial-resolution creation processing and the pixel value obtained by the three-dimensional spatial-resolution creation processing are represented by P2 and P3, respectively, and when the motion information K ranges from 0 to 1, the product-sum computation circuit 718 determines the image data P as a result of the adaptive spatial-resolution creation processing according to the equation $P = K \times P2 + (1-K) \times P3$.

The pixel value determined in the product-sum computation circuit 718 is output to the outside of the IC 700 via the switch circuit 719.

It is then determined in step S736 whether there is any unselected pixel forming the selected frame. If there is any unselected pixel, the process returns to step S733, and step S733 and the subsequent steps are repeated.

If it is determined in step S736 that there is no unselected pixel, the process is completed.

If the subsequent frame is supplied to the IC 700, steps S733 through S736 are repeated for the subsequent frame.

The processing performed by the IC 700 shown in FIG. 64 when a command sequence consisting of one command "Zoom ver1" is supplied from an external source is discussed below with reference to the flowchart of FIG. 75.

In step S741, the receiver 720 receives the command sequence from an external source and supplies it to the required blocks forming the IC 700.

In step S742, the IC 700 switches the internal structure thereof according to the received command sequence.

More specifically, the switch circuits 713A, 713B, 714A, 714B, 719, and 724 through 727 of the IC 700 switch the selection states of the signal lines according to the command "Zoom ver1" to perform recursive enlarging processing.

Figure 76:
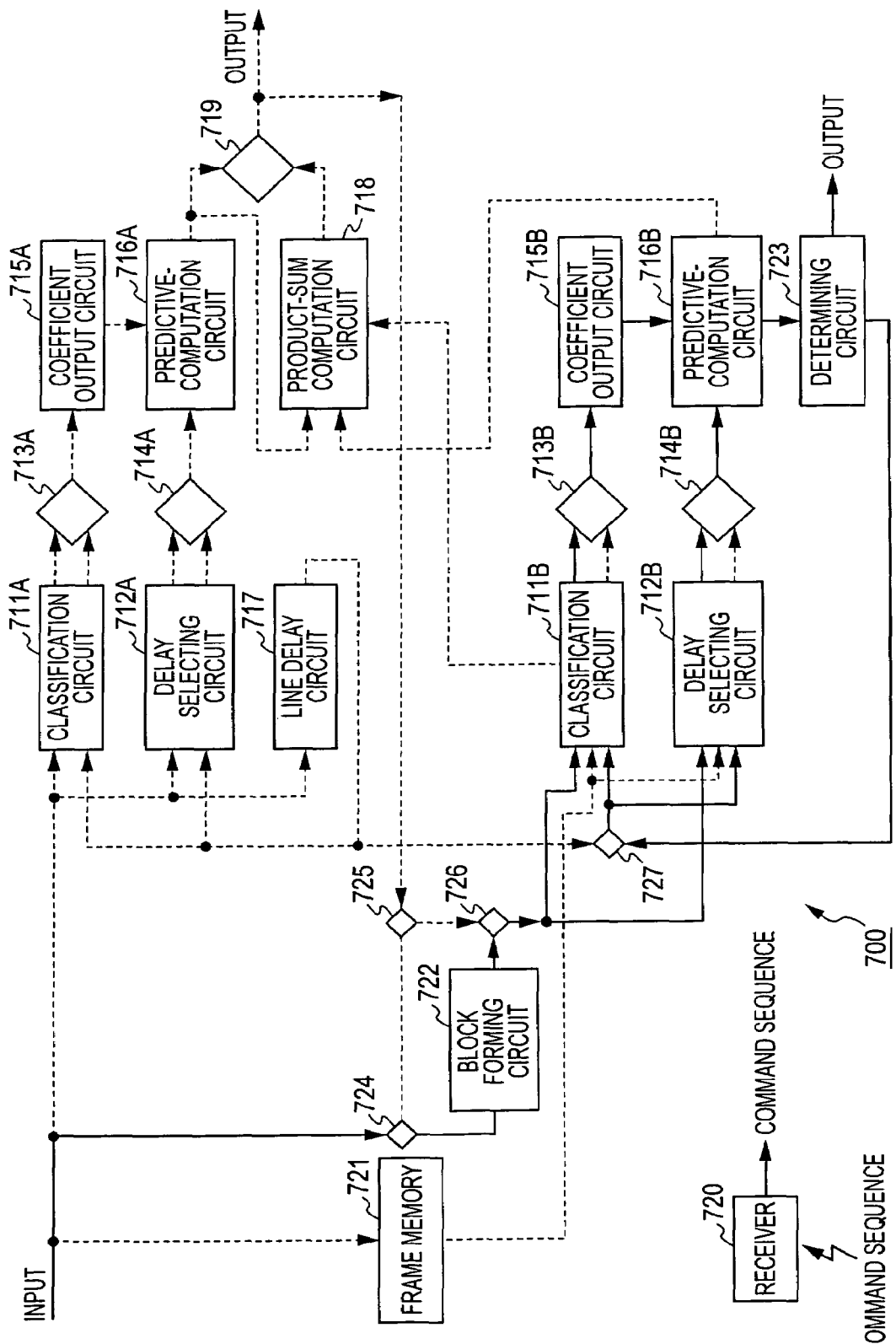
FIG. 76 is a block diagram illustrating the internal structure of the IC in which the selection states of signal lines are switched to perform recursive enlarging processing.

FIG. 76 illustrates the IC 700 in which the selection states of the signal lines are switched to perform recursive enlarging processing.

In FIG. 76, the switch circuits 713A, 713B, 714A, 714B, 719, and 724 through 727 of the IC 700 switch the selection states of the signal lines, as indicated by the solid lines in FIG. 76, according to the command "Zoom ver1" to perform recursive enlarging processing.

The signal lines indicated by the broken lines in FIG. 76 are signal lines that are not used for signal processing in the current IC 700 although they are physically disposed.

In the IC 700 shown in FIG. 76, recursive enlarging processing for converting the image data input into the IC 700 as the first image data into the second image data in classification adaptive processing by resealing a block of the image at a desired scaling factor is performed.

The desired scaling factor can be contained in the command sequence as, for example, a parameter p1 of the command "Zoom ver1". The position of the center at which the input image data is enlarged can also be contained in the command sequence as a parameter p2 of the command "Zoom ver1".

Step S743 and the subsequent steps are performed in the IC 700 having the internal structure switched as shown in FIG. 76.

In step S743, the block forming circuit 722 extracts part of the input image data supplied via the switch circuit 724 to be enlarged as a block.

More specifically, from the scaling factor represented by the parameter p1 and the size of the input image data, the block forming circuit 722 identifies the size of a block that becomes equal to the size of the input image data by enlarging the block at the scaling factor. The block forming circuit 722 then extracts the block having the identified size from the input image data by using the position represented by the parameter p2 as the center (centroid) of the extracted block. In this case, the image data is enlarged at the scaling factor indicated by the parameter p1 both in the horizontal direction and in the vertical direction of the block.

The image data of the extracted block is supplied to the classification circuit 711B and the delay selecting circuit 712B from the block forming circuit 722 via the switch circuit 726.

Then, in step S744, one of the unselected pixels forming the enlarged image as the second image data obtained by enlarging the image data of the extracted block is selected.

In step S745, the classification circuit 711B selects class taps for the selected pixel from the image data of the extracted block supplied from the block forming circuit 722 via the switch circuit 726, and performs two-dimensional classification based on the selected class taps.

The classification circuit 711B then supplies the resulting class code to the coefficient output circuit 715B via the switch circuit 713B.

The coefficient output circuit 715B selects the tap coefficients for resealing processing among the plurality of types of tap coefficients discussed with reference to FIG. 66 according to the command "Zoom ver1" of the command sequence received from the receiver 720.

The tap coefficients for resealing processing selected by the coefficient output circuit 715B according to the command "Zoom ver1" are tap coefficients for enlarging images at a predetermined scaling factor (for example, a comparatively low scaling factor, such as 1.1). Accordingly, the tap coefficients for resealing processing selected by the coefficient output circuit 715B according to the command "Zoom ver1" are not necessarily tap coefficients for enlarging images at the scaling factor indicated by the parameter p1.

In step S746, the coefficient output circuit 715B reads the tap coefficient corresponding to the class of the class code supplied from the classification circuit 711B via the switch circuit 713B among the tap coefficients for resealing processing, and supplies the read tap coefficient to the predictive-computation circuit 716B.

In step S747, the delay selecting circuit 712B selects two-dimensional predictive taps for the selected pixel from the image data of the extracted block supplied from the block forming circuit 722 via the switch circuit 726, and supplies the selected predictive taps to the predictive-computation circuit 716B via the switch circuit 714B.

In step S748, the predictive-computation circuit 716B performs two-dimensional filter computation according to equation (1) by using the two-dimensional predictive taps supplied from the delay selecting circuit 712B via the switch circuit 714B and the tap coefficient supplied from the coefficient output circuit 715B, thereby obtaining and outputting the value of the selected pixel of the enlarged image data.

The enlarged image data output from the predictive-computation circuit 716B is supplied to the determining circuit 723.

It is then determined in step S749 whether all the pixels forming the enlarged image data have been selected. If not, the process returns to step S744, and step S744 and the subsequent steps are repeated.

If it is determined in step S749 that all the pixels forming the enlarged image data have been selected, the process proceeds to step S750 to determine whether the enlarged image data supplied from the predictive-computation circuit 716B to the determining circuit 723 has been enlarged at the scaling factor represented by the parameter p1.

If it is determined in step S750 that the enlarged image data does not satisfy the scaling factor represented by the parameter p1, i.e., that the size of the enlarged image data from the predictive-computation circuit 716B is smaller than the size of the image enlarged at the scaling factor indicated by the parameter p1, the process proceeds to step S751. In step S751, the determining circuit 723 feeds back the enlarged image data to the classification circuit 711B and the delay selecting circuit 712B via the switch circuit 727. The process then returns to step S744.

Then, step S744 and the subsequent steps are repeated for the enlarged image data (hereinafter referred to as the "feedback image data") fed back to the classification circuit 711B and the delay selecting circuit 712B from the determining circuit 723.

In this case, in step S744, one of the unselected pixels forming the enlarged image data as the second image data obtained by enlarging the feedback image data at the scaling factor indicated by the parameter p1 is selected.

Then, in step S745, the classification circuit 711B selects class taps for the selected pixel from the feedback image data output from the determining circuit 723, and performs two-dimensional classification based on the selected class taps. The classification circuit 711B then supplies the resulting class code to the coefficient output circuit 715B via the switch circuit 713B.

In step S746, the coefficient output circuit 715B reads the tap coefficient corresponding to the class of the class code supplied from the classification circuit 711B via the switch circuit 713B among the tap coefficients for resealing processing selected according to the command "Zoom ver1", and supplies the read tap coefficient to the predictive-computation circuit 716B.

In step S747, the delay selecting circuit 712B selects two-dimensional predictive taps from the feedback image data output from the determining circuit 723, and supplies the predictive taps to the predictive-computation circuit 716B via the switch circuit 714B.

In step S748, the predictive-computation circuit 716B performs two-dimensional filter computation according to equation (1) by using the two-dimensional predictive taps supplied from the delay selecting circuit 712B via the switch circuit 714B and the tap coefficient supplied from the coefficient output circuit 715B, thereby obtaining and outputting the value of the selected pixel of the enlarged image data. The selected pixel is then output to the determining circuit 723.

It is then determined in step S749 whether all the pixels forming the enlarged image data have been selected. If not, the process returns to step S744 and step S744 and the subsequent steps are repeated.

If it is determined in step S749 that all the pixels forming the enlarged image data have been selected, the process proceeds to step S750 to determine whether the enlarged image data supplied from the predictive-computation circuit 716B is enlarged at the scaling factor indicated by the parameter p1.

If it is determined in step S750 that the enlarged image data satisfies the required scaling factor, the determining circuit 723 outputs the enlarged image data to the outside of the IC 700. The process is then completed.

In this case, the IC 700 serves as an image enlarging device.

If the input image data of the subsequent frame is supplied to the IC 700, steps S743 and S751 are repeated for the subsequent frame.

The processing performed by the IC 700 shown in FIG. 64 when a command sequence consisting of one command "Zoom ver2" is supplied from an external source is discussed below with reference to the flowchart of FIG. 77.

In step S761, the receiver 720 receives the command sequence from an external source and supplies it to the required blocks forming the IC 700.

In step S762, the IC 700 switches the internal structure thereof according to the received command sequence.

More specifically, the switch circuits 713A, 713B, 714A, 714B, 719, and 724 through 727 of the IC 700 switch the selection states of the signal lines according to the command "Zoom ver2" to perform single enlarging processing.

Figure 78:
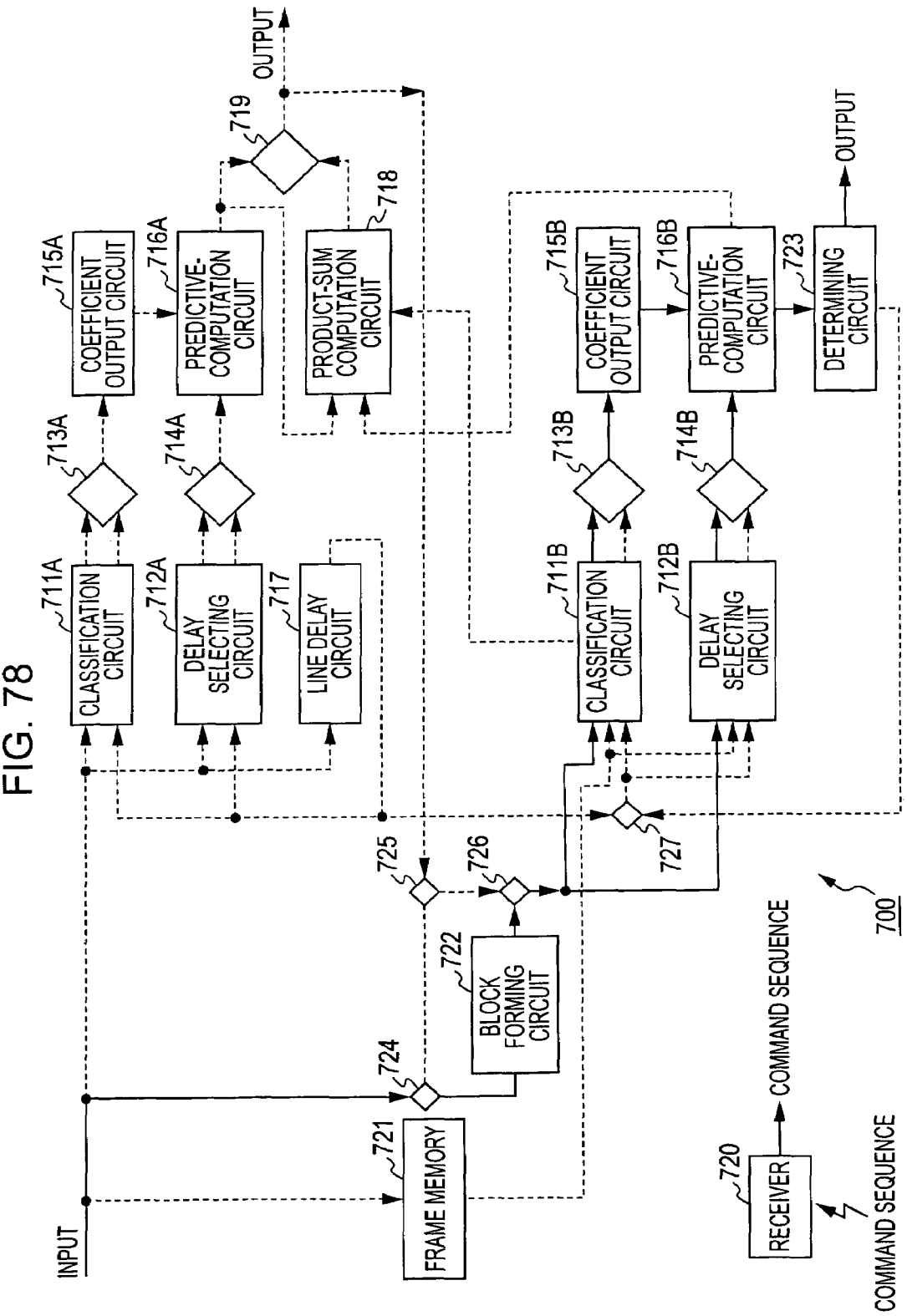
FIG. 78 is a block diagram illustrating the internal structure of the IC in which the selection states of signal lines are switched to perform single enlarging processing.

FIG. 78 illustrates the IC 700 in which the selection states of the signal lines are switched to perform single enlarging processing.

In FIG. 78, the switch circuits 713A, 713B, 714A, 714B, 719, and 724 through 727 of the IC 700 switch the selection states of the signal lines, as indicated by the solid lines in FIG. 78, according to the command "Zoom ver2" to perform single enlarging processing.

The signal lines indicated by the broken lines in FIG. 78 are signal lines that are not used for signal processing in the current IC 700 although they are physically disposed.

In the IC 700 shown in FIG. 78, single enlarging processing for converting the image data input into the IC 700 as the first image data into the second image data in classification adaptive processing by resealing a block of the image at a desired scaling factor is performed.

The desired scaling factor is contained in the command sequence as a parameter p1 of the command "Zoom ver2". The position of the center at which the input image data is enlarged is contained in the command sequence as a parameter p2 of the command "Zoom ver2".

Figure 77:
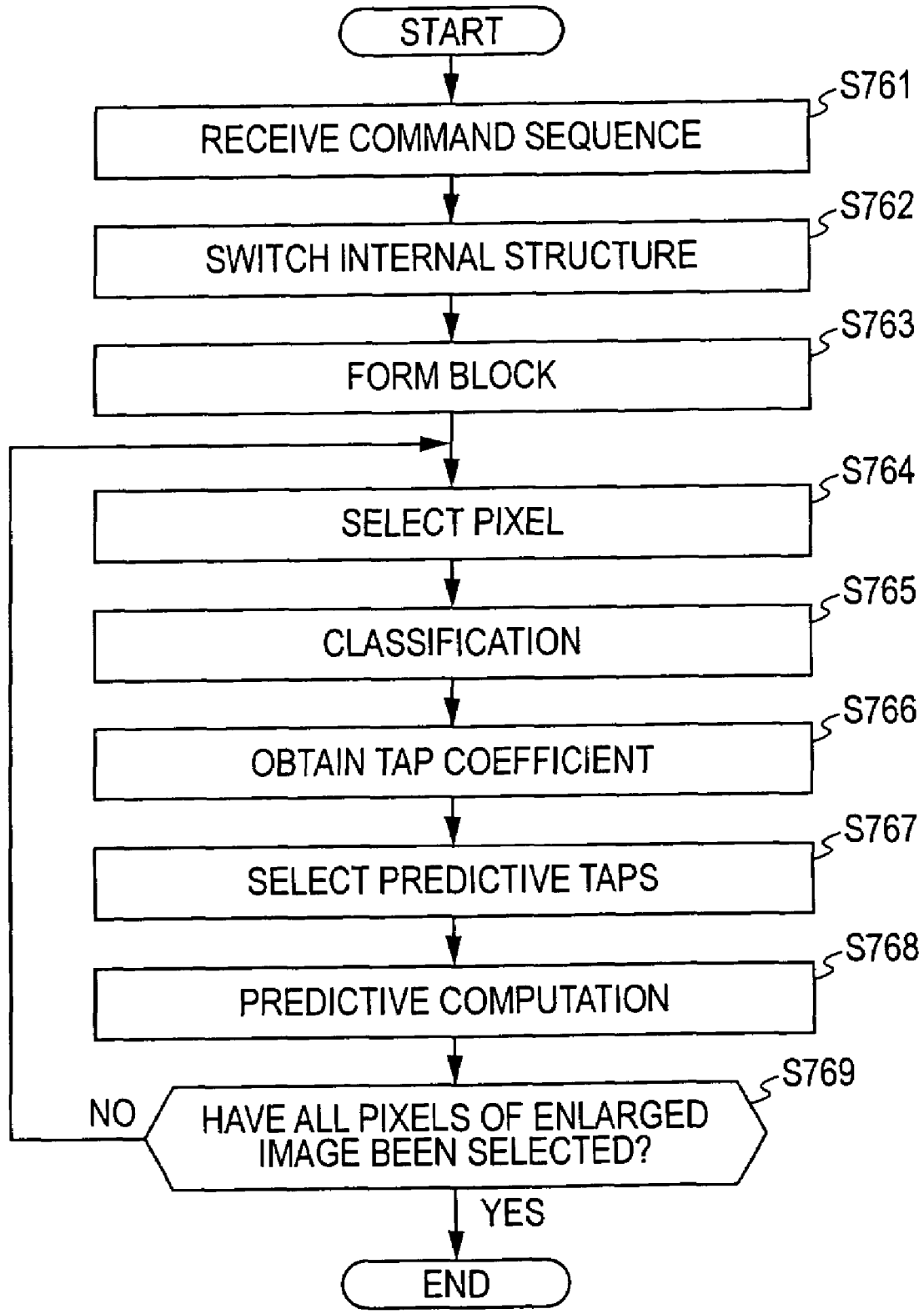
FIG. 77 is a flowchart illustrating processing performed by the IC when a command sequence consisting of a command "Zoom ver2" is received.

Step S763 and the subsequent steps of FIG. 77 are performed in the IC 700 having the internal structure switched as shown in FIG. 78.

Figure 75:
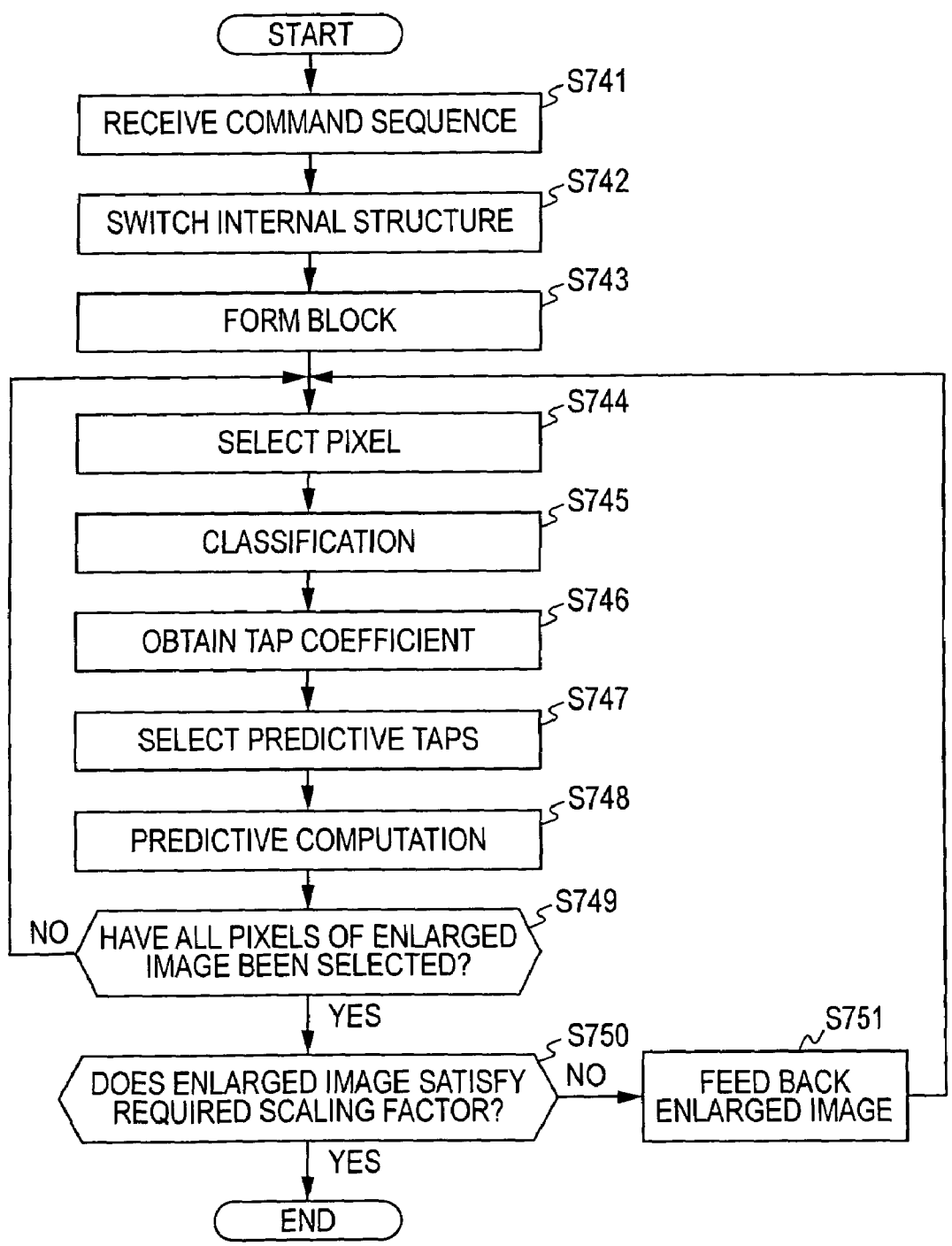
FIG. 75 is a flowchart illustrating processing performed by the IC when a command sequence consisting of a command "Zoom ver1" is received.

As in step S743 of FIG. 75, in step S763, the block forming circuit 722 extracts part of the input image data supplied via the switch circuit 724 to be enlarged as a block.

More specifically, from the scaling factor represented by the parameter p1 and the size of the input image data, the block forming circuit 722 identifies the size of a block that becomes equal to the size of the input image data by enlarging the block at the scaling factor. The block forming circuit 722 then extracts the block having the identified size from the input image data by using the position represented by the parameter p2 as the center (centroid) of the extracted block.

The image data of the extracted block is supplied to the classification circuit 711B and the delay selecting circuit 712B from the block forming circuit 722 via the switch circuit 726.

Then, in step S764, one of the unselected pixels forming the enlarged image as the second image data obtained by enlarging the image data of the extracted block is selected.

In step S765, the classification circuit 711B selects class taps for the selected pixel from the image data of the extracted block supplied from the block forming circuit 722 via the switch circuit 726, and performs two-dimensional classification based on the selected class taps.

The classification circuit 711B then supplies the resulting class code to the coefficient output circuit 715B via the switch circuit 713B.

The coefficient output circuit 715B selects the tap coefficients for resealing processing among the plurality of types of tap coefficients discussed with reference to FIG. 66 according to the command "Zoom ver2" of the command sequence received from the receiver 720.

In step S766, the coefficient output circuit 715B reads the tap coefficient corresponding to the class of the class code supplied from the classification circuit 711B via the switch circuit 713B among the tap coefficients for resealing processing, and supplies the read tap coefficient to the predictive-computation circuit 716B.

In step S767, the delay selecting circuit 712B selects two-dimensional predictive taps for the selected pixel from the image data of the extracted block supplied from the block forming circuit 722 via the switch circuit 726, and supplies the selected predictive taps to the predictive-computation circuit 716B via the switch circuit 714B.

In step S768, the predictive-computation circuit 716B performs two-dimensional filter computation according to equation (1) by using the two-dimensional predictive taps supplied from the delay selecting circuit 712B via the switch circuit 714B and the tap coefficient supplied from the coefficient output circuit 715B, thereby obtaining and outputting the value of the selected pixel of the image data enlarged at the scaling factor represented by the parameter p1.

The enlarged image data output from the predictive-computation circuit 716B is supplied to the outside of the IC 700 via the determining circuit 723.

It is then determined in step S769 whether all the pixels forming the enlarged image data have been selected. If not, the process returns to step S764, and step S764 and the subsequent steps are repeated.

If it is determined in step S769 that all the pixels forming the enlarged image data have been selected, the process is completed.

In this case, the IC 700 serves as an image enlarging device.

If the input image data of the subsequent frame is supplied to the IC 700, steps S764 through S769 are repeated for the subsequent frame.

The processing performed by the IC 700 shown in FIG. 64 when a command sequence consisting of two commands "Kaizodo 2dimensional" and "Zoom ver1" is supplied from an external source is discussed below with reference to the flowchart of FIG. 79.

In step S781, the receiver 720 receives the command sequence from an external source and supplies it to the required blocks forming the IC 700.

In step S782, the IC 700 switches the internal structure thereof according to the received command sequence.

More specifically, the switch circuits 713A, 713B, 714A, 714B, 719, and 724 through 727 of the IC 700 switch the selection states of the signal lines according to the two commands "Kaizodo 2dimensional" and "Zoom ver1" to perform two-dimensional spatial-resolution creation processing and recursive enlarging processing, respectively.

Figure 80:
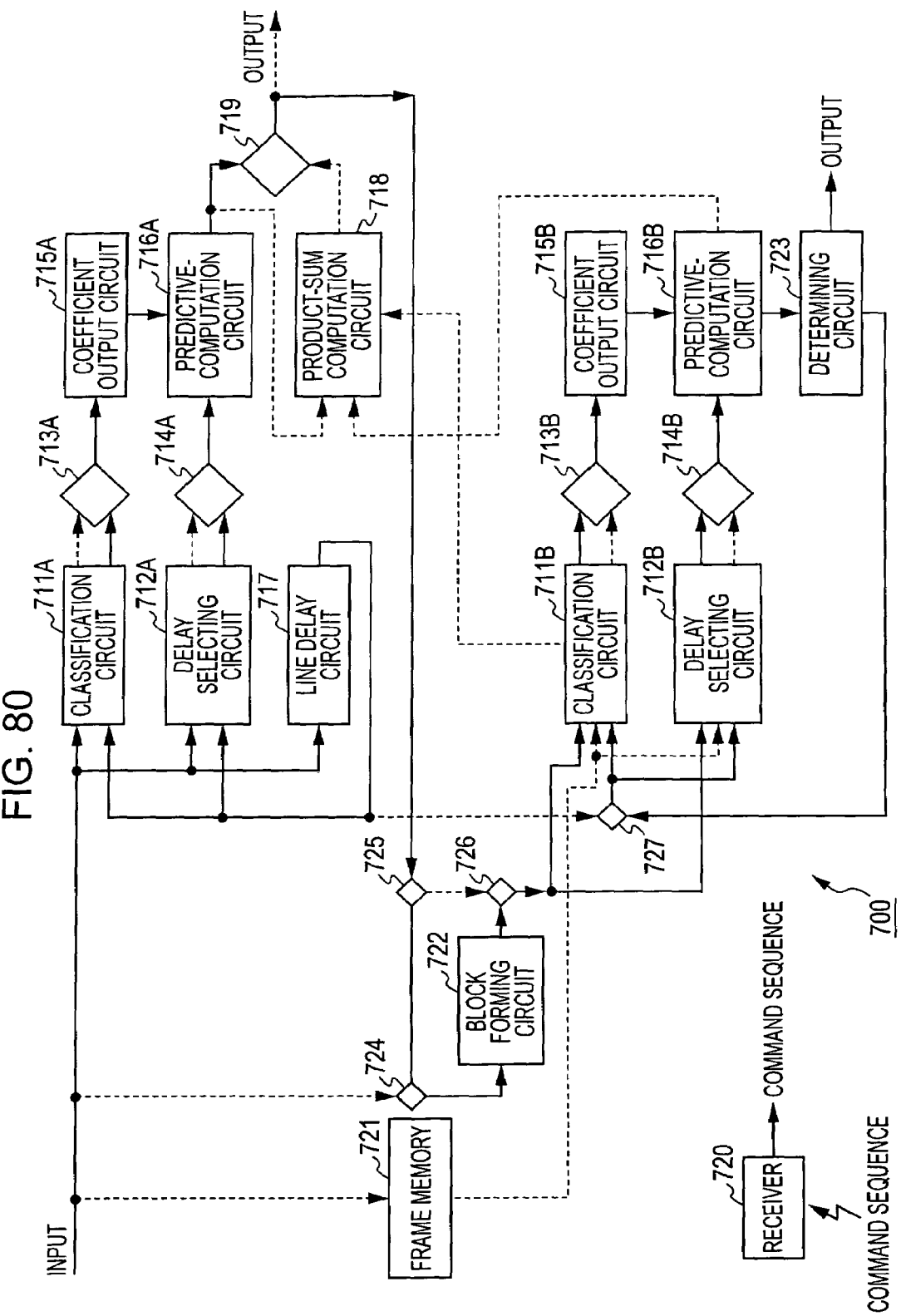
FIG. 80 is a block diagram illustrating the internal structure of the IC in which the selection states of signal lines are switched to perform two-dimensional spatial-resolution creation processing and further to perform recursive enlarging processing on the resulting data.

FIG. 80 illustrates the IC 700 in which the selection states of the signal lines are switched to perform two-dimensional spatial-resolution creation processing and then to perform recursive processing on the data obtained as a result of the two-dimensional spatial-resolution creation processing.

In FIG. 80, the switch circuits 713A, 713B, 714A, 714B, 719, and 724 through 727 of the IC 700 switch the selection states of the signal lines, as indicated by the solid lines in FIG. 80, according to the commands "Kaizodo 2dimensional" and "Zoom ver1" to perform two-dimensional spatial-resolution creation processing and then to perform recursive enlarging processing on the data obtained as a result of the two-dimensional spatial-resolution creation processing.

The signal lines indicated by the broken lines in FIG. 80 are signal lines that are not used for signal processing in the current IC 700 although they are physically disposed.

In the IC 700 shown in FIG. 80, two-dimensional spatial-resolution creation processing for converting the image data input into the IC 700 as the first image data into HD image data with improved spatial resolution as the second image data is performed, and then, recursive enlarging processing for converting the HD image data as the first image data into enlarged image data as the second image data in classification adaptive processing is performed.

Figure 79:
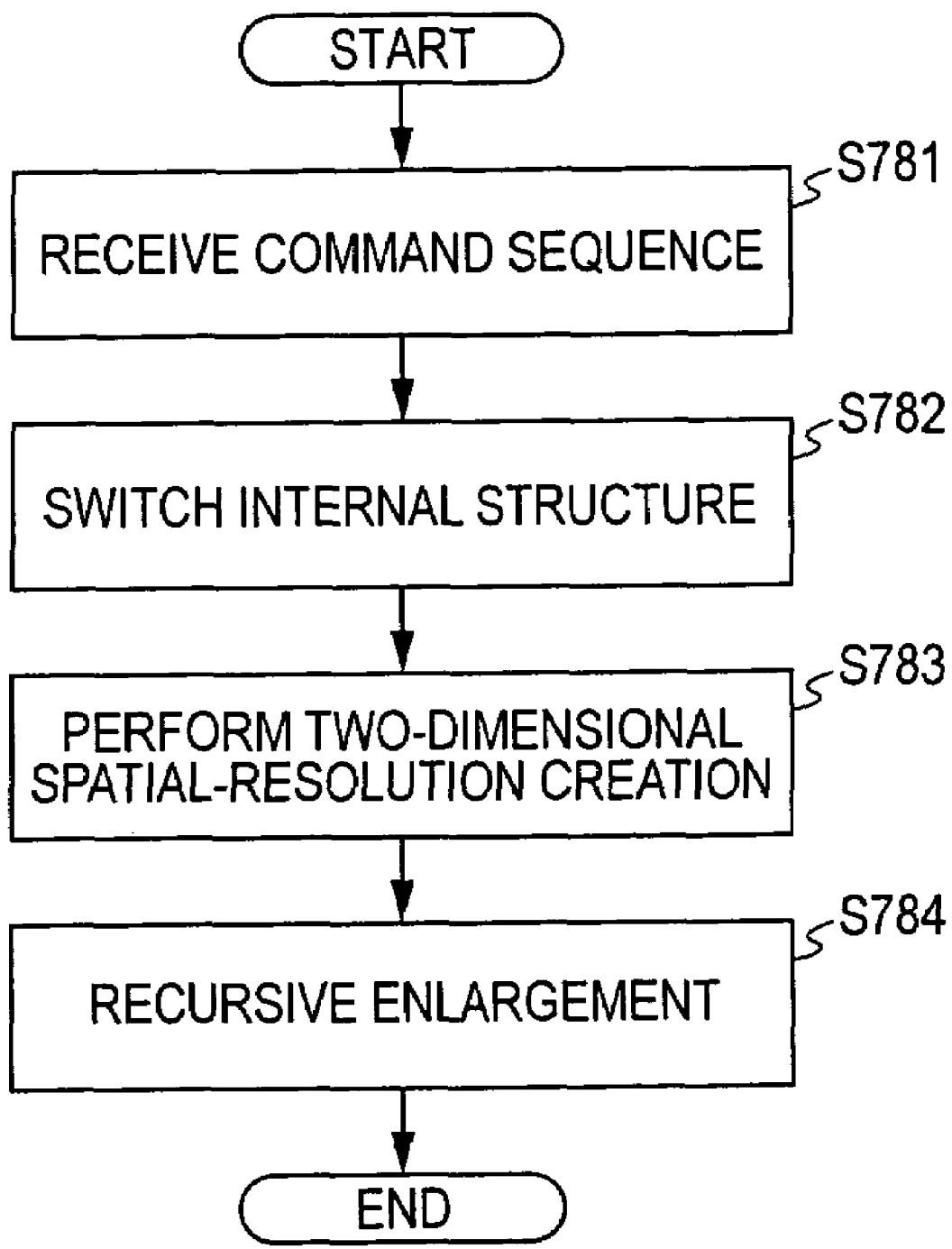
FIG. 79 is a flowchart illustrating processing performed by the IC when a command sequence consisting of commands "Kaizodo 2dimensional" and "Zoom ver1" is received.

Steps S783 and S784 of FIG. 79 are performed in the IC 700 having the internal structure switched as shown in FIG. 80.

More specifically, in step S783, the two-dimensional spatial-resolution creation processing discussed in steps S713 through S718 of FIG. 69 is performed. The resulting HD image data is then supplied to the block forming circuit 722 from the predictive-computation circuit 716A via the switch circuits 719, 725, and 724.

Then, in step S784, the recursive enlarging processing discussed with reference to steps S743 through S751 of FIG. 75 is performed on the HD image data supplied to the block forming circuit 722. Then, the resulting enlarged image data is output to the outside of the IC 700 from the determining circuit 723.

In this case, the IC 700 serves as a two-dimensional digital filter for filtering two-dimensional predictive taps and also as an image enlarging device.

If the input image data of the subsequent frame is supplied to the IC 700, steps S783 and S784 are repeated for the subsequent frame.

The processing performed by the IC 700 shown in FIG. 64 when a command sequence consisting of two commands "Kaizodo 2dimensional" and "Zoom ver2" is supplied from an external source is discussed below with reference to the flowchart of FIG. 81.

In step S791, the receiver 720 receives the command sequence from an external source and supplies it to the required blocks forming the IC 700.

In step S792, the IC 700 switches the internal structure thereof according to the received command sequence.

More specifically, the switch circuits 713A, 713B, 714A, 714B, 719, and 724 through 727 of the IC 700 switch the selection states of the signal lines according to the two commands "Kaizodo 2dimensional" and "Zoom ver2" to perform two-dimensional spatial-resolution creation processing and single enlarging processing, respectively.

Figure 82:
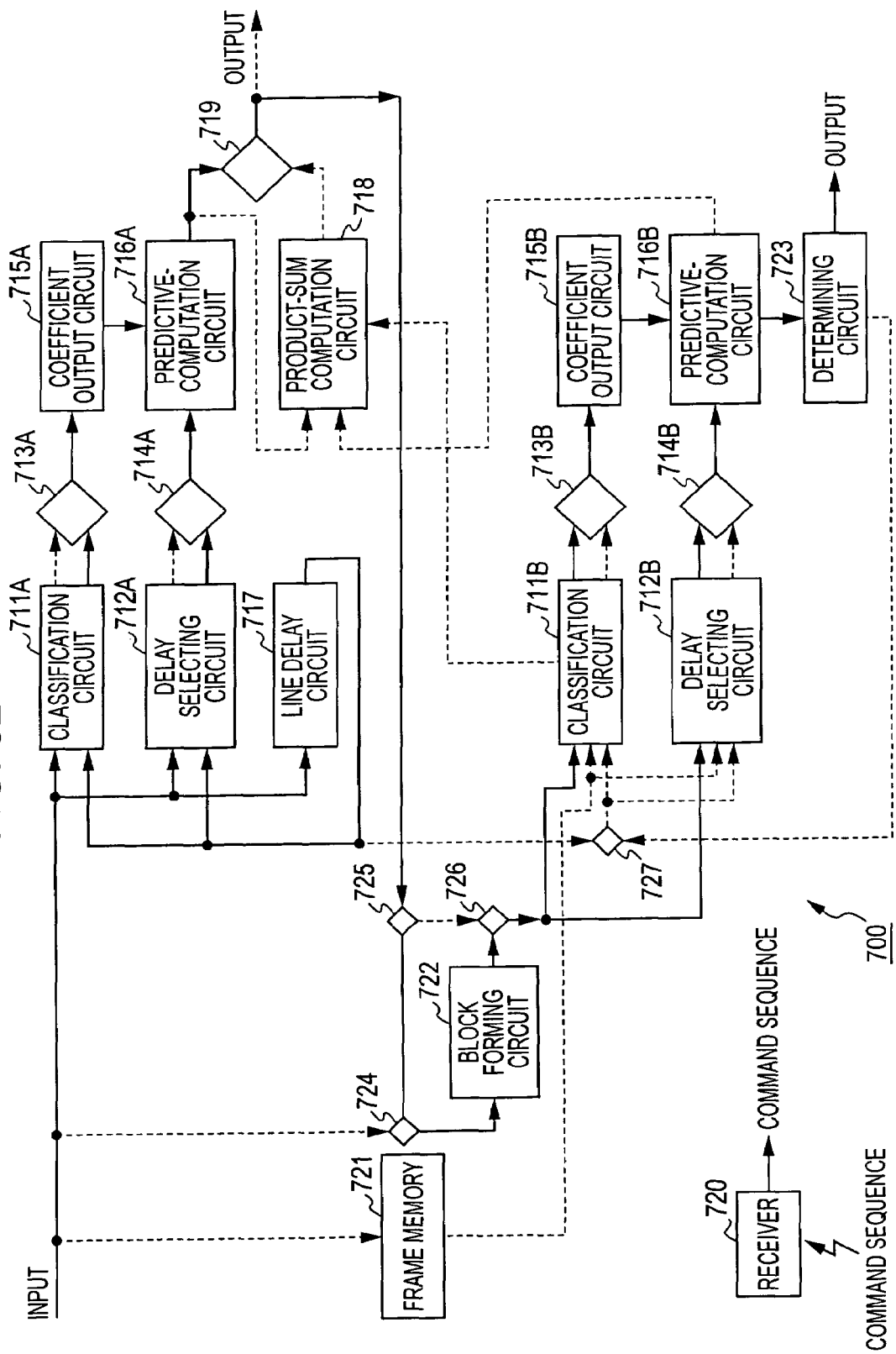
FIG. 82 is a block diagram illustrating the internal structure of the IC in which the selection states of signal lines are switched to perform two-dimensional spatial-resolution creation processing and further to perform single enlarging processing on the resulting data.

FIG. 82 illustrates the IC 700 in which the selection states of the signal lines are switched to perform two-dimensional spatial-resolution creation processing and then to perform single enlarging processing on the data obtained as a result of the two-dimensional spatial-resolution creation processing.

In FIG. 82, the switch circuits 713A, 713B, 714A, 714B, 719, and 724 through 727 of the IC 700 switch the selection states of the signal lines, as indicated by the solid lines in FIG. 82, according to the commands "Kaizodo 2dimensional" and "Zoom ver2" to perform two-dimensional spatial-resolution creation processing and then to perform single enlarging processing on the data obtained as a result of the two-dimensional spatial-resolution creation processing.

The signal lines indicated by the broken lines in FIG. 82 are signal lines that are not used for signal processing in the current IC 700 although they are physically disposed.

In the IC 700 shown in FIG. 82, two-dimensional spatial-resolution creation processing for converting the image data input into the IC 700 as the first image data into HD image data with improved spatial resolution as the second image data is performed, and then, single enlarging processing for converting the HD image data as the first image data into enlarged image data as the second image data in classification adaptive processing is performed.

Figure 81:
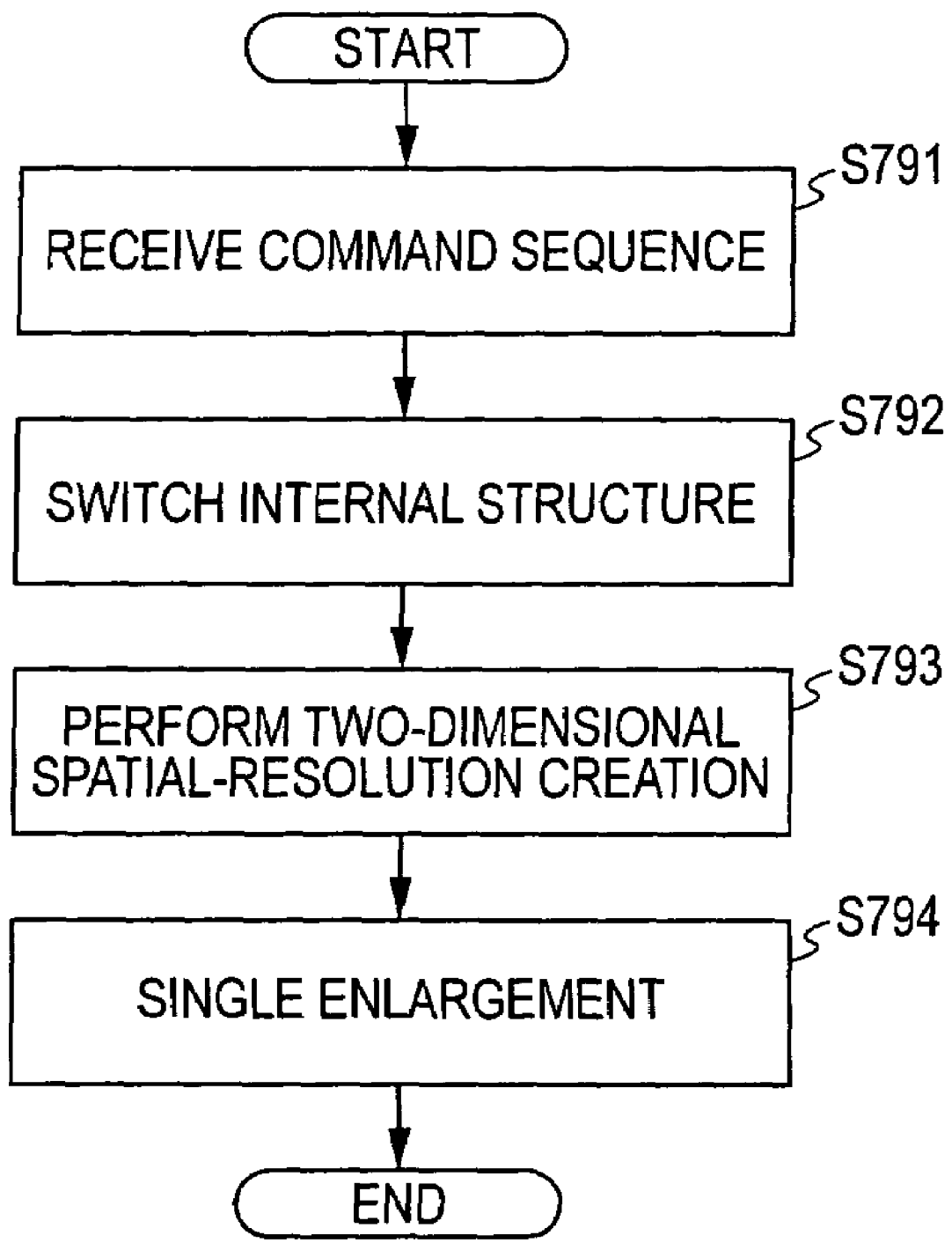
FIG. 81 is a flowchart illustrating processing performed by the IC when a command sequence consisting of commands "Kaizodo 2dimensional" and "Zoom ver2" is received.

Steps S793 and S794 of FIG. 81 are performed in the IC 700 having the internal structure switched as shown in FIG. 82.

More specifically, in step S793, the two-dimensional spatial-resolution creation processing discussed in steps S713 through S718 of FIG. 69 is performed. The resulting HD image data is then supplied to the block forming circuit 722 from the predictive-computation circuit 716A via the switch circuits 719, 725, and 724.

Then, in step S794, the single enlarging processing discussed with reference to steps S743 through S751 of FIG. 77 is performed on the HD image data supplied to the block forming circuit 722. Then, the resulting enlarged image data is output to the outside of the IC 700 from the determining circuit 723.

In this case, the IC 700 serves as a two-dimensional digital filter for filtering two-dimensional predictive taps and also as an image enlarging device.

If the input image data of the subsequent frame is supplied to the IC 700, steps S793 and S794 are repeated for the subsequent frame.

As is seen from the foregoing description, in the IC 700, when a command sequence consists of a plurality of commands, for example, first and second commands, the internal structure of the IC 700 is switched according to the first and second commands so that first signal processing corresponding to the first command and second image processing corresponding to the second command can be performed. Then, the first signal processing is performed, and the second signal processing is performed on the data obtained as a result of the first image processing. Thus, in the IC 700, a plurality of functions can be easily implemented by using a single unit of hardware.

In this specification, it is not essential that the steps forming the processes indicated by the flowcharts be performed in chronological order specified in the flowcharts, and they may be executed in parallel.

Although in this embodiment signal processing is performed on image data, it may be performed on another type of data, for example, audio data.

According to the present invention, many functions can be easily implemented by using a single unit of hardware.

The present application contains subject matter related to Japanese Patent Application No. 2004-042904, filed in Japanese Patent Office on Feb. 19, 2004, the entire contents of which being incorporated herein by reference.

What is claimed is:

1. A signal processing apparatus comprising:

first signal processing means for performing signal processing on a first signal after switching an internal structure of the first signal processing means and for outputting a second signal, the first signal processing using learned tap coefficients from a command sequence for computation on the first signal, the tap coefficients being determined based on parameters z;

second signal processing means for performing signal processing on the second signal after switching an internal structure of the second signal processing means and for outputting a third signal; and command sequence generating means for generating the command sequence in response to a signal from an external source and for transmitting the command sequence to the first and second signal processing means, wherein the first and second signal processing means switch the internal structure according to at least one of a plurality of commands forming the command sequence, and wherein the command sequence generating means includes, a learning image storage unit storing learning image data, a supervisor data generator for generating supervisor image data from the learning image data, a learner data generator for generating a learner data for learning the tap coefficients, a parameter generator to provide the parameters z to the learner data generator and the supervisor data generator, and a learning unit that determines and outputs the tap coefficients to the first signal processing means by using the supervisor image data from the supervisor data generator, by using the learner data generated from the learner data generator, and by using the parameters z supplied from the parameter generator.

2. The signal processing apparatus according to claim 1, wherein at least one of the first signal processing means and the second signal processing means is a one-chip integrated circuit.

3. The signal processing apparatus according to claim 1, wherein the learned tap coefficients are configured such that the first signal processing means or the second signal processing means performs noise removing processing for removing noise contained in the corresponding first or second signal, distortion removing processing for removing distortion occurring in the corresponding first or second signal, spatial-resolution creation processing for improving a spatial resolution of an image, or temporal-resolution creation processing for improving a temporal resolution of an image after switching the internal structure.

4. The signal processing apparatus according to claim 1, wherein the first signal processing means performs computation by using the learned tap coefficient corresponding to a class obtained by classifying a selected signal component forming the second signal into one of a plurality of classes and by using the first signal corresponding to the selected signal component, thereby determining the selected signal component.

5. The signal processing apparatus according to claim 4, wherein the first signal processing means comprises:

class tap selecting means for selecting, from the first signal, class taps used for classifying the selected signal component into one of the plurality of classes;

classifying means for classifying the selected signal component based on the class taps;

predictive tap selecting means for selecting, from the first signal, predictive taps used together with the tap coefficient to determine the selected signal component;

tap coefficient output means for outputting the tap coefficient corresponding to the class of the selected signal component; and computing means for determining the selected signal component by performing computation by using the tap coefficient corresponding to the class of the selected signal component and the predictive taps corresponding to the selected signal component.

6. The signal processing apparatus according to claim 5, wherein the first signal processing means switches the internal structure so that a type of tap coefficient output from the tap coefficient output means is changed.

7. The signal processing apparatus according to claim 1, wherein the second signal processing means performs computation by using a tap coefficient corresponding to a class obtained by classifying a selected signal component forming the third signal into one of a plurality of classes and by using the second signal corresponding to the selected signal component, thereby determining the selected signal component.

8. The signal processing apparatus according to claim 7, wherein the second signal processing means comprises:

class tap selecting means for selecting, from the second signal, class taps used for classifying the selected signal component into one of the plurality of classes;

classifying means for classifying the selected signal component based on the class taps;

predictive tap selecting means for selecting, from the second signal, predictive taps used together with the tap coefficient to determine the selected signal component;

tap coefficient output means for outputting the tap coefficient corresponding to the class of the selected signal component; and computing means for determining the selected signal component by performing computation by using the tap coefficient corresponding to the class of the selected signal component and the predictive taps corresponding to the selected signal component.

9. The signal processing apparatus according to claim 8, wherein the second signal processing means switches the internal structure so that a type of tap coefficient output from the tap coefficient output means is changed.

10. The signal processing apparatus according to claim 1, wherein:

the first signal, the second signal, and the third signal are a first image signal, a second image signal, and a third image signal, respectively;

the first signal processing means performs spatial-resolution creation processing for improving a spatial resolution of the first image signal or image reducing processing for reducing the size of the first image signal after switching the internal structure so as to output the second image signal; and the second signal processing means performs noise removing processing for removing noise of the second image signal or temporal-resolution creation processing for improving a temporal resolution of the second image signal after switching the internal structure so as to output the third image signal.

11. The signal processing apparatus according to claim 10, further comprising image signal output means for receiving a broadcast signal and for outputting a first image signal obtained from the broadcast signal.

12. The signal processing apparatus according to claim 10, further comprising motion vector detecting means for detecting motion vectors according to one of the plurality of commands forming the command sequence, wherein the first signal processing means or the second signal processing means performs signal processing by using the motion vectors detected by the motion vector detecting means.

13. The signal processing apparatus according to claim 10, further comprising image signal storage means for storing the third image signal according to one of the plurality of commands forming the command sequence.

14. The signal processing apparatus according to claim 1, further comprising:

coefficient memory devices configured to store coefficient sets for configuring the at least one of first or second signal processing means; and a selector configured to select a coefficient set from one of the coefficient memory devices, wherein the command sequence includes a command that selects the coefficient set by using the selector to supply the coefficient set to the at least one of the first or second signal processing means for switching the internal structure of at least one of the first or second signal processing means.

15. The signal processing apparatus according to claim 1, wherein the command sequence instructs the first signal processing means to switch the internal structure to perform noise removing processing on the first signal, and instructs the second signal processing means to switch the internal structure not to perform any signal processing on the second signal.

16. A signal processing method for a signal processing apparatus comprising first signal processing means and second signal processing means, the signal processing method comprising:

a first signal processing step of performing by the first signal processing means signal processing on a first signal after switching an internal structure of the first signal processing means so as to output a second signal, the first signal processing step using learned tap coefficients from a command sequence for computation on the first signal, the tap coefficients being determined based on parameters z;

a second signal processing step of performing by the second signal processing means signal processing on the second signal after switching an internal structure of the second signal processing means so as to output a third signal;

a command sequence generating step of generating the command sequence in response to a signal from an external source;

a step of transmitting the command sequence to the first and second signal processing means; and a step of switching the internal structure of the first and second signal processing means according to at least one of a plurality of commands forming the command sequence, wherein the command sequence generating step includes, a learning image storage step storing learning image data, a supervisor data generation step for generating supervisor image data from the learning image data, a learner data generation step for generating a learner data for learning the tap coefficients, a parameter generation step to provide the parameters z for the learner data generation step and the supervisor data generation step, and a learning step that determines and outputs the tap coefficients to the first signal processing means by using the supervisor image data from the supervisor data generation step, by using the learner data generated from the learner data generation step, and by using the parameters z supplied from the parameter generation step.

17. The signal processing method according to claim 16, further comprising:

storing coefficient sets in coefficient memory devices for configuring the at least one of first or second signal processing means;

selecting a coefficient set from one of the coefficient memory devices based on a command of the command sequence; and supplying the selected coefficient set to at least one of the first or second signal processing means for switching the internal structure of at least one of the first or second signal processing means.

18. The signal processing method according to claim 16, wherein the step of switching further comprising:

instructing the first signal processing means by the command sequence to switch the internal structure to perform noise removing processing on the first signal; and instructing the second signal processing means by the command sequence to switch the internal structure not to perform any signal processing on the second signal.

19. A signal processing apparatus comprising:

first signal processing means for performing signal processing on a first signal after switching an internal structure of the first signal processing means and for outputting a second signal, the first signal processing using learned tap coefficients from a command sequence for computation on the first signal, the tap coefficients being determined based on parameters z; and command sequence generating means for generating the command sequence in response to a signal from an external source and for transmitting the command sequence to the first signal processing means, wherein the second signal is subjected to signal processing by second signal processing means that switches an internal structure of the second signal processing means, and wherein the first and second signal processing means switch the internal structure according to at least one of a plurality of commands forming the command sequence, wherein the command sequence generating means includes, a learning image storage unit storing learning image data, a supervisor data generator for generating supervisor image data from the learning image data, a learner data generator for generating a learner data for learning the tap coefficients, a parameter generator to provide the parameters z to the learner data generator and the supervisor data generator, and a learning unit that determines and outputs the tap coefficients to the first signal processing means by using the supervisor image data from the supervisor data generator, by using the learner data generated from the learner data generator, and by using the parameters z supplied from the parameter generator.

20. The signal processing apparatus according to claim 19, further comprising:

coefficient memory devices configured to store coefficient sets for configuring the first signal processing means; and a selector configured to select a coefficient set from one of the coefficient memory devices, wherein the command sequence includes a command that selects the coefficient set by using the selector to supply the coefficient set to the first signal processing means for switching the internal structure of the first signal processing means.

21. The signal processing apparatus according to claim 19, wherein the command sequence instructs the first signal processing means to switch the internal structure to perform noise removing processing on the first signal, and instructs the second signal processing means to switch the internal structure not to perform any signal processing on the second signal.

22. A signal processing apparatus comprising:

second signal processing means for performing signal processing on a second signal, the second signal being output as a result of performing signal processing on a first signal by first signal processing means that switches an internal structure of the first signal processing means, the second signal processing using learned tap coefficients from a command sequence for computation on the second signal, the tap coefficients being determined based on parameters z; and command sequence generating means for generating the command sequence in response to a signal from an external source and for transmitting the command sequence to the second signal processing means, wherein the second signal processing means performs signal processing on the second signal after switching an internal structure of the second signal processing means so as to output a third signal, and wherein the first and second signal processing means switch the internal structure according to at least one of a plurality of commands forming the command sequence, wherein the command sequence generating means includes, a learning image storage unit storing learning image data, a supervisor data generator for generating supervisor image data from the learning image data, a learner data generator for generating a learner data for learning the tap coefficients, a parameter generator to provide the parameters z to the learner data generator and the supervisor data generator, and a learning unit that determines and outputs the tap coefficients to the first signal processing means by using the supervisor image data from the supervisor data generator, by using the learner data generated from the learner data generator, and by using the parameters z supplied from the parameter generator.

23. The signal processing apparatus according to claim 22, further comprising:

coefficient memory devices configured to store coefficient sets for configuring the second signal processing means; and a selector configured to select a coefficient set from one of the coefficient memory devices, wherein the command sequence includes a command that selects the coefficient set by using the selector to supply the coefficient set to the second signal processing means for switching the internal structure of the second signal processing means.

24. The signal processing apparatus according to claim 22, wherein the command sequence instructs the first signal processing means to switch the internal structure to perform noise removing processing on the first signal, and instructs the second signal processing means to switch the internal structure not to perform any signal processing on the second signal.

* * * * *